INVENTORS
DAVID W. ANDERSON
DON M. POWERS
ROBERT M. TOMASULO

BY

*Bernard M. Goldman*

ATTORNEY

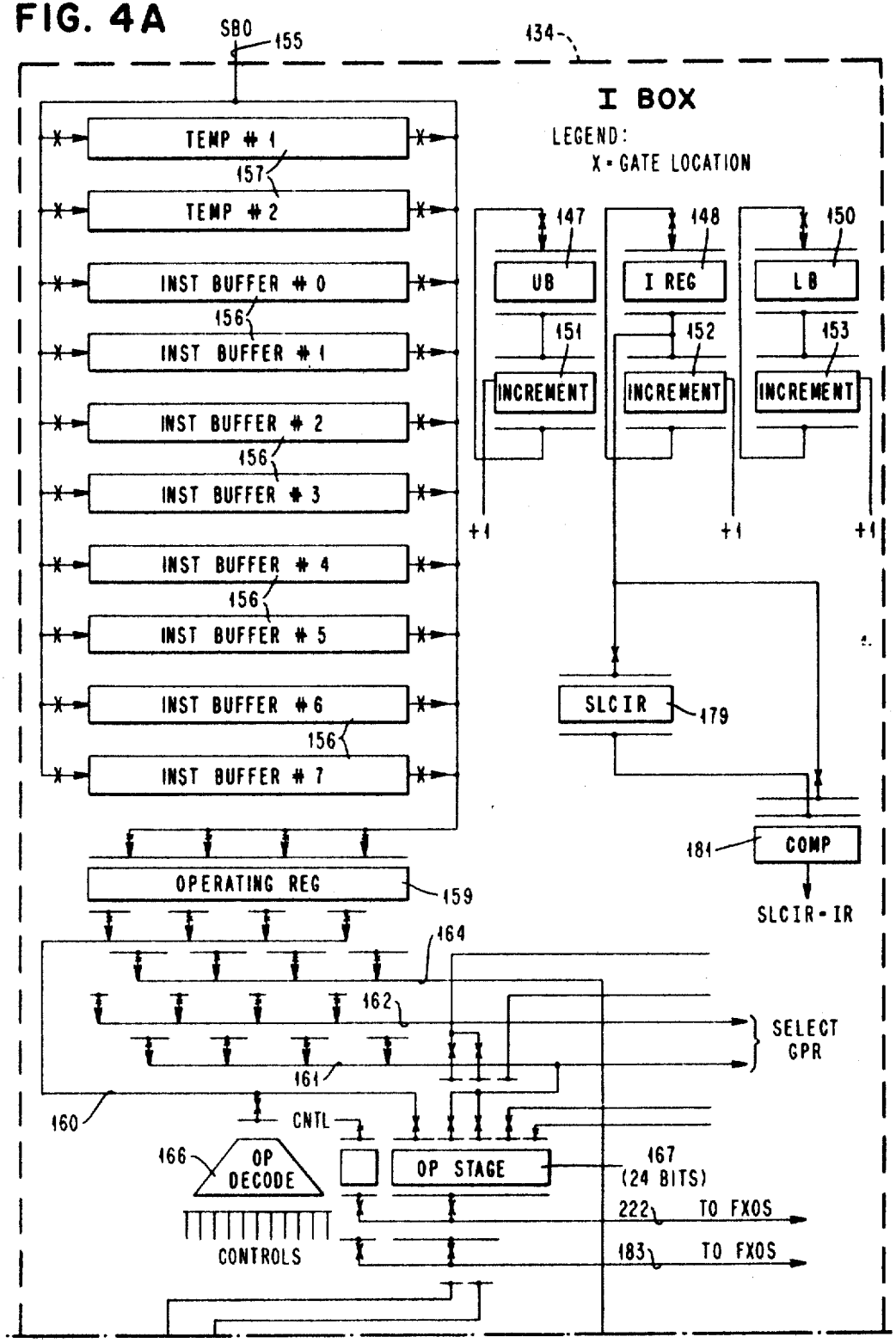

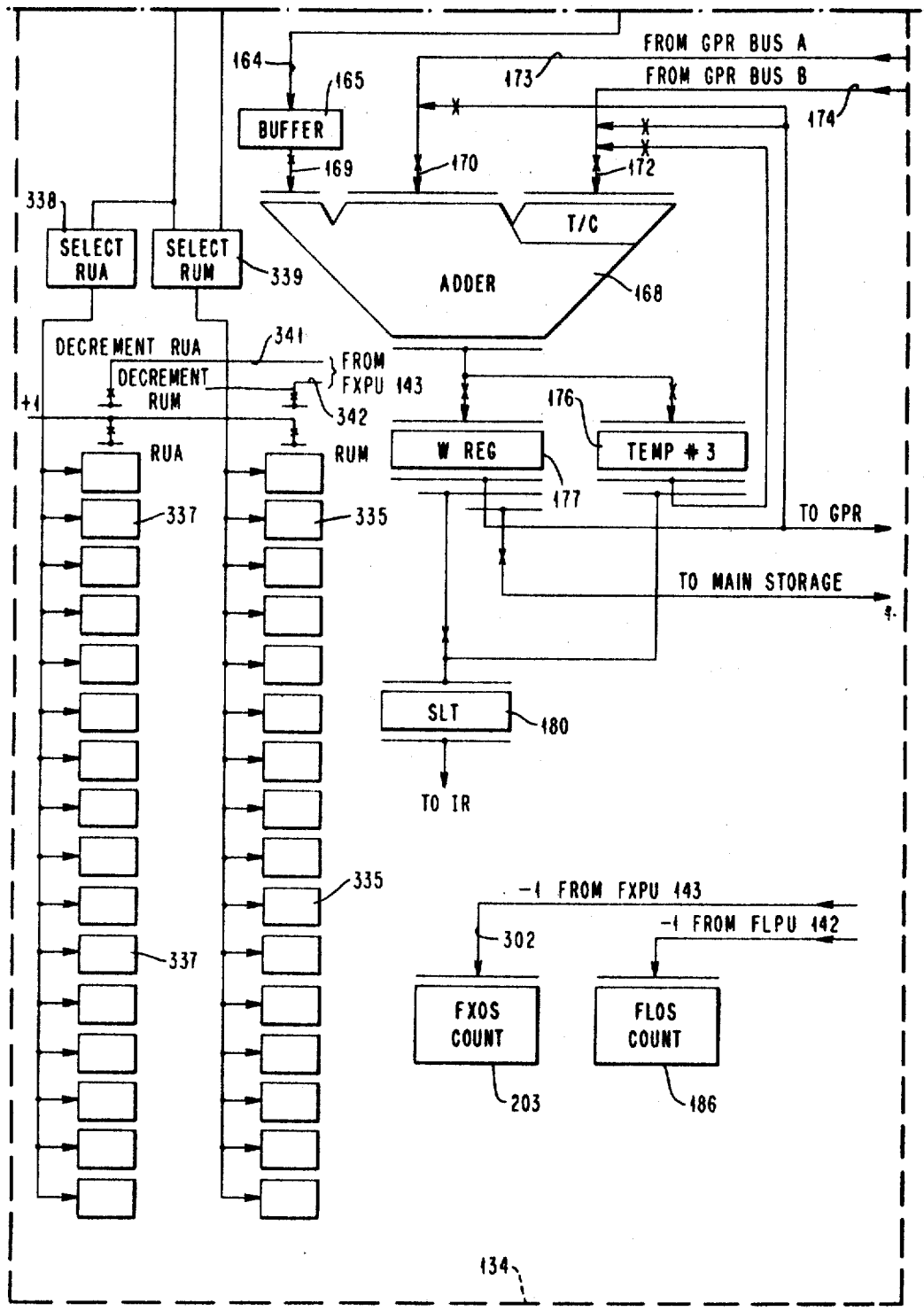

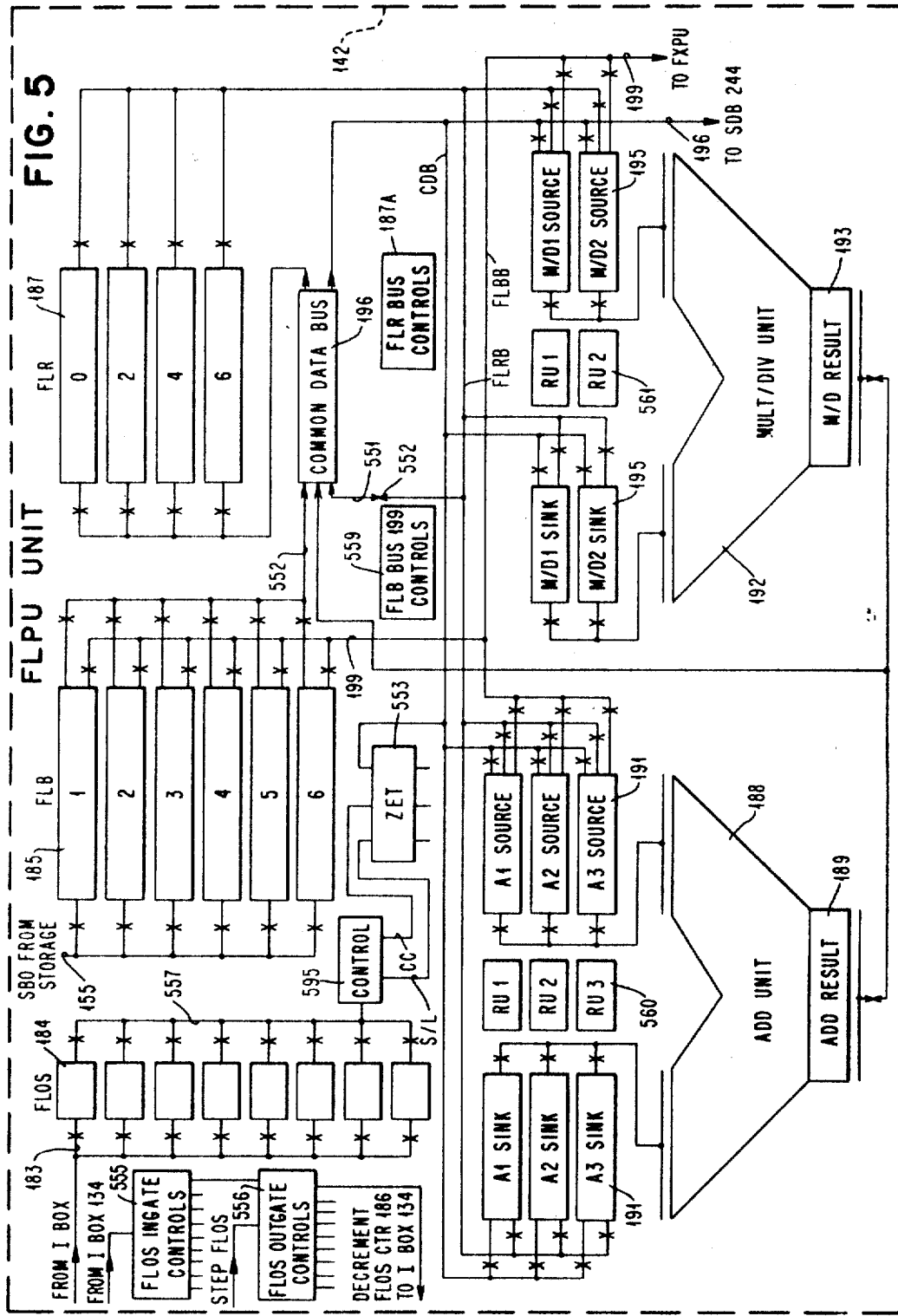

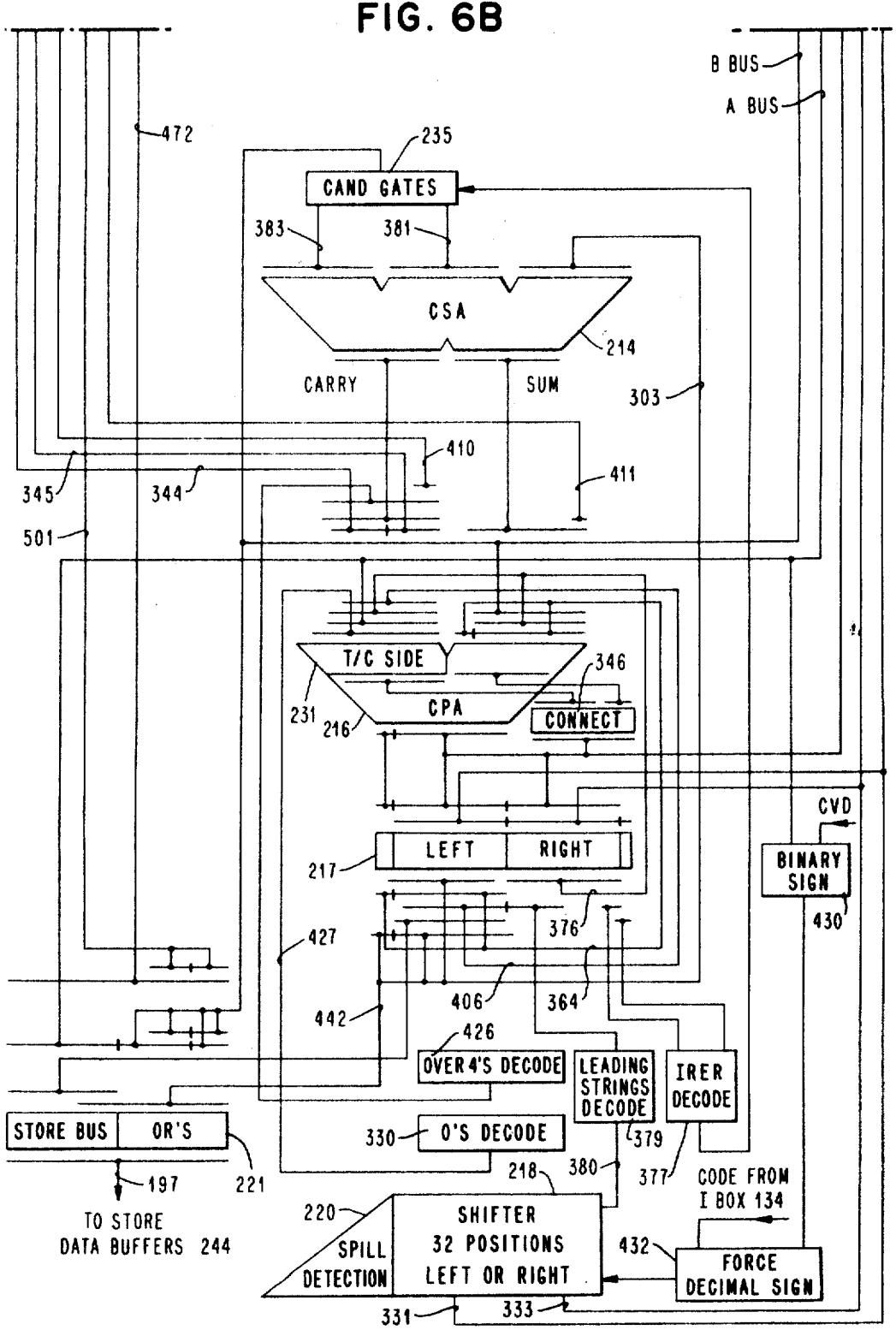

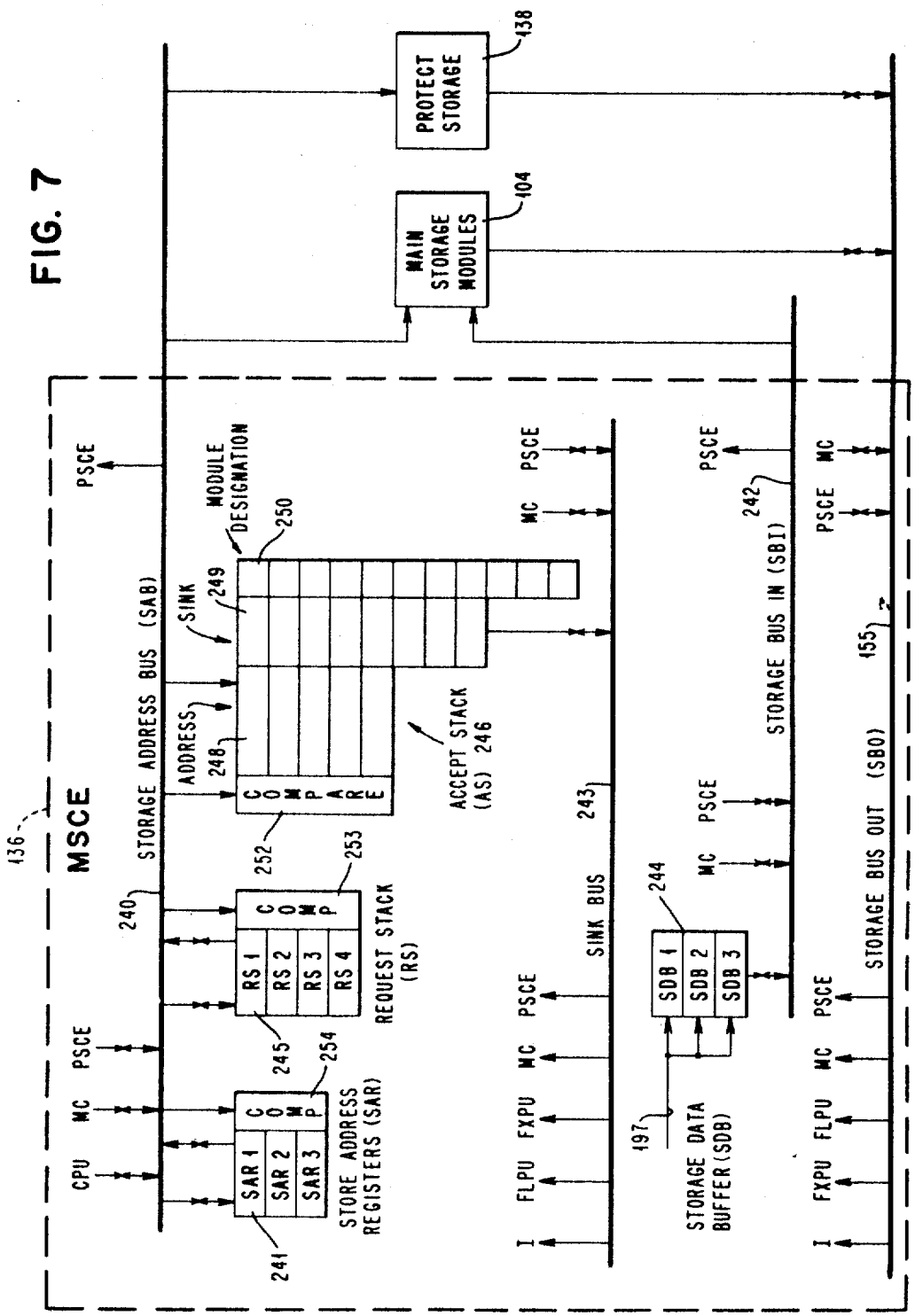

LEGEND TO FIGS. 10 & 11

▨ CIRCUIT FUNCTION

⊢—⊣ STORAGE FUNCTION

LEGEND:
 D — FLOS DECODE CYCLE
 AG — ADDRESS GENERATOR FOR STORAGE FETCH
 ☐ — CDB TIME  S LOT
 • • • — STORAGE FETCH TIME

FLOS POSITION

NOTE: OPS ARE STRIPPED OF UNUSED BITS IN THE I-BOX

FLB CONTROL POSITION

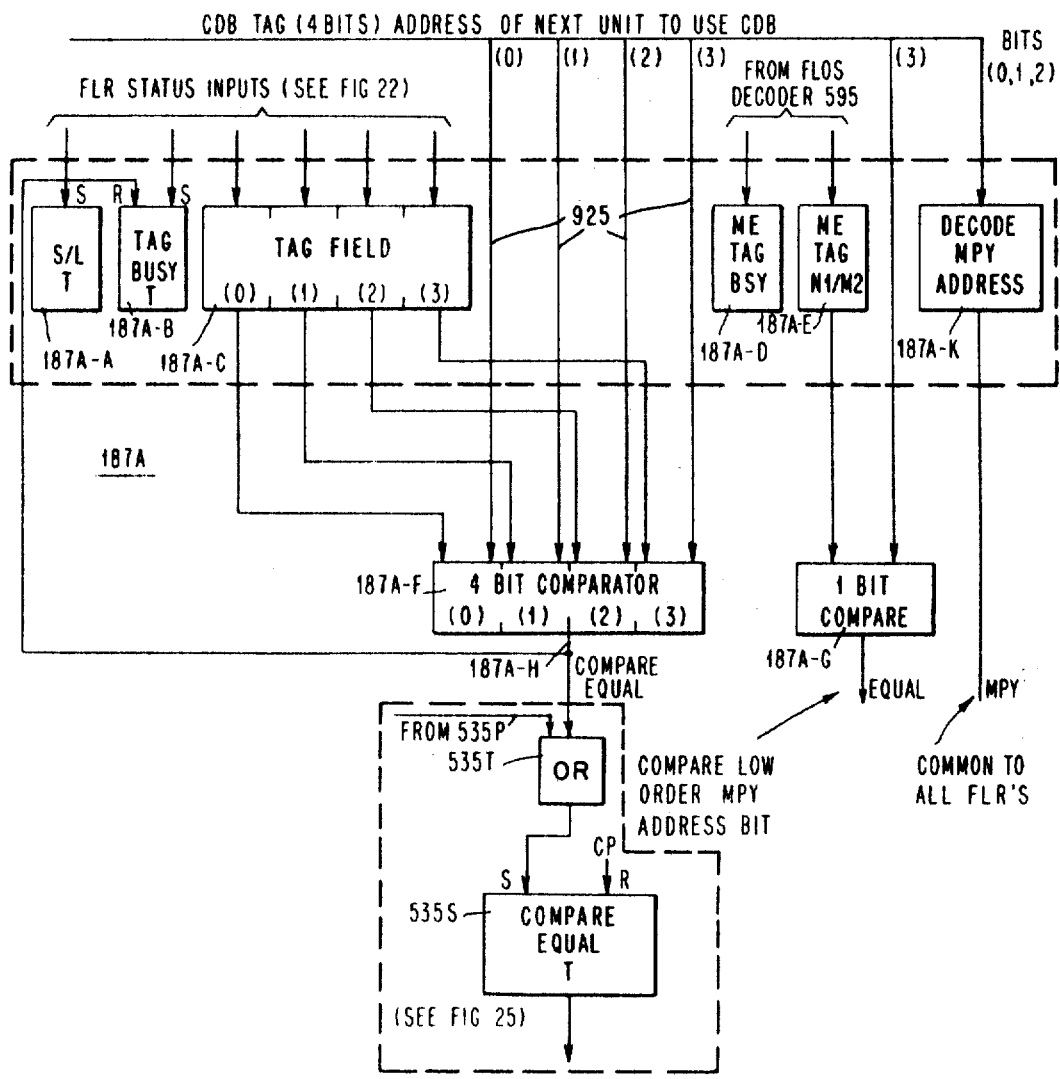

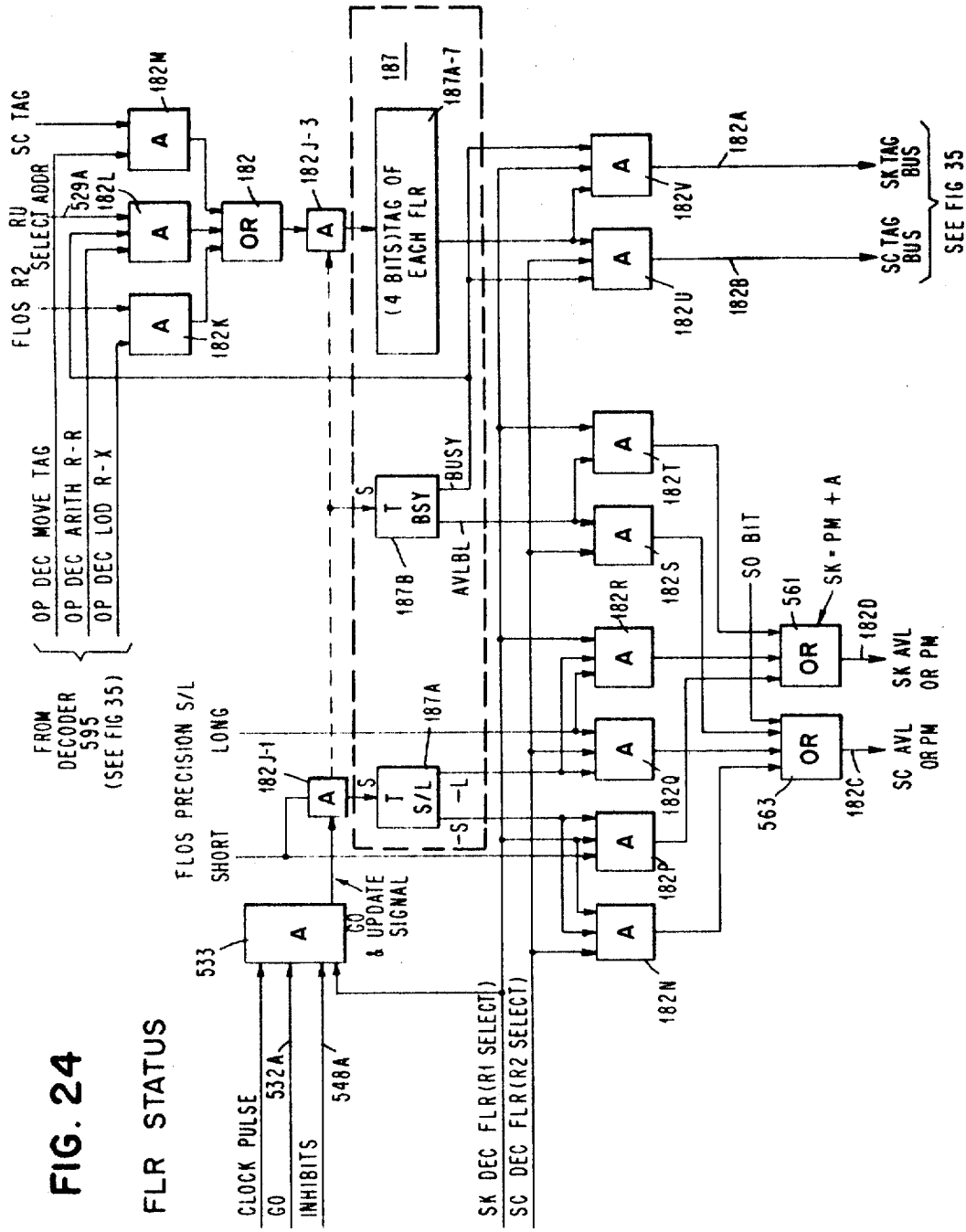

FIG. 25B (FROM DECODER ON R-R STORE OR R-R LOAD INSTRUCTIONS)

Aug. 19, 1969         R. M. TOMASULO ET AL         3,462,744
              EXECUTION UNIT WITH A COMMON OPERAND AND
                       RESULT BUSSING SYSTEM
Filed Sept. 28, 1966                            71 Sheets-Sheet 32

FIG. 32    FORCED CDB CONTROL ON RR STORE
           AND RR LOAD INSTRUCTIONS

FIG. 36A  RX LOAD INSTRUCTIONS

CASE 1

| EXECUTION TIME | SINK | | | SOURCE | | | |
|---|---|---|---|---|---|---|---|
| | CONTROL | TAG | STORAGE UNIT | CONTROL | | DESIGNATOR | STORAGE UNIT |
| BEGINNING OF DECODE CYCLE | TB = 0 | ANY TAG | FLR-X | F/E =0 | GWF CDB =0 | NONE | FLB-Y |
| END OF DECODE CYCLE | TB = 1 | ADDR OF FLB-Y | FLR-X | F/E =0 | GWF CDB =1 | NONE | FLB-Y |
| DATA TRANSFER | WHEN F/E = 1, DATA IS IN FLB-Y; THEN DATA IS SENT ON CDB TO FLR-X, BECAUSE IT IS TAGGED WITH FLB-Y ADDRESS. | | | | | | |

CASE 2

| EXECUTION TIME | SINK | | | SOURCE | | | |
|---|---|---|---|---|---|---|---|
| | CONTROL | TAG | STORAGE UNIT | CONTROL | | DESIGNATOR | STORAGE UNIT |
| BEGINNING OF DECODE CYCLE | TB = 0 | ANY TAG | FLR-X | F/E =1 | GWF CDB =0 | NONE | FLB-Y |
| END OF DECODE CYCLE | TB = 1 | ADDR OF FLB-Y | FLR-X | F/E =1 | GWF CDB =1 | NONE | FLB-Y |
| DATA TRANSFER | AVAILABLE DATA IN FLB-Y IS SENT ON CDB TO FLR-X (BECAUSE IT IS TAGGED WITH FLB-Y ADDR) TWO CYCLES AFTER DECODE CYCLE | | | | | | |

FIG. 36A RX LOAD INSTRUCTIONS

CASE 3

| EXECUTION TIME | SINK | | | SOURCE | | |
|---|---|---|---|---|---|---|
| | CONTROL | TAG | STORAGE UNIT | CONTROL | DESIGNATOR | STORAGE UNIT |
| BEGINNING OF DECODE CYCLE | TB=1 | ANY TAG | FLR-X | F/E=0 | GWF CDB =0 | NONE | FLB-Y |
| END OF DECODE CYCLE | TB=1 | ADDR OF FLB-Y | FLR-X | F/E=0 | GWF CDB =1 | NONE | FLB-Y |
| DATA TRANSFER | WHEN F/E=1, DATA IS IN FLB-Y; THEN DATA IS SENT ON CDB TO FLR-X, BECAUSE IT IS TAGGED WITH FLB-Y ADDRESS | | | | | | |

CASE 4

| EXECUTION TIME | SINK | | | SOURCE | | |
|---|---|---|---|---|---|---|
| | CONTROL | TAG | STORAGE UNIT | CONTROL | DESIGNATOR | STORAGE UNIT |
| BEGINNING OF DECODE CYCLE | TB=1 | ANY TAG | FLR-X | F/E=1 | GWF CDB =0 | NONE | FLB-Y |
| END OF DECODE CYCLE | TB=1 | ADDR OF FLB-Y | FLR-X | F/E=1 | GWF CDB =1 | NONE | FLB-Y |
| DATA TRANSFER | AVAILABLE DATA IN FLB-Y IS SENT ON CDB TO FLR-X (BECAUSE IT IS TAGGED WITH FLB-Y ADDR) TWO CYCLES AFTER DECODE CYCLE | | | | | | |

FIG. 36B RR LOAD INSTRUCTIONS

CASE 1

| EXECUTION TIME | SINK | | | SOURCE | | |
|---|---|---|---|---|---|---|
| | CONTROL | TAG | STORAGE UNIT | CONTROL | TAG | STORAGE UNIT |
| BEGINNING OF DECODE CYCLE | TB=0 | ANY TAG | FLR-X | TB=1 | OLD TAG | FLR-W |
| END OF DECODE CYCLE | TB=1 | OLD TAG | FLR-X | TB=1 | OLD TAG | FLR-W |
| DATA TRANSFER | WHEN DATA IS AVAILABLE IN FLB OR RU NAMED BY "OLD TAG", IT'S DATA IS SENT ON CDB TO BOTH FLR-W AND FLR-X TAGGED WITH "OLD TAG". IF DATA BECOMES AVAILABLE DURING DECODE CYCLE, DATA INGATES ARE OPENED TO BOTH FLR-X AND FLR-W. | | | | | |

CASE 2

| EXECUTION TIME | SINK | | | SOURCE | | |
|---|---|---|---|---|---|---|
| | CONTROL | TAG | STORAGE UNIT | CONTROL | TAG | STORAGE UNIT |
| BEGINNING OF DECODE CYCLE | TB=0 | ANY TAG | FLR-X | TB=0 | OLD TAG | FLR-W |
| END OF DECODE CYCLE | TB=0 | OLD TAG | FLR-X | TB=0 | OLD TAG | FLR-W |
| DATA TRANSFER | AVAILABLE DATA IN FLR-W IS TRANSFERRED ON CDB TO FLR-X TWO CYCLES AFTER DECODE CYCLE | | | | | |

FIG. 36B RR LOAD INSTRUCTIONS

CASE 3

| EXECUTION TIME | SINK | | | SOURCE | | |
|---|---|---|---|---|---|---|
| | CONTROL | TAG | STORAGE UNIT | CONTROL | TAG | STORAGE UNIT |
| BEGINNING OF DECODE CYCLE | TB-1 | ANY TAG | FLR-X | TB-1 | OLD TAG | FLR-W |
| END OF DECODE CYCLE | TB-1 | OLD TAG | FLR-X | TB-1 | OLD TAG | FLR-W |
| DATA TRANSFER | WHEN DATA IS AVAILABLE IN FLB OR RU NAMED BY "OLD TAG", IT'S DATA IS SENT ON CDB TO BOTH FLR-W AND FLR-X TAGGED WITH "OLD TAG". IF DATA BECOMES AVAILABLE DURING DECODE CYCLE, DATA INGATES ARE OPENED TO BOTH FLR-X AND FLR-W. | | | | | |

CASE 4

| EXECUTION TIME | SINK | | | SOURCE | | |
|---|---|---|---|---|---|---|
| | CONTROL | TAG | STORAGE UNIT | CONTROL | TAG | STORAGE UNIT |
| BEGINNING OF DECODE CYCLE | TB-1 | ANY TAG | FLR-X | TB-0 | OLD TAG | FLR-W |
| DATA TRANSFER | AVAILABLE DATA IN FLR-W IS TRANSFERRED ON CDB TO FLR-X TWO CYCLES AFTER DECODE CYCLE | | | | | |

FIG. 36C RX STORE INSTRUCTIONS

CASE 1

| EXECUTION TIME | SINK | | | SOURCE | | | |
|---|---|---|---|---|---|---|---|
| | CONTROL | TAG | STORAGE UNIT | CONTROL | | TAG | STORAGE UNIT |
| BEGINNING OF DECODE CYCLE | TB=1 | OLD TAG | FLR-X | FT=0 | BT=0 | ANY TAG | SDB=Z |
| END OF DECODE CYCLE | TB=1 | OLD TAG | FLR-X | FT=0 | BT=1 | OLD TAG | SDB=Z |
| DATA TRANSFER | WHEN DATA IS AVAILABLE IN FLB OR RU NAMED BY "OLD TAG", DATA IS SENT ON CDB TO ANY UNIT TAGGED WITH "OLD TAG" | | | | | | |

CASE 2

| EXECUTION TIME | SINK | | | SOURCE | | | |
|---|---|---|---|---|---|---|---|
| | CONTROL | TAG | STORAGE UNIT | CONTROL | | TAG | STORAGE UNIT |
| BEGINNING OF DECODE CYCLE | TB=0 | ANY TAG | FLR-X | FT=0 | BT=0 | ANY TAG | SDB-Z |
| END OF DECODE CYCLE | TB=0 | ANY TAG | FLR-X | FT=0 | BT=0 | TAG=0 | SDB-Z |
| DURING SELECT CYCLE | TB=0 | ANY TAG | FLR-X | FT= | BT=1 | TAG=0 | SDB-Z |
| DATA TRANSFER | THE AVAILABLE OPERAND IN FLR-X IS SENT ON THE CDB TO SDB-Z TAGGED WITH AN ALL ZERO TAG DURING CYCLE AFTER SELECT CYCLE | | | | | | |

CASE 3

| EXECUTION TIME | SINK | | | SOURCE | | | |
|---|---|---|---|---|---|---|---|
| | CONTROL | TAG | STORAGE UNIT | CONTROL | | TAG | STORAGE UNIT |
| BEGINNING OF DECODE CYCLE | TB=1 | OLD TAG | FLR-X | FT=1 | BT=0 | ANY TAG | SDB-Z |
| DATA TRANSFER | FLOS INSTRUCTION DECODING STOPS UNTIL FT=0 FOR SDB-Z AND OPERATION CONTINUES AS "RR STORE INSTRUCTION — CASE 1" | | | | | | |

CASE 4

| EXECUTION TIME | SINK | | | SOURCE | | | |
|---|---|---|---|---|---|---|---|
| | CONTROL | TAG | STORAGE UNIT | CONTROL | | TAG | STORAGE UNIT |
| BEGINNING OF DECODE CYCLE | TB=0 | OLD TAG | FLR-X | FT=1 | BT=0 | ANY TAG | SDB-Z |
| DATA TRANSFER | FLOS INSTRUCTION DECODING STOPS UNTIL FT=0 FOR SDB-Z AND OPERATION CONTINUES AS "RX STORE INSTRUCTION — CASE 2" | | | | | | |

FIG. 36D  RX ARITHMETIC INSTRUCTIONS

CASE 1

| EXECUTION TIME | SINK | | | SOURCE | | | |
|---|---|---|---|---|---|---|---|
| | CONTROL | TAG | STORAGE UNIT | CONTROL | DESIGNATOR | | STORAGE UNIT |
| BEGINNING OF DECODE CYCLE | TB-1 | OLD TAG | FLR-X | F/E =0 | GWF FLBB =0 | ANY RU | FLB-Y |
| END OF DECODE CYCLE | TB-1 | SELECTED RU ADDR | FLR-X | F/E =0 | GWF FLBB =1 | ADDR OF SELECTED RU | FLB-Y |
| DURING SELECT CYCLE | UB-0 | SINK TAG = OLD TAG | ALL UNBUSY RU'S | F/E =0 | UB =0 | SOURCE TAG=0 | ALL UNBUSY RU'S |
| END OF SELECT CYCLE | UB-1 | SINK TAG = OLD TAG | RU SELECTED (AWAITS OPERAND) | F/E =0 | UB =1 | SOURCE TAG=0 | RU SELECTED (AWAITS OPERAND) |
| DATA TRANSFER | WHEN DATA IS AVAILABLE IN FLB OR RU NAMED BY "OLD TAG", DATA IS SENT ON CDB TO ANY UNIT TAGGED WITH "OLD TAG" | | | WHEN F/E=1, DATA IS IN FLB-Y; AND FLBB CYCLE SENDS DATA TO DESIGNATED RU TWO CYCLES LATER. | | | |

CASE 2

| EXECUTION TIME | SINK | | | SOURCE | | | |
|---|---|---|---|---|---|---|---|
| | CONTROL | TAG | STORAGE UNIT | CONTROL | DESIGNATOR | | STORAGE UNIT |
| BEGINNING OF DECODE CYCLE | TB=0 | OLD TAG | FLR-X | F/E =0 | GWF FLBB =0 | ANY RU | FLB-Y |
| END OF DECODE CYCLE | TB-1 | SELECTED RU ADDR | FLR-X | F/E =0 | GWF FLBB =1 | ADDR OF SELECTED RU | FLB-Y |
| DURING SELECT CYCLE | UB-0 | SINK TAG =0 | ALL UNBUSY RU'S | F/E =0 | UB =0 | SOURCE TAG=0 | ALL UNBUSY RU'S |
| END OF SELECT CYCLE | UB=1 | SINK TAG =0 | RU SELECTED (CONTAINS OPERAND) | F/E =0 | UB =0 | SOURCE TAG =0 | RU SELECTED (AWAITS OPERAND) |
| DATA TRANSFER | THE AVAILABLE OPERAND IS TRANSFERRED ON THE FLRB TO THE SELECTED RU DURING THE SELECT CYCLE | | | WHEN F/E=1, DATA IS IN FLB-Y; AND FLBB CYCLE SENDS DATA TO DESIGNATED RU TWO CYCLES LATER | | | |

FIG. 36D  RX ARITHMETIC INSTRUCTIONS

CASE 3

| EXECUTION TIME | SINK | | | SOURCE | | | |
|---|---|---|---|---|---|---|---|
| | CONTROL | TAG | STORAGE UNIT | CONTROL | | DESIGNATOR | STORAGE UNIT |
| BEGINNING OF DECODE CYCLE | TB = 0 | OLD TAG | FLR - X | F/E = 1 | GWF FLBB = 0 | ANY RU | FLB - Y |
| END OF DECODE CYCLE | TB = 1 | SELECTED RU ADDR | FLR - X | F/E = 1 | GWF FLBB = 1 | ADDR OF SELECTED RU | FLB - Y |
| DURING SELECT CYCLE | UB = 0 | SINK TAG = 0 | ALL UNBUSY RU'S | F/E = 1 | UB = 0 | SOURCE TAG = 0 | ALL UNBUSY RU'S |
| END OF SELECT CYCLE | UB = 1 | SINK TAG = 0 | RU SELECTED (CONTAINS OPERAND) | F/E = 1 | UB = 1 | SOURCE TAG = 0 | RU SELECTED (AWAITS OPERAND) |
| DATA TRANSFER | THE AVAILABLE OPERAND IS TRANSFERRED ON THE FLRB TO THE SELECTED RU DURING THE SELECT CYCLE | | | AVAILABLE DATA IS IN FLB-Y AND FLBB CYCLE SENDS DATA TO DESIGNATED RU TWO CYCLES AFTER SELECT CYCLE | | | |

CASE 4

| EXECUTION TIME | SINK | | | SOURCE | | | |
|---|---|---|---|---|---|---|---|
| | CONTROL | TAG | STORAGE UNIT | CONTROL | | DESIGNATOR | STORAGE UNIT |
| BEGINNING OF DECODE CYCLE | TB = 1 | OLD TAG | FLR - X | F/E = 1 | GWF FLBB = 0 | ANY RU | FLB - Y |
| END OF DECODE CYCLE | TB = 1 | SELECTED RU ADDR | FLR - X | F/E = 1 | GWF FLBB = 1 | ADDR OF SELECTED RU | FLB - Y |
| DURING SELECT CYCLE | UB = 0 | SINK TAG = OLD TAG | ALL UNBUSY RU'S | F/E = 1 | UB = 0 | SOURCE TAG = 0 | ALL UNBUSY RU'S |
| END OF SELECT CYCLE | UB = 1 | SINK TAG = OLD TAG | RU SELECTED (AWAITS OPERAND) | F/E = 1 | UB = 1 | SOURCE TAG = 0 | RU SELECTED (AWAITS OPERAND) |
| DATA TRANSFER | WHEN DATA IS IN FLB OR RU NAMED BY "OLD TAG", DATA IS SENT ON CDB TO ANY UNIT TAGGED WITH "OLD TAG" | | | AVAILABLE DATA IS IN FLB-Y; AND FLBB CYCLE SENDS DATA TO DESIGNATED RU TWO CYCLES AFTER SELECT CYCLE | | | |

FIG. 36E  RR ARITHMETIC INSTRUCTIONS

CASE 1

| EXECUTION TIME | SINK | | | SOURCE | | |
|---|---|---|---|---|---|---|
| | CONTROL | TAG | STORAGE UNIT | CONTROL | TAG | STORAGE UNIT |
| BEGINNING OF DECODE CYCLE | TB-1 | OLD TAG | FLR-X | TB-1 | OLD TAG | FLR-W |
| END OF DECODE CYCLE | TB-1 | SELECTED RU ADDR | FLR-X | TB-1 | OLD TAG | FLR-W |
| DURING SELECT CYCLE | UB-0 | OLD TAG | ALL UNBUSY RU'S | UB-0 | OLD TAG | ALL UNBUSY RU'S |
| END OF SELECT CYCLE | UB-1 | OLD TAG | SELECTED RU SINK (AWAITS OPERAND) | UB-1 | OLD TAG | SELECTED RU SOURCE (AWAITS OPERAND) |
| DATA TRANSFER | WHEN AVAILABLE, OPERAND IS TRANSFERRED ON CDB DIRECTLY TO TAGGED RU | | | WHEN AVAILABLE, OPERAND IS TRANSFERRED ON CDB DIRECTLY TO TAGGED RU | | |

CASE 2

| EXECUTION TIME | SINK | | | SOURCE | | |
|---|---|---|---|---|---|---|
| | CONTROL | TAG | STORAGE UNIT | CONTROL | TAG | STORAGE UNIT |
| BEGINNING OF DECODE CYCLE | TB-0 | OLD TAG | FLR-X | TB-1 | OLD TAG | FLR-W |
| END OF DECODE CYCLE | TB-1 | SELECTED RU ADDR | FLR-X | TB-1 | OLD TAG | FLR-W |
| DURING SELECT CYCLE | UB-0 | TAG-0 | ALL UNBUSY RU'S | UB-0 | OLD TAG | ALL UNBUSY RU'S |
| END OF SELECT CYCLE | UB-1 | TAG-0 | SELECTED RU (CONTAINS OPERAND) | UB-1 | OLD TAG | SELECTED RU SOURCE (AWAITS OPERAND) |
| DATA TRANSFER | SINCE OPERAND IS AVAILABLE, IT IS TRANSFERRED ON FLB TO SELECTED RU DURING THE SELECT CYCLE | | | WHEN AVAILABLE, OPERAND IS TRANSFERRED ON CDB DIRECTLY TO TAGGED RU | | |

FIG. 36E  RR ARITHMETIC INSTRUCTIONS

CASE 3

| EXECUTION TIME | SINK | | | SOURCE | | |
|---|---|---|---|---|---|---|
| | CONTROL | TAG | STORAGE UNIT | CONTROL | TAG | STORAGE UNIT |
| BEGINNING OF DECODE CYCLE | TB=0 | OLD TAG | FLR-X | TB=0 | OLD TAG | FLR-W |
| END OF DECODE CYCLE | TB=1 | ADDR OF SELECTED RU | FLR-X | TB=0 | OLD TAG | FLR-W |
| DURING SELECT CYCLE | UB=0 | TAG=0 | ALL UNBUSY RU'S | UB=0 | TAG=0 | ALL UNBUSY RU'S |
| END OF SELECT CYCLE | UB=1 | TAG=0 | SELECTED RU (AWAITS OPERAND) | UB=0 | TAG=0 | SELECTED RU (CONTAINS OPERAND) |
| DATA TRANSFER | AVAILABLE OPERAND IS TRANSFERRED ON FLRB TO SELECTED RU DURING CYCLE FOLLOWING THE SELECT CYCLE | | | AVAILABLE OPERAND IS TRANSFERRED ON FLRB TO SELECTED RU DURING THE SELECT CYCLE | | |

CASE 4

| EXECUTION TIME | SINK | | | SOURCE | | |
|---|---|---|---|---|---|---|
| | CONTROL | TAG | STORAGE UNIT | CONTROL | TAG | STORAGE UNIT |
| BEGINNING OF DECODE CYCLE | TB=1 | OLD TAG | FLR-X | TB=0 | OLD TAG | FLR-W |
| END OF DECODE CYCLE | TB=1 | ADDR OF SELECTED RU | FLR-X | TB=0 | OLD TAG | FLR-W |
| DURING SELECT CYCLE | UB=0 | OLD TAG | ALL UNBUSY RU'S | UB=0 | TAG=0 | ALL UNBUSY RU'S |
| END OF SELECT CYCLE | UB=1 | OLD TAG | SELECTED RU (AWAITS OPERAND) | UB=1 | TAG=0 | SELECTED RU (CONTAINS OPERAND) |
| DATA TRANSFER | WHEN AVAILABLE, OPERAND IS TRANSFERRED ON CDB DIRECTLY TO TAGGED RU | | | THE AVAILABLE OPERAND IS TRANSFERRED ON FLRB TO SELECTED RU DURING SELECT CYCLE | | |

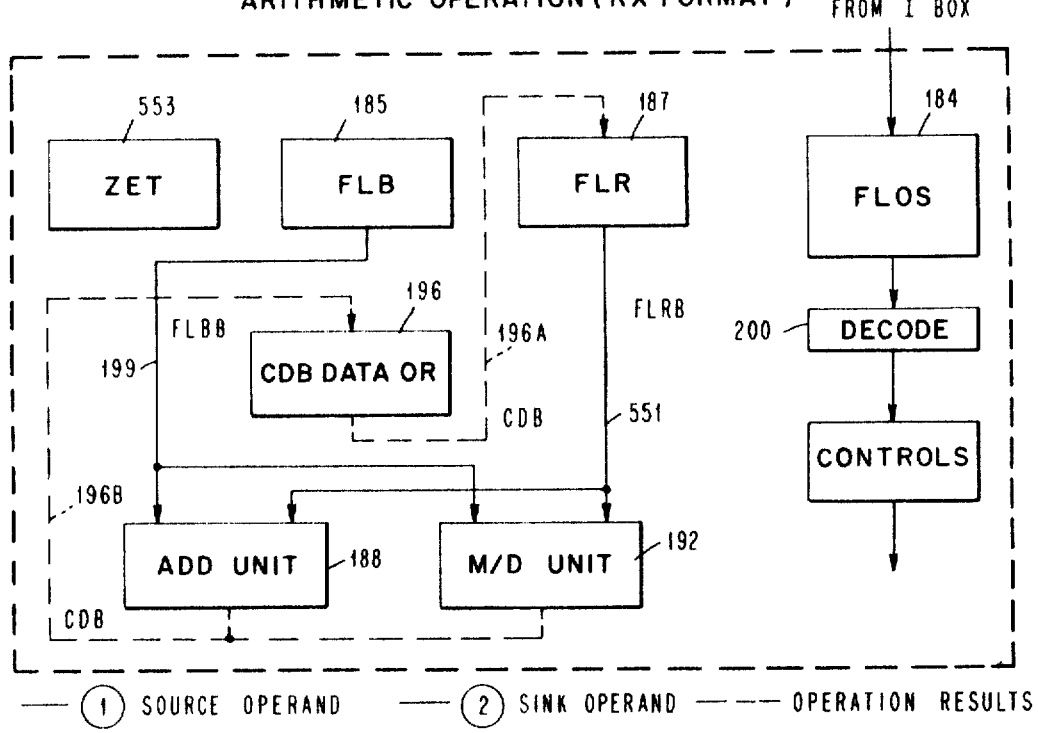
FIG. 37 ARITHMETIC OPERATION (RX FORMAT)
—①— SOURCE OPERAND  —②— SINK OPERAND  ——— OPERATION RESULTS
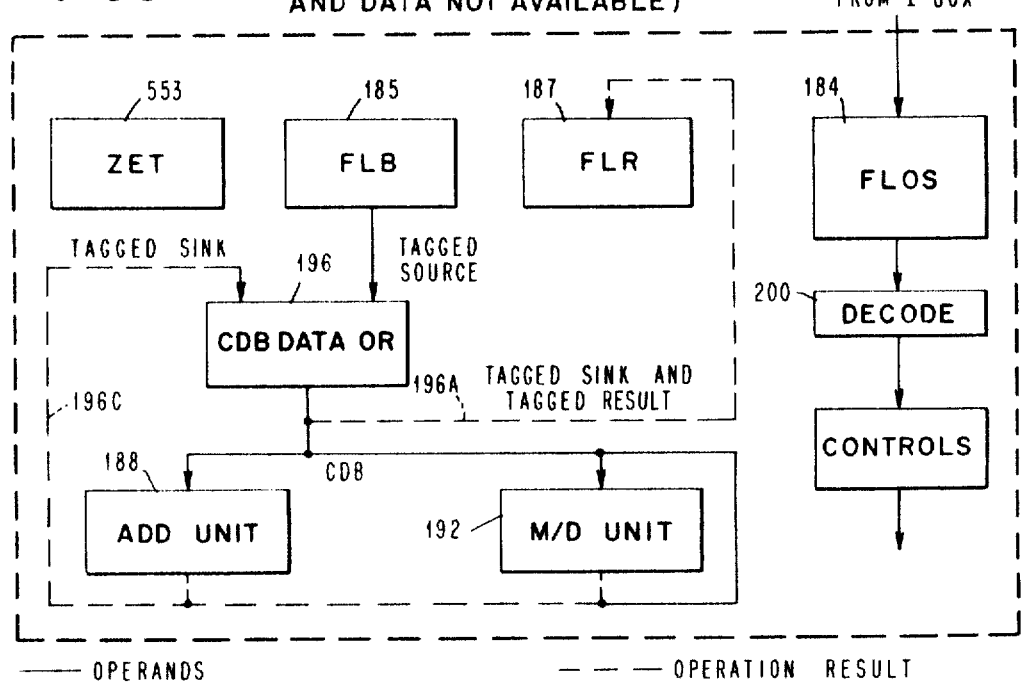
FIG. 38 ARITHMETIC OPERATION (RR OR RX FORMAT AND DATA NOT AVAILABLE)
——— OPERANDS  ——— OPERATION RESULT FIG. 39  STORE INSTRUCTIONS
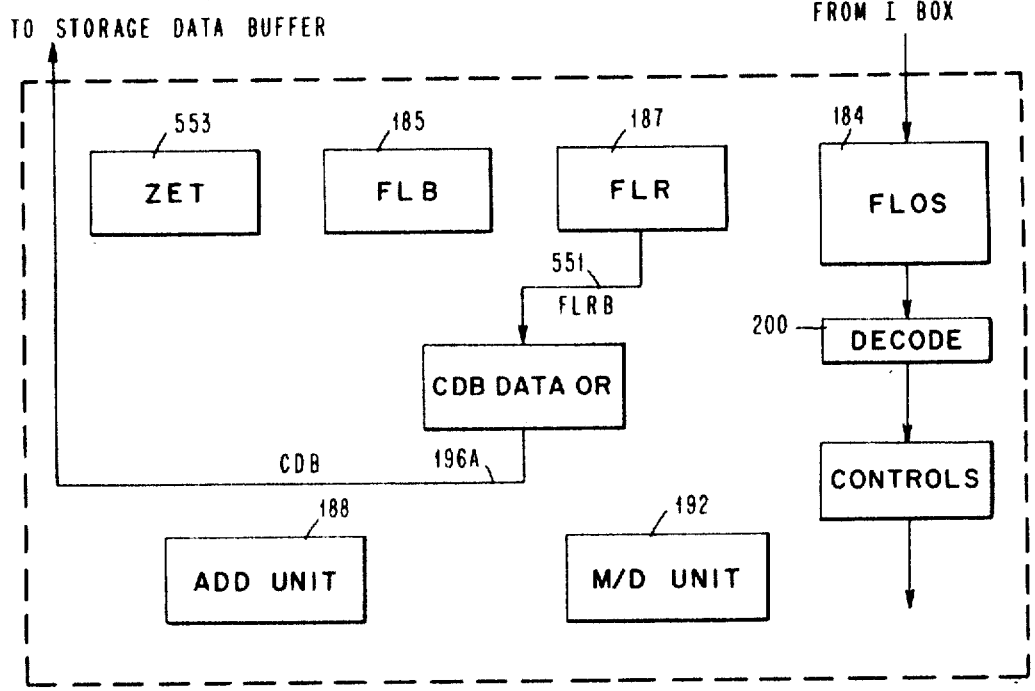
FIG. 40  ARITHMETIC OPERATION (RR FORMAT)
(OPERANDS AVAILABLE AT DECODE TIME)
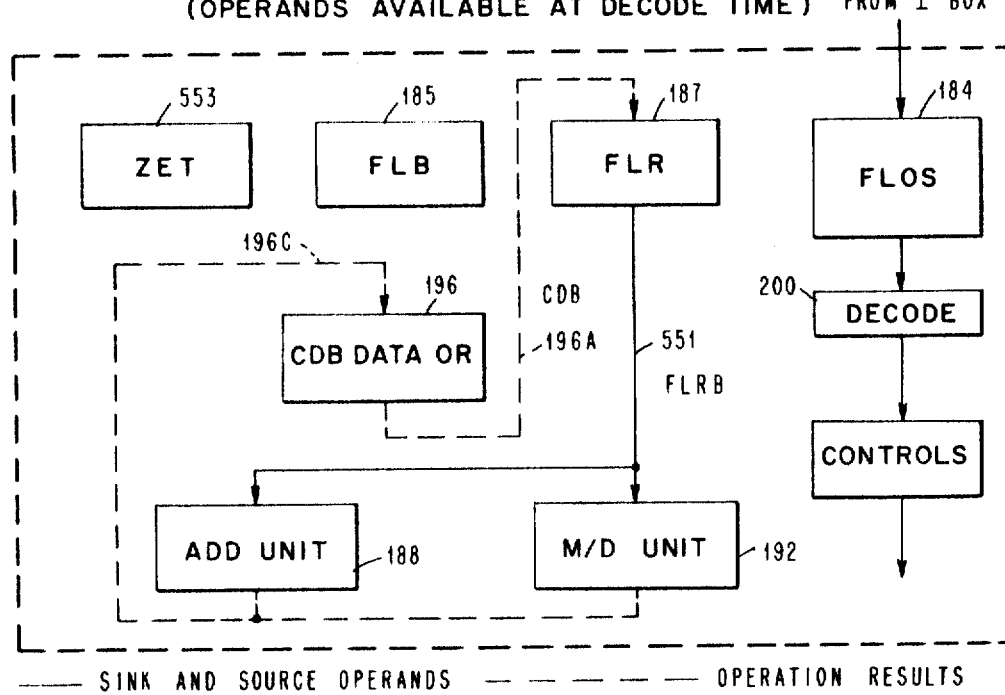
—— SINK AND SOURCE OPERANDS    – – – – OPERATION RESULTS

FIG. 43

| UNIT | TAG REPRESENTATIONS AT DECODE UPDATE TIME | | | | | | |
|---|---|---|---|---|---|---|---|
| | INSTR 1 | 2 | 3 | 4 | 5 | 6 | 7 |
| F 0 | FLB1 | M/D1 | | | A1 | | FLB 5 |
| F 2 | | | FLB-3 | M/D2 | | | |
| SOURCE M/D 1 | | 0 | | | | | |
| SINK M/D 1 | | FLB 1 | | | | | |
| SOURCE M/D 2 | | | | 0 | | | |
| SINK M/D 2 | | | | FLB 3 | | | |
| SOURCE A1 | | | | | M/D 2 | | |
| SINK A1 | | | | | M/D 1 | | |
| SDB 1 | | | | | | A 1 | |

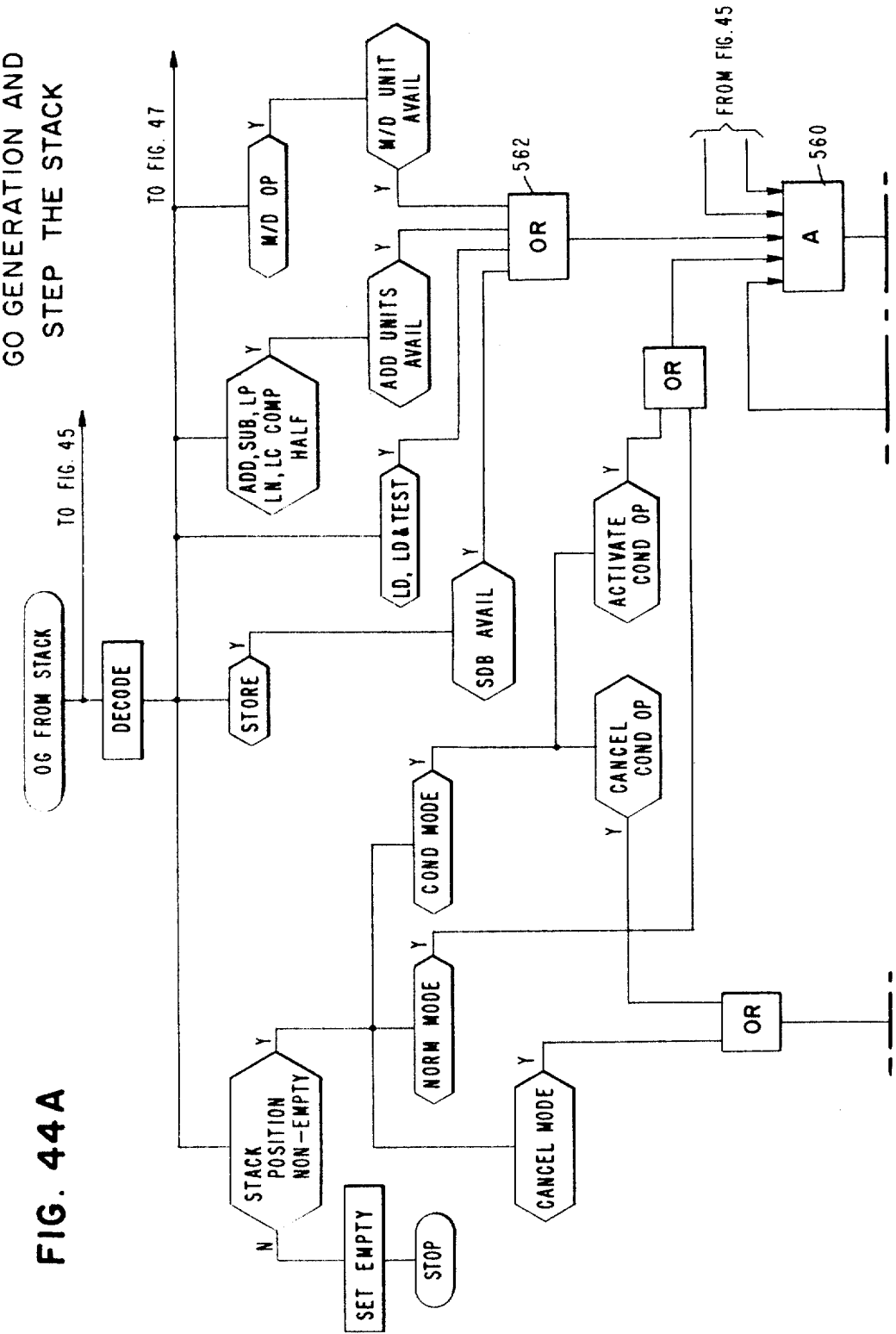

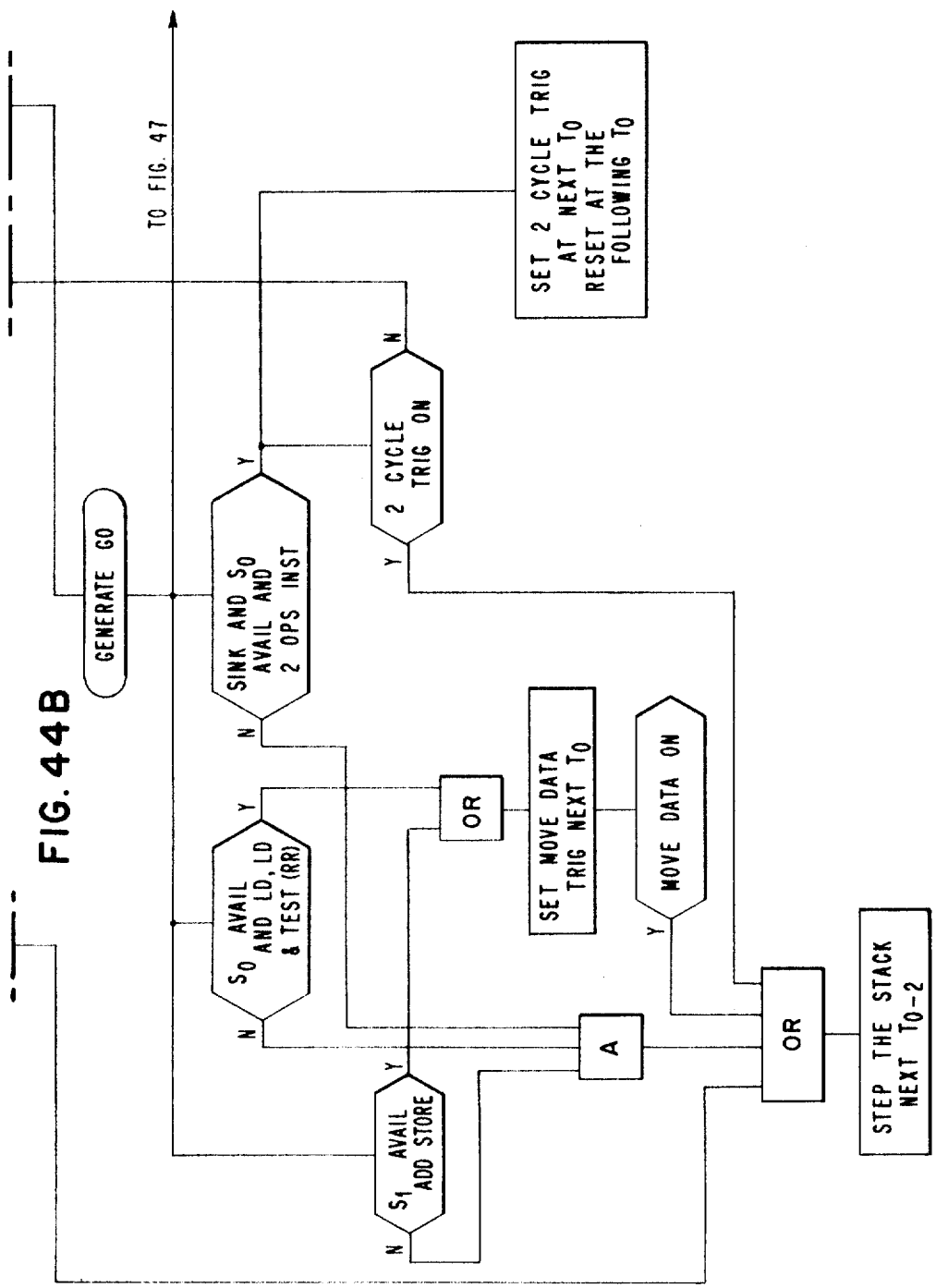

ARITHMETIC UNITS AND SDB SELECT

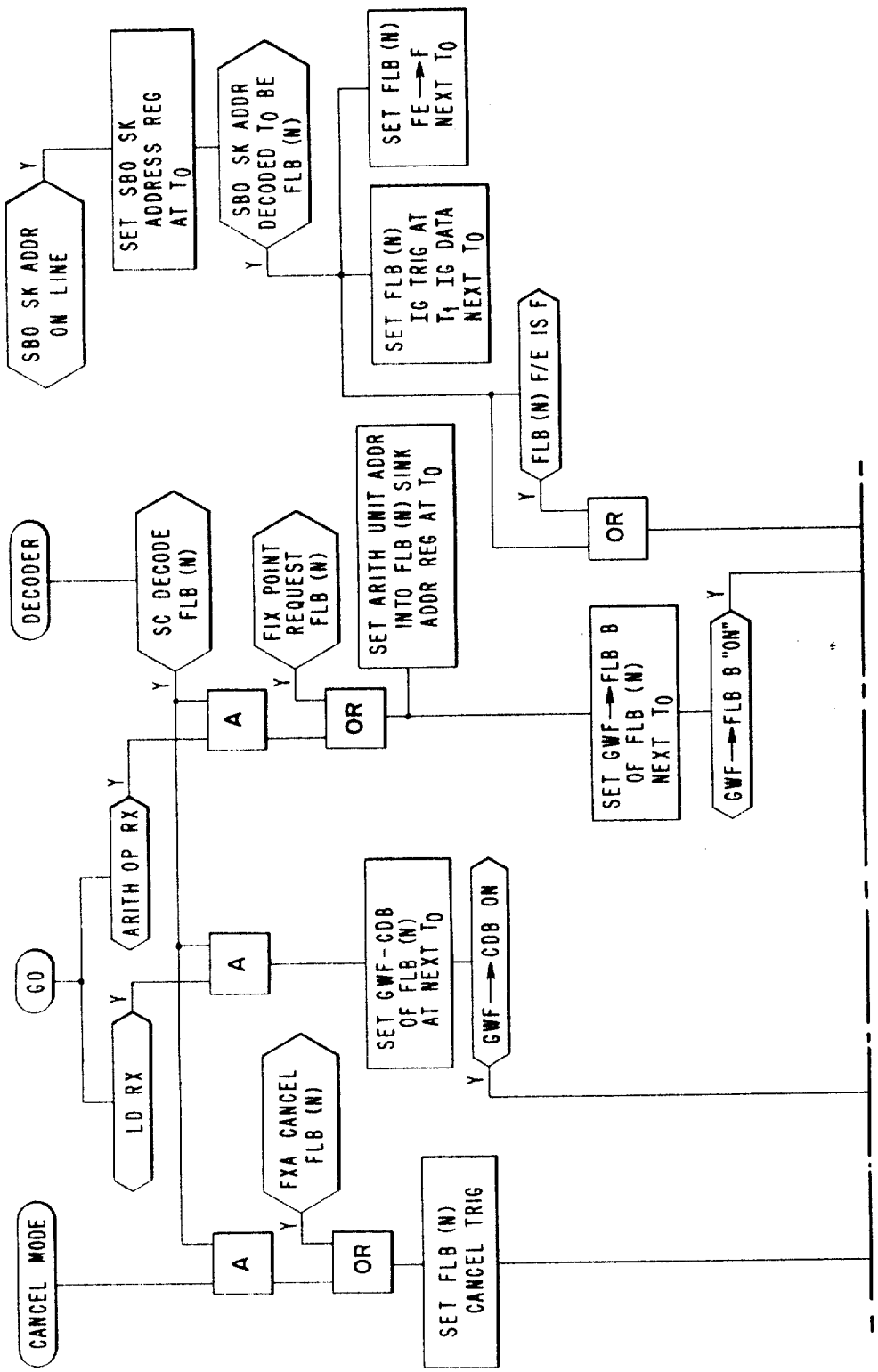

FLB AND FLBB CONTROL

FIG. 49  SK AND SC AVAILABLE, PRECISION MATCH, BUS TAG GENERATION
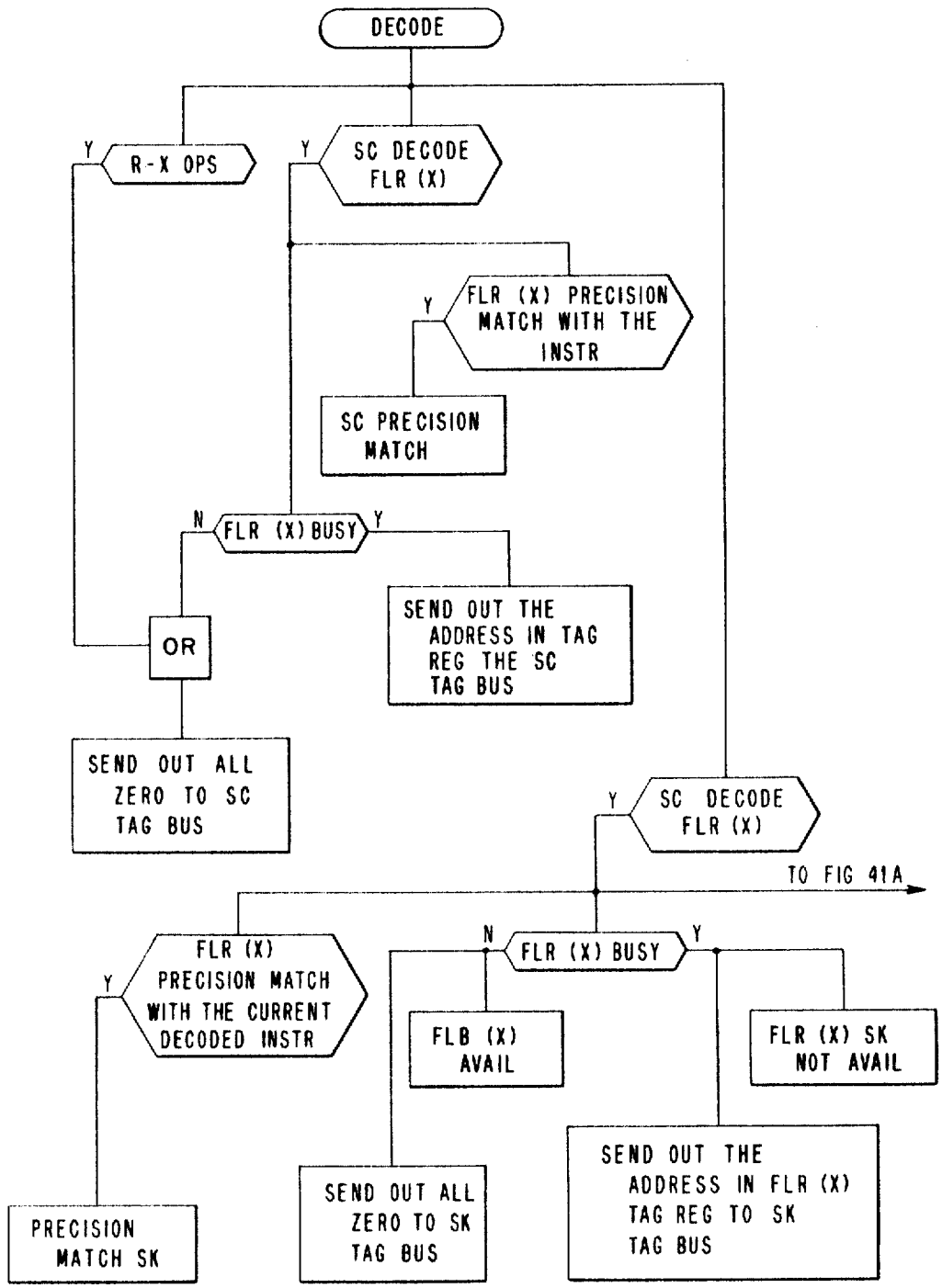

FIG. 50 FLR OG CONTROL
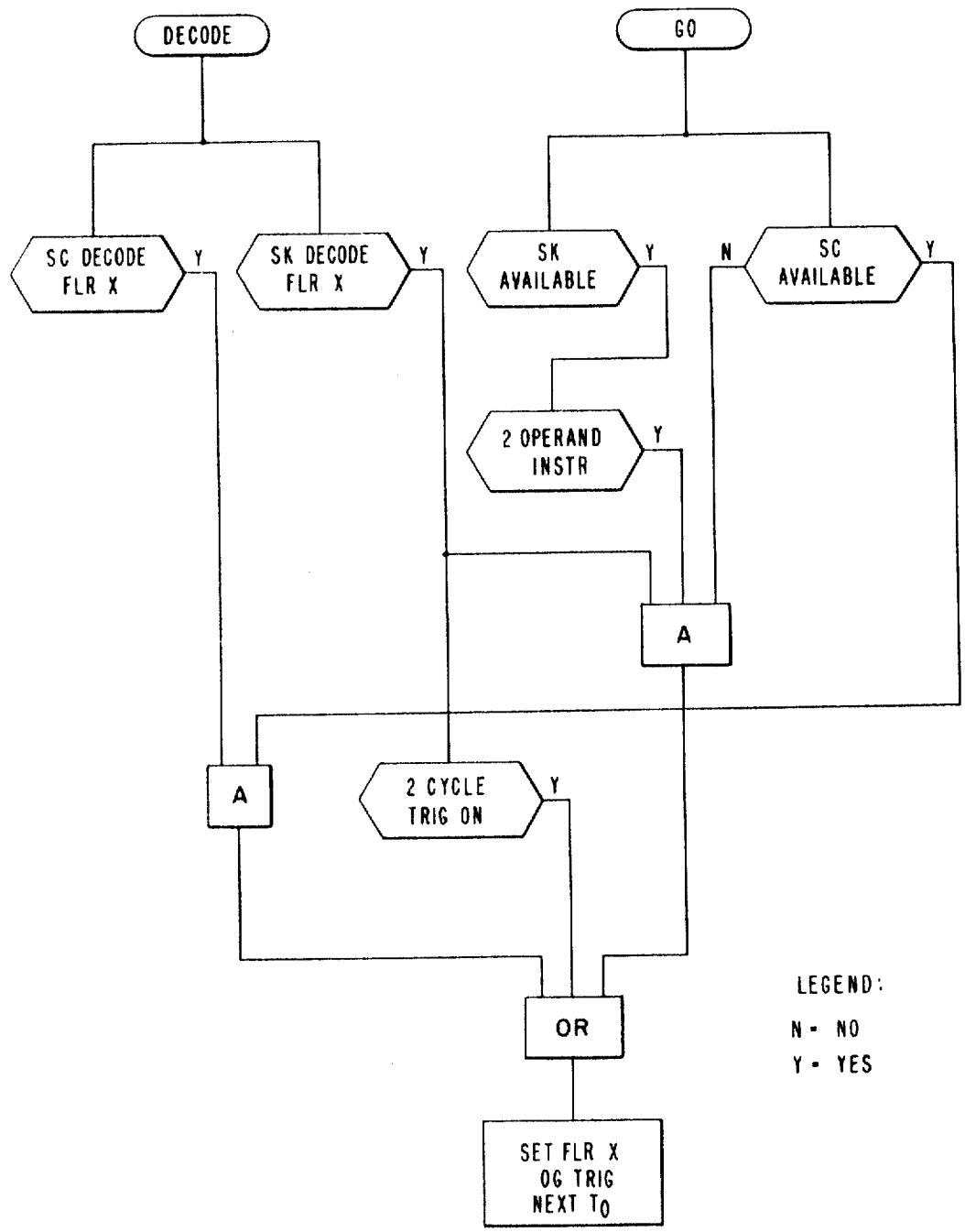

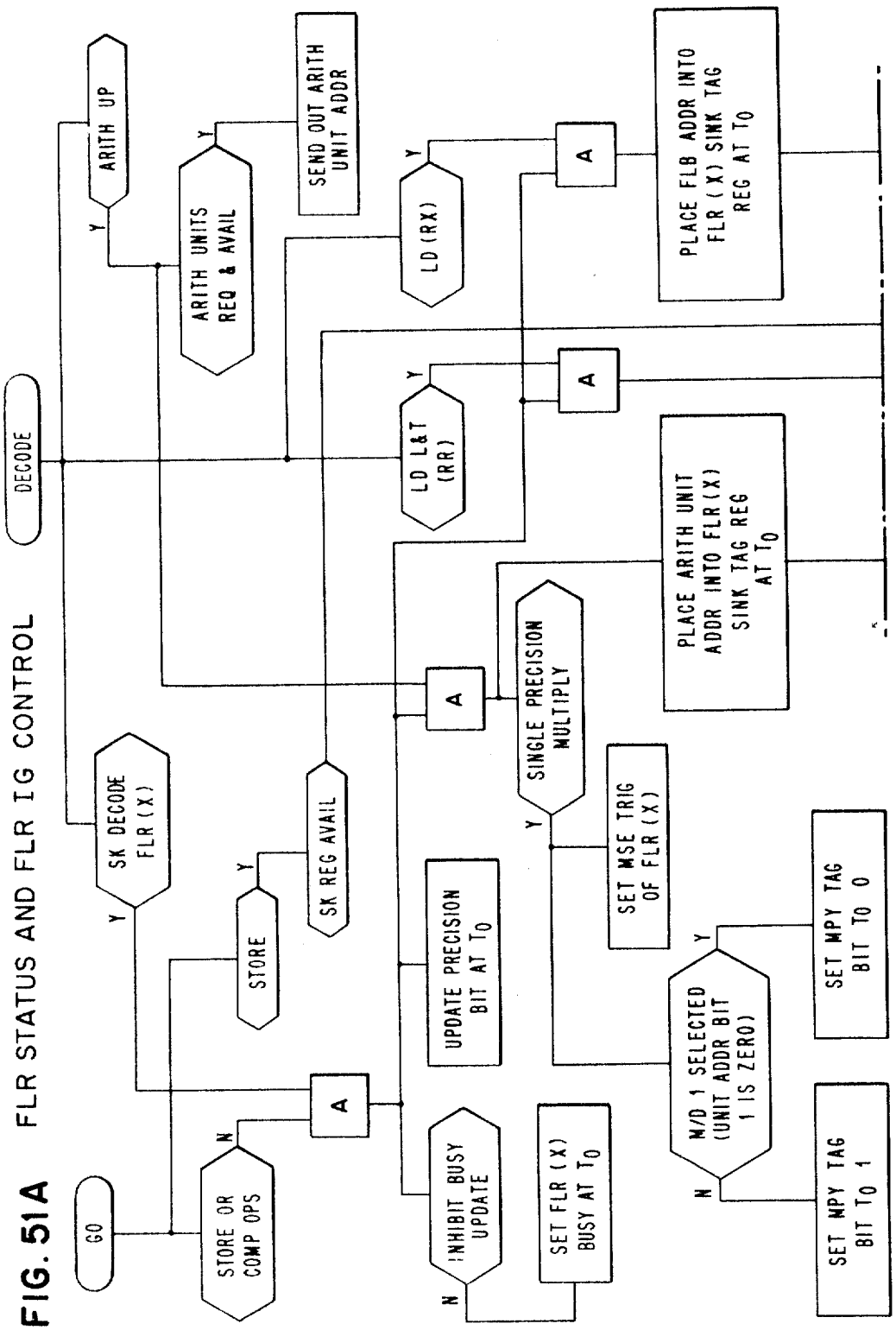
FIG. 51A  FLR STATUS AND FLR TG CONTROL

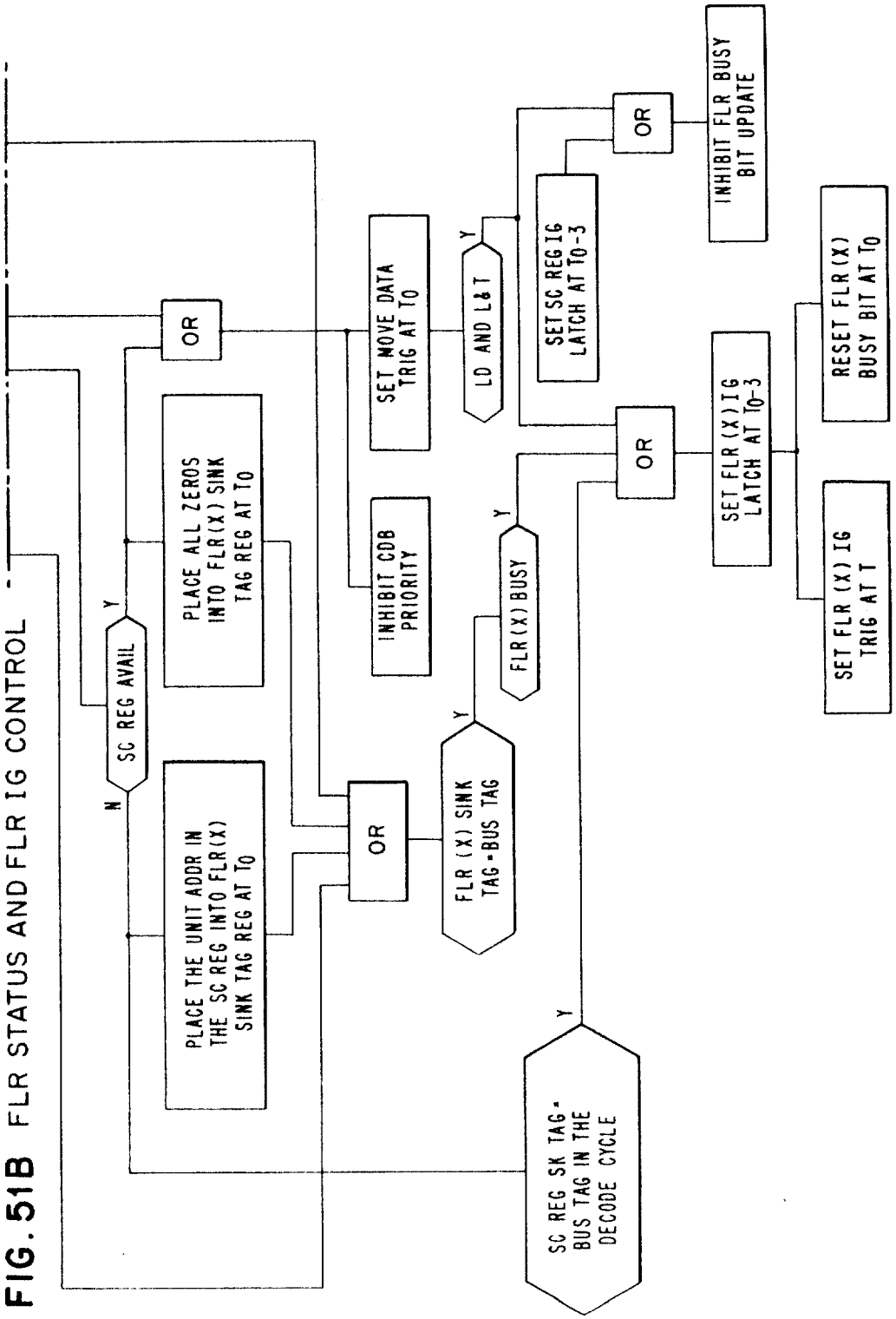
FIG. 51B FLR STATUS AND FLR IG CONTROL

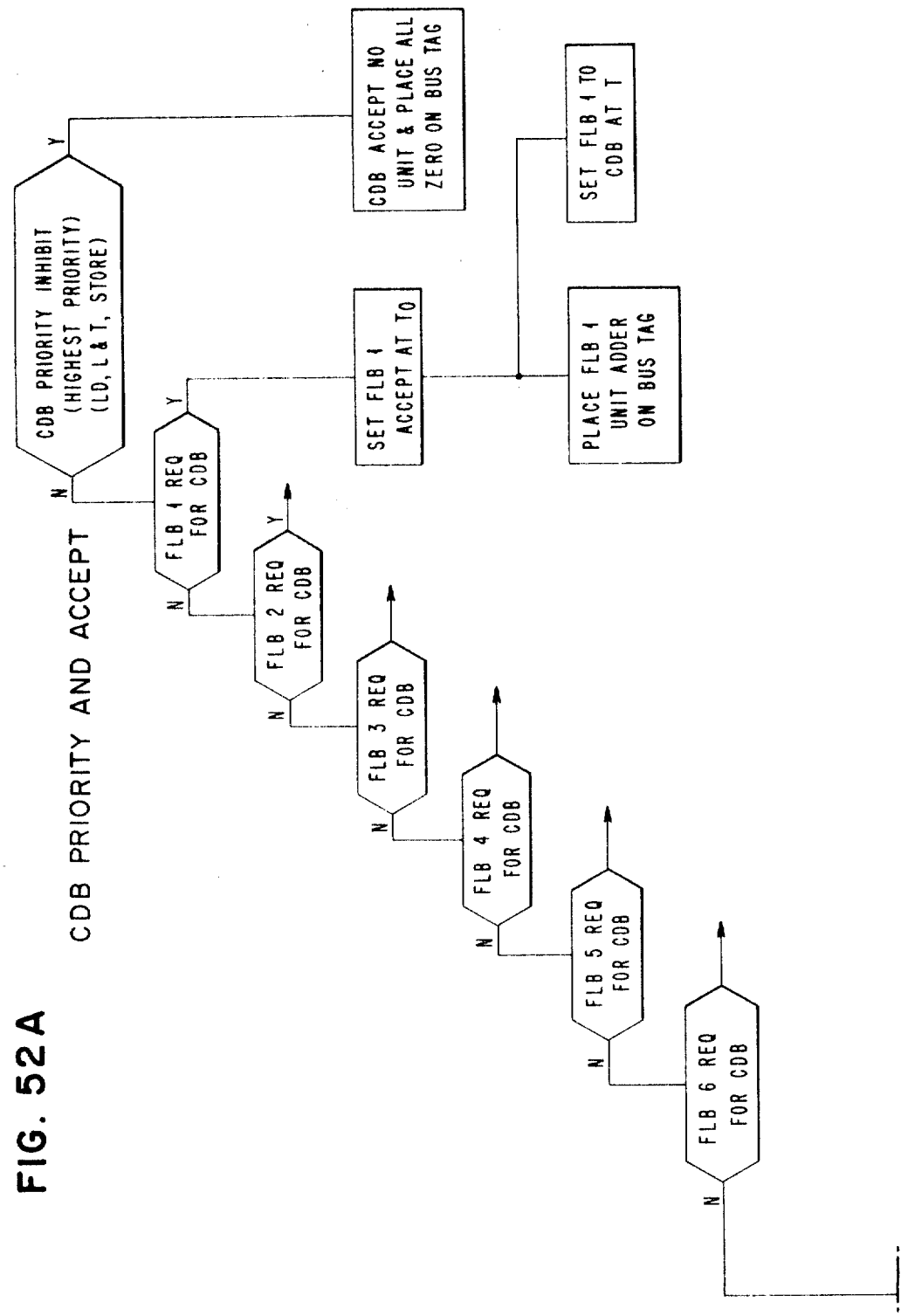
FIG. 52A  CDB PRIORITY AND ACCEPT

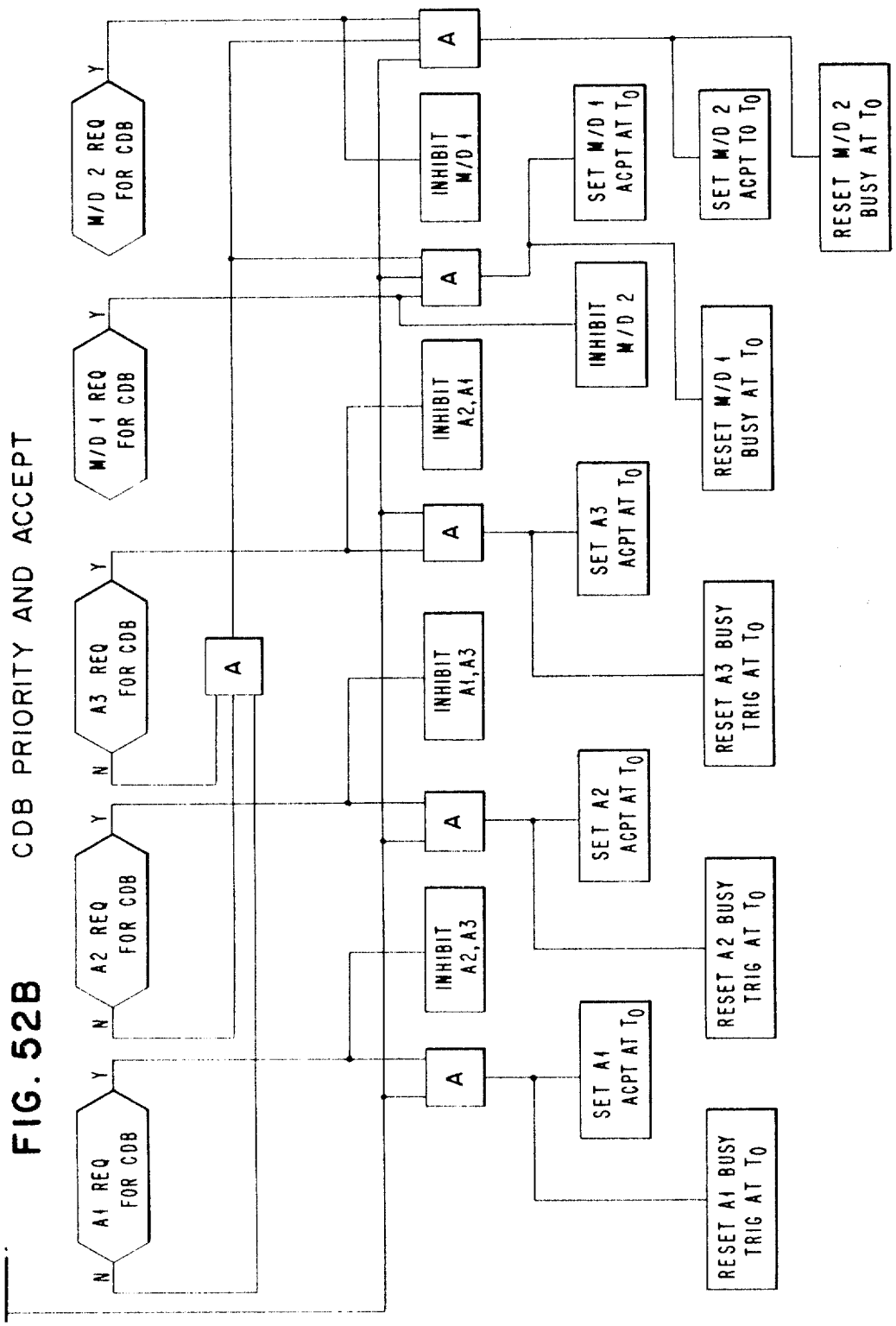
FIG. 52B    CDB PRIORITY AND ACCEPT

FIG. 55 BASIC FLOATING POINT INST. TIMING

Aug. 19, 1969    R. M. TOMASULO ET AL    3,462,744
EXECUTION UNIT WITH A COMMON OPERAND AND
RESULT BUSSING SYSTEM
Filed Sept. 28, 1966                       71 Sheets-Sheet 69

United States Patent Office 3,462,744
Patented Aug. 19, 1969

3,462,744
EXECUTION UNIT WITH A COMMON OPERAND AND RESULTING BUSSING SYSTEM
Robert M. Tomasulo, Staatsburg, and David W. Anderson and Don M. Powers, Poughkeepsie, N.Y., assignors to International Business Machines Corporation, Armonk, N.Y., a corporation of New York
Filed Sept. 28, 1966, Ser. No. 582,675
Int. Cl. G06f 7/08, 7/10, 1/04
U.S. Cl. 340—172.5                                 50 Claims

TABLE OF CONTENTS

|  | Column |
|---|---|
| I. Preface | 2 |
|   A. CDB Tag Assignments and CDB Operand Handling | 3 |
|   B. Special Bus (FLBB) for Storage Operands | 4 |
|   C. Special Bus (FLRB) For Available Operands | 5 |
| II. Related U.S. Patent Applications | 6 |
| III. Drawing Description | 6 |
| IV. General Description of Invention | 7 |
|   A. Definitions and Data Paths | 8 |
|   B. Preservation of Precedence | 11 |
|   C. Common Data Bus | 13 |
| V. General Description of a Computer System Embodying the Invention | 17 |
|   A. Central Processing Unit | 19 |
|   B. Instruction Unit | 20 |
|   C. Operation of the Instruction Unit | 23 |
|   D. Instruction Issuing | 26 |
|   E. Execution Unit | 28 |
|   F. Floating-Point Box | 28 |
|   G. Fixed-Point Unit | 30 |
|   H. Fixed-Point Unit Operation | 32 |
|   J. Variable Field Length Operations | 33 |
|   K. Main Storage Control Element | 34 |
|   L. MSCE Controls | 37 |
|   M. Peripheral Storage Control Element | 40 |
|   N. Bus Control | 40 |
|   P. Common Channel Control | 42 |
|   Q. Storage Channel | 42 |
| VI. Floating-Point Unit | 43 |
|   A. Floating-Point Instruction Groups | 44 |
|     1. Move Group | 44 |
|     2. Add/Subtract Group | 44 |
|     3. Multiply/Divide Group | 44 |
|   B. Instruction Execution Timing | 44 |
|     1. Section A Timing | 44 |
|     2. Section B Timing | 44 |
|     3. Section C Timing | 45 |
|   C. FLPU Detailed Circuits and Operations | 45 |
|   D. Summary of FLPU Operations and Major Formats | 53 |
|     1. Arithmetic Operation Data Flow | 53 |
|     2. Handling of Arithmetic Instructions | 54 |
|     3. Transfer Operation Data Flow | 55 |
|     4. Handling of RX Load Instructions | 55 |
|     5. Handling of RR Load or Load and Test Instructions | 55 |
|     6. Handling of Store Instructions | 57 |
|     7. Floating-Point Buffer (FLB) | 57 |
|     8. Floating-Point Buffer Bus (FLBB) | 58 |
|     9. Floating-Point Register (FLR) | 59 |
|     10. Floating-Point Register Bus (FLRB) | 60 |
|     11. Common Data Bus (CDB) | 60 |
|     12. Example of Tag Assignment Sequence | 61 |
|     13. RU Operation | 63 |
|     14. RU Reset Control Logic | 65 |
|     15. Storage Data Buffer (SDB) | 65 |

ABSTRACT OF THE DISCLOSURE

A computer execution unit which at instruction decoding time dynamically assigns a tag to represent an assigned register for each unavailable sink operand. Thereafter, execution continues using the tag to set-up a path along a Common Data Bus to any of plural reservation units which require the operand when it is later made available either by a fetch from memory, or by a result of execution completion for another instruction. The reservation units store inputs to execution units. When the operand becomes available, it and its tag are inputed to the Common Data Bus, which gates it into all units having the same tag at that moment. This tagging scheme preserves sink register dependencies among instruction sequences to obtain (1) parallel execution of sequential instructions, and (2) out-of-sequence execution among instructions not having a precedence relationship.

This invention relates generally to a computer Instruction Execution Unit, and particularly to such Execution Unit having a uniquely controlled common bussing system. The invention is used to choose and control various paths for transferring instruction operands and/or instruction results to, from, and during the execution of each instruction. The term "data" is used throughout this specification to mean a particular unit of information related to the execution of a single machine instruction, i.e., an operand, or a result of an instruction operation which in most cases is an operand for a subsequent instruction.

I. PREFACE

This invention comprises an Instruction Execution System which can be designed as either a "Pure Common Data Bus Execution System," or a "Diluted Common Data Bus Execution System." A Pure Common Data Bus Execution System has only one or parallel Common Data Busses to transfer operands among its units. A Diluted CDB Execution System is comprised of one or more Special Operand Busses in addition to one or more CDB's. Thus one Common Data Bus can be connected in parallel among the same set of units in a single Instruction Execution System. The determination of whether to design an Execution System as a Pure CDB arrangement or as a diluted CDB arrangement is made by determining the degree of probable time conflicts that could occur among the various units using the Common Data Bus. Such time conflicts do not result in any execution error but may result in slowing down the speed of instruction execution, if the Common Data Bus becomes overloaded. If a Pure single CDB arrangement cannot accommodate a particular Execution System design without undue overloading, then the designer can use two or more CDB's in parallel among the same units with a coordinating control among the parallel CDB's.

On the other hand, undue overloading in a single CBD system may be eliminated by using a diluted CDB Execution System, in which a CDB is used in combination with one or more Special Operand Busses connected along certain high traffic paths within the Instruction Execution System. The detailed embodiment shown herein is such a Diluted Common Data Execution System, in which a first special bus (called an FLBB) is provided to the execution units for connecting operands fetched from main storage. Also certain operands available at instruction-decoding time are transferred on a second special bus (called an FLRB) connected between the working registers (FLR's) and the arithmetic execution units.

In a Diluted Common Data Bus Execution System a coordinated inter-relationship between the Common Data Bus and each Special Bus must be provided. This is accomplished in the detailed embodiment by a tagging system, wherein a special tag is generated and transferred to a selected receiving unit under control of the instruction decoder indicating to the receiving unit that it should expect its operand from a special bus rather than from the Common Data Bus; while other tags are transmitted under the decoder control to a receiving unit to designate at the receiving unit that sending unit from which an operand shall later be on the Common Data Bus. The tag designation may be done in a tag register associated with a data receiving unit by setting the tag-register bits in address-indicating bit configurations (called tags); each tag setting uniquely identifies a different unit that can output onto the CDB. On the other hand, the tag can be a special indicator bit with each receiving unit representing a different sending unit. The designer is free to use whichever form is expedient under the particular design circumstances at hand, which is determinable in view of this invention. In a multiple bus system, the tag can have a bus interlock operation to coordinate the use of a receiving unit among plural busses connected to that unit.

A. CDB Tag assignments and CDB operand handling

Receiving Units can have a CDB Tag in lieu of data to indicate the source from which data will be forthcoming on the CDB. The execution of subsequent instructions can in most cases proceed before the completion of execution of preceding instructions. Hence many sequential instructions can be executing in parallel within the same unit, because of the CDB performance. There is no duplication in plural execution units.

A CDB Tag (Bus Tag) is a group of binary bits representing the address of a unit which has data ready to be transmitted on the CDB. In this embodiment, they include FLB's and RU's. Each Bus Tag is received by all Receiving Units, which compare the Bus Tag with a stored tag. Receiving Units in the embodiment are FLR's, SDB's and sink and source reservation units (RU's). All Receiving Units with a compare-equal ingate the CDB data in the cycle following the Bus Tag cycle.

The instruction being decoded in the Execution Unit determines: which FLR is the sink, which FLR is the source, and selects which RU or SDB is to complete the execution of the instruction.

An Execution Unit Decoder assigns tags to the Receiving Units. Then they await a Bus Tag 18 compare to determine when to ingate the awaited operand from the CDB.

To assign tags to Receiving Units the decoder broadcasts the old tag of each selected FLR to all non-busy RU's and SDB's (not to FLB's).

The tag broadcast is made on a sink bus tag and a source tag bus. (1) for arithmetic instructions, FLR sink tags are sent only to RU or SDB sink tag registers; FLR source tags are sent only to RU source tag registers. (2) For RR Load Instructions, the old source FLR tag is sent to the FLR sink tag register. (3) For Store Instructions, the old sink FLR tag is sent to the SDB tag register.

The decoder selects a non-busy RU if the instruction requires an RU. However, the selected RU is not told during the decode cycle that it is selected and any non-busy RU maintains its non-busy status through the decode cycle.

At the end of the decode cycle for Load and Arithmetic Instructions, the FLR old sink tag is replaced (updated) by a new tag, which for the current arithmetic instruction is the address of the selected RU.

A select cycle normally follows the decode cycle to continue the execution of the current instruction simultaneously with the decode cycle for the next instruction. (a) Before the end of the select cycle (which follows the decode cycle), the old tag has been received by all non-busy RU's and SDB's. (b) Near the end of the select cycle, the decoder's selection of an RU is received by the selected RU. This is done by setting the Unit Busy (UB) Trigger in the selected RU at the end of the select cycle. Setting the UB Trigger freezes the tags in that RU. The other non-selected non-busy RU's remain with their Busy Trigger not set, so that they can receive all tag assignments broadcast by the next instruction decode cycle. (Tag assignments are complete.)

For each RX Load Instruction, a special buffer called a FLB is assigned (by the source field of the instruction being decoded) to receive its operand from storage. A special bit, called a (Go When Full) GWF–CDB bit, associated with the selected FLB, is set. Whenever the operand is received by the FLB, another bit associated with the particular FLB, called a (Full/Empty) F/E bit, is set to full, which causes a request for a CDB cycle to a CDB priority circuit in the same manner as any other unit making a request for a time slot on the CDB.

After an operand is available in any CDB sending unit, all RU's, FLR's, and SDB's needing it (regardless of the number) may receive it in two machine cycles from the CDB after the sending unit requests and receives a CDB time slot.

In more detail, any unit desiring to send data on the CDB signals a CDB Priority Circuit for a CDB time slot.

Any CDB sending unit can be broadcasting its identification (Bus Tag) on the CDB simultaneously (during the same cycle) while another CDB sending unit can be broadcasting its operand on the CDB. The priority circuit responds with an Accept Signal to the Requesting Unit and broadcasts its address as the Bus Tag simultaneously with the Accept Signal.

During the Accept cycle, the Bus Tag is received by all busy FLR's, SDB's and RU's; and each unit makes a comparison of the Bus Tag with the tag stored in the respective unit during that cycle.

At the end of the Accept cycle, each receiving unit with a compare-equal sets an in-gate trigger. Also at the end of this cycle, any unit with a compare-equal has its busy trigger reset to indicate that its data is valid but its tag is invalid.

If a conflict should exist at the end of any CDB Accept cycle, wherein the CDB compare-equal attempts to *reset* an FLR tag busy bit simultaneously while an update at the end of a decode cycle is attempting to *set* the same tag busy bit, the decode cycle wins; and the tag busy bit is set to busy, indicating that the FLR tag is valid. However, the ingated trigger of the RU remains set. On the next cycle when the operand is transmitted on the CDB Data Bus, it is in-gated only by units (RU's, FLR's, and SDB's) having set in-gate triggers. Yet these same units can be receiving a new tag assignment simultaneously (during the same cycle) while they are receiving an operand. (CDB Data Transfer is now complete.)

B. Special bus (FLBB) for storage operands

A storage operand bus may be added to the CDB Execution System if a design decision is made to transfer operands received from main storage directly to awaiting units. This will reduce traffic on the CDB according to the frequency of storage-fetched operands in a particular program. Generally, storage operand transfers comprise a significant percentage of overall operand transfers in the Execution System. This percentage is dependent on the ratio of RX to RR instructions in programs being executed.

In the detailed embodiments described herein, the special storage operand bus (the FLBB) is used only for transmitting storage operands for RX arithmetic instructions; and the CDB is used for transmitting storage operands for RX Load Instructions, as explained in the preceding section titled "CDB Tag Assignments and CDB Operand Handling." For both types of RX instructions, all storage operands are received by the special buffers (FLB's). Thus the FLBB connects a selected FLB only to the source registers in all RU's.

The source field of the particular instruction being decoded contains the address of the particular FLB assigned to receive the storage operand. For an RX arithmetic instruction decode cycle, the Instruction Execution Decoder does the following:

(a) Sets a (Go When Full) GWF–FLBB bit associated with this particular FLB, and (b) Tags the source-tag register in all unbusy RU's with a special tag (which may be all zeros), and sets a special bit (SO) to indicate that a source operand will be coming from the FLBB. The special tag does not correspond to any CDB Bus Tag, in order to prevent any ingating from the CDB to that RU source register until the storage operand is received by it. The setting of the SO bit prevents any ingating from the FLRB while the RU is awaiting the storage operand.

During the select cycle (following the decode cycle), an RU is selected to complete the execution for that instruction by setting its Unit Busy Trigger. This locks the special source tag and the SO bit setting until the Unit Busy Trigger is later reset after both of its operands are received. The sink operand, of course, will not come from the FLBB, but will come from either the FLRB or CDB.

A (Full/Empty) F/E bit is associated with each FLB. The F/E bit is set to full whenever the operand is received by a respective FLB, which then makes a request to a FLBB priority circuit for a time slot on the FLBB. The highest priority FLB then making a request is gated out to the RU selected by the RU address tagged onto the requesting FLB. (The FLBB has a separate select line to each RU which is chosen by the FLB tagged address.)

When the FLB's data is gated to the FLBB, the GWF–FLBB bit, and the F/E bit are reset to off and empty, respectively. Whenever the RU has both operands, as previously explained, it transfers them to its Execution Unit, and before the end of execution it resets its Unit Busy Trigger, which frees its tag and SO bit fields for a new setting that can represent any connectable bus.

C. Special bus (FLRB) for available operands

A working register available-operand bus (the FLRB) may be added to the CDB Execution System if a design decision is made to provide a special bus to transfer directly to a selected RU *available* FLR operands for the instruction being decoded. This will reduce traffic on the CDB according to the available FLR operand frequency in a particular program, which generally will be less than the storage operand frequency.

The FLRB available operand transfer is preferably made immediately after the decode cycle for that instruction. It is the time relationship between the FLRB transfer and the instruction decode cycle that relates the FLRB transfer to a particular instruction. The setting of a control bit (which may be called a Tag Busy bit) with each FLR can indicate whether the operand is available or not in that FLR.

The Instruction Decode Cycle assigns a special tag (which may be all zeros) to the RU source and/or sink tag registers, and resets a special bit (SO) to indicate that an available operand(s) will be coming from the FLRB during the next one or two machine cycles depending on whether one or two special tags are stored in the RU. The special tag does not correspond to any CDB Bus Tag, in order to prevent any ingating from the CDB, which would undesirably interfere with the FLRB operation. If only one operand is available, whether sink or source, it is sent during the first machine cycle after the decode cycle to all respective sink or source RU registers having the special tag. If both operands are available, the source operand is sent during that first machine cycle and the sink operand is sent during the next machine cycle to respective RU source and sink registers having the special tag. The order of transmission on the FLRB distinguishes the source from the sink operand, and the ingating sequencing of the RU determines that the operands are received by the correct registers in the RU.

After both operands are in the RU, and presented by it to its Execution Unit, the RU is made unbusy to accept a tag representing any bus for a subsequent ingating of operands.

If the FLR operand is not available ($TB=1$), the FLRB cannot be used for later transmitting that operand, which can later only be transferred on the CDB.

II. RELATED U.S. PATENT APPLICATIONS

U.S. patent applications related directly or indirectly to the subject application are the following:

Ser. No. 581,052, filed Sept. 21, 1966, by D. W. Anderson et al. and titled "Instruction Handling Unit for Program Loops"

Ser. No. 580,910, filed Sept. 21, 1966, by D. W. Anderson et al. and titled "Instruction Processing Unit for Program Branches"

Ser. No. 579,082, filed Sept. 12, 1966, by R. E. Goldschmidt et al. and titled "High Speed Adder"

Ser. No. 576,157, filed Aug. 30, 1966, by R. E. Goldschmidt et al. and titled "Multiplying Apparatus for Performing Division Using Successive Approximate Reciprocals of a Divisor"

Ser. No. 576,401, filed Aug. 31, 1966, by R. E. Goldschmidt et al. and titled "Apparatus for Accumulating the Sum of a Plurality of Operands"

Ser. No. 578,745, filed Sept. 12, 1966, by L. J. Boland et al. and titled "Control System for Interleave Memory"

Ser. No. 573,360, filed Sept. 18, 1966, by S. A. Calta et al. and titled "Peripheral Data Exchange."

III. DRAWING DESCRIPTION

The foregoing and other objects, features and advantages of the invention will be apparent from the following more particular description of preferred embodiments of the invention, as illustrated in the accompanying drawings.

Figure 1:
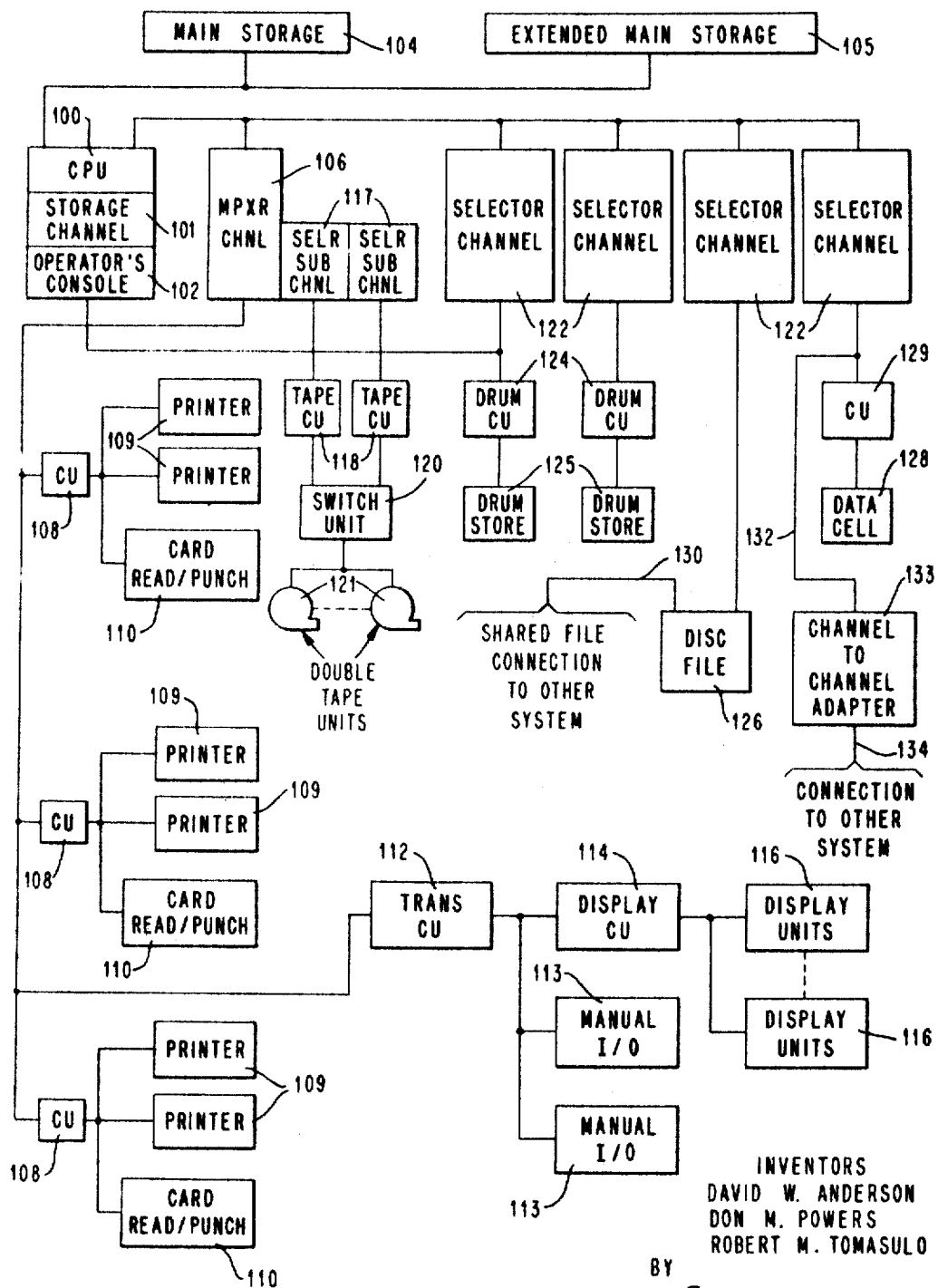
FIGURE 1 is a diagram showing a large data processing system which uses the invention.
Figure 3:
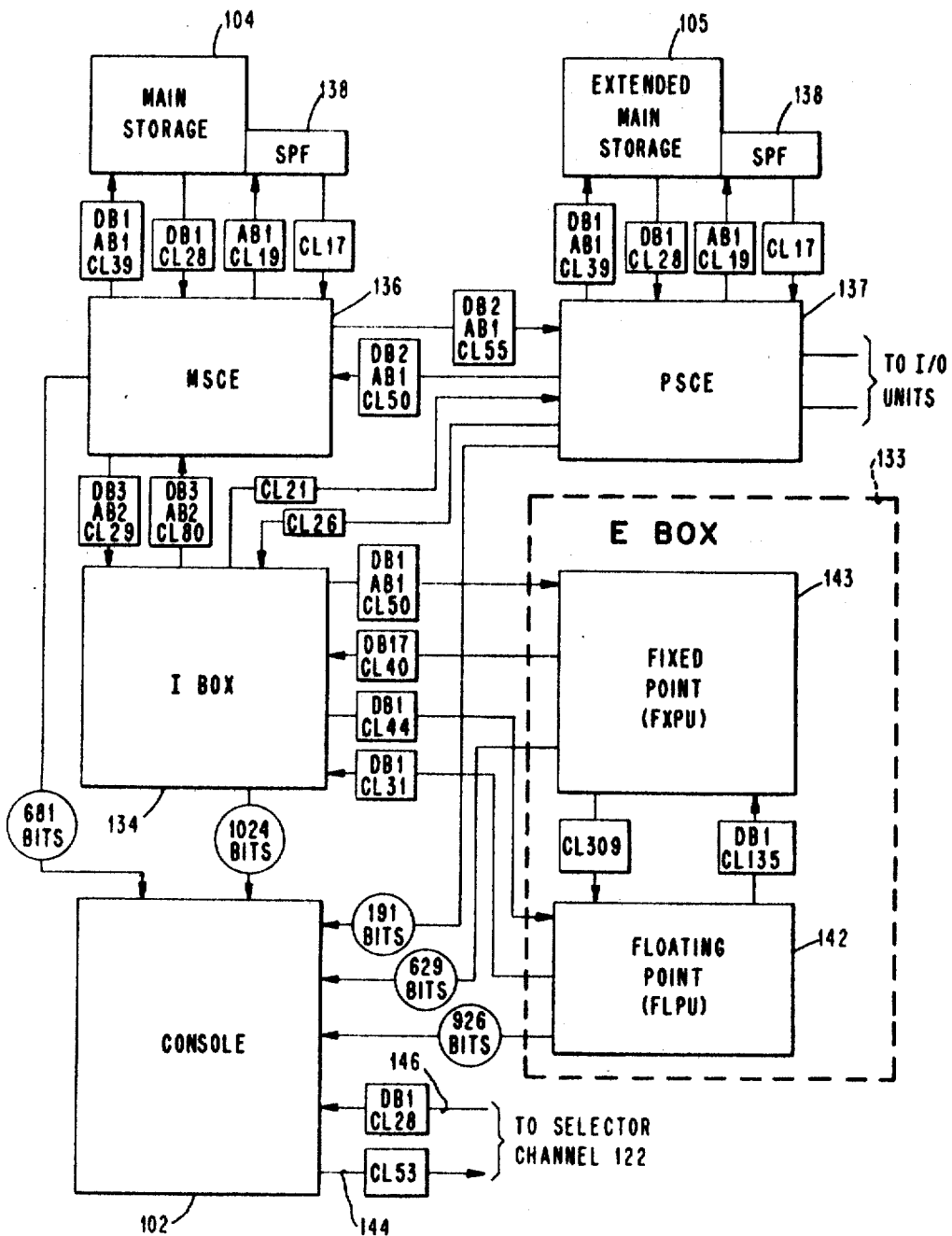
FIGURE 3 is a more detailed view of CPU and Storage Unit portion of FIGURE 2, showing the major sections and interconnections therebetween.
Figure 6A:
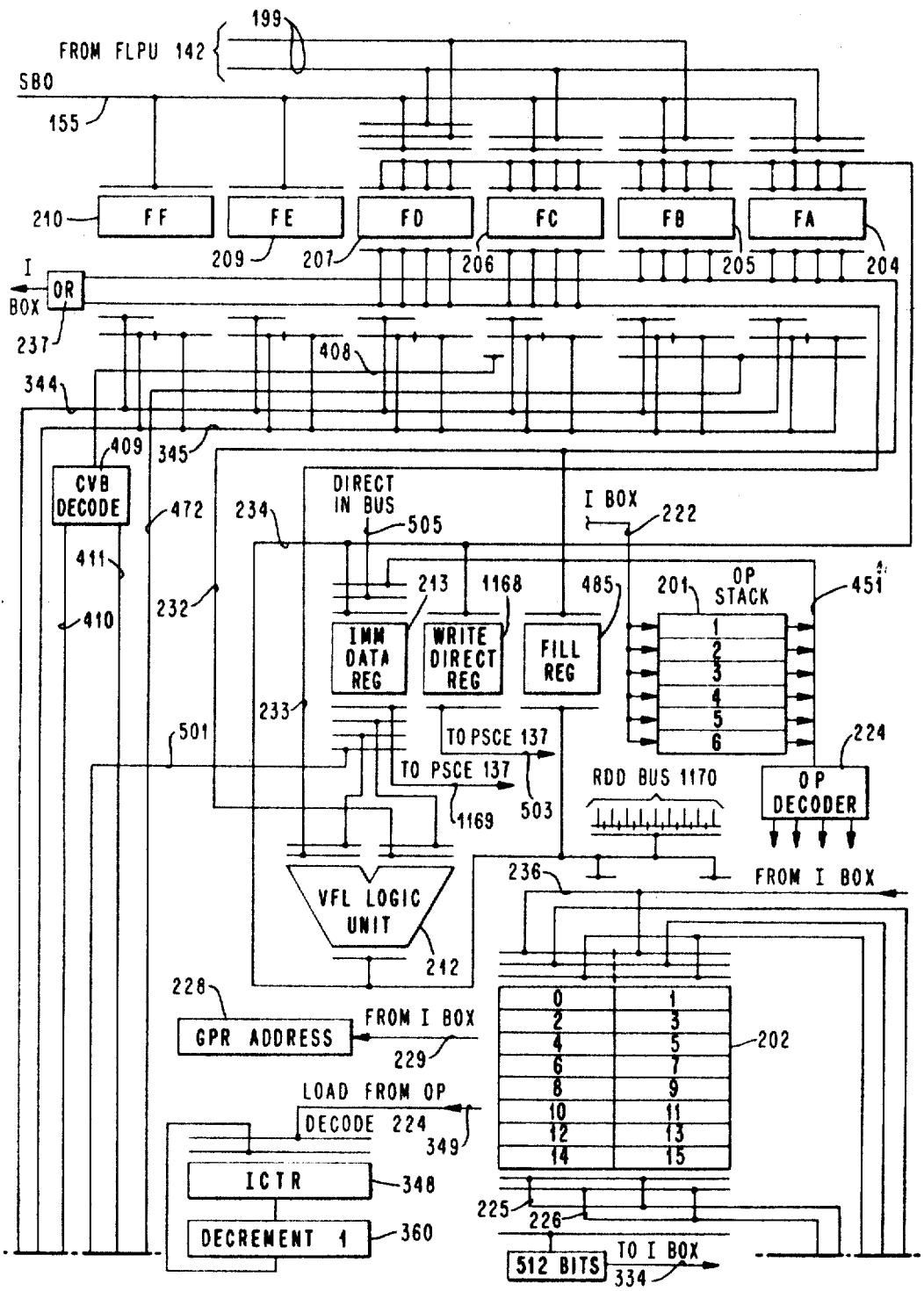
Figure 8:
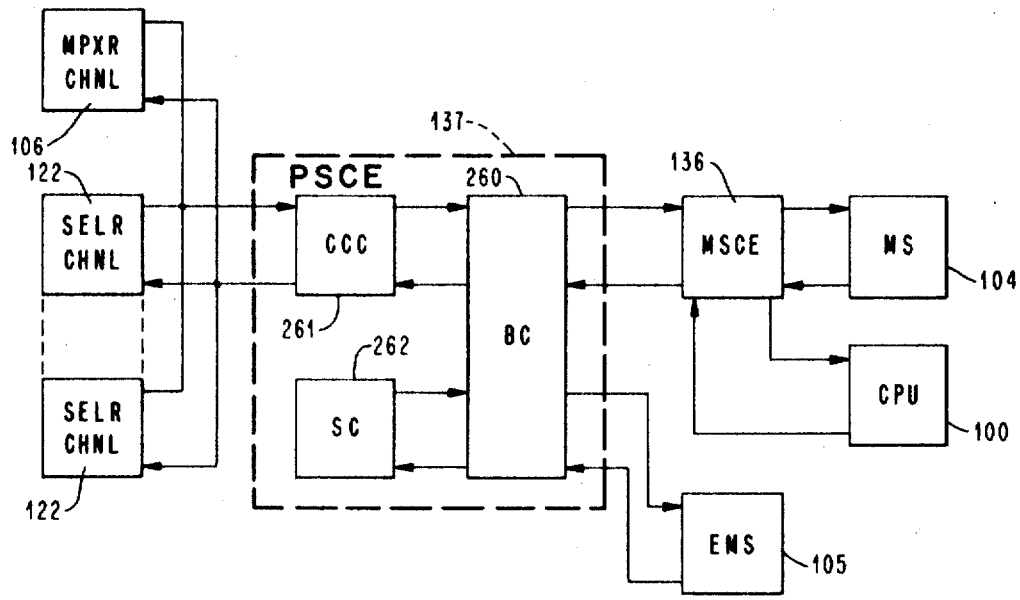
Figure 9:
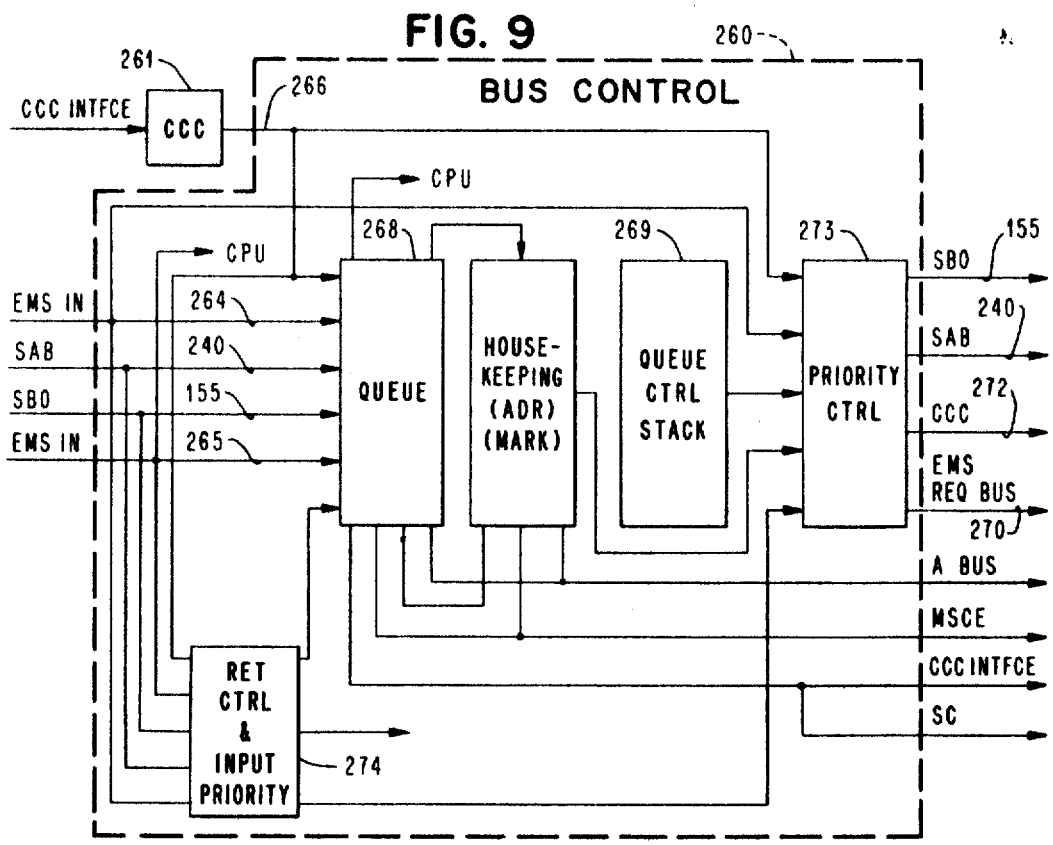
Figure 10:
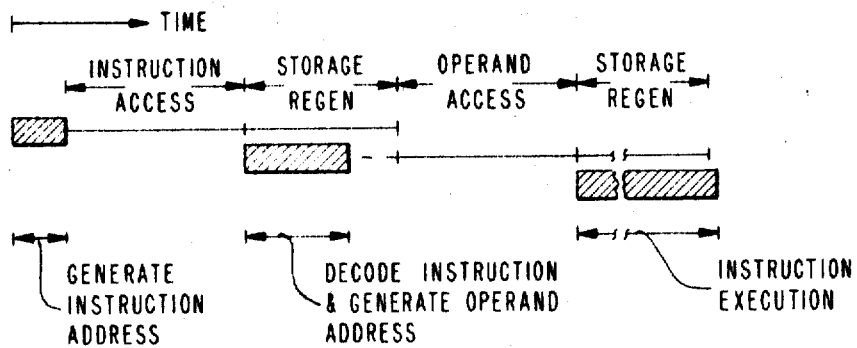
Figure 11:
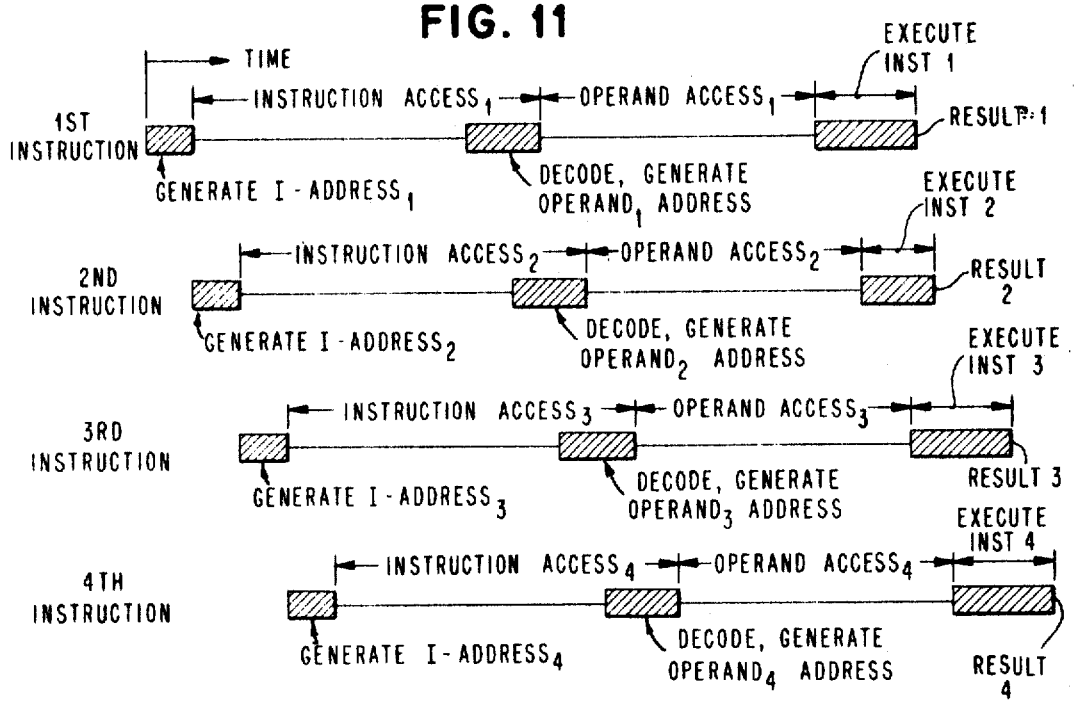
Figure 12:
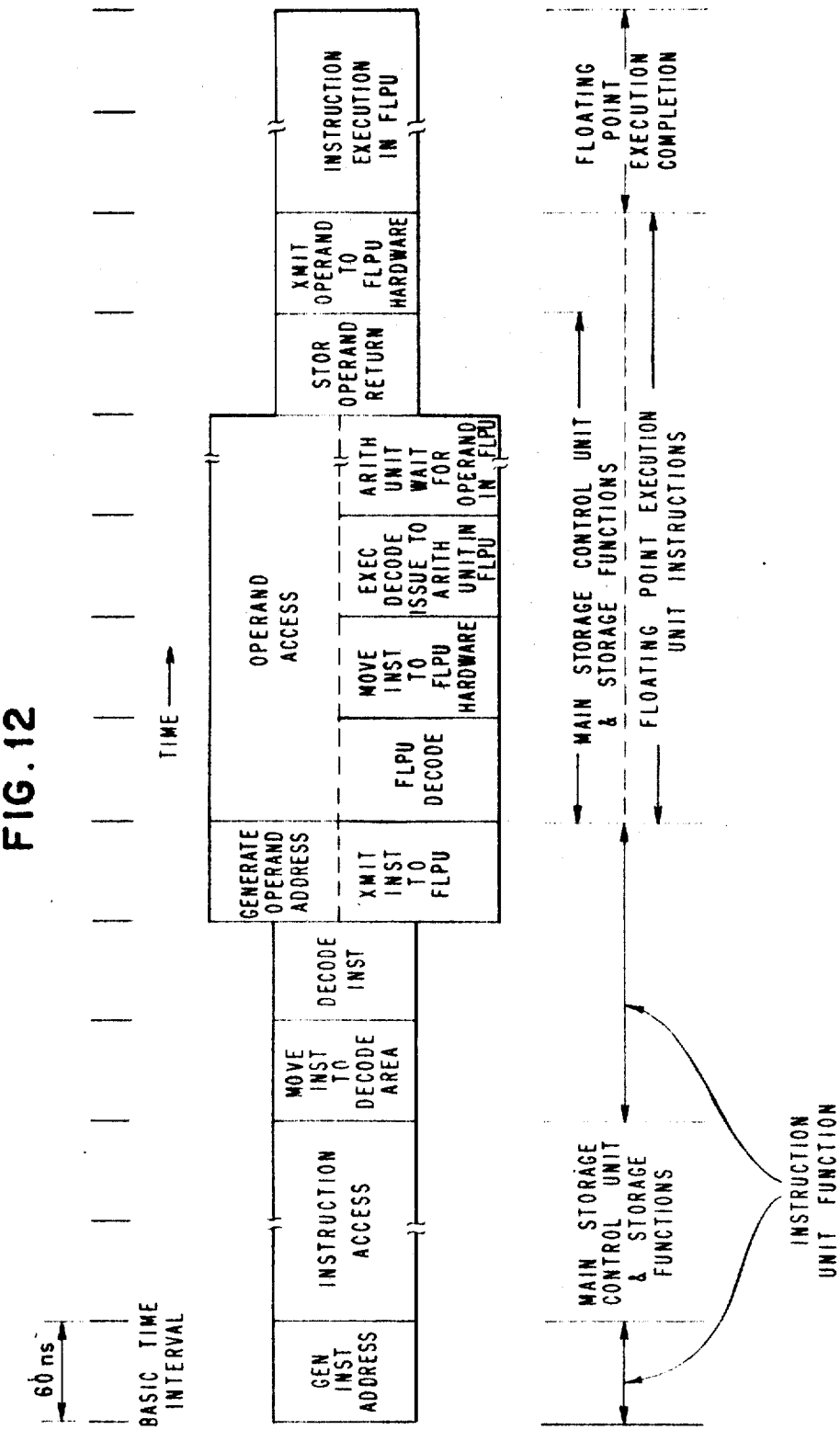
Figure 13:
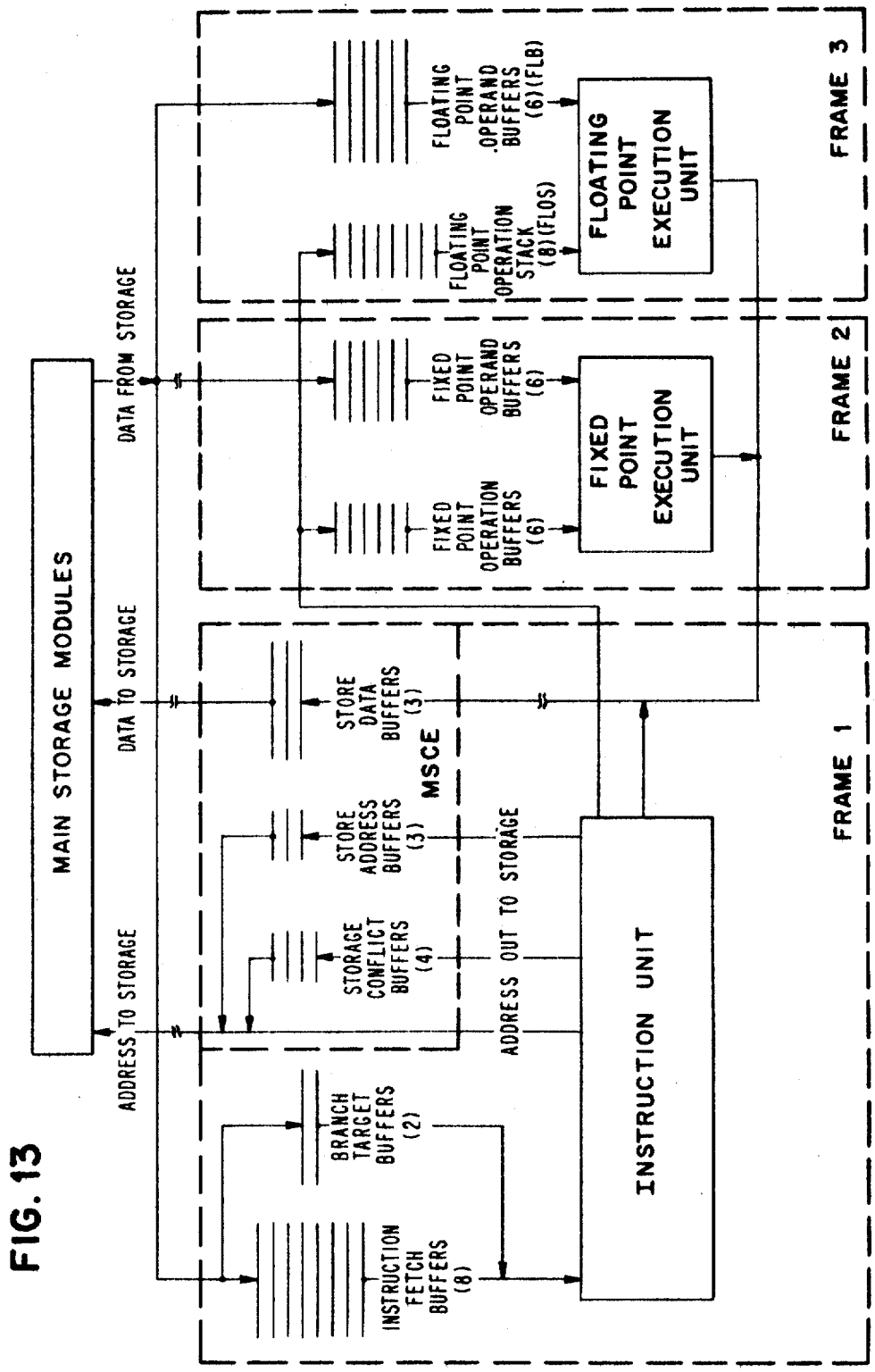
Figure 14:
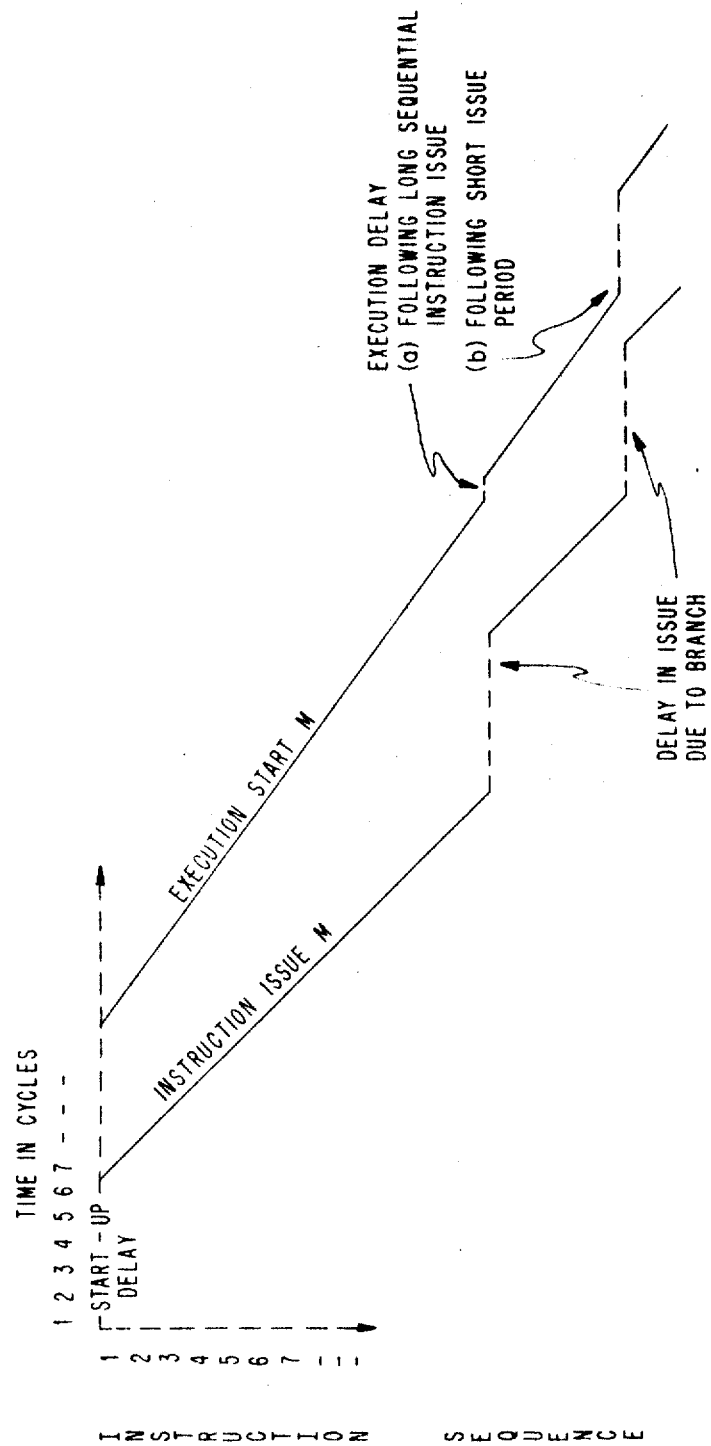
Figure 15:
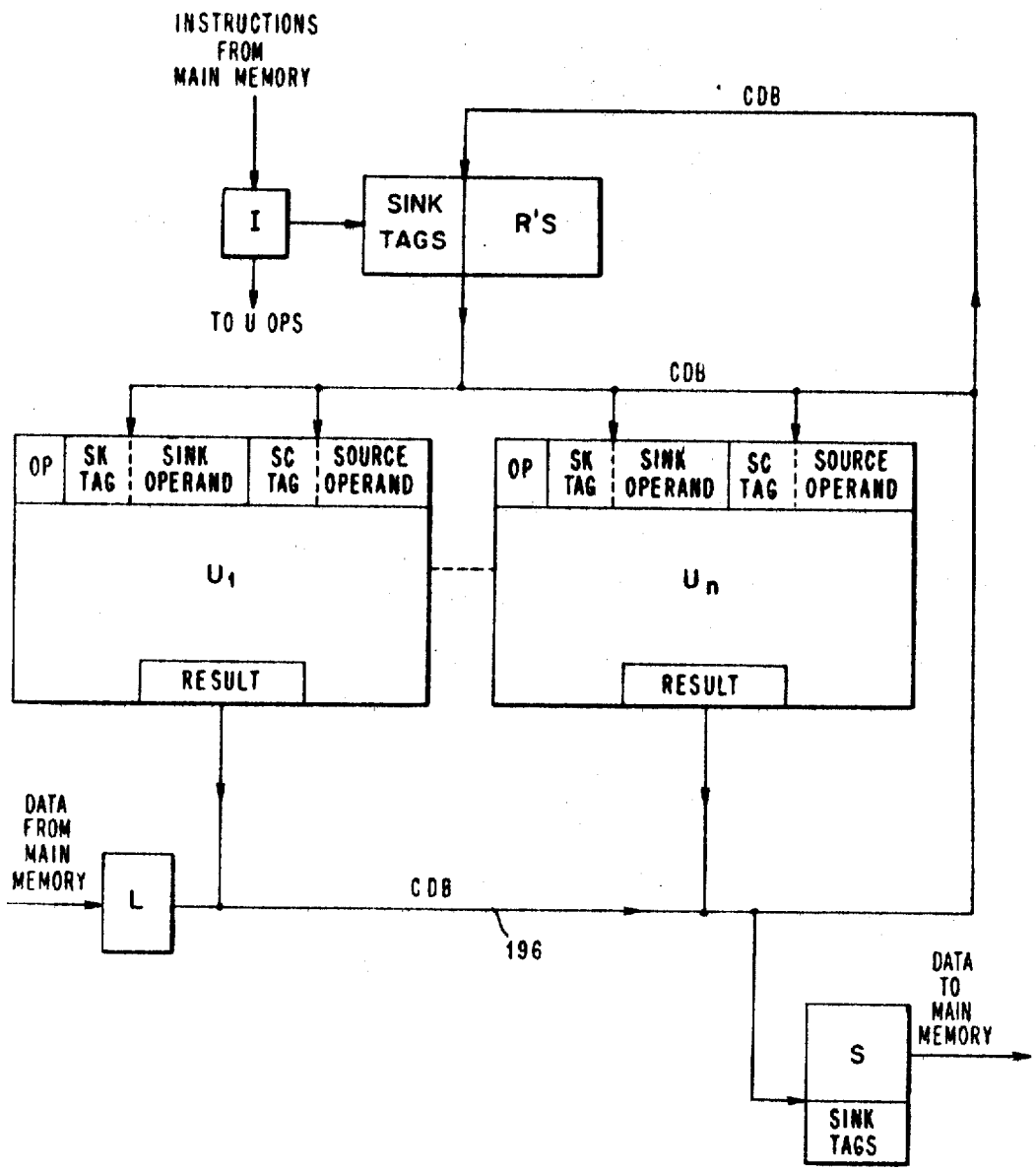
Figure 16A:
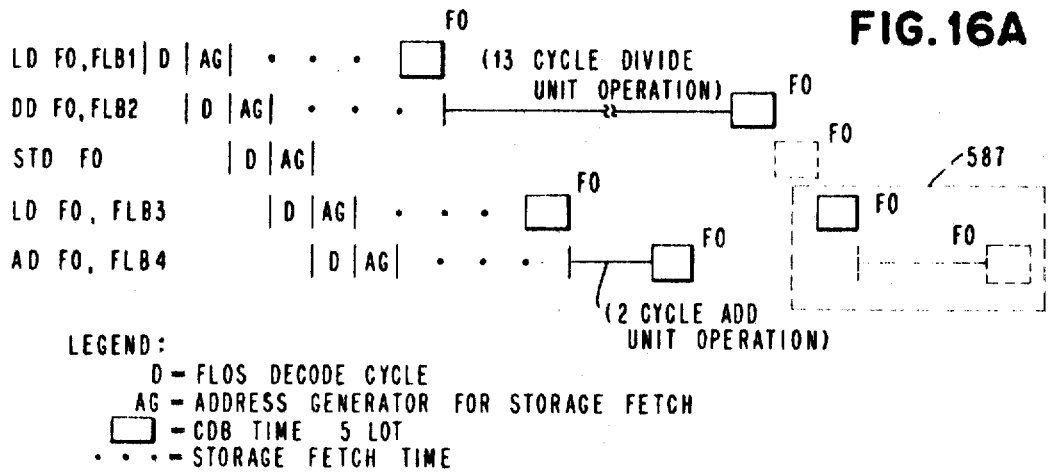
Figure 17A:
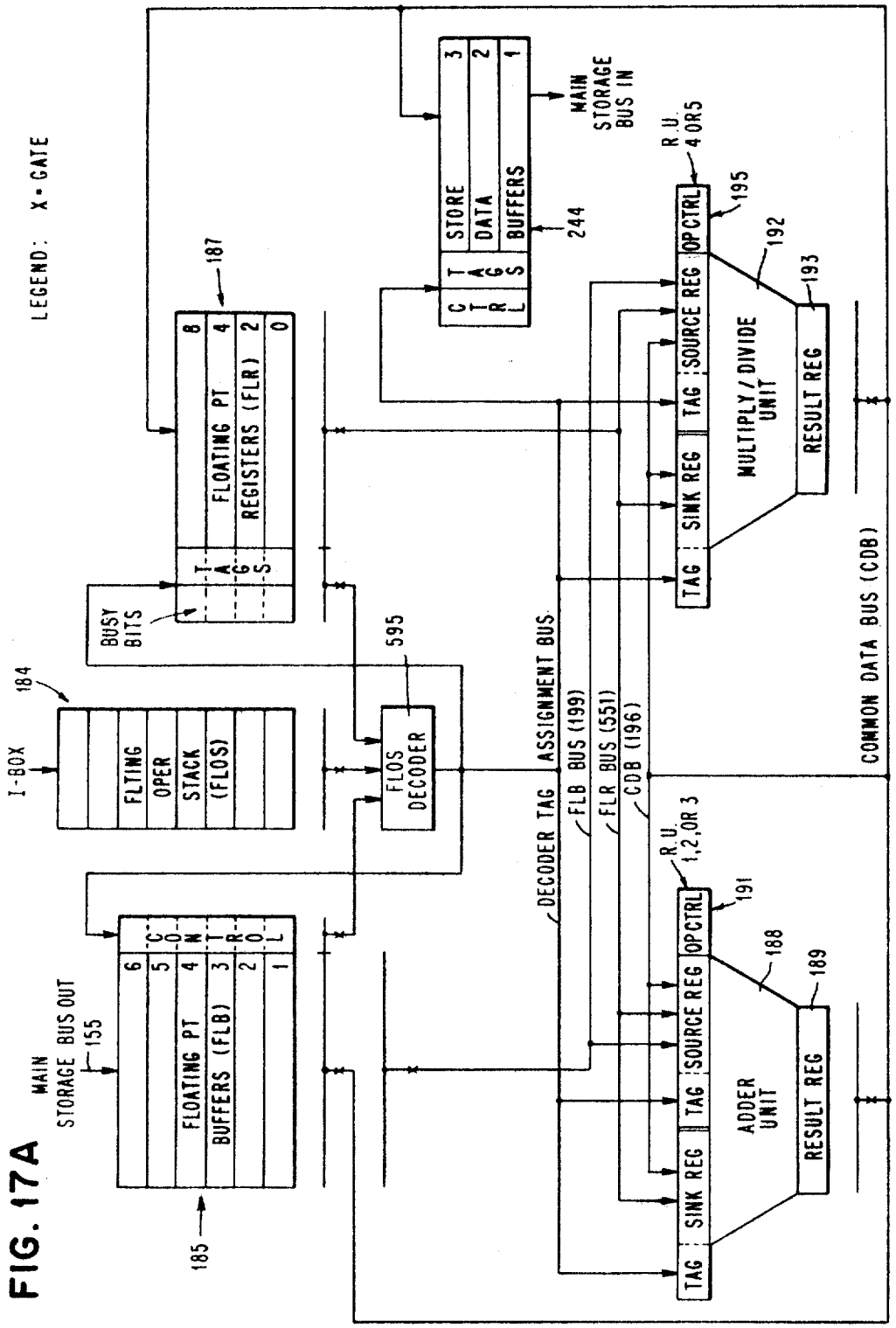
Figure 18A:
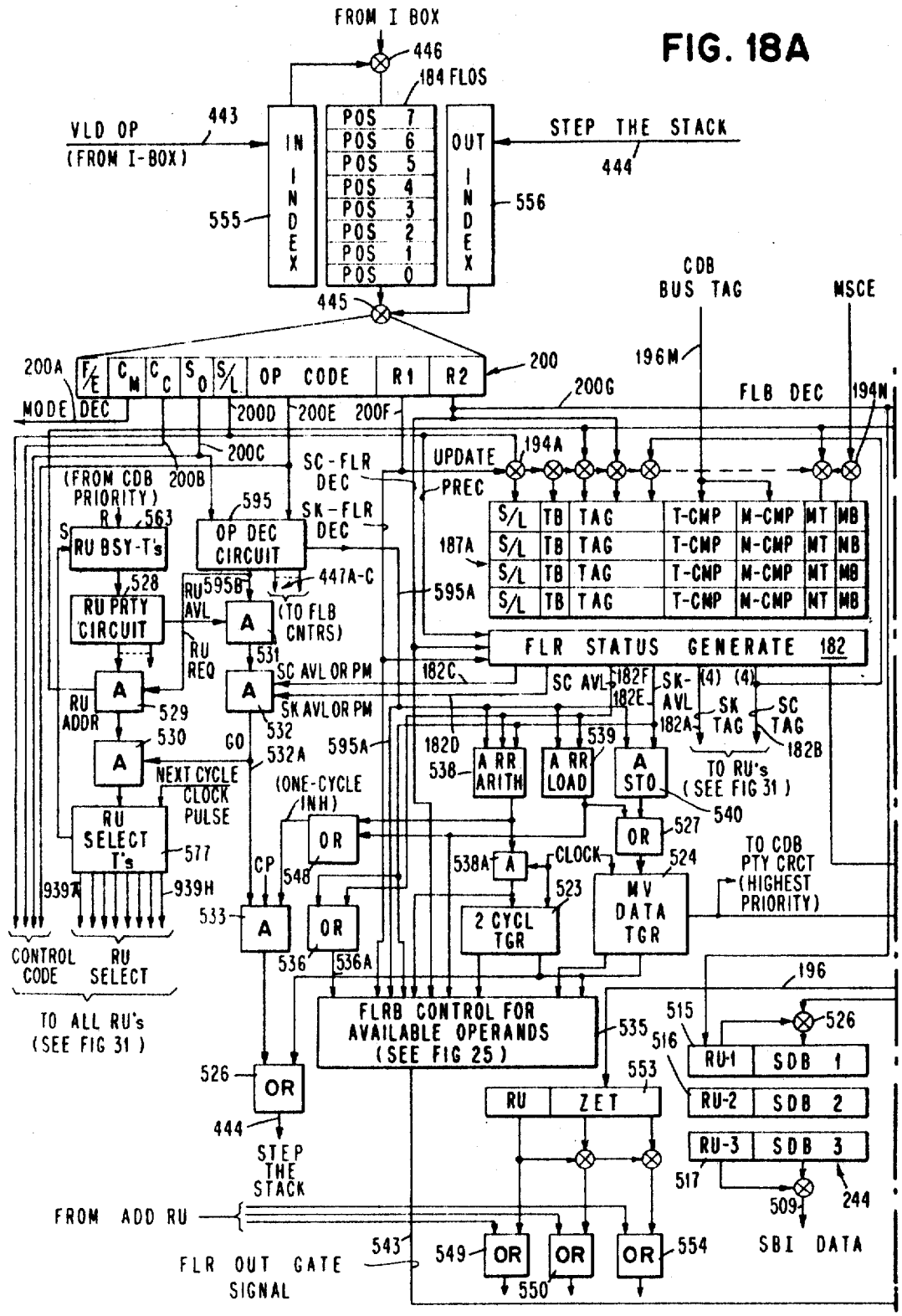
Figure 19:
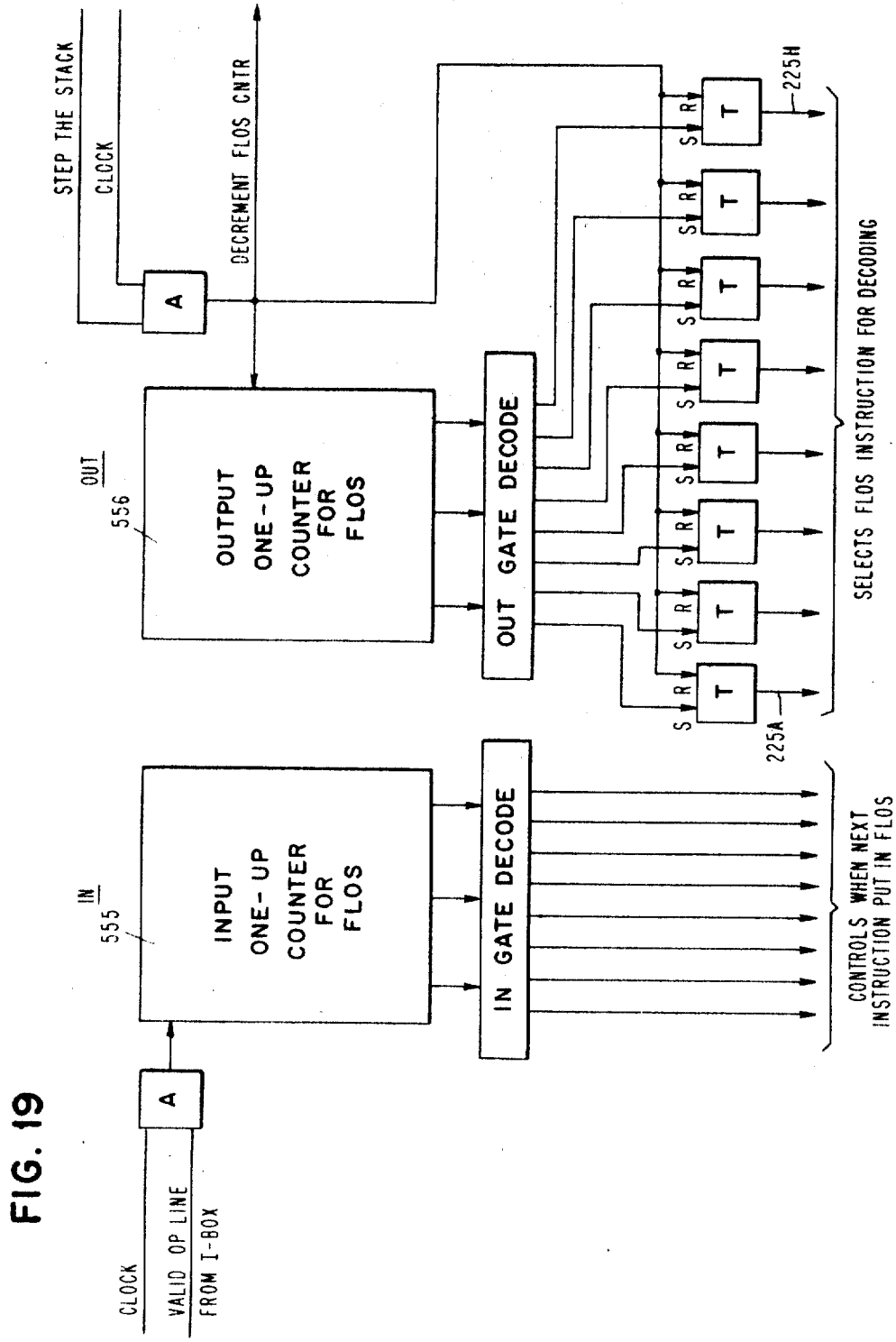
Figure 20:
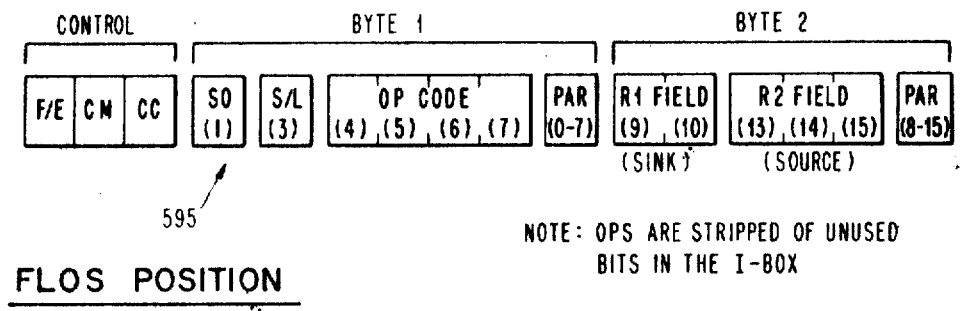
Figure 21:
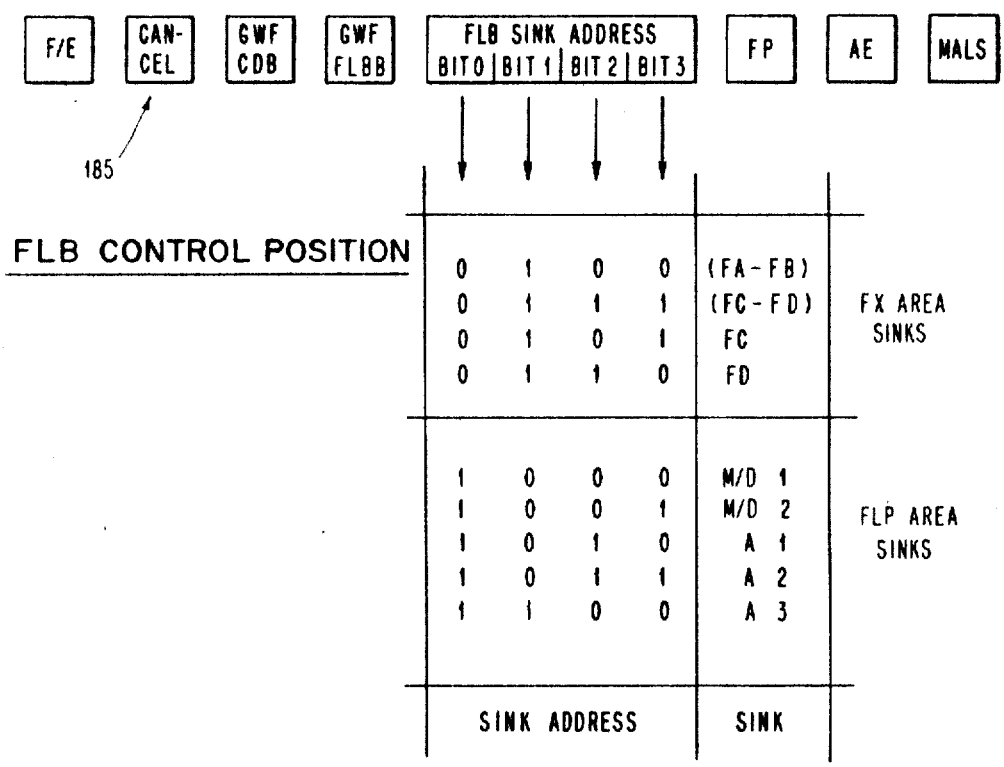
Figure 25A:
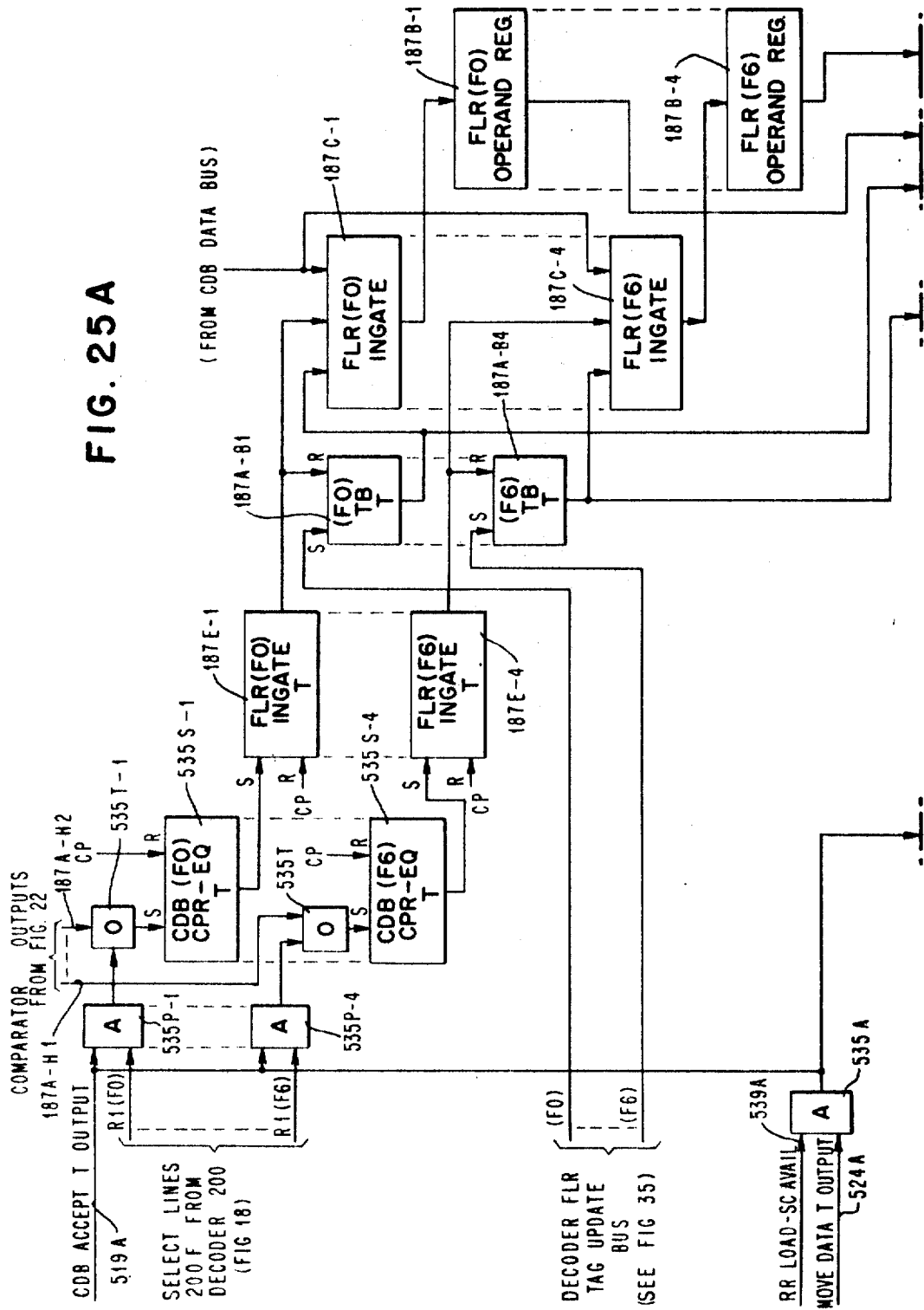
Figure 26:
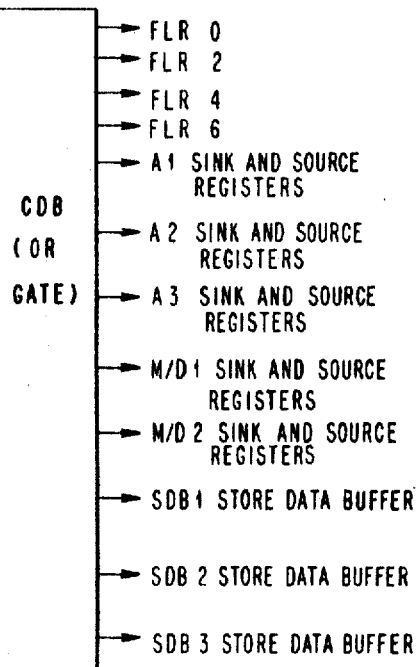
Figure 27:
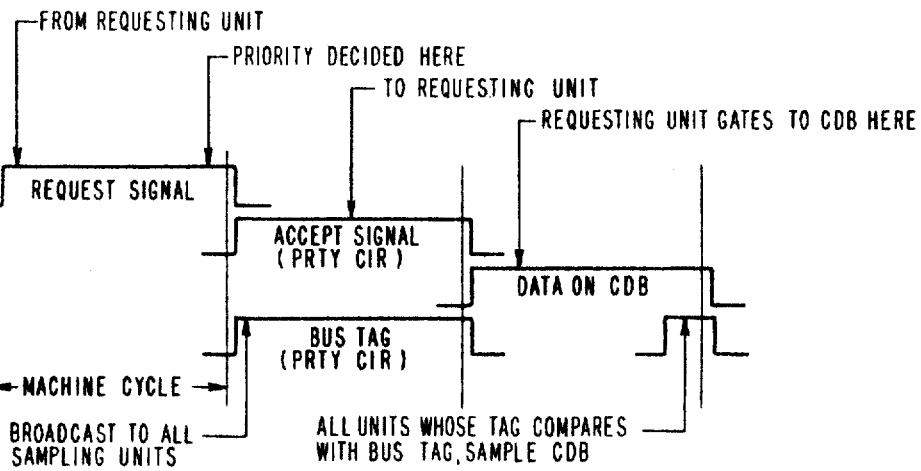
Figure 28:
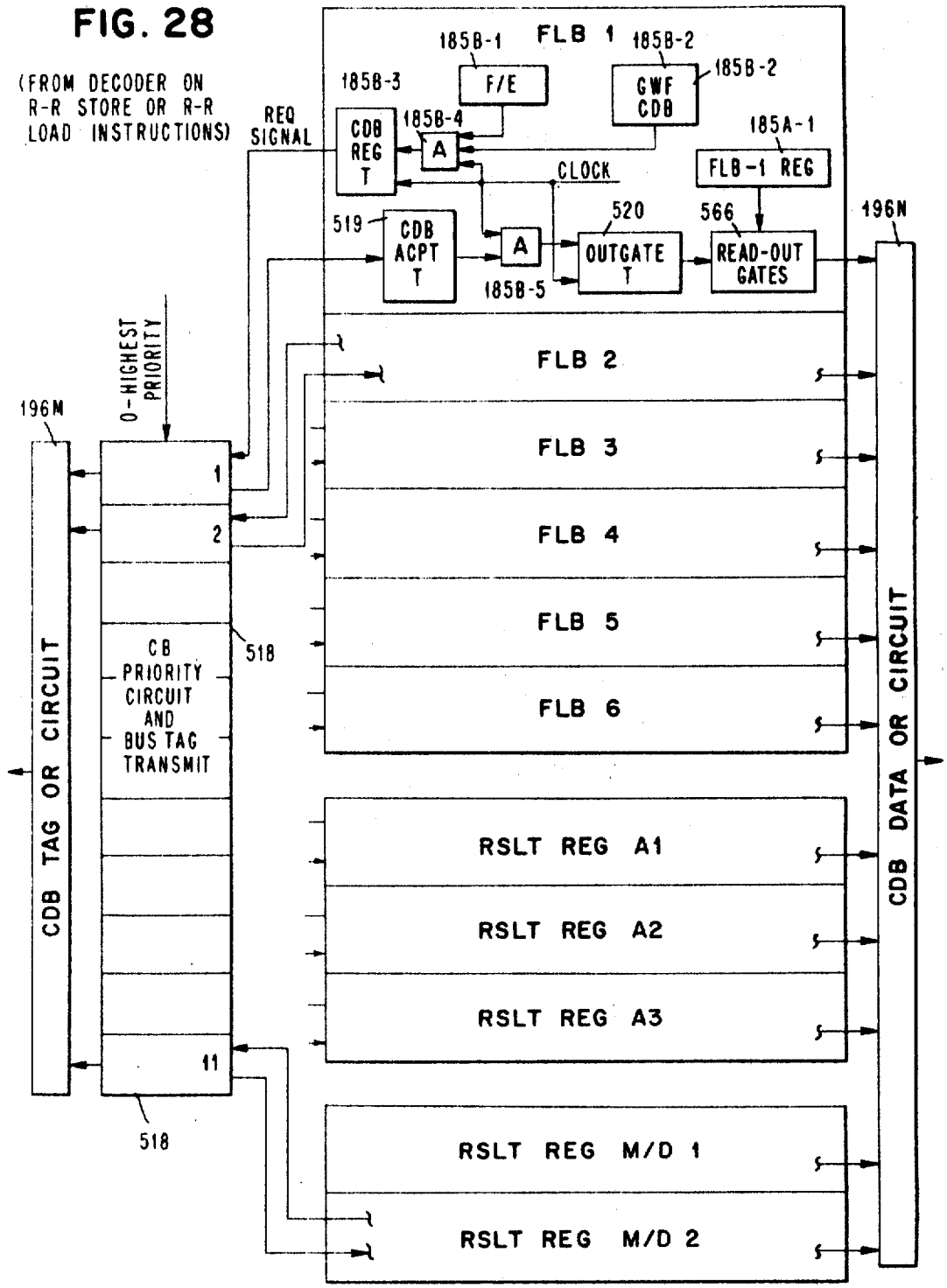
Figure 29:
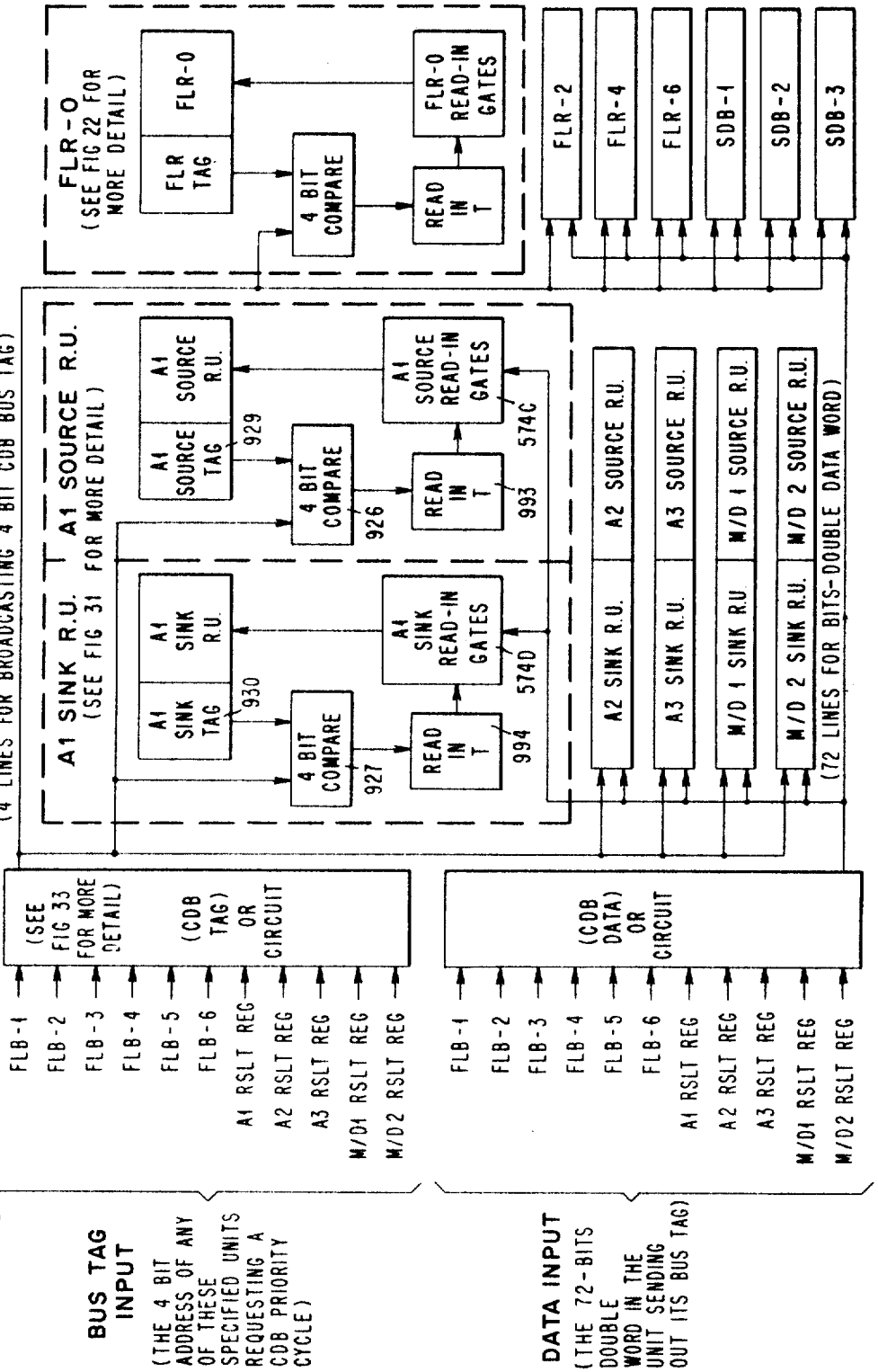
Figure 30:
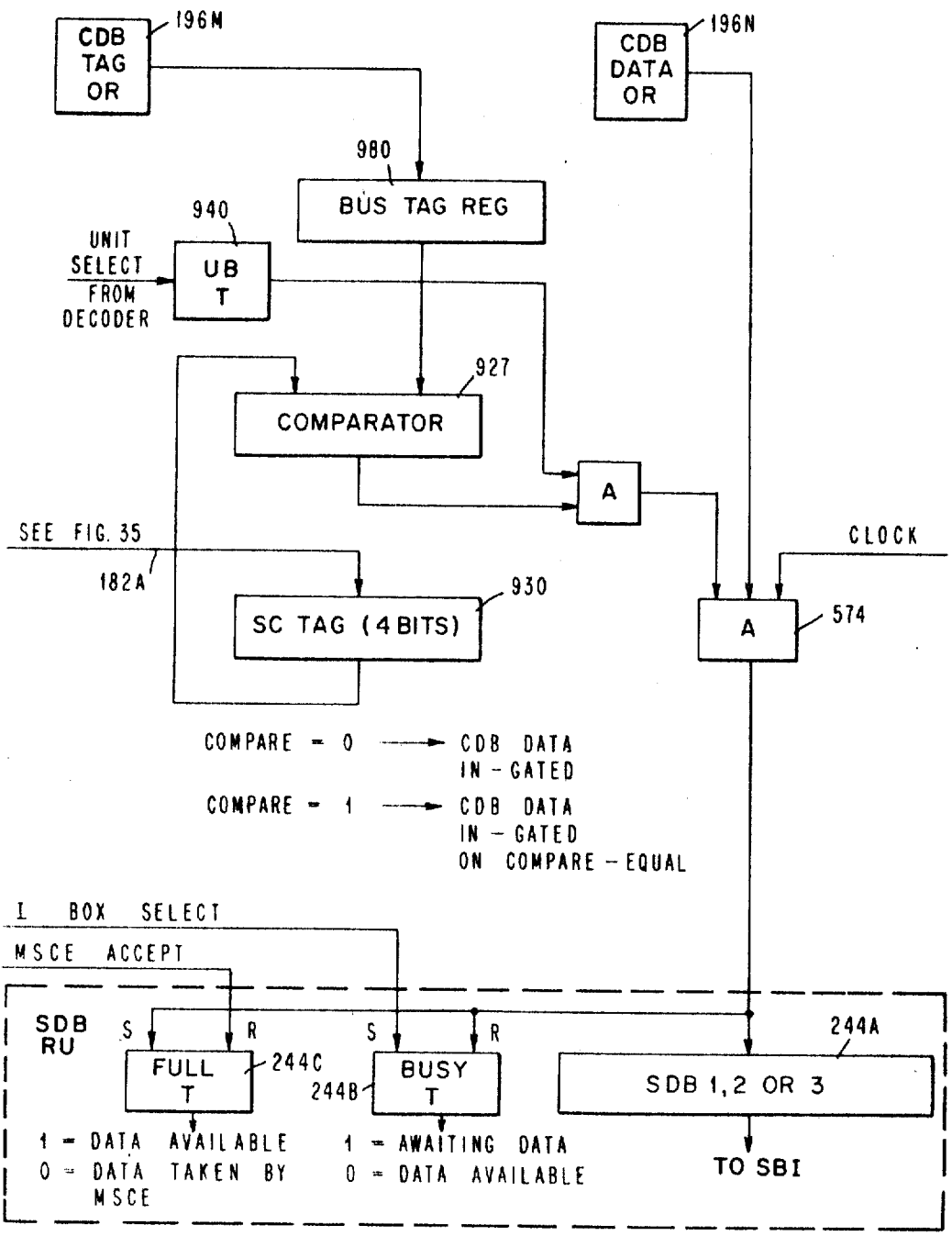
Figure 31:
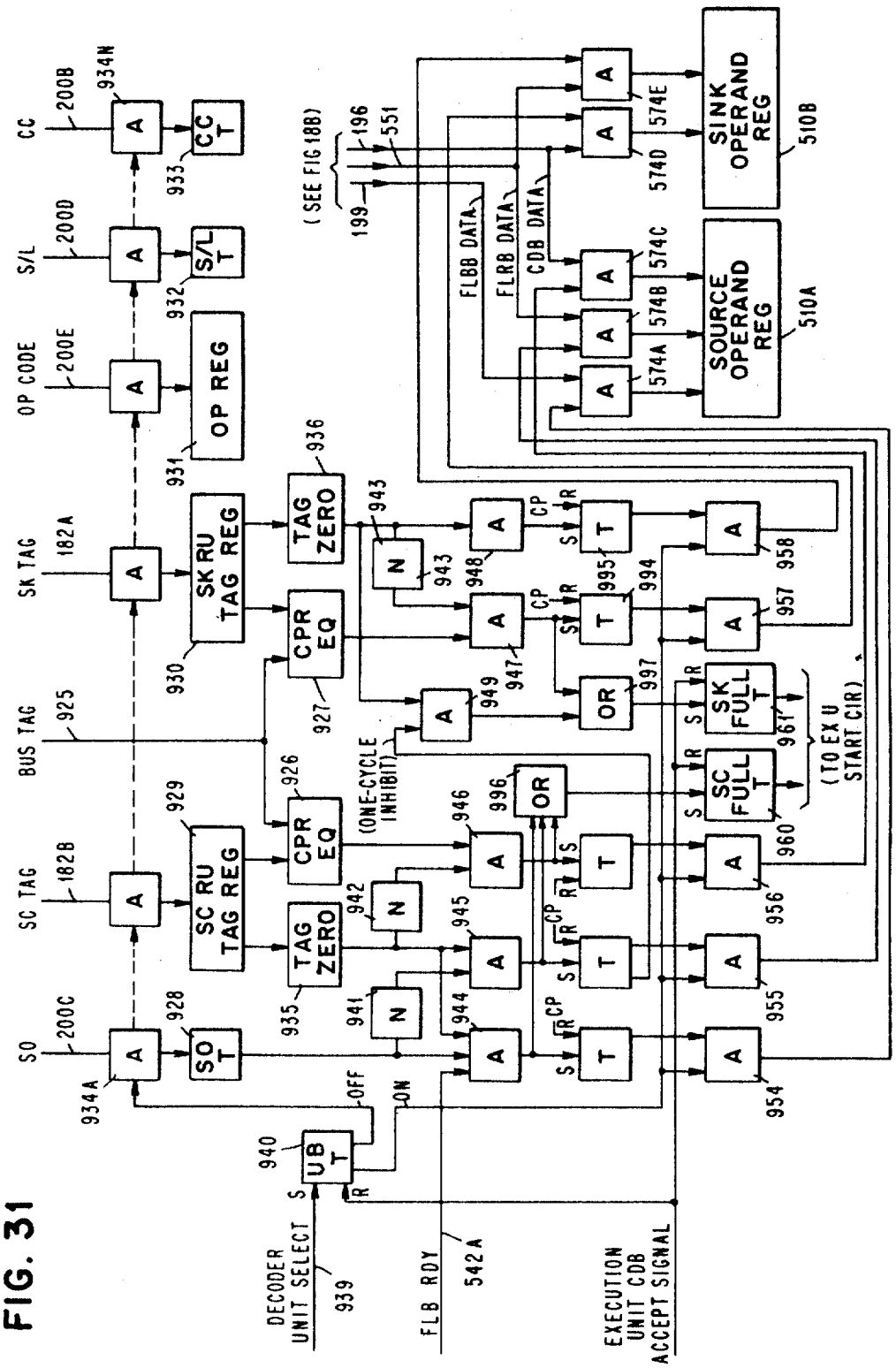
Figure 32:
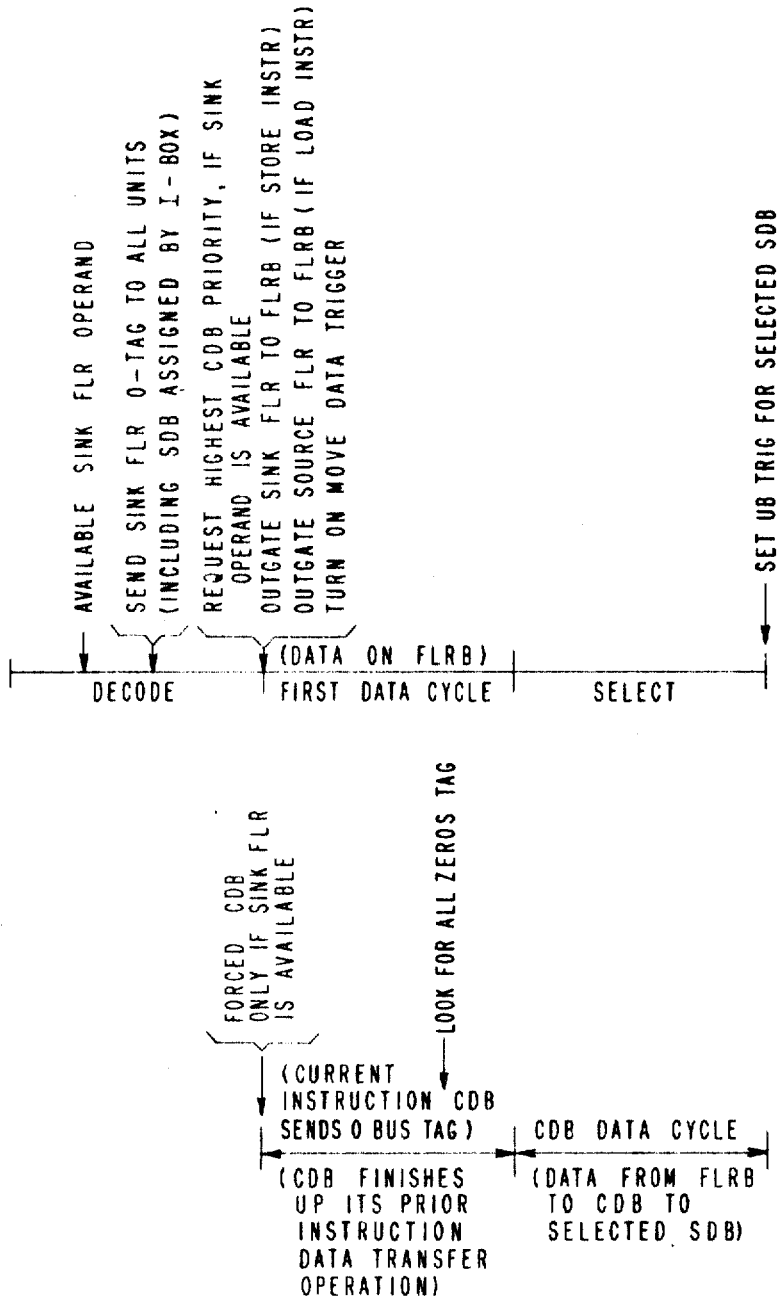
Figure 33:
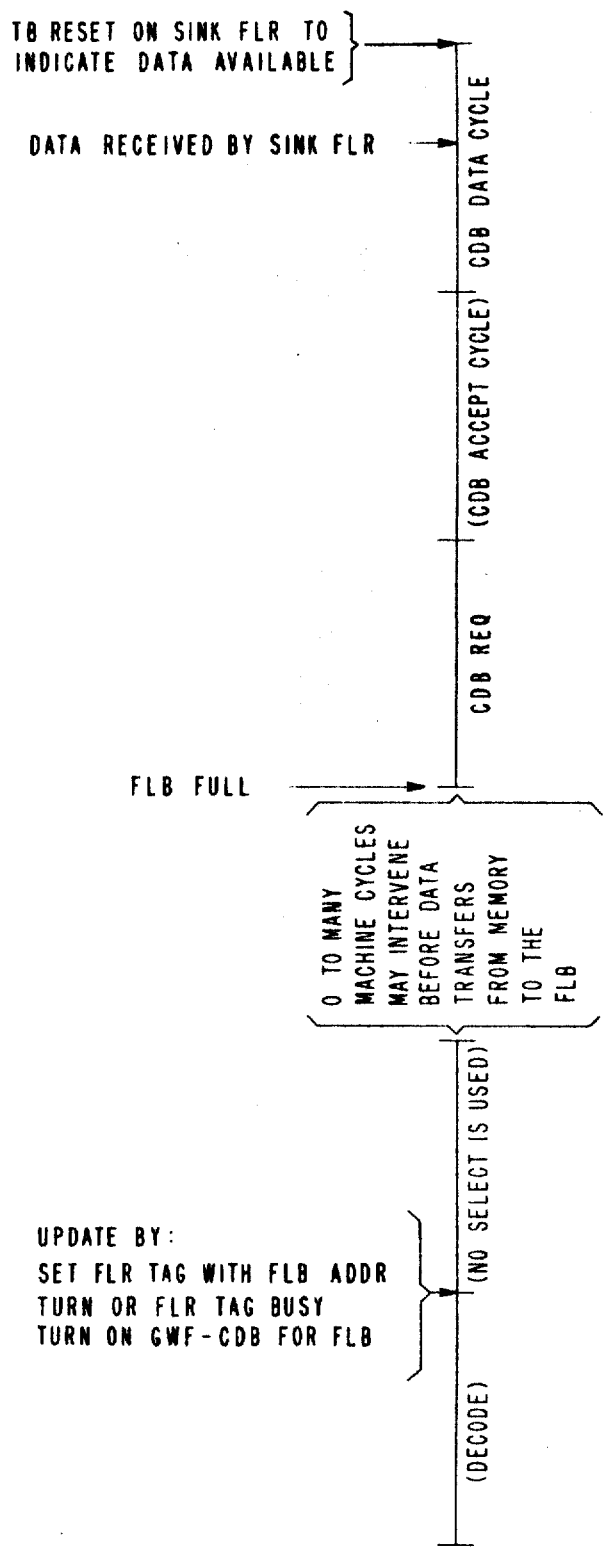
Figure 34:
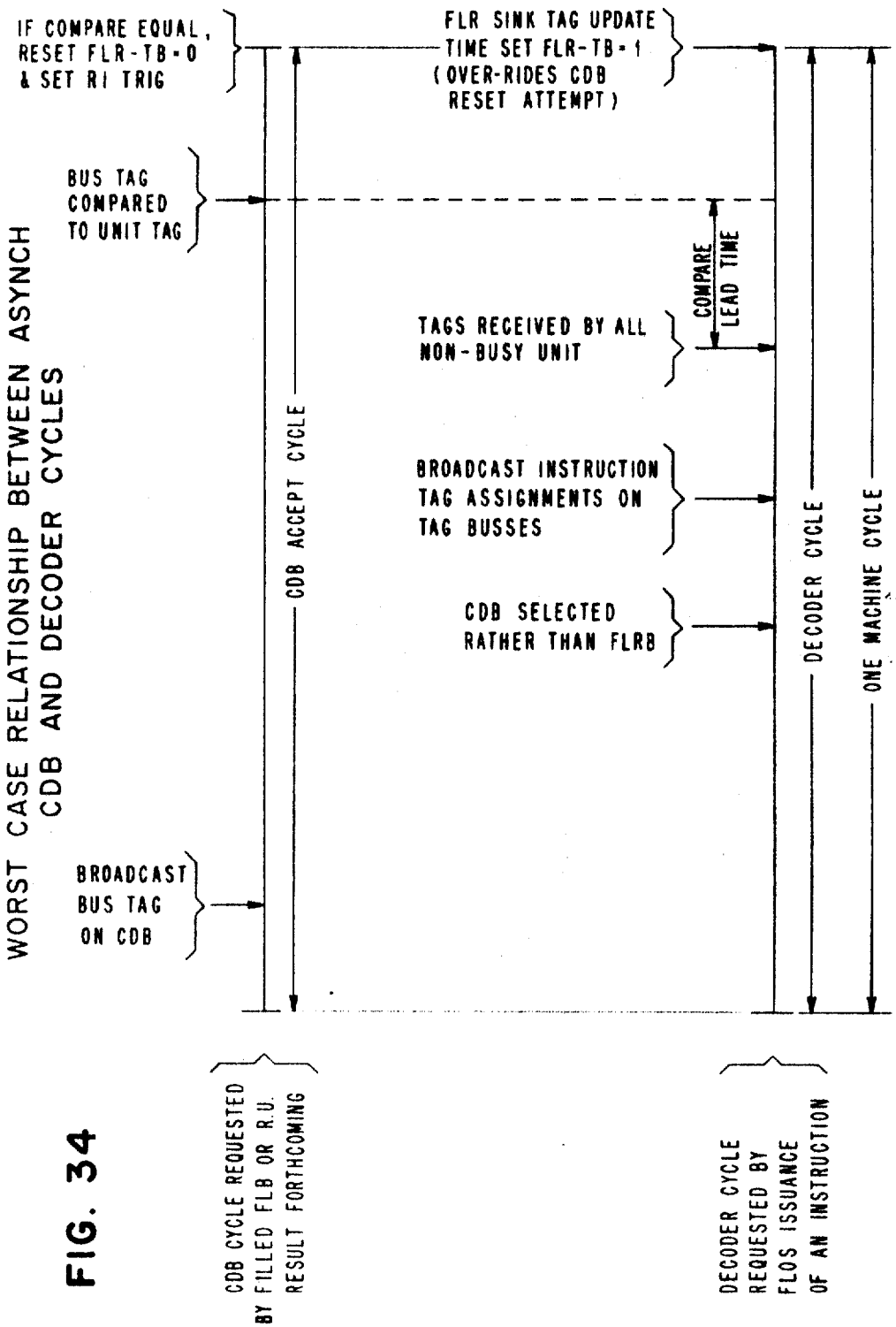
Figure 35:
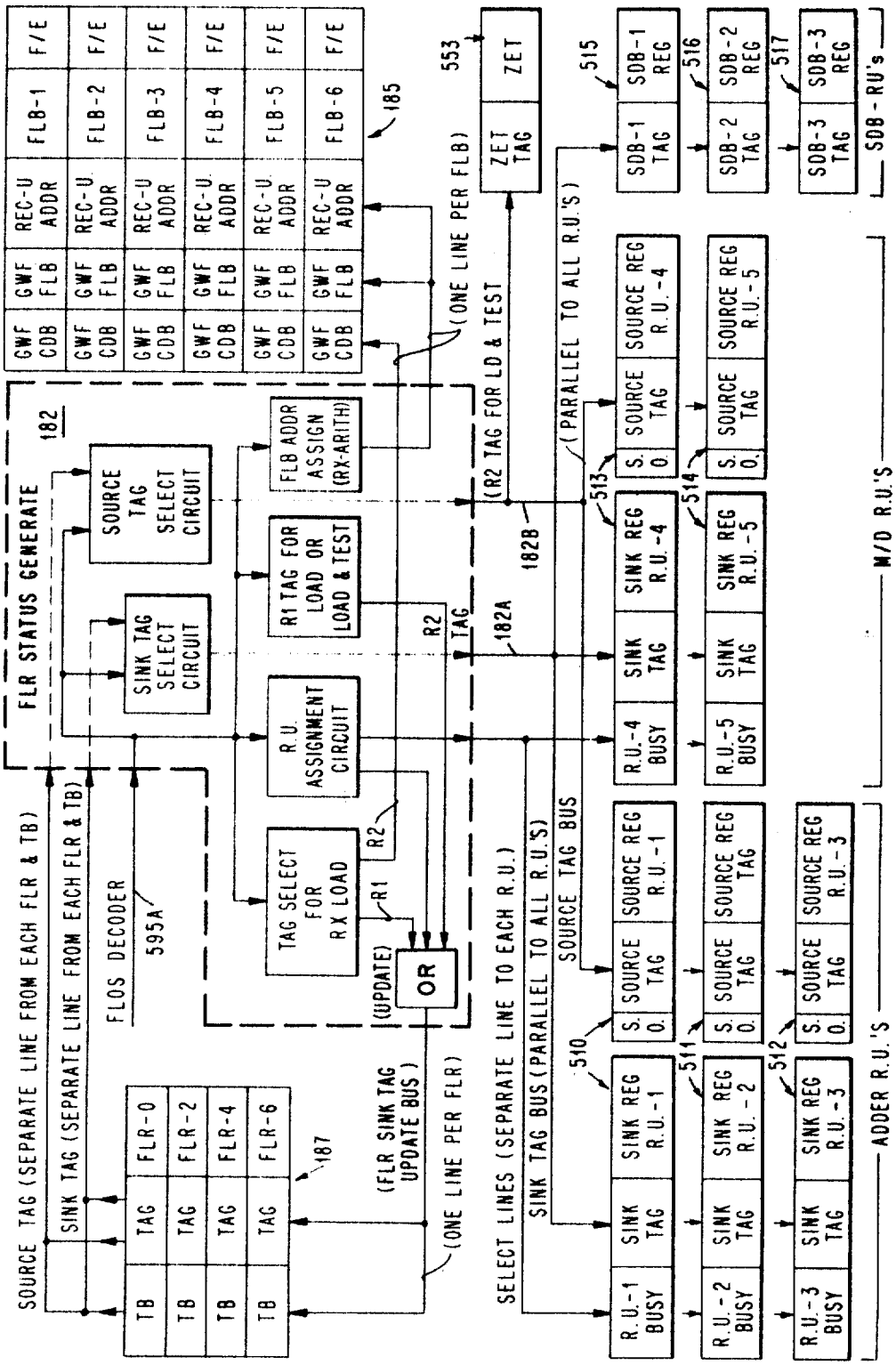
Figure 41:
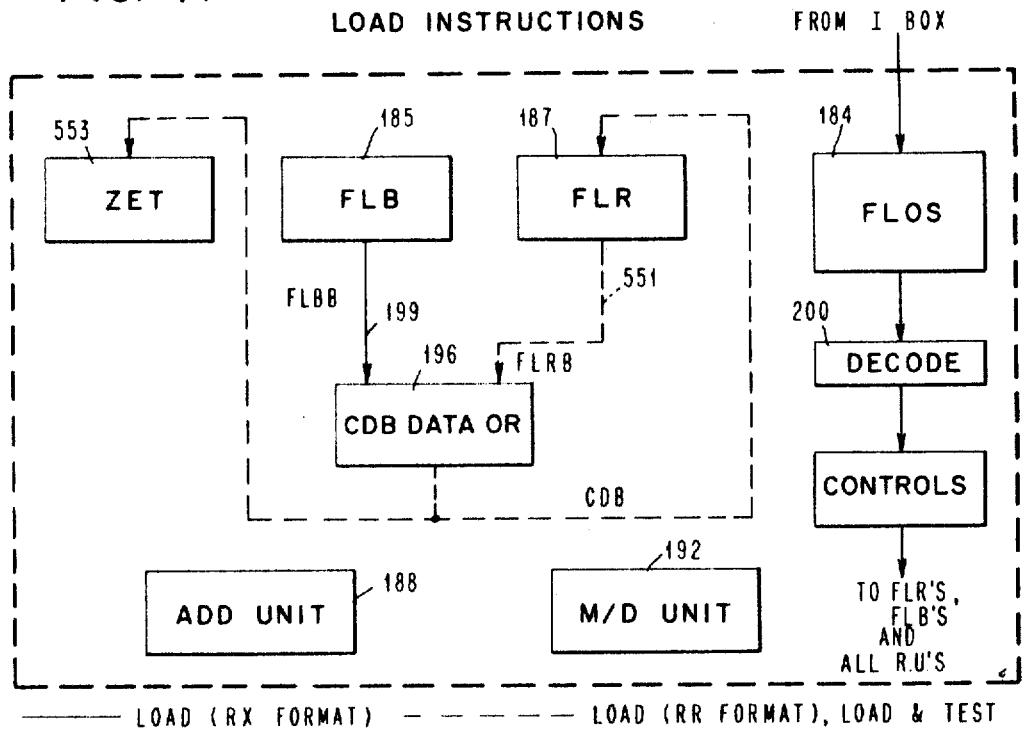
Figure 42:
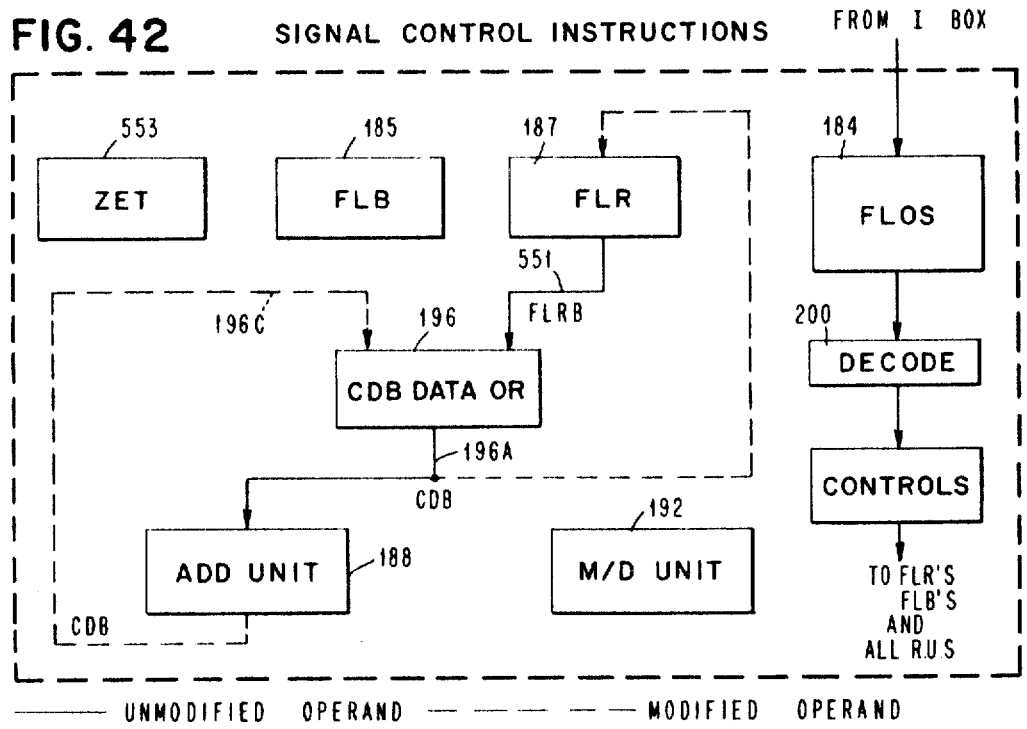
Figure 45:
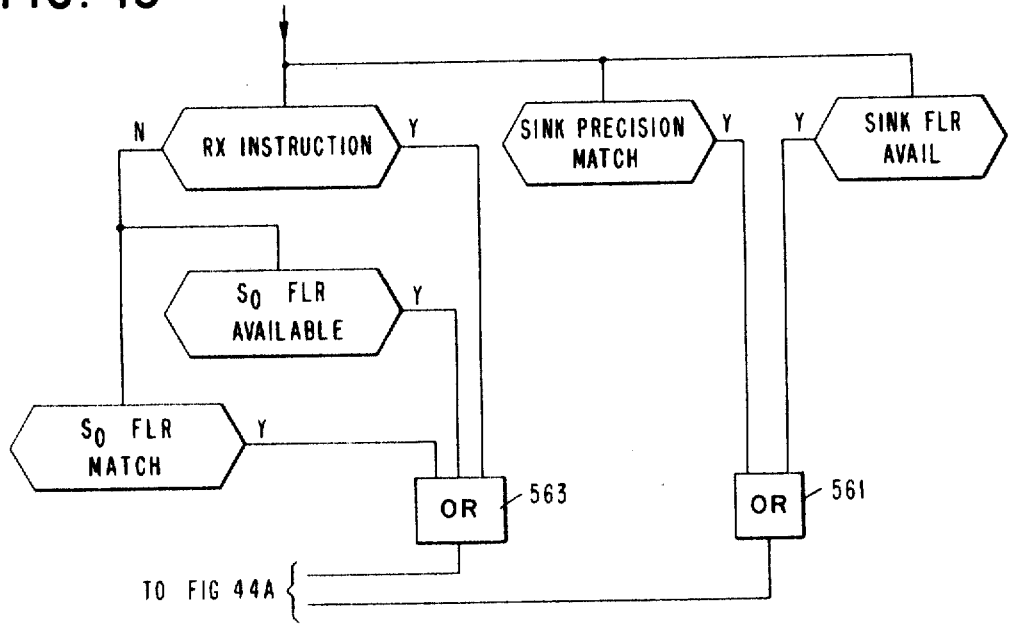
Figure 46:
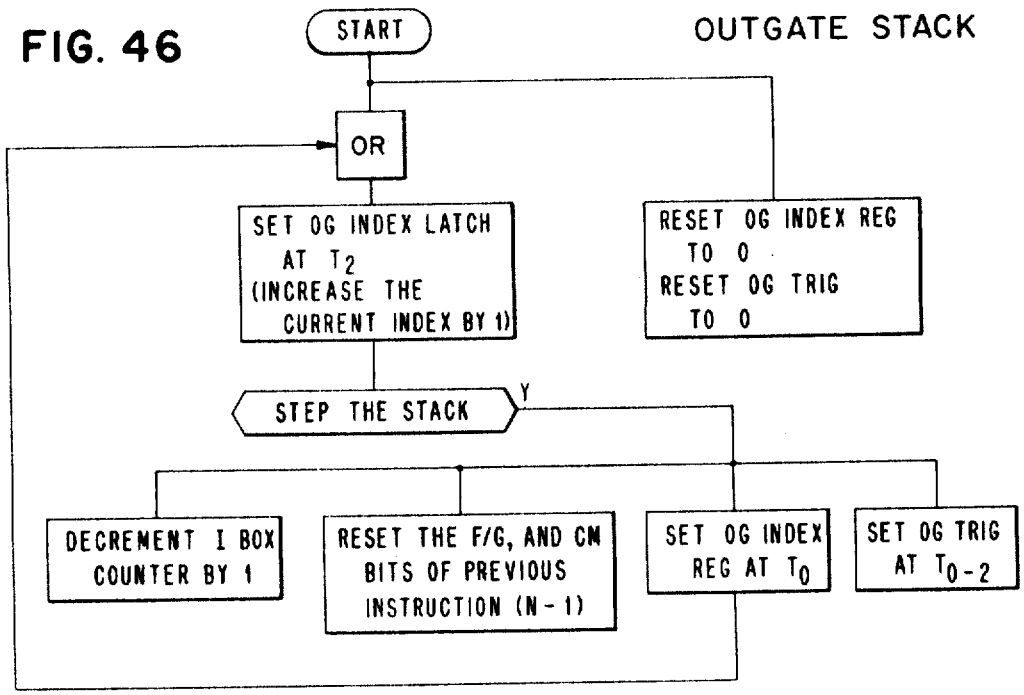
Figure 47:
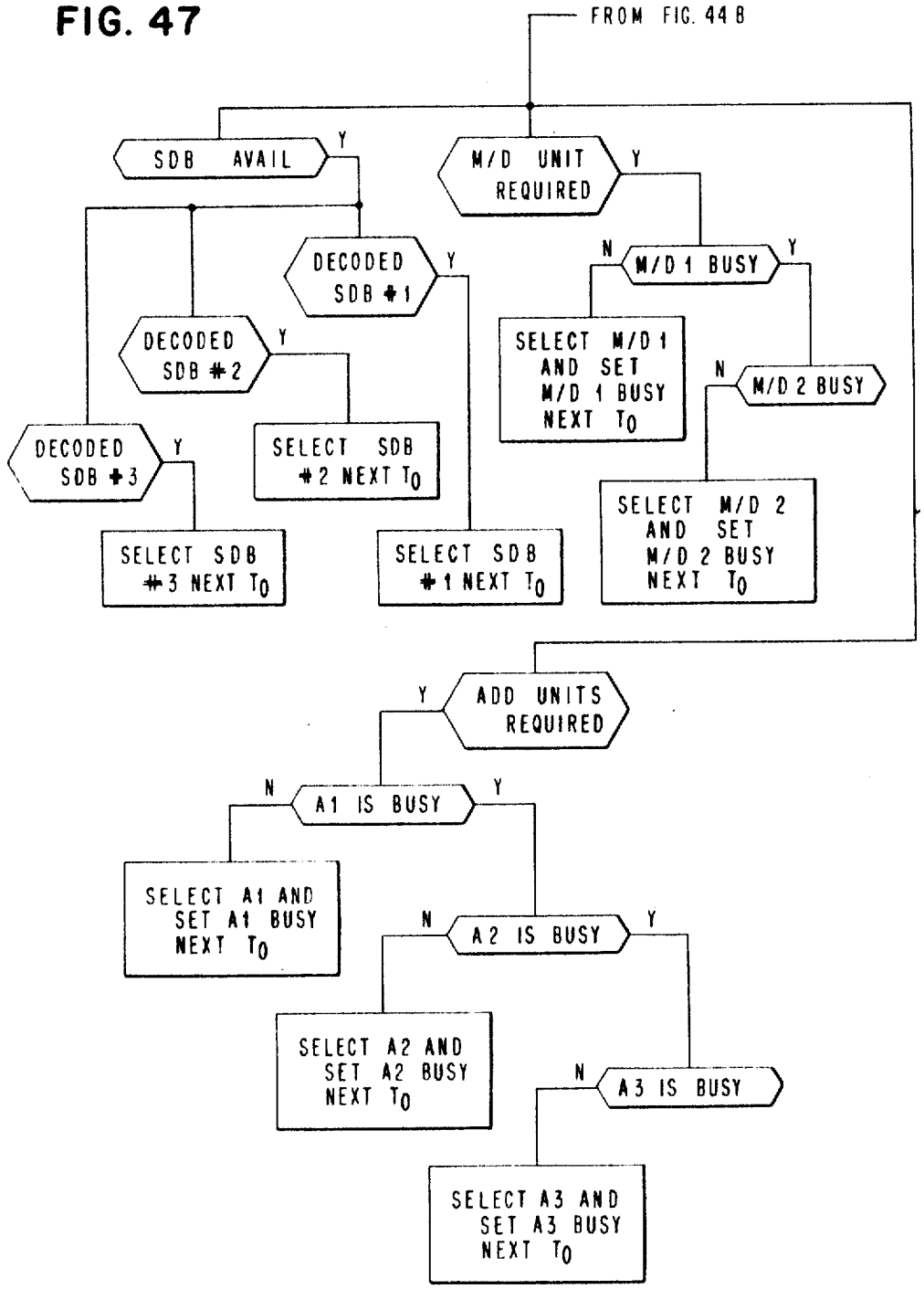
Figure 48B:
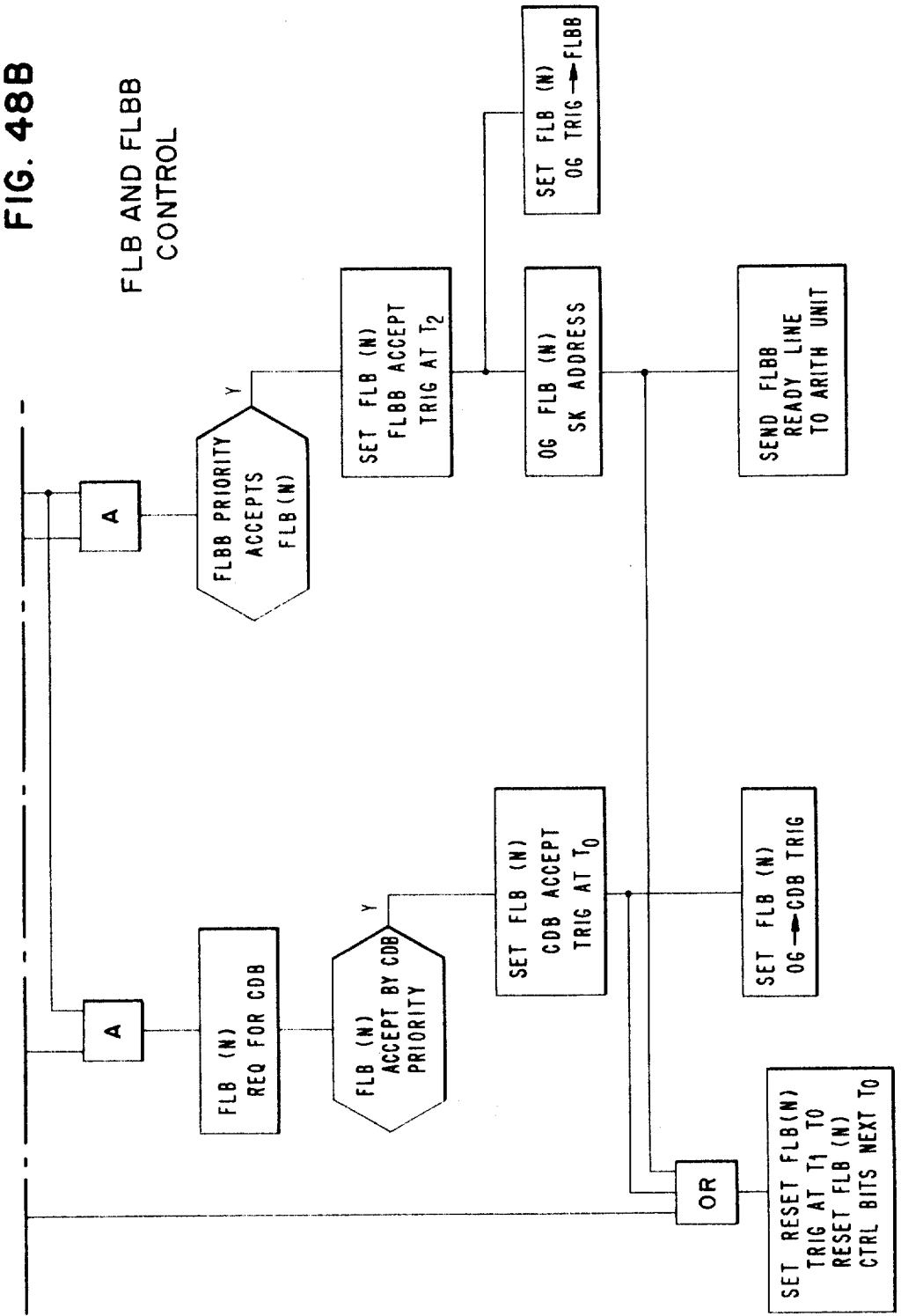
Figure 53:
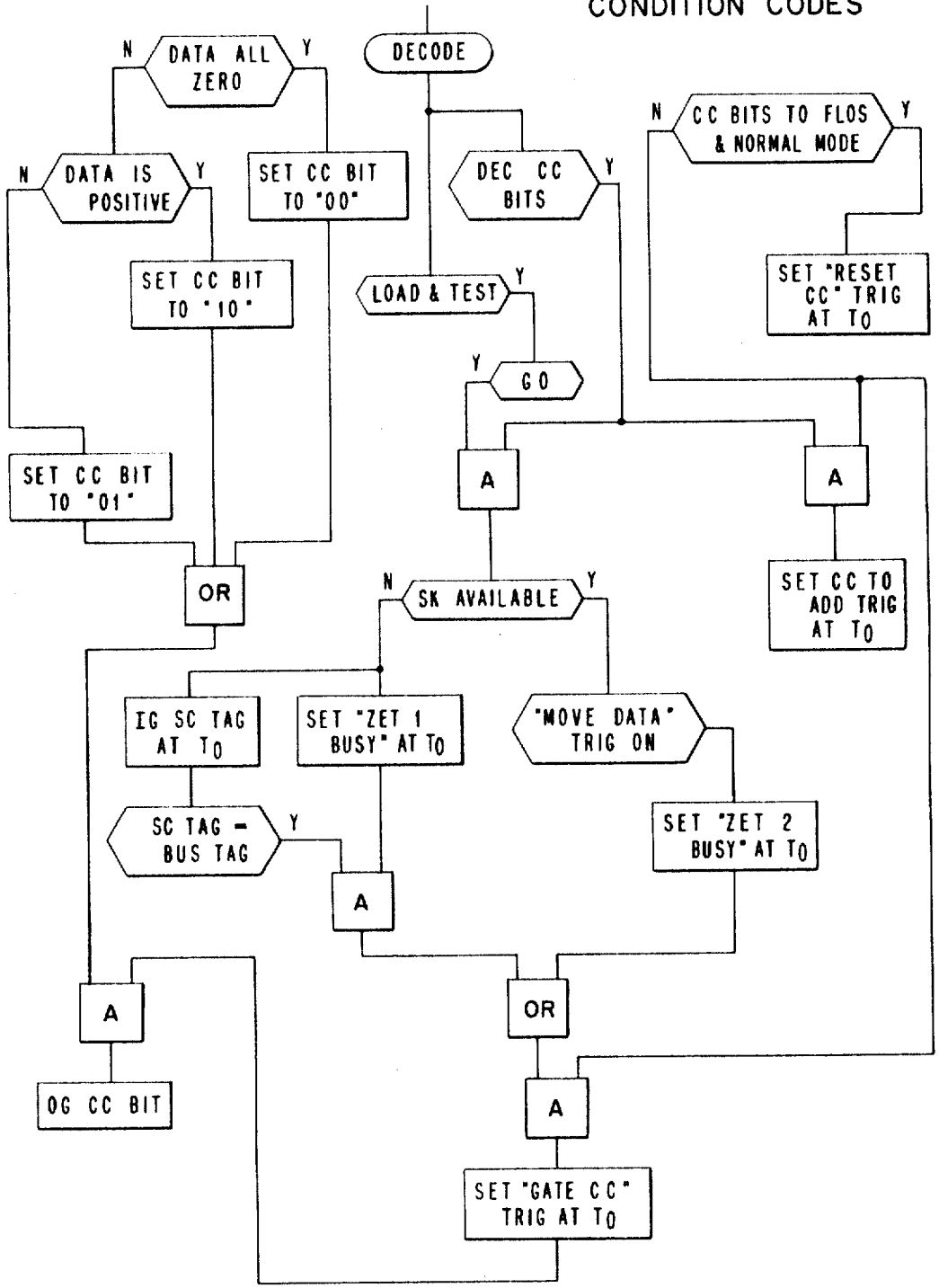
Figure 54:
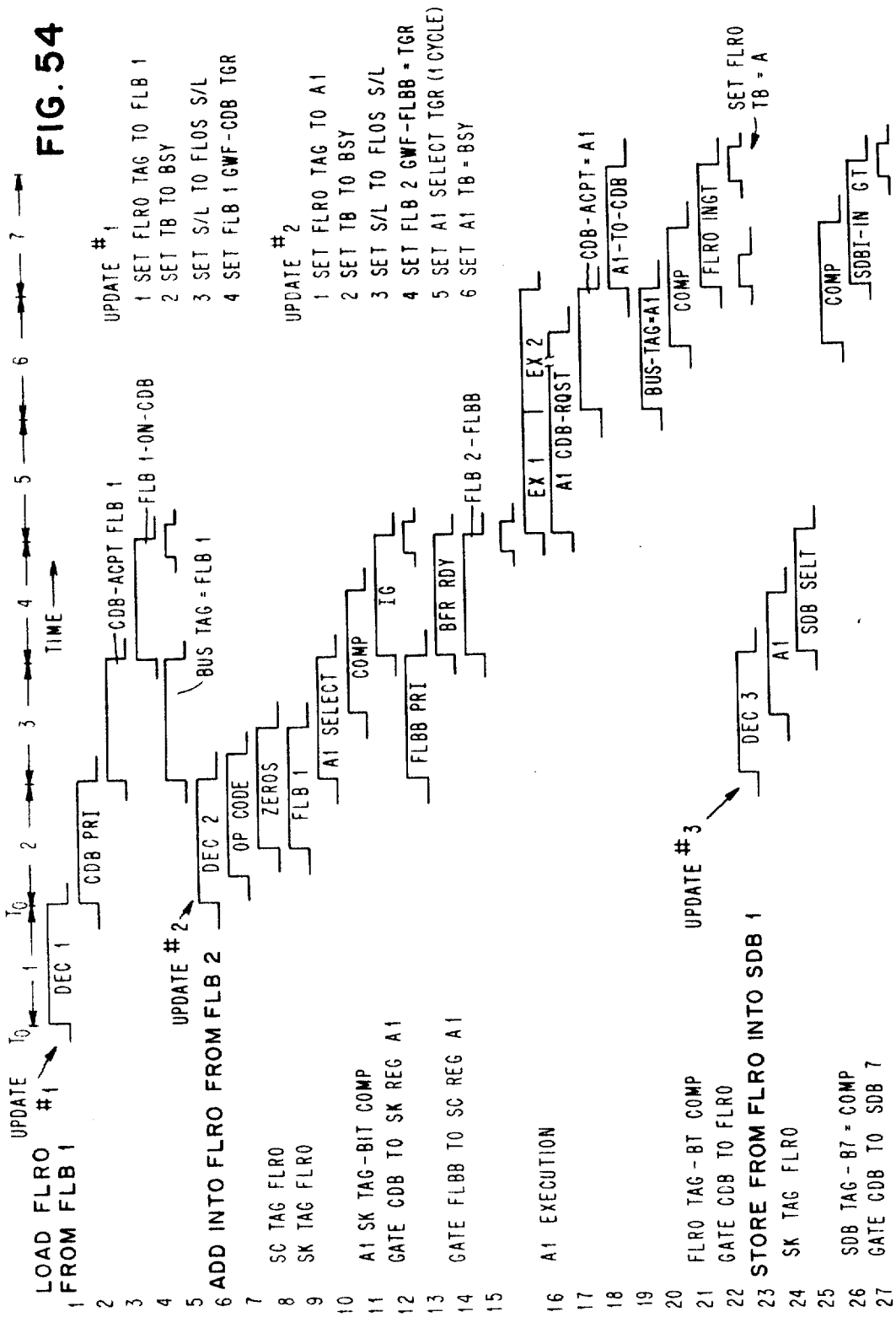
Figure 55:
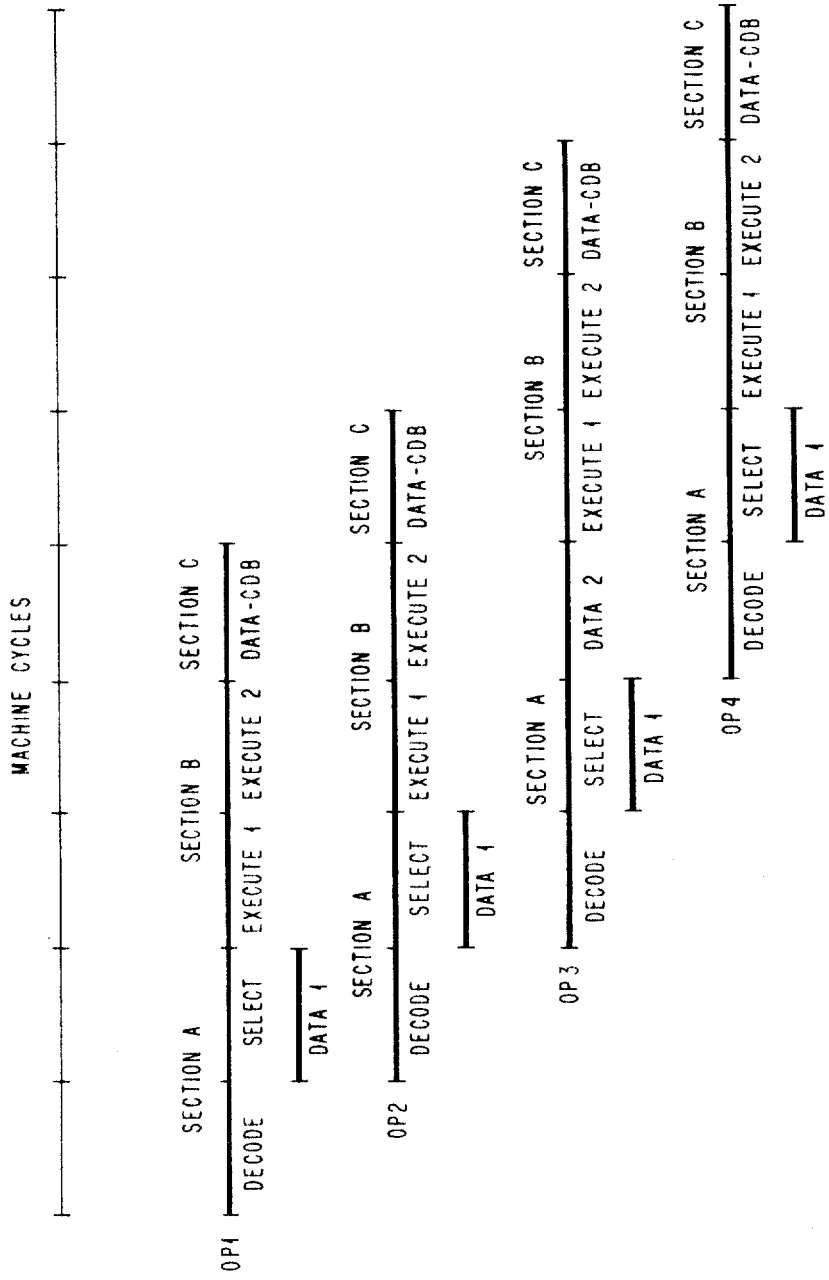
Figure 56:
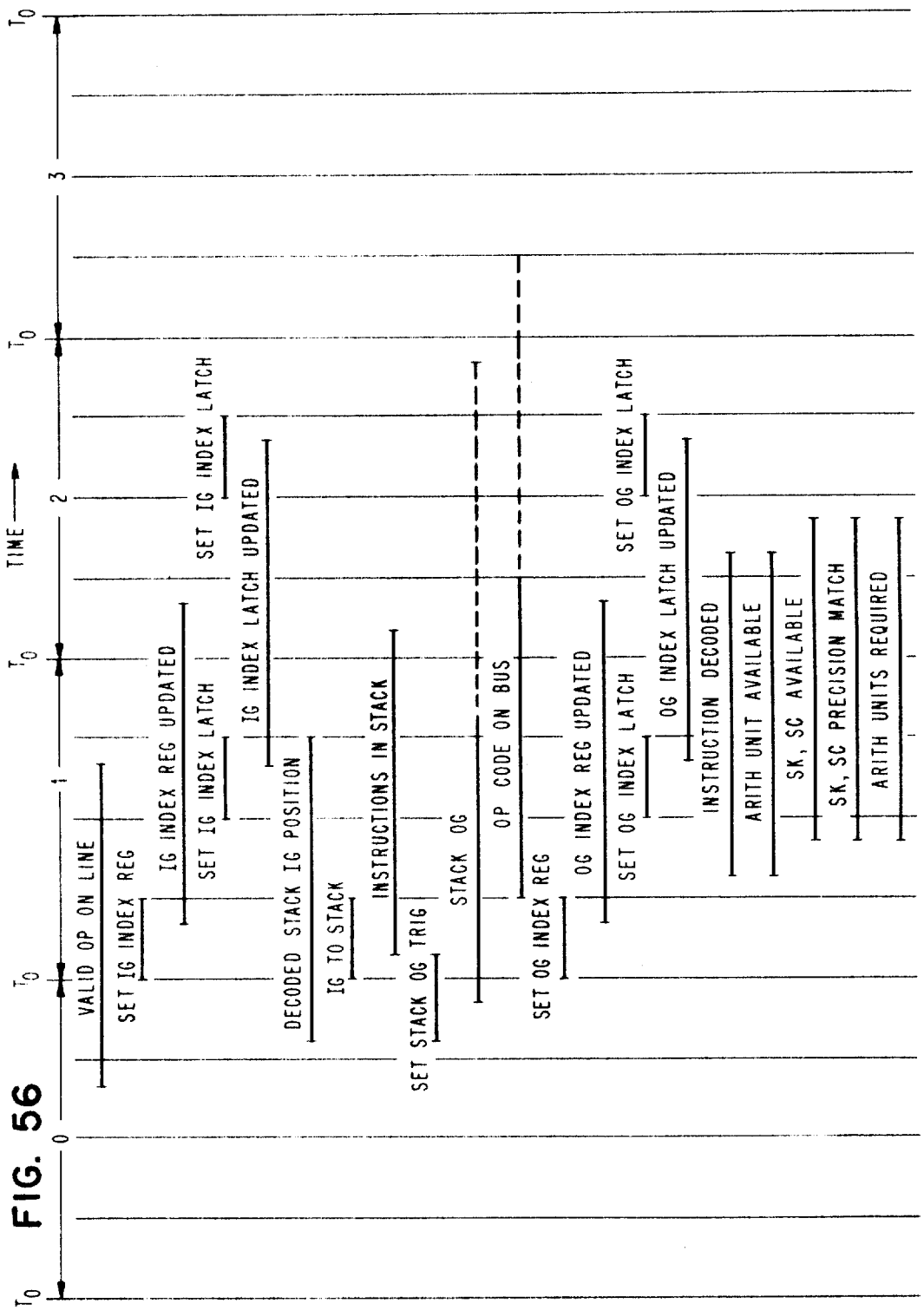
Figure 57:
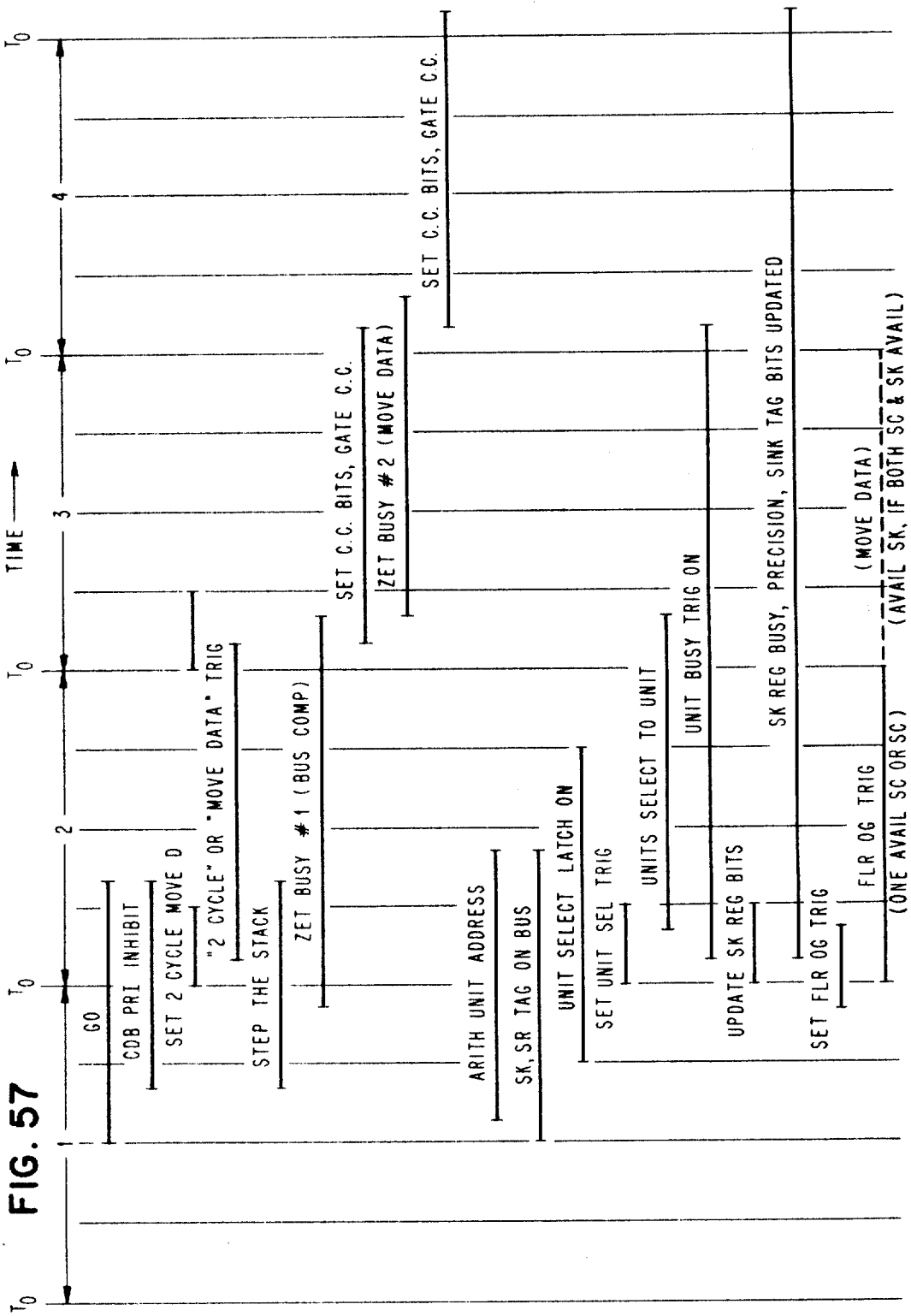
Figure 58:
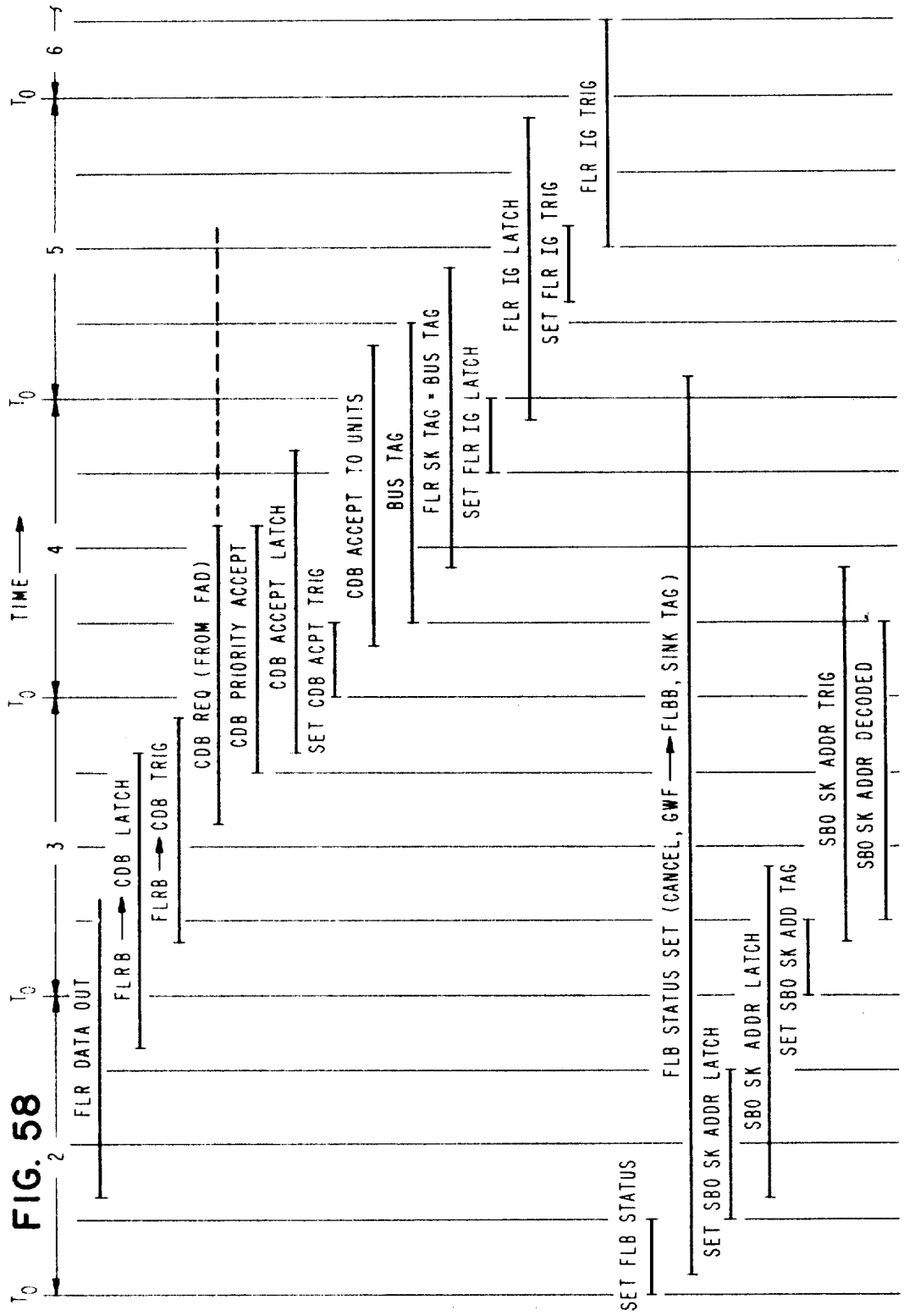
Figure 59:
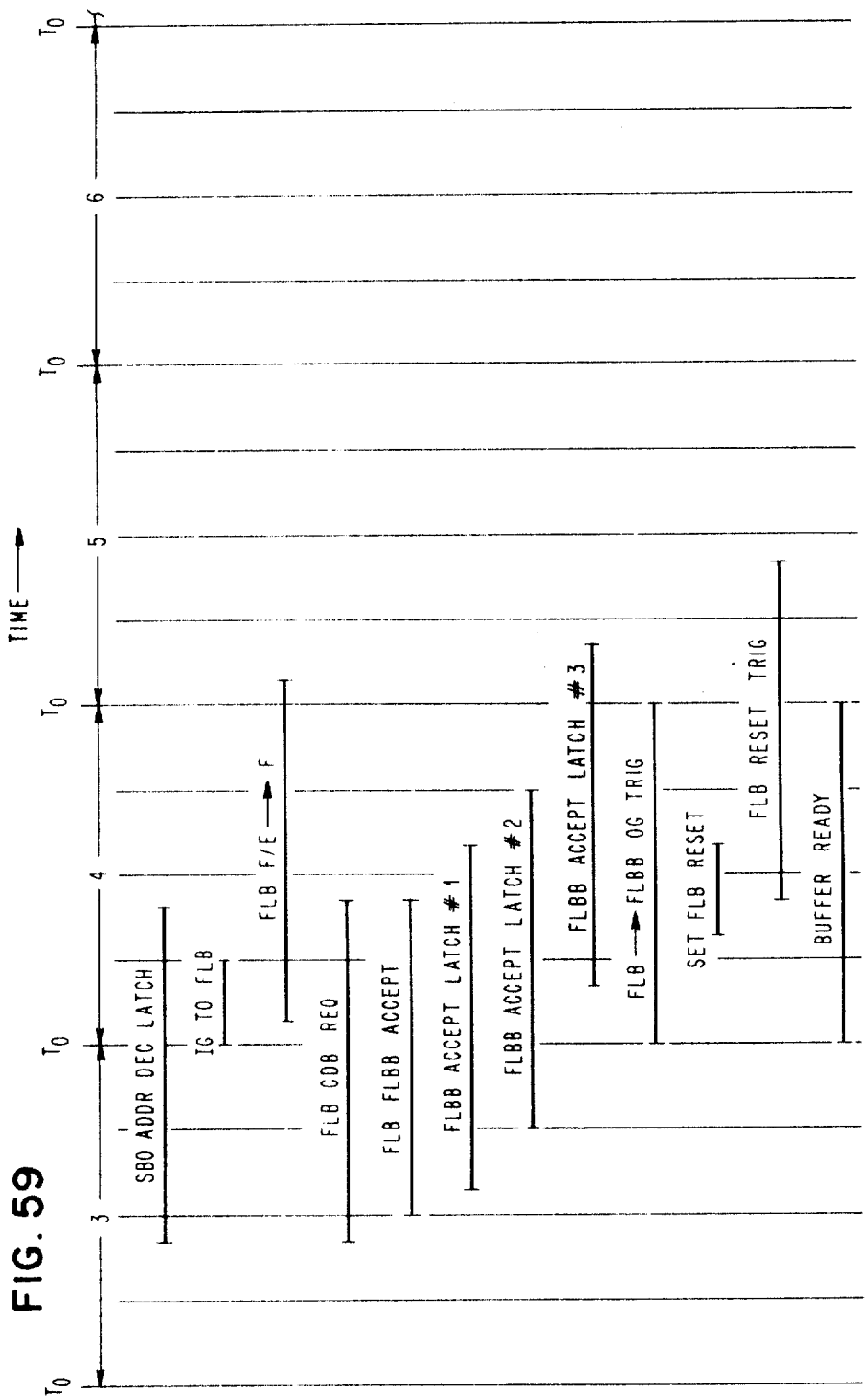
Figure 60:
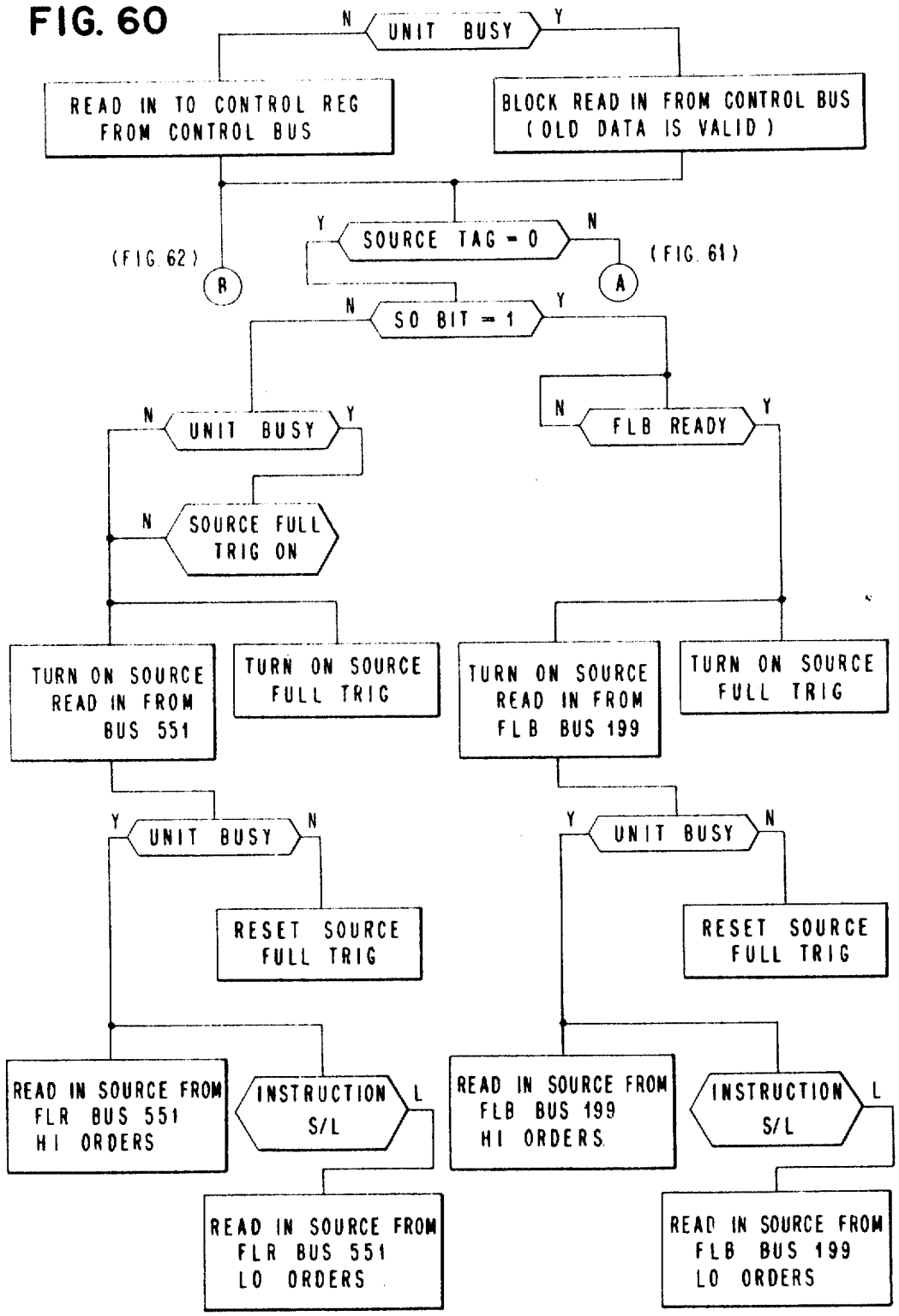
Figure 61:
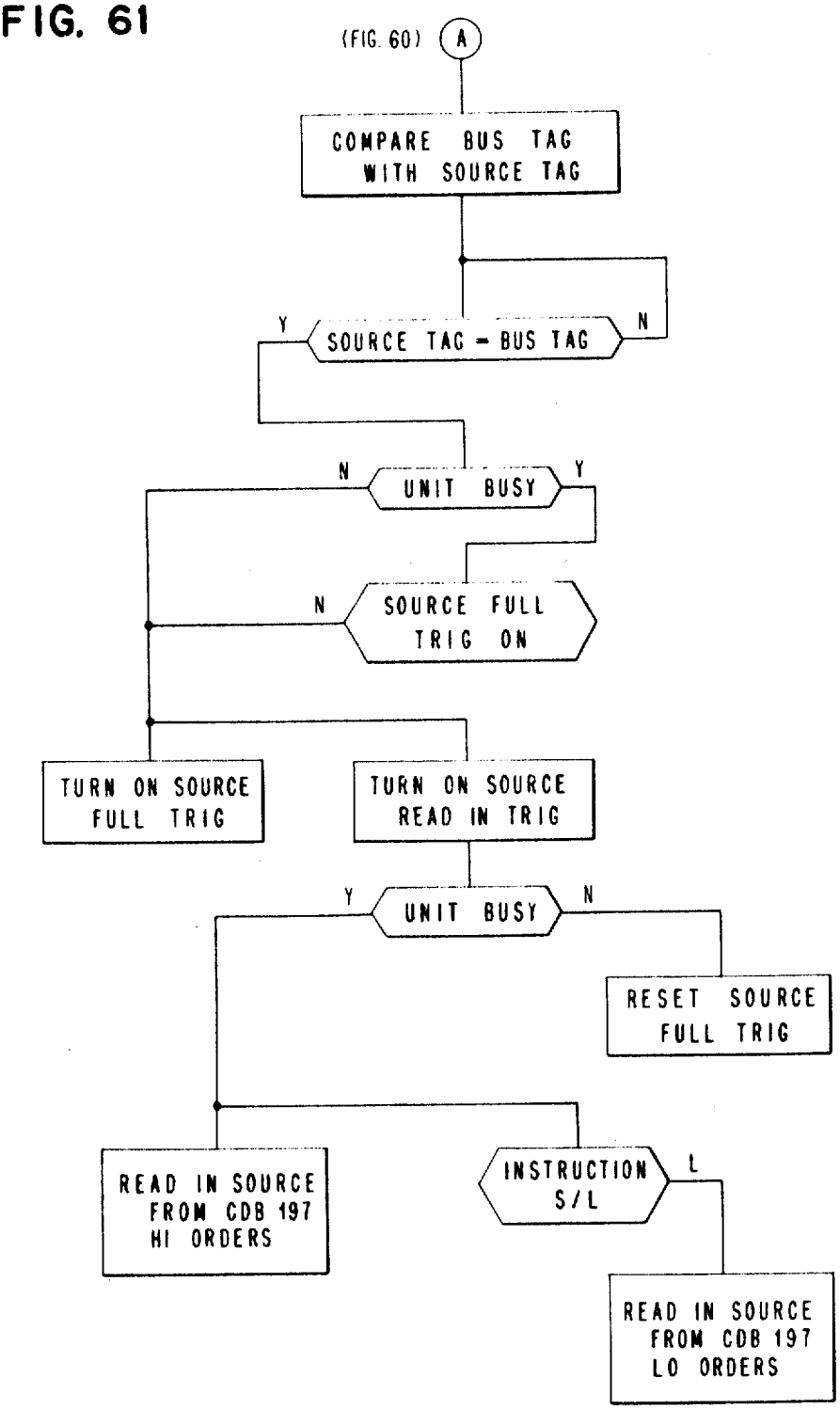
Figure 62:
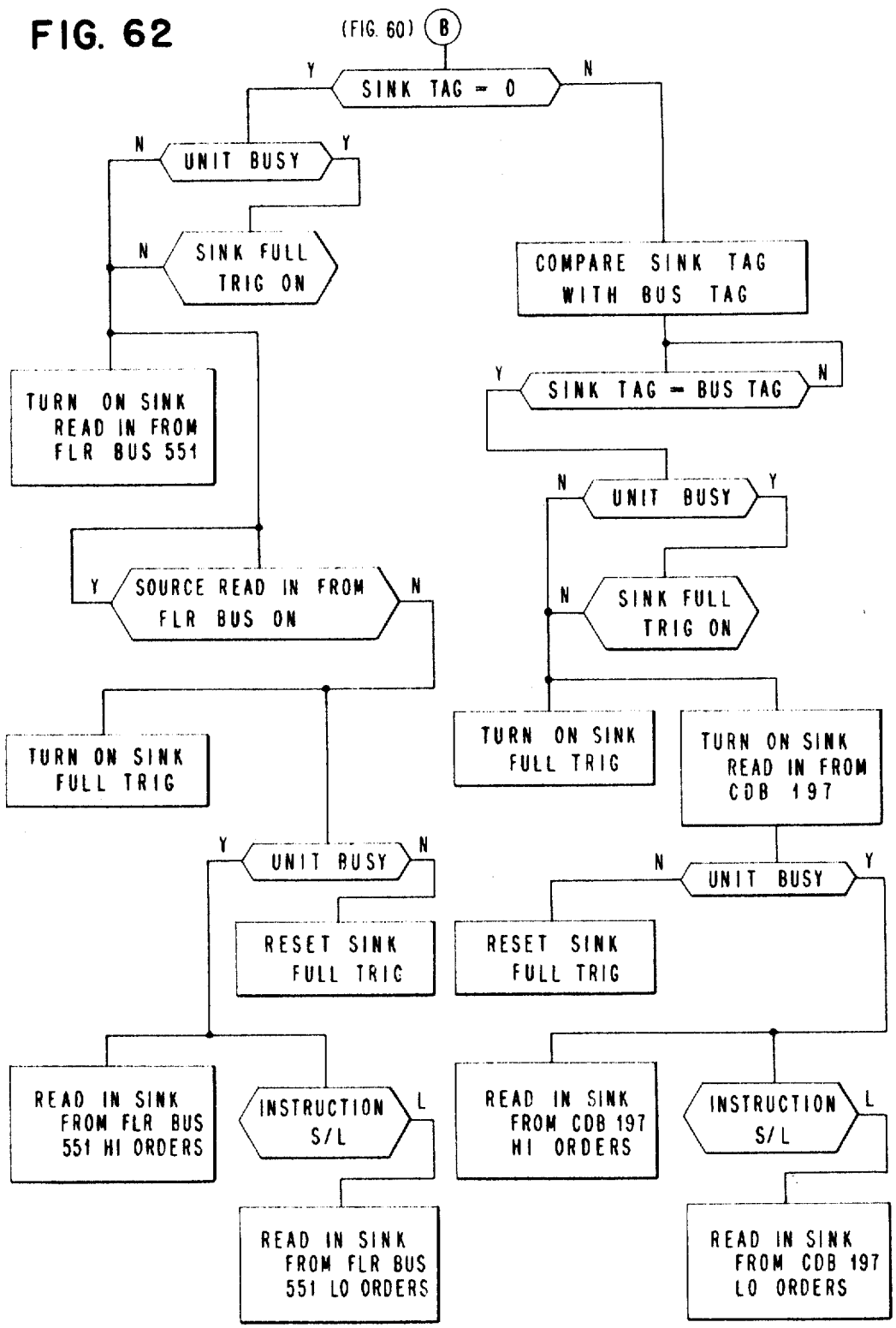
Figure 63:
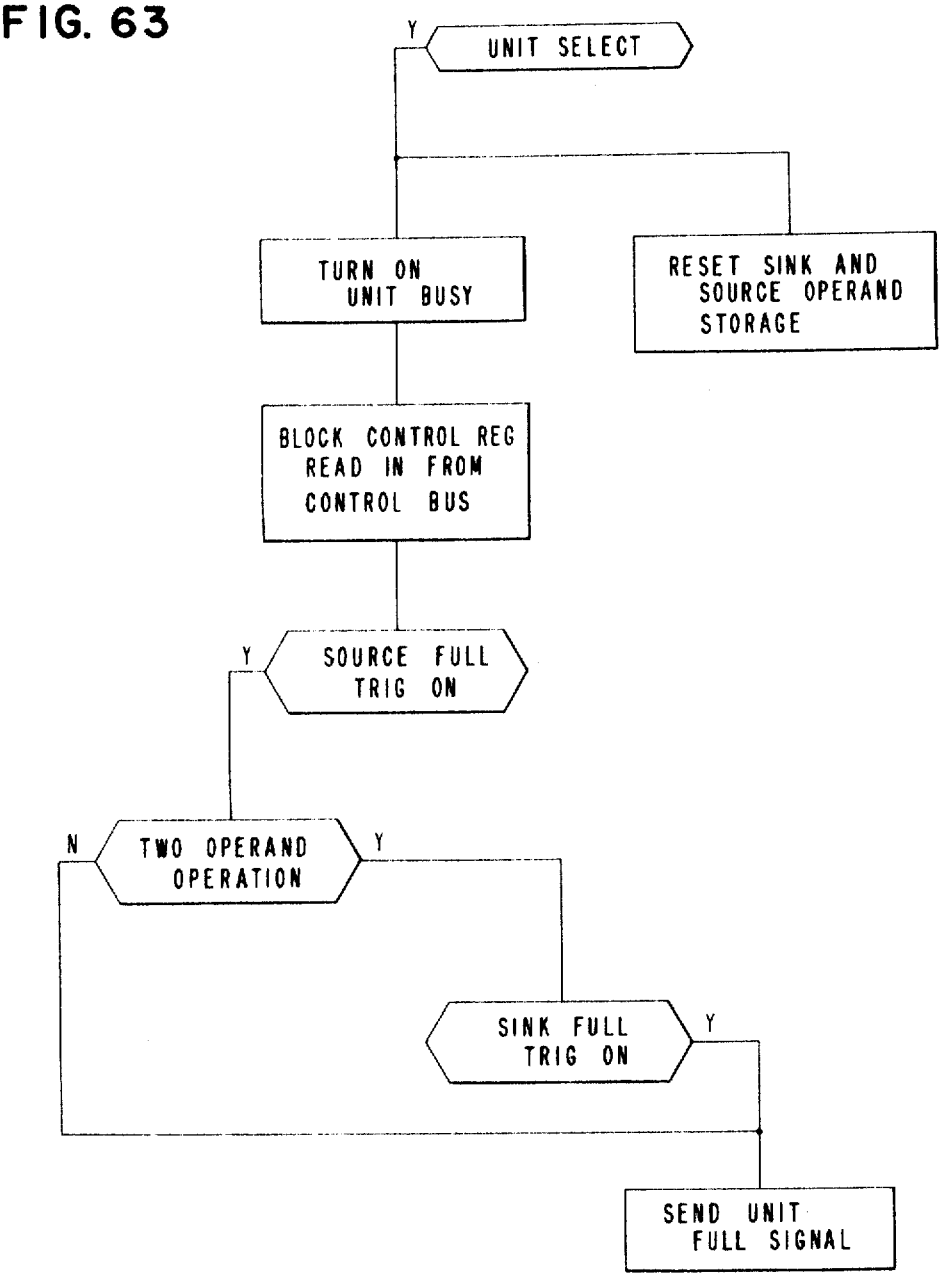

FIGURES 4A and B comprise a schematic showing of the basic parts and operand paths of the Instruction Unit of FIGURE 3;

FIGURE 5 is a schematic representation of the Floating Point Unit and its operand paths in the system of FIGURE 1;

FIGURES 6A and B comprise a schematic of the basic parts and operand paths of the Fixed Point-Variable Field Length Unit in the system of FIGURE 1;

FIGURE 7 is a schematic of the Main Storage Control Element showing its basic parts in the system of FIGURE 1;

FIGURE 8 is a schematic of the Peripheral Storage Control Element of FIGURE 3;

FIGURE 9 shows the internal sections of the Peripheral Storage Control Element of FIGURE 8;

FIGURE 10 is a diagram representing the timing sequence used by different hardware operations in the CPU of FIGURE 3 during execution of a typical instruction;

FIGURE 11 illustrates the concurrency of execution by the CPU of FIGURE 3 among successive instructions in a program;

FIGURE 12 illustrates a more detailed series parallel timing sequence for different hardware operations involved in different parts of the Central Processing Unit for handling a typical floating-point storage-to-register (RX) type instruction;

FIGURE 13 shows the general buffering arrangement for instructions and data between main storage and the instruction unit, fixed-point execution unit, and floating-point execution unit;

FIGURE 14 shows the effect of branching discontinuities on execution delays when instructions are decored faster than they are executed;

FIGURE 15 illustrates a basic arrangement for the subject invention;

FIGURES 16A, B, and C illustrate a comparative relationship between a Busy Bit Only System and a Tag System in regard to the use of a sink register for data storage during the execution of a particular instruction sequence on Common Data Bus Systems;

FIGURES 17A and B each show the same embodiment of the invention with a different emphasis in each drawing;

FIGURES 18A and B show a more detailed embodiment;

FIGURE 19 shows the increment and decrement counters for controlling the movement of instructions into FLOS and out of FLOS;

FIGURE 20 shows the control fields with each instruction position in the Floating-Point Operation Stack (FLOS);

FIGURE 21 shows the control fields with each operand position in the floating-point buffers (FLB);

FIGURE 22 illustrates the control fields and circuitry for each operand position in the Floating Point Register (FLR);

FIGURE 23 is a table illustrating the meaning of the settings of the busy bit (TB) with each FLR operand;

FIGURE 24 illustrates circuitry in the FLOS decoder for controlling the FLR tag assignments;

Figure 25B:
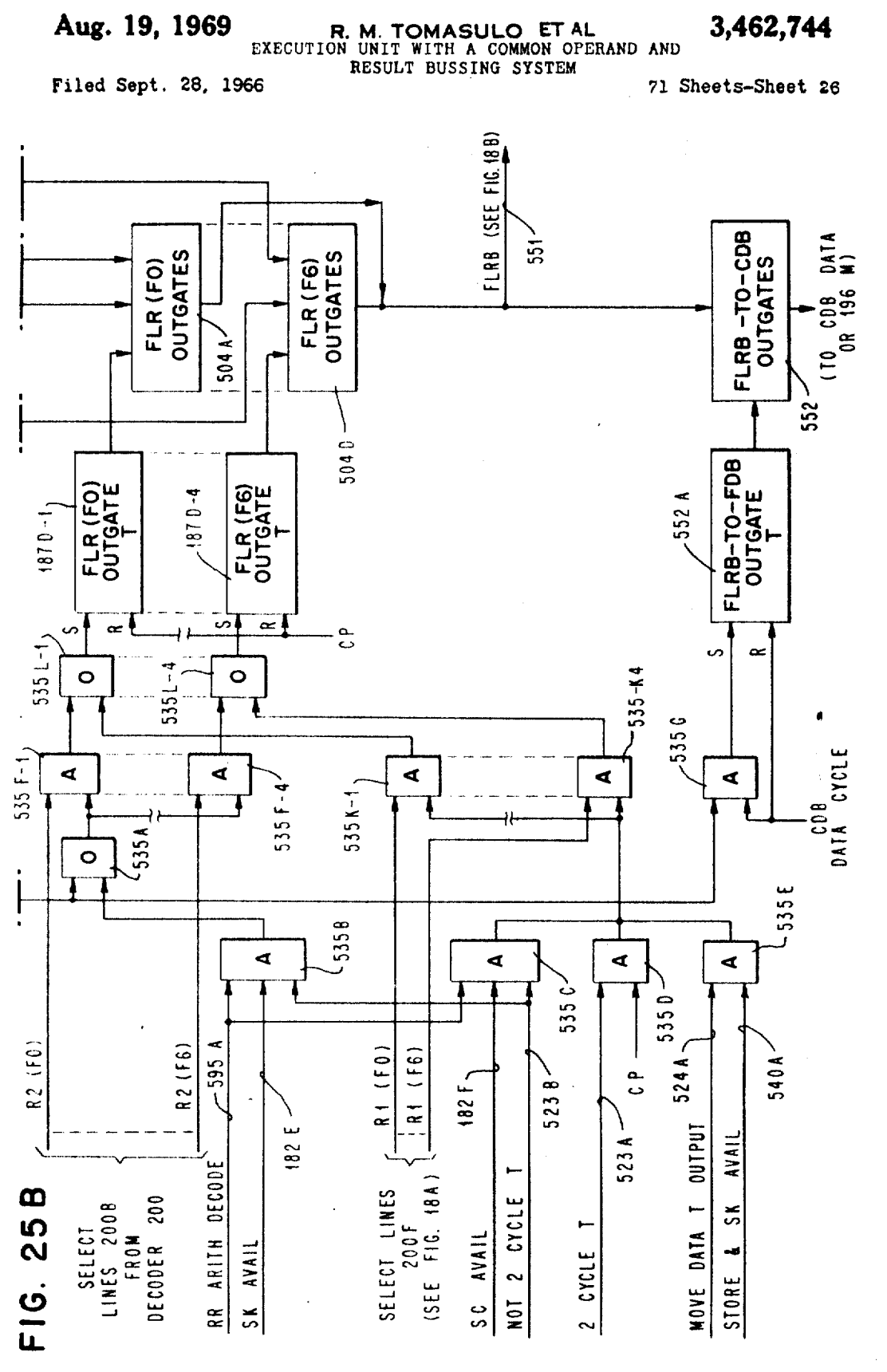

FIGURES 25A and 25B show ingating and outgating for the FLR'S;

FIGURE 26 illustrates the priority relationship among the input to the common data bus (CDB) and shows its output units;

FIGURE 27 represents the timing of signals on the CDB embodiment;

FIGURE 28 shows a more detailed relationship between the FLB control bit circuits and the CDB priority circuit;

FIGURE 29 shows the CDB embodiment in more detail;

FIGURE 30 illustrates a circuit arrangement connecting the CDB to the SDB's;

FIGURE 31 illustrates circuitry within a Reservation Unit (RU) for controlling its operation;

FIGURE 32 represents a timing relationship between a forced CDB cycle resulting from execution of an RR Store or RR LOAD instruction;

FIGURE 33 represents a timing relationship between an RX Load instruction execution and its subsequent CDB cycle;

FIGURE 34 shows a worst case asynchronous relationship between an instruction decode cycle and an asynchronous CDB cycle usable by the instruction being decoded;

FIGURE 35 is a drawing representing the tag assignment operation by the detailed embodiment during decode and select cycles;

FIGURES 36A, B, C, D, and E show various cases of tag control during the execution of the different types of instructions in the preferred embodiment;

FIGURE 37 shows the general data flow path during execution of an RX arithmetic instruction in the embodiment;

FIGURE 38 illustrates a general data flow during execution of an RR or RX arithmetic instruction in the detailed embodiment when data is not available during the instruction decode;

FIGURE 39 provides a general data flow diagram for store instructions in the detailed embodiment;

FIGURE 40 shows a general data flow diagram for the execution of RR arithmetic instructions when the operands are available at decode time in the detailed embodiment;

FIGURE 41 illustrates the general data flow for RR and RX LOAD instructions in the detailed embodiment;

FIGURE 42 shows the general data flow for control instructions in the detailed embodiment;

FIGURE 43 is a diagram representing the tag transfer relationship during the execution of a particular instruction sequence;

FIGURES 44A and B illustrate the operation of the FLOS decoder with respect to generating a GO signal for decoding the current instruction and stepping the FLOS stack to the next instruction;

FIGURE 45 relates to FIGURE 44A the operation of the FLOS decoder while executing an RX type instruction, or checking for sink operand availability, or precision match;

FIGURE 46 shows an operating diagram for outgating an instruction from the FLOS;

FIGURE 47 illustrates the operation of the FLOS decoder for the selection of reservation units and storage data buffers;

FIGURES 48A and B illustrate the operation of each floating-point buffer (FLB) and its bus (FLBB) controls;

FIGURE 49 shows the operation of the FLOS decoder for determining availability of the sink and source operands, precision match and bus tag generation;

FIGURE 50 illustrates the operation of the FLR outgate controls;

FIGURES 51A and B illustrate the operation of the FLR status and ingate controls;

FIGURES 52A and B represent the operation of the CDB priority and accept control circuits;

FIGURE 53 illustrates the operation of the Zero and Test (ZET) unit in relation to an instruction decode operation using that unit;

FIGURE 54 is a waveform timing chart illustrating timing interrelationships within the hardware found during the execution of certain instructions;

FIGURE 55 represents basic timing relationships between execution cycles in the detailed embodiment of the invention;

FIGURE 56 through FIGURE 59 represent timing relationships among the multiplicity of gating operations found in the detailed embodiment of the subject invention;

FIGURES 60 through 63 are flow diagrams representing the operation of each Reservation Unit.

IV. GENERAL DESCRIPTION OF INVENTION

This invention uses multiple execution units, common operand bussing, and a register tagging system which permits simultaneous execution of independent instructions while preserving the essential precedences inherent in the instruction stream. A common operand bus, called herein a Common Data Bus (CDB), improves performance by efficiently utilizing the execution units without requiring specially optimized code. The hardware automatically optimizes the program execution on a local basis in the execution system.

This invention can be used to improve the execution of an instruction sequence in any computer having multiple Execution Units and one or more "accumulators" (program addressable working registers).

There remains the need to improve performance of arithmetic operations, especially floating point, even after the Instruction Unit has been pipelined to operate at a rate approaching one instruction per cycle, and even after the storage access time has been satisfactorily reduced by state of the art techniques through the use of buffering and overlap. Two familiar problems may confront the designer in his attempt to balance execution with the issuing of instructions for execution. First, individual operations are not fast enough to allow simple serial execution in present high performance general purpose digital computers. Second, it is impossible to achieve the fastest execution times in a universal execution unit; in other words, circuitry designed to do both multiply and add will do neither as fast as two units each limited to one kind of instruction.

A first step toward surmounting these obstacles may be the division of the execution function into two independent parts, such as a Fixed-Point Execution Area and a Floating-Point Execution Area. While this relieves the physical constraint and makes concurrent execution possible between these two types of instructions, there is another consideration. In order to secure a performance increase, the program must contain an intimate mixture of fixed-point and floating-point instructions. Obviously, it is not always feasible for the programmer to arrange this, and indeed, many of the programs of greatest interest to the user consist almost wholly of floating-point instructions. An object of this invention, then, is to provide a method and means to achieve concurrent execution of a particular type of instructions, such as floating point. Multiple execution units, for example, may include an adder/subtracter and a multiplier/divider.

It might appear that achieving concurrent operation of these two units does not differ substantially from the attainment of fixed-floating overlap. In the latter case, each instruction class has its own set of accumulators; and this provides independence between separate classes of instruction sequences, such as fixed point and floating point. Within a single class, there is only one set of accumulators (general registers), which implies program-specified sequences may have dependent operations. It is no longer simply a matter of classifying each instruction as fixed-point or floating-point, a classification relating to independent sequences of instructions. Rather, each instruction may be dependent upon preceding instructions in the same sequence, which may not be completely executed. Hence it is another object of this invention to preserve essential relationships among dependent instructions within a sequence while allowing the greatest possible overlap in the execution of independent instructions in the sequence.

The objective is improved by an operand communication system called a Common Data Bus (CDB). It makes possible maximum concurrency with minimal effort (usually none) by the programmer or, more importantly, by a compiler program. At the same time the hardware required is logically relatively simple. The CDB can be used with any number of accumulators and and number of execution units. It provides a relatively simple hardware arrangement for the automatic, efficient utilization of multiple execution units.

This invention can use a physical framework of registers, data path and execution circuitry within an overall CPU structure such as that presented in the U.S. patent application filed on Sept. 21, 1966, having Ser. No. 580,910, entitled "Instruction Processing Unit for Program Branches" by inventors D. W. Anderson et al., and assigned to the same assignee as the subject invention.

A. Definitions and data paths

The invention is explained in the context herein as applying to computer machines that use two operands per machine-coded instruction, sink and source. However it will be evident to those skilled in the computer architecture arts that this invention is just as applicable to computer machines using other operand formats per machine-coded instruction, such as for example two sources and a sink.

While the reader is assumed to be familiar with present publicly available computer architecture and mnemonics, such as found in presently publicly used models of IBM S/360 Computers, the terminology as modified by the context of this patent application is reviewed here. The computer's Instruction Unit, as explained in patent application Ser. No. 580,910, prepares instructions for a Floating Point Opertation Stack (FLOS) and maps both storage-to-register and register-to-register instructions into a pseudo-register-to-register format. In this format, an instruction operand R1 is always the contents of one of four Floating-Point Registers (FLR's). It is usually the *sink* of the instruction i.e., it is the FLR whose contents are expected to receive the result of the instruction's operation. STORE operations are the sole exception wherein R1 specifies an FLR whose contents are expected to be the *source* of the operand to be placed in main storage. A word in the main storage is really the sink of a STORE, and it is initially received by a Storage Data Buffer (SDB).

In the pseudo-register-to-register format "seen" by the FLOS, the other operand R2 of the instruction can have three different meanings. (1) It can be an FLR as in normal register-to-register instruction. (2) If the program contains a storage-to-register instruction, the R2 field designates the Floating Point Buffer (FLB) assigned by the Instruction Unit to receive the storage operand. (3) Finally, R2 can designate a Store Data Buffer (SDB) assigned by the Instruction Unit to STORE instructions. In the first two cases, R2 represents the *source* operand in the last case it represents a sink operand. The instruction assigns each R2 operand coming from storage or going to storage to a particular Floating-Point Buffer or a Storage Data Buffer, so that the FLOS sees only pseudo-register-to-register operations.

The distinction between source and sink is quite important in relation to instruction sequence precedence in this invention, and it should be fixed firmly in mind. All of the instructions (except STORE and COMPARE) have the following execution format:

R1          OP          R2          R1 (result)
source                  source      sink Note that R1 may be both a source and a sink, because it may provide both an input (source) to the operation, and it may receive the output (sink) resulting from the operation. It will be apparent that this invention is equally as applicable to systems using three separate registers for each source and sink as in the preferred embodiments which require only two registers for the three entities. In the embodiments R1 will be called the sink and/or source, and R2 the source in all subsequent discussion herein.

This definition of the instruction execution format implies a set of data registers with transfer paths among them. These are shown in FIGURE 15. The major sets of registers are one or more working registers R's, a storage fetch buffer FLB, a storage store buffer S, a plurality of execution units U, each having at least one Reservation unit RU, and a Common Data Bus CDB connecting all of these units. Initially the RU registers may be considered to be the internal working registers of the execution circuits and put to multiple use in a way to be described below. Later, their function is generalized under the reservation unit concept and they are dissociated from the "working" function.

In designing a machine the data paths evolve at the design progresses. To illustrate the operation let us consider in turn, four kinds of instructions—loading a register from storage, storage-to-register arithmetic, register-to-register arithmetic, and storing a register into storage. For each let us first see how it can be accomplished in vacuo; then what difficulties arise when it is embedded in the context of a program. For simplicity double-precision (64 bit operands) are assumed.

FIGURE 12 shows a timing relationship between an Instruction Unit's handling of an instruction and its processing by the Execution Unit decoder. FIGURE 10 shows a less detailed representation of the same circumstances shown in FIGURE 12. FIGURE 11 shows a sequence of instruction executions being overlapped by operation of this invention. When it decodes a LOAD instruction, an FLB (which is assigned to receive the operand) has not yet been loaded with the operand from storage. Rather than holding up the decode of the LOAD instruction until the operand arrives, the FLOS sets a control bit associated with the assigned FLB, which causes its content to be transmitted when it "goes full" to the Register R1 designated by a tag register setting as the sink operand in the LOAD instruction. A FULL/EMPTY control bit indicates this. The bit is set FULL by the Main Storage Control Element and EMPTY when the buffer is used.

If the instruction is a storage-to-register arithmetic type, the storage operand is handled as in the described LOAD (control bits cause it to be forwarded to the proper Reservation unit). Also the R1 contents of the Floating-Point Register (FLR) is sent by the FLOS decoder to the same Reservation Unit. After receiving both operands; the execution unit executes the operation and sends the result to register R1 (the same FLR).

In register-to-register arithmetic instructions two Floating Point Registers (FLR's) are transmitted on successive cycles to the appropriate execution RU.

Store instructions are handled like storage-to-register arithmetic functions, except that the working register (FLR) is sent to a Store Data Buffer (SDB) rather than to an execution unit. Now consider the following sequence of instructions.

| OP Code | Sink | Source | Explanation |
| --- | --- | --- | --- |
| LD | F0 | FLB1 | LOAD register F0 from buffer 1 |
| MD | F0 | FLB2 | MULTIPLY register F0 by buffer 2 |

The LOAD (LD) can be handled as before, but what about the MULTIPLY (MD)? Certainly we cannot send the operands in F0 to the multiplier as in the case of the isolated MULTIPLY, since FLB1 has not yet been set into F0. (The speed of the decoder's moving from the LD to the MD instruction is much faster than the speed at which operands for FLB1 and FLB2 can be fetched from main storage.) This sequence illustrates the cardinal "precedence principle": No Floating-Point Register (FLR) operand may participate in an operation if it is the sink of another incompleted instruction. That is, the content of a register (which is supposed to have an operand) cannot be used until its content reflects that operand which is the result of the most recent operation to use that register as its sink. In other words, if the sink operand of an instruction is dependent upon the execution of a prior instruction, a precedence relationship exists between these two instructions. Three functions must be required of any mechanism designated to cope with precedence and independence.

(1) It must recognize the existence of a dependency on a prior instruction.

(2) It must cause the correct sequencing of the dependent instructions.

(3) It must distinguish between the given dependent sequence and any subsequent independent sequence, which must be allowed to proceed.

The following two instructions are independent because they use different sink registers F0 and F2.

LD F0, FLB1
    MD F2, FLB2

Here the subsequent independent MD must be allowed to proceed without interference from the execution of the LD. The first two requirements are necessary to preserve the logical integrity of the program; the third is necessary to meet the speed performance goal of this invention.

Next, several alternatives are presented for accomplishing these objectives within the subject invention.

B. Preservation of precedence

Perhaps the simplest scheme for preserving precedence is as follows. A busy bit is associated with each working register (FLR). This bit is set when the Execution-Unit decoder issues an instruction designating the register as a sink; it is reset when the executing unit returns the execution result to that sink register. No following instruction using the same sink register can be decoded by FLOS as long as the busy bit of that sink register is on. If the source register for a register-to-register instruction has its busy bit on, the decoder sets control bits associated with the source register. When a result is entered into the sink register, these control bits cause the register contents, when available, to be sent to the execution unit waiting for it as a source operand.

This scheme easily meets the first two requirements, but unfortunately the third requirement requires the help of the programmer; he must use different registers to achieve overlap. For example, the expression $A+B+C+D\times E$ can be programmed as follows:

| OP | SK | SC | Explanation |
| --- | --- | --- | --- |
| LD | F0 | D | F0=D |
| LD | F2 | C | F2=C |
| LD | F4 | B | F4=B |
| MD | F0 | E | F0=D×E |
| AD | F2 | F0 | F2=C+D×E |
| AD | F4 | A | F4=A+B |
| AD | F2 | F4 | F2=A+B+C+D×E |

The busy bit scheme should allow the second ADD and the MULTIPLY to be executed simultaneously (really, in any order) since they use different sink registers. Unfortunately, the expected overlap does not occur, and many cycles are lost to operand access time. The overlap fails to materialize because the first ADD (AD), which uses the result of the MULTIPLY (MD), ties up the adder. Cycles are lost because so many of the instructions use the adder. In this case an instruction cannot be decoded unless a unit is available to execute it.

One solution that leaps to mind is the addition of one or more adders. If this were done and some programs timed, it would become apparent that the execution circuitry is in use only a small part of the time. Most of its time would be spent waiting for operands.

What is required is a device to collect operands (and control information) and then engage the execution circuitry when all conditions are satisfied. But this is precisely the function of the sink and source registers in FIGURE 15 which comprise any RU. Therefore, the better solution is to associate more than one set of registers (control, sink, source) with each execution unit (U). Each such set is called a *Reservation Unit* (RU). Note that RU's need not be associated with any specific execution unit, in which case additional selection circuitry is needed to associate a selected RU with a selected execution unit. Now instruction decoding depends on the availability of the appropriate kind of reservation unit. In an embodiment, there are three add and two multiply/divide reservation units. Note that logically all 5 RU's could have shared the adder and multiplier, rather than rigidly associating three with one execution unit and two with the other. For simplicity, they are treated as if they were actual execution units, because they appear to the instruction decoding system as execution units. Thus, the reference to the reservation units is Adder 1 (A1), Adder (A2), etc., and M&D1 and M/D2.

The effect of the addition of Reservation Units on the problem running time is that several machine cycles have been eliminated. The second AD execution now overlaps the MD execution and actually executes before the first AD; because the first AD cannot start until completion of the MD, but the second AD can start after completion of the third LD provided that operand A is available. While the speed increase is gratifying and the busy bit method easy to implement, there remains a dependence on the programmer. Note that the expression could have been coded this way:

LD  F0,  E
    MD  F0,  D
    AD  F0,  C
    AD  F0,  B
    AD  F0,  A

Now overlap is impossible and the program will run six cycles longer in spite of it having two less instructions. Suppose however, that this program is part of a loop, as below:

```
LOOP 1:
    LD   F0   Ei
    MD   F0   Di
    AD   F0   Ci
    AD   F0   Bi
    AD   F0   Ai
    STD  F0   Fi
    BXHi -1   0         LOOP 1 (decrease by 1 branch if i
                               equals 0)
LOOP 2:
    LD   F0   Ei
    LD   F1   Ei+1
    MD   F0   Di
    MD   F2   Di+1
    AD   F0   Ci
    AD   F2   Ci+1
    AD   F0   Bi
    AD   F2   Bi+1
    AD   F0   Ai
    AD   F2   Ai+1
    STD  F0   Fi
    STD  F2   Fi+1
    BXHi -2   0         LOOP 2
```

Iteration $n+1$ of LOOP 1 appears to the decoder to depend on iteration $n$, since the instructions in both iterations have the same sink register. This example illustrates a *second way* in which two instruction sequences can be independent. *The first way, of course, is for the two strings to have different sink registers. The second way is for the second string to begin with a LOAD.* By its definition a LOAD launches a new, independent string because it instructs the computer to destroy the previous contents of the specified register.

Unfortunately, the busy bit scheme does not recognize the second way, because it does not permit a subsequent LD to use a sink register until its use by a prior instruction is completed. If overlap is to be achieved with this scheme, the programmer must instead write LOOP 2. (This technique is called doubling or unravelling. It requires twice as much storage but it runs faster by enabling two iterations to be executed simultaneously.) However, such dependence on the programmer is not desirable.

C. Common Data Bus

The preceding portion was intended to portray the difficulties of achieving concurrency among the execution of sequential instructions and to show some of the steps in the evolution of a design to overcome them. It is clear, in retrospect, that previous approaches failed for lack of a way of uniquely identifying each instruction and subsequently utilizing this identity to sequence execution and to set results into the sink registers (FLR's). This invention provides a data path and associated controls, termed the Common Data Bus (CDB), by which the above difficulties are overcome.

FIGURE 15 shows the data paths required for operation of the CDB. A feature of the CDB is that it is routed to all registers which can have an R or FLR as a sink or source operand. These are comprised of the working registers (FLR's), the sink and source registers of all reservation units (RU's), and the Store Data Buffers (SDB's). By this structure, the CDB makes the result of any instruction execution available to all registers and execution units without requiring the path to go through an FLR. Also the CDB provides a direct path from the Storage Buffers L or FLB to the R's or FLR's, thereby enabling LOAD instructions to be executed without using and arithmetic unit U.

The CDB receives inputs from all registers and units that can alter an FLR. The CDB inputs are the FLB, FLR, and arithmetic units U, represented by RU's. The FLB's and FLR's can be considered one operand RU's which only input to the CDB without going through any arithmetic units.

The CDB control is based on a tagging scheme which provides, through such tags, for both direct and indirect routing of data operands and results between the FLR's and the execution units U.

In the embodiment of FIGURES 17A and B, each FLR, FLB, and RU input to the CDB is assigned a uniquely coded identity, while every CDB output sink is provided with a tag register capable of holding such coded identity.

The available status of each FLR is performed by use of a specially coded tag.

The basic operation of FIGURES 17A and B is as follows. In decoding each instruction, the decoder 595 checks the busy status of each specified FLR. If the register is not busy, its contents are valid and may be sent to the appropriate unit via the CDB. The decoder 595 issues each sequential instruction only if the unit RU required by the instruction is available to execute it. The decoder 595 changes the availability status of the specified *sink* FLR to a coded-bit tag representing the selected RU. All source FLR control tags remain unchanged. The coded-bit tag provides the sink FLR with the designation of the Execution Unit which will provide its execution result on the CDB.

The CDB system permits any CDB input unit having an operand ready (or almost ready) to broadcast its name on the CDB. A broadcast name is called a "Bus Tag." All CDB output units waiting for an operand from the Bus Tag unit have a stored tag identical to the name of the broadcasting unit. A comparator in each unit can recognize the identity by a compare-equal between its stored tag and the broadcast Bus Tag. The operand (data) is broadcast on the CDB immediately following each Bus Tag Broadcast, but the operand is only received by those CDB output units having a compare-equal indication from the immediately preceding Bus Tag. Since the CDB inputs are asynchronous in regard to when they are ready to provide a Bus Tag, a CDB priority circuit controls which CDB input unit will next provide its Bus Tag on the CDB, when CDB input units make substantially simultaneous requests.

As an example take the instruction AD FLR-0, FLB1. After issuing this instruction to an Execution Unit U1, the control tag bits of FLR-0 may be TAG=U1.

This control tag indicates to FLR-0 that its contents are no longer valid, and further that when U1 completes execution its result is to be gated into FLR-0 after the CDB broadcast cycle of U1's address.

It is significant that decoder 595 finds this FLR unavailable at decode time for a following instruction. In this case there is no suspension of decoding even though this FLR is unavailable. As was previously done, decoder 595 updates the tag with this FLR to represent the newly assigned RU for this following instruction. However, in this situation it does not transmit the operand contents of the FLR to the selected RU, but it instead transmits the old tag in the selected FLR to the sink tag in the selected RU. For example, suppose the previous AD was followed by a second AD instruction which is assigned execution unit U2. At the end of the decode of the second AD, the FLR-0 tag=U2 and the U2 tag=U1.

By this control environment, FLR-0 no longer will accept the result of U1 but rather will in-gate data only following the CDB broadcast of identity U2. Furthermore, U2 will not begin execution until it has ingated data to its RU sink register susbequent to the CDB broadcast of identity U1.

Some time after the start of execution but before the end, unit U1 requests a time-slot on the CDB for transmission of its expected result. Since the CDB is fed by many sources, it is time-shared among these input sources under the control of a CDB priority circuit. If the CDB is free, the priority control circuit accepts the requesting adder, U1, by signalling U1 to broadcast its identity (bits representing U1) as the "Bus Tag" on the CDB to all CDB receiving units. Each busy receiving unit (selected but awaiting a register operand) compares its sink and source tags to the CDB bus tag. If they match, the data from U1 then transmitted on the CDB is ingated by that receiving unit. Upon the ingating of data from the CDB, the specially coded tag (representing availability) is set as the tag of each ingating receiving unit.

Two things toward the goal of preserving precedence have been illustrated by the foregoing example. First, the second AD cannot complete execution until the first AD finishes execution, because one of the operands for the second AD is not in existence until the result of the first AD appears on the CDB.

Secondly, the result of the first AD cannot change register FLR-0 once the decode of the second AD updates the tag of FLR-0, since the tag now in FLR-0 will not match U1. These are precisely the desired effects. Before proceeding with more detailed considerations let us recapitulate the essence of the disclosd System. The FLR tag identifies the last U whose result is destined for the FLR. Thus when an RU selecting instruction is decoded that requires an unavailable FLR, the old tag is sent to the selected RU in place of the FLR contents. The RU continually compares this tag with each bus tag broadcast on the CDB. When a match is detected, the RU ingates from the CDB. The U begins executing after its RU has received both operands. A source FLR tag is not updated; and it is only set when it was the sink FLR of a previous instruction. By passing tags around in this fashion, all instructions using the same sink FLR are correctly sequenced, while other instructions in the same sequence are allowed to execute independently. Finally, the FLR tag controls the changing of the register itself, thereby ensuring that only the most recent instruction being executed can change a FLR sink register.

A variation of the tag handling technique is used to correctly sequence register-to-storage (RX) instructions. During such a STORE instruction, the sink FLR tag is not updated while the selected source SDB has its tag updated to the existing tag of the sink FLR. The SDB will thereby ingate its data off the CDB at the proper time. (The conventional sink and source terminology is used here, although their actual relationship is reversed wherein the FLR is the source and the SDB the sink for the data flow).

The CDB structure described has the interesting consequence that a loop of the following kind

```
LOOP    LD      F0, Ai      LOAD
        AD      F0, Bi      ADD
        STD     F0, Ci      STORE
        BXH     i,-1,0,LOOP BRANCH TO LOOP
``` may execute indefinitely without any change in the contents of FLR-0. This action would occur when the LOAD of a subsequent iteration of the loop occurs prior to the completion of the ADD of the previous iteration. In such a case the tag of FLR-0 would be updated to the identity of the load buffer assigned the LOAD instruction and thereby the ADD result would not get set into FLR-0. Note, however that some SDB would be waiting to capture the ADD result and forward it to storage as specified by the program. It is seen that the CDB permits only tag swapping for FLR-0 without any data being normally entered in FLR-0 with the only data transfer for each loop being from the add unit to an SDB on the CDB under tag control.

As mentioned previously, there are two ways of starting an independent instruction sequence. The first is to have an instruction with a different sink FLR, and the second is LOAD instruction. The CDB handles the former in essentially the same way as the busy bit scheme. The LOAD, which had been a difficult problem previously, is now very simple. Regardless of the FLR tag a LOAD sets the tag to represent the FLB assigned by the Instruction Unit to participate in the execution of the LOAD instruction. This causes subsequent instructions to look to the assigned FLB rather than to the FLR for their operand. Meanwhile, previously issued instructions will execute properly by virtue of utilizing the old tag which existed prior to the execution of the LOAD instruction. The FLB controls are set to request the CDB when the storage operand arrives. The following example and FIGURES 16A, B, and C show this clearly:

```
LD      F0, FLB1    LOAD
DD      F0, FLB2    DIVIDE
STD     F0, A       STORE
LD      F0, FLB3    LOAD
AD      F0, FLB4    ADD
```

Figure 16B:
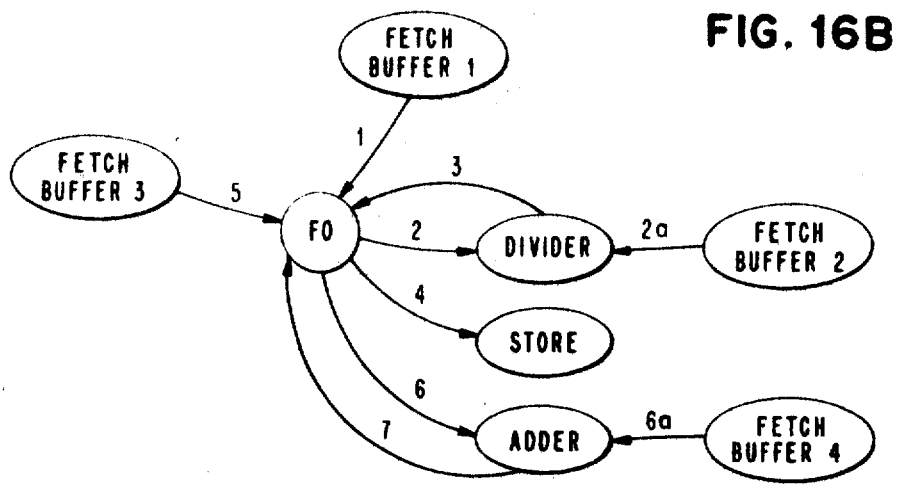
Figure 16C:
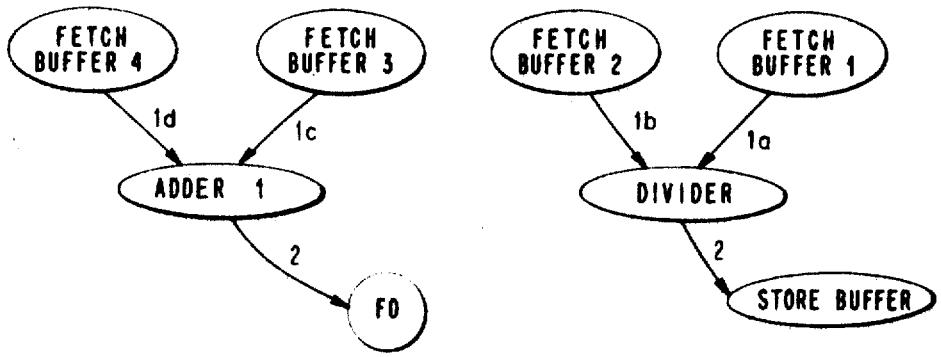

Note that the add execution finishes before the divide. The dashed line box 587 in FIGURE 16A shows the longer time sequence for an FLR called F0 under the busy bit only system, wherein the tag system shows the add execution finishes before the divide execution. Hence, the overall execution is faster under the Tag system than the Busy Bit only System. FIGURE 16B graphically illustrates the bottleneck caused by using a single sink register F0 with only the busy bit system. Because all data must pass through this register F0, the program is reduced to strictly sequential execution, steps 1 through 7 except for some Fetch concurrency. On the other hand, FIGURE 16C graphically illustrates the Tag System, in which sink register F0 hardly appears in the data transfer operations, and the program is broken into two independent, concurrent sequences. This facility of the Tag System obviates the need for the loop doubling given in an earlier instruction-sequence example.

The CDB used with the Tag System provides a relatively simple hardware design, and it makes it possible to execute some instructions with no increases in time at all, due to overlap. In the above example the second LOAD and ADD took place concurrently with the DIVIDE, and took no extra time.

In a similar fashion a register-to-register LOAD between a busy registers is accomplished by moving the tag of the source Register to the tag of the sink register. For example, in the sequence

```
AD                      F0,FLB1
LDR                     F2,F0   move F0 to F2
``` the tag of F0 will be 1010 (A1) at the time LDR is decoded. The decoder simply sets F2's tag to 1010. Now, when the result from A1 of the AD appears on the CDB both F0 and F2 will simultaneously ingate, since the CDB bus tag of 1010 will match the tag of each register. Thus, no unit or extra time is required for the execution of the LDR instruction.

FIGURES 36A, B, D, and E illustrate this principle of operation for tag transfer in the embodiment. The meaning of the TB (Busy Bit) is shown in FIGURE 23.

A number of details have been omitted from this discussion in order to clarify the fundamental operation of this invention but only two are of major operational significance. First, every unit should request the CDB before it finishes execution, such as two cycles prior to the result being generated. This limits the execution time of any instruction to a two cycle minimum, excluding concurrency of executon among sequential instructions. It also adds one cycle to the access time for isolated LOAD instructions, since storage gives one cycle prenotification of the arrival of data. Nevertheless, these limitations do not cause an increase in system running time for executing a normal program.

The second problem has to do with mixed precision floating-point instruction sequences, when an architectural definition causes the low-order part (such as the lower half) of an FLR to be preserved during single precision operations in the high-order part of the FLR. In such case, an error can occur in the following kind of program:

| | | | |
|---|---|---|---|
| LD | F0 | FLB1 | Load-double precision. |
| AD | F0 | FLB2 | Add-double precision. |
| AE | F0 | FLB3 | Add-single precision. |

By the described CDB action, only the last instruction, which is single precision, will change F0, and the low order result of the double precision AD will be lost. This is handled by associating a control bit called S/L (Short precision/Long precision) with each register to indcate whether a particular register is the sink of an outstanding single or double precision instruction. If this bit does not match the "length" of the instruction being decoded, the decode is suspended until the busy bit goes off. A further complication arises from the fact that a single precision multiply produces a double-precision product. While this stratagem solves the problem, it does so at the expense of performance. This problem may be avoided by designing the system for double-precision only, since double precision can operate as fast as single-precision floating-point when this invention is used.

However, even with mixed precision, it is important to note that all single or all double precision programs run at the maximum possible speed. It is only the interface instruction between single and double precision instruction sequences to the *same* sink register that suffers any delay.

A "Pure CDB Execution System" has been described with respect to FIGURE 15. A "Diluted CDB Execution System" will later be described in detail with respect to FIGURES 17A, 17B, or 18A and B.

Two inventive concepts of significance to the design of high performance computers have been presented in this section. The first, a system of reservation units, is simply an expeditious method of prearranging buffering, when required, in an environment where the transmission time between units is of consequence. Because of the disparity between storage access and circuit speeds and because of dependencies between successive operations, it is observed (given multiple execution units) that each unit spends much of its time waiting for operands. In effect, the reservation stations do the waiting for operands while the execution circuitry is free to be engaged by whichever reservation station fills first.

The second innovation, the CDB, utilizes the reservation units and a special tagging scheme to preserve precedence to obtain concurreny. In conjunction with the various kinds of buffering in the CPU, the CDB helps to render the computer system substantially insensitive to programming variations of instruction sequences.

The following program, a typical partial differential equation inner loop, illustrates the possible performance increase.

```
LOOP:  MD  _____ F0, Ai.
       AD  _____ F0, Bi.
       LD  _____ F2, Ci.
       SDR _____ F2, F0.
       MDR _____ F2, F6.
       AD2 _____ F2, Ci.
       STD _____ F2, Ci.
       BXH _____ i, −1, 0, LOOP
```

Without the CDB one iteration of the loop would use 17 machine cycles, allowing 4 per MD, 3 per AD and none for LD or STD. With the CDB one iteration requires 11 cycles. For this kind of code the CDB improves performance by about one third.

V. GENERAL DESCRIPTION OF A COMPUTER SYSTEM EMBODYING THE INVENTION

The preferred embodiment of the invention described herein forms a part of a large size data processing system capable of extremely rapid operation, and operation of many sections in parallel whereby large amounts of data may be processed in a reasonable length of time. Data processors of this nature are of great value in real time circumstances where certain computations must be performed in a short time if the data to be produced is to be of value, or where forecasts are to be made of conditions at points of a three or more dimensional lattice. An example of the first type is in the computer forecasting of weather data where updated weather must be predicted for each of a plurality of stations and that updated weather is then used as the basis for another updating, etc. Obviously, if it takes longer to update the weather forecast for all the stations involved than the real time interval for which the updating is computed, there is no real time gain and the repetitions of computer forecast updating cannot generate forecasts ahead of the actual weather. For useful weather forecasting, a very large amount of data must be processed in a comparatively short time interval.

Another type of problem for which large high speed processors are required is the determination of successive states at coordinate intersections of a three dimensional configuration such as a nuclear pile where accuracy of successive state conditions can be increased by using a finer coordinate system. However, the amount of data to be processed will increase far faster than the increase in the number of intersections on any one of the coordinates. Here again, high speed processing is needed if the data is to be processed in a reasonable time.

Although it is to be understood that the exact configuration of a data processing system will depend upon the form in which data is to be initially supplied to the system and the data outputs desired, a representative configuration of a large system is shown in FIG. 1. Here the Central Processing Unit (CPU) 100, a Storage Channel (SC) 101, and a Maintenance and Operators Console 102, are combined in a main frame which will be uniform for all system configurations. A Main Storage (MS) 104, typically 256 thousand double (64 bits and 8 parity bits) words, will be connected to the CPU 100 to hold the programs and data required by the CPU, and this Main Store 104 may be supplemented by an Extended Main Storage (EMS) 105 of the same or double capacity, i.e. 256+ thousand or 512+ thousand double words. Due to restrictions on physical size and location, lengths of wire connections, control sizes and the like, data cannot be transferred between the CPU 100 and EMS 105 as rapidly as it can be passed between CPU 100 and MS 104, so that it is preferable to maintain most of the immediately needed material in MS 104 and to make only occasional data transfers from CPU 100 to EMS 105. The Storage Channel 101 which may be almost a small computer is therefore provided in the main frame to control with only occasional commands from the CPU 100, the transfer of large blocks of storage data between the MS 104 and EMS 105, to keep the words in MS 104 reasonably current with needs.

The operators part of Console 102 contains the keyboard, control switches and display units required for operation of the system. To prevent interference with the normally uninterrupted cycling of the machine, the Console 102 is connected to CPU 100 as another Input/Output (I/O) device and not directly, thus enabling the CPU 100 carry on with the performance of other operations while the Console 102 is being set up for another entry.

The remainder of the system comprises the I/O Devices and their controls to supply the CPU 100, MS 104 and EMS 105 with needed information. A multiplexor (MPXR) channel 106 is provided to receive data from a large number of slow speed devices operating concurrently, and it does this by accepting a byte (eight bits+ parity) of data from a connected I/O device as soon as the device has the data available, and assembling the byte with earlier bytes received from the device until it has a double 64 bit word assembled and then transmitting the word to a storage location. The MPXR 106 will also receive a double word and transmit the word by bytes to a connected I/O device. Due to the speed difference between the operations of MPXR 106 and the I/O devices connected thereto, up to 256 devices can be operating concurrently through the MPXR 106. Typical devices shown attached to the MPXR 106 are three control units (CU) 108, each of which controls two Printers 109 and a Card Read/Punch Unit 110. Also connected to MPXR 106 is a Transmission Control Unit 112 for control of remotely located devices, here shown as Manual Input/Output Devices 113, such as keyboard, typewriters, or card machines, and a Display Control Unit 114, which controls a number of cathode ray tube Display Units 116.

Also shown connected to MPXR 106 as a part thereof are two Selector Sub Channels 117, each of which will be connected through a Tape Control Unit 118 to a Switch Unit 120. Any tape unit of a plurality of Double Tape Units 121 can be connected through Switch unit 120 and CU's 118, to either of the Selector Sub Channels 117. A Selector Sub Channel such as 117 can be connected to any of a plurality of I/O units, but differs from a Multiplexor Channel such as 106, in that only one I/O device can be operating at a time. Such a Selector Sub Channel will be for devices which supply or receive data at a comparatively high rate and cannot share time with other devices on the same channel.

The system shown also includes four Selector Channels 122, although more or less may be connected as desired, and each Selector Channel 122 may have a plurality of I/O devices connected thereto. Two of the Selector Channels are shown as each having a Drum Control Unit 124, and a Drum Storage Unit 125, connected thereto, a third has Disk File 126 attached thereto, and the fourth is shown connected to a Data Cell 128 through its Control Unit 129. A lead 130 from Disk File 126 indicates that the file may be shared with another system. A Channel-to-Channel Adaptor 133 connected by a Lead 132 to the fourth Selector Channel 122, and by another Lead 134 to another system, may permit direct communication between two systems by making each system appear to be an I/O device of the other system.

The Maintenance and Operators Console 102 may also be connected to a Selector Channel 122 to enable entry of control data by the operator in the same manner as other I/O data, and without arresting the system operation unless such is desired.

These I/O devices, including Multiplexer and Selector Channels 106 and 122, and similar units for supplying and receiving data and instructions, are representative of commercially available devices and as the details of such devices are not part of the inventive concepts claimed herein, no further description of such devices will be given. It will hereafter be assumed that information is supplied by appropriate devices to the Main Storage 104 and the Extended Main Storage 105 as it is needed.

A. Central Processing Unit

Figure 2:
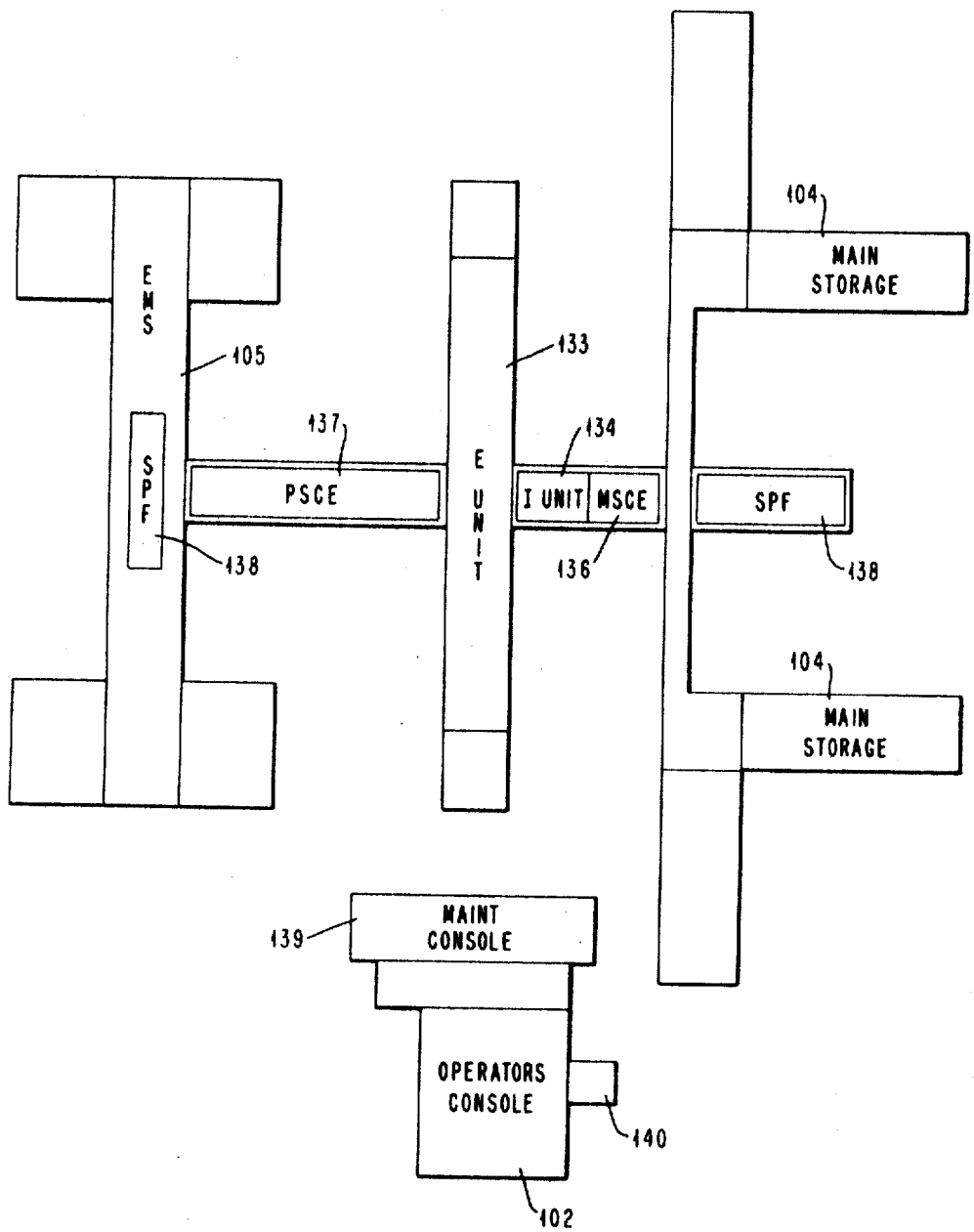
FIGURE 2 is a layout arrangement for the Central Processing Unit in FIGURE 1.

The CPU 100 is the major operating unit of the present system and can logically be subdivided into four more or less independent units. As shown in FIG. 2, the CPU 100 is physically in the form of a cross with four sets of modules connected to a common central junction box. Vertically of the cross and comprising two of the four module sets in the Execution (E Box) Unit 133, which performs all of the arithmetic and logical operations on the data. The inner part of the righthand arm is the Instruction Unit (I Box) 134, which is responsible for all instruction decoding, operand fetching, and an overall control of the operations of the system. The other part of the right arm is the Main Storage Control Element (MSCE) 136 which is the main interface between the I and E units 134 and 133 and the Main Storage 104. Also all communications between the I and E Units 134 and 133 on one hand, and the Peripheral Storage Control Element (PSCE) 137, pass through MSCE 136. The PSCE 137 forms the other, left, arm of the cross and has connected to it the Extended Main Storage 105. Each Storage Unit 104 and 105 has as a part thereof a Storage Protection Feature (SPF) 138 which stores a protection code for each block of storage addresses, and for each reference to its storage, compares the protection code with the program to ensure that the program is permitted access to the called for storage address. As this Storage Protection Feature is fully disclosed and claimed in the assignee's copending patent application, Ser. No. 334,714, filed by G. M. Amdahl, E. D. Councill, R. J. Flaherty and J. J. Zagursky, on Dec. 31, 1963, and titled, "Memory Protection System," no further description of the details of the SPF 138 will be given herein.

The systems engineers part of the Maintenance and Operators Console 102 is numbered 139 and the both consoles with an attached CRT Display Unit 140 are combined into a separate stand-alone unit and will be connected with each of the four CPU sections by cabled wiring. The Console 139 can display the states of all settable circuits in the CPU and with the operator's part of Console 102 will provide a serviceman with complete manual control of the system for error diagnosis and repair.

As is indicated in FIG. 3, the CPU 100 can be logically considered as five functional sections connected by information carrying circuits and by control signal circuits. Since the E Box 133 has one portion which is primarily used for computations involving floating point numbers, and a second section used mainly for arithmetic operations on fixed point (integer) numbers, and logical or arithmetic operations on variable length alphanumeric operands, it is shown as the Floating Point Unit 142 and as the Fixed Point (including Variable Field Length) Unit 143. The major communications between units are set out in FIG. 3 where the number of control lines (CL), the number of address busses (24 lines each) (AB) and the number of 72 bit (8 bytes each with 8 data bits and 1 parity bit) data busses (DB) are indicated for each direction of communication between the logical units.

The Maintenance and Operators Console 102 is also included in FIG. 3 as it receives communications from all of the CPU 100 areas. The inputs to Console 102 are mostly individual data bit lines from the CPU, there being 926 from the FLPU 142, 629 from the FXPU 143, 1024 from the I Box 134, 681 from the MSCE 136, and 191 from PSCE 137, for indication purposes. In addition a further group of 53 lines 144 from the Console 102, and 100 lines 146 to a Console 102, connect to a Selector Channel 122 to enable the system operator or a system engineer to communicate with the CPU 100.

The overall layout of this system with interconnecting buffer representation is shown in FIGURE 15. The relationship between instruction issuing and execution is shown in FIGURE 14.

B. Instruction Unit

The Instruction Unit (I Box) 134 performs under the control of the instruction words of a program and has the following assignments:

(1) Fetching and buffering of the stream of instructions.
(2) Partial decoding of instructions and their assignment to the proper execution unit.
(3) Fetching of operands to the execution units.
(4) Complete execution of branching, I/O and status switching instructions and partial execution of instructions requiring multiple operations.
(5) Handling of interrupts.

The first assignment, instruction fetching is under the control of three registers, the Upper Bound Register (UB) 147, FIG. 4, the Instruction Register (I Reg.) 148, and the Lower Bound Register (LB) 150. Each of these three registers has associated therewith an Incrementer Unit 151, 152, and 153, respectively, which always has an output signal representing one more than the value in its associated register. When the incremented output is fed back into a register, the register assumes the incremented value which then passes to the Increment Unit 151, 152, or 153, to raise it to the next value. Thus, each time the output of the Increment Unit is gated into its register, the register value increases by a unit.

The instruction words from storage, double words of 72 bits each, are received by I Box 134 on a group of 72 lines forming the Storage Bus Out (SBO) 155, and are gated into a set of eight Instruction Buffers 156, numbered 0 to 7, or, under some conditions, into #1 or #2 Temporary Buffers 157. For the present it may be assumed that the first instruction word fetched will be stored in the Instruction Buffer 156 having as its designation the lowest three bits of the double word address of the fetched word. The second word with normally have a sequential address and will be placed in the next higher numbered Buffer until #7 Instruction buffer is filled. The next word fetched will have an address which will end in 000 and the fetched word will be placed in the #0 Instruction Buffer 156.

Initially all Instruction Buffers 156 are considered to be empty as are UB 147, I Register 148 and LB 150. The starting address of the program is placed in UB 147, I Register 148 and LB 150, and a fetch is immediately initiated using the address in UB 147. On the next machine cycle, a second fetch is initiated using the address from Incrementer 151 which address is also placed in UB 147. A third and a fourth fetch are called for on the next two machine cycles with an incrementing of UB 147 on each fetch, after which incrementing the UB 147 will be set to an address three higher than the starting address in I Register 148, and this will be the address of the last word fetched. As will be more fully described later with reference to the MSCE 136, the destination of a fetched word is sent out on the machine cycle before the word is transmitted, and in this instance the input gates to the Instruction Buffer 156 having the address corresponding to the lowest three digits of the storage address will be selected to put the returned word into the appropriate Instruction Buffer 156. Since this is the first fetch, the Operating Register 159 is empty at this time and the fetched word will also be gated into this register. Operating Register 159 is controlled to receive instruction words from any of the Instruction Buffers 156, Temporary Buffers 157 or SBO 155, and holds the current instruction word for decoding and control, and also holds enough of the next instruction word or words to fill up its double word capacity. Successive instruction words are placed in the successive Instruction Buffers 156 as they are received.

In the described embodiment, instructions may be of three lengths, either 16, 32, or 48 bits long and it will be noted that the Operating Register 159 has an elaborate array of gates connected thereto. On the input side, there are four sets of 16 bit gates so that any one or more of the 16 bit positions of Register 159 can be loaded independently. Initially as was noted, the entire 64 bits of the first instruction word on SBO 155 are loaded into OP Register 159. Since instructions may start at any of the four positions within this instruction, it will be clear that the current instruction address in I Reg. 148 will need two low order bits in addition to the fetch address to select the proper part of the instruction word in Register 159 for decoding, and one or more of the 16 bit groups to the left may belong to a previous program and are not to be used. Hence, under control of the I Reg. 148, any of the bits needed to fill out these left orders with significant instructions will be gated into OP Register 159 when the second instruction word is fetched over SBO 155. Thereafter, as instructions are used from Register 159, it is refilled from the Instruction Buffers 156 to maintain the Register 159 filled with unused instructions.

Among the outgates from Register 159 is the operating code set of four groups of eight gates supplying a Bus 160 of eight lines. Since the operating code will always be the leftmost eight bits of an instruction, and the instruction can start at any of the four positions within the Register 159, the lines 160 are gated to the left eight bits of each group of 16 bits.

Storage addresses within instruction words may be in either of two formats. First will be instructions for those operations requiring only the use of some of the General Purpose Registers (GPR) to be described later and designating one or two GPR's in the second eight bits of the first 16 bits of the instruction. These addresses will be gated out of the appropriate positions to a Bus 161 of eight lines. In the other format, a storage address will be set out in the second or third 16 bits of a longer instruction as four bits specifying a GPR which contains a base address and 12 bits specifying the displacement of the wanted address from the base address. The four bits for the GPR selection will, for this format, be gated out of the selected positions to a Bus 162 which is only four bits wide. The accompanying 12 displacement bits of the address will be gated on a 12 bit wide Bus 164 into a storage buffer 165.

The OP Code part of an instruction in Register 159 will be gated out on Bus 160, and into an Operation Decoder 166, under control of the two low order bits of I Reg. 148, which as mentioned above, identify the location of the current instruction within Register 159. The two highest bits of the operation code specify the instruction format and control the readout of the address part of the instruction to Busses 161, 162, and 164. For a 16 bit instruction, the address or addresses on Bus 161 normally specify GPR's which contain operands for an operation within E Box 133, and will be transmitted thereto along with the operation control signals from Decoder 166.

For a medium length, 32 bit instruction, the second half of the first 16 bits may still specify a GPR for use, as for example, as address in Main Store 104, or Extended Main Store 105, and such address will require use of an I Box Adder 168. The Adder 168 has three inputs which are to be added together to produce the effective address of the operand to be fetched. One input 169 is 12 bits wide and is supplied by Buffer 165 which is loaded with the displacement part of the address directly from the Operating Register 159. The base part of the address can be up to 24 bits and will be stored in a GPR which will be gated into a second input 170 of Adder 168 under control of the address on Bus 162. Another factor of the effective address is to be found in an index register which will also be a GPR, and the value in the index GPR, which will be selected by the signals on Bus 161, will be transmitted to the third input 172 of Adder 168.

It should be noted at this time that the GPR's are physically located in the Fixed Point Unit 143, FIG. 3, and not in the I Box 134. As the time required to send a gating signal to the GPR's and receive their stored value is substantial and would cause at least a loss of one machine cycle in the time required to generate an effective address, the numbers stored in the GPR's are made immediately available to the I Box 137 by extending "hot" lines, indicated in FIG. 4 as GPR Bus A, 173 and GPR Bus B, 174 into the I Box from the GPR's, and putting gates at the I Box end of these busses. Thus, when a value in a GPR is needed, it may be immediately gated into Adder 168 despite the physical distance separating the GPR's from the Adder. The only exception to the immediate availability of the GPR settings can arise when a value to be stored in a GPR is generated in Adder 168, and is needed in the next machine cycle, and there is insufficient time available for the value to be stored in the GPR and returned on the Busses 173 and 174. This exception is sensed in the I Box 134 and is compensated for by the provision of a third Temporary Register 176 which is loaded from the output of Adder 168. Whenever I Box 134 determines that the address of a required GPR is the same as that one which has just been loaded from Adder 168, the value stored in Temporary Register 176 is gated to Adder 168 instead of the settings of the associated GPR Bus 173 or 174. Another Register 177, the W Register, also receives the output of Adder 168, and can be gated out to the GPR's or to Main Storage 104, as required.

C. Operation of the Instruction Unit

In the operation of the I Box structure thus far described, it will be seen that initially UB 147, I Reg. 148, LB 150 and all Instruction Buffers 156 and Temporary Registers 157 are clear of significant values. The address of the starting instruction is loaded into UB 147, I Reg. 148, and LB 150, and instruction fetching is started by requests for double words from the addresses in UB 147. The UB 147 is incremented at each fetch so that it always records the address of the last instruction fetch requested. The UB 147 will request fetches of instruction words until it is three word addresses ahead of the address in I Reg. 148 for a total of four initial words. When the first word returns it is gated into one Instruction Buffer 156 and into Operating Register 159 where the two lowest order bits of I Reg. 148 which have no address function in fetching, control the readout of the initial half word, 16 bit, instruction to the CP Decoder 166, the GPR's etc. As soon as the first instruction is processed by either execution in the I Box, or by being transferred to another unit for execution, the address in I Reg. 148 is increased by the length of the last instruction, this length is indicated in the first two bits of the instruction, and now points to the first part of the next instruction At this time, the half words of instruction in Operating Register 159, which have been utilized, are replaced by the corresponding half words of the next instruction word from an instruction Buffer 156. Thus, there will always be available in Register 159 at least the operating code part of the next instruction, and the remainder of the instruction can be loaded into 159 as that OP code is being decoded.

Each time the I Reg. 148 is incremented to cause a carry from the two low order bits into a higher order bit, it is an indication that another double word instruction has been completely utilized so far as the I Box is concerned and that decoding has moved into a new word. Since the UB 147 is not now 3 double word addresses ahead of I Reg. 148, a fetch of the next instruction is called for and UB 147 is incremented to again be 3 ahead of I Reg. 148. LB 150 has in the meantime remained at the address of the first instruction word placed in Buffers 156. When UB 147 is eventually incremented so that it calls for a fetch into the same Buffer 156 as the first instruction word was placed in, the address in LB 150 is incremented to point to the next higher address. Thus, in summary, UB 147 contains the address of the last instruction word which has been called for a fetch, I Reg. 148 contains the address of the instruction word being decoded, and LB 150 contains the address of the oldest instruction word remaining in Buffers 156. These operations will continue in this order until a branch point of some kind is reached. For a branch which forms a short enough loop so as to be contained within the past history instruction words already in Buffers 156, as shown by a comparison of the address in LB 150, with the branch address specified in the current instruction, the I Box 134 is set into "Loop Mode."

In Loop Mode, the address in LB 150 is set to the target of the branch and LB 150 is frozen in that state so long as the I Box continues in Loop Mode. It is also possible to generate a Loop Mode state of the I Box if the target of the branch instruction is not contained within the Instruction Buffers 156, but is nevertheless less than eight full double words prior to the address of the present instruction. In such a situation, the entire loop can be contained within the Buffers 156. Upon detection of such a loop, i.e. the branch address is within eight double words of the address in I Reg. 148 but is not at this time contained in Buffers 156, an initialization of the I Box is started. Here, the branch address of the instruction is placed into UB 147, I Reg. 148 and LB 150 as above described, to start instruction fetching. In the Loop Mode state LB 150 is frozen at the starting address and UB 147 is permitted to increase to completely fill the Buffers 156 with future instructions as soon as the necessary machine cycles can be spared after the four cycles required for the initial instruction fetches and after such operand fetches and other storage operations, as have priority, have been taken care of.

In either type of Loop Mode state, the complete instruction loop is contained within the instructions stacked in Buffers 156 and will be decoded and transmitted to the E Box 133 for execution without any need for continuous fetching of the instructions of the loop from storage. It will be evident that any branch instruction which leads to an instruction loop will be a branch on condition type of instruction for otherwise the machine will be locked into an unending loop. The I Box 134 operation for all branch on condition instructions will be substantially the same unless the instruction leads to the first type of Loop Mode where the target instruction is already in Buffers 156. As a preliminary description, the I Box 134 will have no difficulty with an unconditional branch instruction or a conditional branch instruction in which the condition for the branch has occurred prior to the decoding of the instruction after its transfer into Operating Register 159. In these unconditional or predetermined condition branches, the target address of the instruction is placed into UB 147, I Reg. 148, and LB 150, as soon as it is determined through Adder 168 and the condition, if any, is tested and thereafter the I Box 134 proceeds in the same manner as initially described.

If, however, the branch is dependent on a condition which has not been determined, when the branch instruction is decoded, the I Box must proceed in a manner which offers the best chance of avoiding loss of time. Hence, the I Box assumes that the condition will not be met and continues to decode and transmit for execution the subsequent instructions. It does, however, set up a condition test circuit to be activated when the condition has been determined and will also pause long enough to call for two storage fetches starting at the target address of the branch. These two instruction words when they return will be stored into #1 and #2 Temporary Buffers 156, respectively, to be available if the program branch is to be taken. Furthermore, the instructions issued to the I Box 134 or E Box 133 after the conditional branch instruction is decoded will be accompanied by a conditional tag which prevents execution of the instruction so long as it is present since the I Box does not now know if the branch is to be taken or not. When the condition on which the branch depends is determined, such conditionally tagged instructions will have their tags turned off if the condition is not met, or if the condition is met the conditionally tagged instructions will be cancelled and thus not executed. Obviously, if the condition of the branch is not met, the instructions stored in Temporary Buffers 157 will be cancelled or if they have not returned from storage, will be blocked at the gates into Buffers 157, but if the branch condition is met, then the word in #1 Temporary Buffer 157 is transferred into an Instruction Buffer 156 and into Operating Register 159 for decoding as the new instructions. The storage address of this instruction word is placed in UB 147, I Reg. 148, and LB 150, and this address determines which of the Buffers 156 is selected to store the instruction word. The instruction word in #2 Temporary Buffer 157 is now transferred into the next adjacent Buffer Register 156 and UB 147 is incremented. Control will then be transferred back to UB incrementer 151, now pointing to the branch address plus two and further instruction fetching will proceed as first described but from the branch path.

If, however, the conditional branch will set up an instruction loop which can be contained within Instruction Buffers 156, the I Box 134 will for the first iteration proceed exactly as above set out but will additionally be set into Loop Mode to prevent the LB 150 from exceeding the target address until the condition of the branch has been determined. If, however, the LB 150 has already exceeded the target address, and thus the first loop instruction has been dropped from Buffers 156, the I Box will be set into Loop Mode and will then proceed as in any other branch, i.e. the target instruction will be fetched into #1 Temporary Buffer 157, etc. as above described.

So long as the I Box 134 remains in Loop Mode, there will be no additional instruction fetching from the Main Store 104 after the Instruction Buffers 156 have been filled with eight words starting at the branch target address until after the branch condition ceases to be met at the branch point or the target address changes. It was noted above that it is normally assumed that a branch will not be taken and that the I Box will issue instructions along the main path after the branch instruction and will tag such instructions conditional and not to be executed until the branch condition is determined. In Loop Mode, however, the alternative assumption is made, i.e. that the branch will be taken and the conditionally issued instructions will be in the branch back to the loop. They will, however, still be tagged conditional and will not be performed until the condition precedent has been decided. When the branch condition is no longer met, any such conditional instructions will be cancelled, the Loop Mode will be set off and new instructions will be issued along the main path. The LB 150 will be unfrozen and the UB 147 will immediately start fetching new instruction words until the normal relationship between the values stored in UB 147, I Reg. 148, and LB 150, is re-established.

It is also possible to leave Loop Mode or change to a different loop by some operation performed as a result of an instruction within the loop. It will be remembered that when the Loop Mode is entered, the address of the branch target is generated in Adder 168 by summing the values in at least one GPR and the address displacement specified in the instruction and stored in Buffer 165. If, during the processing of a loop, an instruction changes the value stored in one of the GPR's which was used to generate the branch address, the old address is no longer valid, and the branch instruction must be reprocessed to determine the new branch address. Such reprocessing of branch address could be done at each iteration of the loop, but does require a full machine cycle, and it is preferred to add some additional hardware to save this machine cycle. Such hardware comprises a Save Loop Count Instruction Register (SLCIR) 179 into which is gated the address in I Reg. 148 when a Loop Mode branch is detected and a Save Loop Target (SLT) Register 180 which receives the target address of the branch when it is available from Adder 168. Thus, SLCIR 179 contains the address of the instruction which sets the branch, and SLT 180 has the target address for the branch. Whenever in Loop Mode a branch instruction is found, the setting of I Reg. 148 is compared in Comparator 181 with the setting of SLCIR 179, and if they are found to be equal, the value of SLT 180 is gated into I Reg. 148, thus saving one machine cycle. It is to be remembered that Loop instructions after the branch are not to be executed until the branch condition is determined.

The target address in SLT 180 can be in error at the completion of iteration of a loop if one of the GPR's has had its stored value changed since it was used in generating the address in SLT 180. To detect such condition, the I Box 134 also stored during Loop Mode, the numbers of the GPR's which were utilized to generate the SLT 180 address, and also monitors the activity of such GPR's. If there is any alteration of one of these monitored GPR's, the SLT 180 value is considered invalid. Loop mode is therefore cancelled and a new branch address is generated in the same manner as the address was generated in the first loop iteration.

D. Instruction issuing

A second principal responsibility of the I Box 134 is the issuing of instructions to the appropriate units for execution and the fetching of required operands from storage 104 or 105. This task is pipelined in three independent stages so that at any time as many as three instructions may be in process by the I Box, each instruction being at a different stage of processing. This pipeline type of operation naturally provides an improvement in the effective speed of I Box operation, even though a particular instruction may be in process longer than the time needed to similarly process an instruction with straight through hardware.

Assuming that there are no interlocks to hold up operation of I Box 134, the first pipeline stage gates out over Bus 160 the operation code (8 bits) of the instruction in Operating Register 159 as selected by the setting of I Reg. 148. The OP code is decoded in Decoder 166 to the type of operation to be performed, i.e., floating point, fixed point, or other, and whether the execution unit will require operands from storage or not. For a floating point type of operation, the I Box will check to see if the Floating Point Unit (FLPU) 142 can accept the instruction. As will be described later, the FLPU 142 is analogous to a simple computer with an instruction stack to hold some instructions, floating point buffers to store operands and some arithmetic and logic units to operate on the operands. If the instruction stack is full, the FLPU 142 cannot accept the instruction from the Decoder 166. Also, if the instruction calls for operands to be fetched from storage, the I Box 134 checks for availability of a floating point buffer register to receive the fetched operand and checks the availability of Adder 168. The Adder 168 is not available if pipeline stage 3 is full, or if pipeline stage 2 is full and MSCE 136 is not accepting addresses for storage fetches for reasons to be set out at a later point. If any of these conditions is not met, the I Box 134 will stop until the condition is met. As soon as it can proceed, the Decoder 166 determines whether the I Box 134 is operating in conditional mode, i.e. whether a conditional branch has been previously decoded and the condition precedent to the branch has not been determined, and whether the operation will set a condition code signal.

As soon as the requirements are met, the I Box 134 will send to the FLPU 142 a signal including the following 14 bit signals:

1 Full/Empty—Sets tag to indicate valid instruction
1 Conditional Instruction Operation—Not to be executed when bit is on
1 Condition Code—This instruction will set a condition code
6 Operation Code—Control the FLPU operations
2 Register Address—Designate the one of four registers having one of the operands
3 2nd Register Address—Designate a second register or a buffer having a second operand If the instruction is for a fixed point operation the I Box makes similar checks of its own pipeline status and of the FXPU 143 status to detect any blocking conditions. As soon as there are no such conditions, the FXPU 143 receives a set of 24 bit signals as follows:

1 Full/Empty bit—Set to indicate a valid instruction
1 Conditional Instruction Operation—Not to be executed when bit is on
1 Condition Code—This instruction will set condition code
8 Operation Code—Controls the FXPU operations
4 GPR #1 Address—The location of operand #1
4 GPR #2 Address—The location of operand #2
3 Fixed Pt. Buffer—The address of the buffer register which is to have the source operand 2 Storage Address Register—Identifies a Storage Data Buffer to receive a generated operand Since both the I Box 134 and FXPU 143 can change the operands in the GPR's, an interlock is provided to prevent the I Box from using these registers before the FXPU can set them in an issued but unexecuted instruction, and also to prevent the I Box 134 from changing the GPR operand if the operand is to be used in an unexecuted operation. The structure for this interlock is associated with the GPR's and will be more fully described in the description of the FXPU 143, but briefly consists of a Register Unavailable for Addressing (RUA) Counter 337 and a Register Unavailable for Modification (RUM) Counter 335 for each GPR. Every instruction which uses a GPR as a sink for data storage increments the RUA counter for that GPR and execution of the instruction decrements the counter. The I Box 134 cannot use a GPR to generate an address until the RUA Counter for that GPR equals zero, at which time the GPR will store the correct value for an address generation. Similarly, the RUM counter is incremented whenever an instruction is decoded which uses the associated GPR as a data source and is decremented as the instruction is executed. The I Box is prevented from using such a GPR until its stored data has been fully utilized. Only when both RUA and RUM are 0 can the I Box use a GPR in a manner which would alter its stored value.

As noted above, when the I Box 134 decodes a branch on condition, it checks the condition code setting to determine which way to branch. Since there may be some instruction in the E Box 133 which has not been executed but which will affect the condition code, the branch cannot be determined until the last instruction capable of changing the code has been performed. Each instruction issued by the I Box 134 which can change the condition code includes a condition code bit and this will turn off all other set condition code tags in both FXPU 143 and FLPU 142. Thus, only one condition code tag can be set at any time, and this will be the last one issued. The I Box must hold off on determination of a branch until that condition code tag is reset.

As above noted, until a branch is decided, the I Box 134 will continue to issue instructions tagged for conditional operation. Any such instruction may have a condition code tag set but this will not reset the tag for the previously issued unconditional instructions. It will, however, reset the condition code tag on any previously issued conditional instruction so that one conditional instruction may also have a set condition code tag. When the conditional tag is cancelled on such an instruction, the presence of a set condition code tag will immediately reset any condition code tag bits among the unexecuted instructions.

There are also instructions which can be fully executed within the I Box 134, such as the branching set out above. In general, when the I Box 134 encounters an I Box instruction, it halts succeeding instruction processing until the instruction is completed, and for some instructions the I Box must wait until all instructions in process, i.e. in the pipeline, are issued before it can proceed.

In pipeline stage two, address generation for the first of any required storage operands takes place. The three operands on Adder Inputs 169, 170, and 172, are gated into the Adder 168, and the sum is gated to the Working Register 177. If the instruction is a store instruction, a quick check is made to see if the store can be to the storage address from which the next instruction now being coded by OP Decoder 166 was fetched.

In pipeline stage three, the storage address of an operand is passed to an address buffer in MSCE 136, and in a store operation, the address is also checked in the I Box to detect if it is a store to an address from which an instruction fetch has already been. If so the I Box stops for one cycle and orders a new instruction fetch from the storage address. The MSCE 136 has, as will be described later, interlocks to insure that the store and fetch will be executed in proper logical order.

E. Execution Unit

The Execution Unit (E Box) 133 can be considered as divided into two almost independently operating sections, the Floating Point Unit (FLPU) 142, and the Fixed Point Unit (FXPU) 143, both receiving instructions from the I Box 134 and being connected by data busses to the MSCE 136 for operand transfer.

F. Floating-Point Box

The Floating-Point Box comprises the Floating-Point Unit (FLPU) which will be later described in greater detail in section VI.

The overall data flow and instruction storage for the FLPU Box 142 is shown in FIGURE 5. The 14 bit instruction signal from the I Box 134 is received on a Bus 183 and will be stored in the next available one of a set of eight, 14 bit stack registers forming the Floating Point Operating Stack (FLOS) 184. The I Box can issue instructions for storage in FLOS 184 so long as the stack is not filled. The instructions in FLOS 184 are issued in a strict first-in first-out sequence.

The FLPU 142 also has a stack of six 64 bit buffer registers (FLB) forming the FLB stack 185. Each of these FLB's is connected to the Storage Data Out Bus 155, see FIG. 4, to receive operands from Main Store or Extended Main Store through MSCE 136. These operands will have been called from storage by the I Box 134 as the instruction was decoded. The I Box will also have assigned one of the FLB's 185 to receive the operand and will have transmitted the address of that FLB to MSCE 136 as the sink to which the data fetched is to be sent, and will also have sent it to the FLOS Register 184 along with the operating code to identify to the FLOS 184 where its operand will be found. There is no requirement that the FLB's 185 be used in sequence for either receiving or transmitting operands.

There is also a stack of four 64 bit Floating Point Registers (FLR) 187. These FLR's normally contain one of the operands for every instruction, and are also the sink into which the result of an operation is placed.

An Add Unit 188 is provided to handle all floating point additions. This Add Unit 188 contains a full carry-propagate carry-lookahead type of adder in which the complete addition of two operands can be made in one machine cycle with the sum latched in a set of Add Result Latches 189. Since a floating point number will consist of an exponent of a base of sixteen as a multiplier factor and also consists of a fraction part, and as only fraction parts having the same exponent can be added or subtracted, it is necessary to compare the exponents of two addition operands and to right shift the fraction part having the lower value of exponent to align the fraction parts properly. This testing and shifting operation is performed in one machine cycle and the aligned operands are set into latches for application to the adder during the next machine cycle with latching of the result into latches 189. Thus, addition of two operands can be performed in two machine cycles, but as the output during the first cycle is set into latches, it is possible to gate the setting of the latches into the adder and at the same time to gate a second set of operands into the exponent comparing and fraction shifting stage for their preliminary handling. It is thus possible to have two sets of operands in Adder 188 at the same time, and by such pipelining to produce results at the Adder 188 output latches 189 at an effective rate of one per machine cycle.

To provide the operands required for such repetitive adder cycles, the Add Unit 188 is supplied with three sets of input buffers 191, each set being effectively an adder and comprising two 64 bit registers to store respectively, a sink operand and a source operand, and also comprising a group of 10 address latches to store the four bit address of the unit whose output will be stored as the sink operand, all zeros indicating that the operand will be from an FLR 187 and a five bit group for the address of the unit whose output will be stored as the source operand. An all zero condition of the five bit group will specify that one of the FLR's 187 will be the source, a 10000 setting will specify the Buffer Stack 185 as the source, while a non-zero condition of the last four bits will identify one of the other add or multiply-divide units as the source. A single bit, the S/L bit, is a part of the original instruction field in the Operating Stack 184, and indicate whether the operation is to be performed with short or long precision, i.e., it controls the gating for the low order group of 32 bits.

The FLPU 142 also contains a Multiply/Divide Unit (M/D) 192 for the multiplication or division of operands supplied thereto. The result of an M/D unit operation is temporarily held in a group of latches, M/D Result 193. To keep the input of the M/D Unit 192 supplied with operands, there are two Operand Storage registers 195 for each input to the M/D unit. This enables a new set of operands to be stored for the M/D unit 192, while a first set is being utilized in the unit. As in the Add Unit 188, there are ten register positions associated with a pair of Registers 195, four positions to retain the address of the unit from which a sink operand will be supplied, five positions to hold the address of the unit from which a source operand will be supplied, and a short/long precision bit.

A Common Data Bus (CDB) 196 is provided to transfer data between the inputs and outputs of the Add Unit 188, the M/D Unit 192, and the FLR's 187, and to gate out the values in FLB's 185. Insofar as data as concerned, the CDB 196 is an extensive set of gates feeding an output OR circuit, so that any selected input to the Bus 196 may be connected to the Output Bus 197, which is common to all data receiving units including the Storage Data Buffers 244 of MSCE 136. The CDB 196 also contains control circuitry to gate the units which are to utilize CDB 196 in accordance with a preselected priority. The FLB's 185 have first priority and when they contain operands will be gated out in sequence from the lowest numbered on to the highest numbered one. When no operands are in FLB's 185, the Add Unit 188 has next priority for the CDB 196 and is strictly on a First In-First Out priority among the Buffer Registers 191 which have all of their needed operands. The M/D unit 192 has the lowest priority and can gate out its results with a First In-First Out priority between its input registers 195 if both sets are ready at the same time. The First In-First Out (FIFO) priority among the inputs of the Add Unit and the M/D unit is to allow staging of operations through these units to maintain a proper sequence of results, and to prevent any undue delay in supplying operand results.

When any unit requires the use of CDB 196 to transfer an operand, it transmits its request to the CDB priority circuit which will, when no unit with higher priority is requesting the bus, return an accept signal and transmit to every operand input circuit, the address of the unit which is to put its operand on the CDB 196. It was noted earlier that each of the Buffer Registers 191 and 195 stored the address of the unit which was to supply its operand and such a register will also be provided in the other units receiving data from CDB 196 as the FLR's 187 and the SDB's 244 supplied by SDB 197. When the address of the transmitting unit appears on CDB 196, it is compared at every input with the stored address, and when an equality is detected, the receiving unit prepares to accept the operand. The CDB 196 will gate out the selected operand to its Output Bus 197 on the next machine cycle at which time the receiving unit will have its gates opened to receive the operand. On the same cycle which transfers the operand, the control section of the CDB 196 can again respond to a bus request and transmit on its address bus, the address of another unit which will supply the next operand on the bus so that effectively the CDB 196 can transmit at a maximum of one operand in each machine cycle.

The FLB's 185 are provided with a direct input to the right hand ones, the sources, of the Buffer Registers 191 and 195, and to the Fixed Point Unit 143 by way of the Buffer Bus (FLBB) 199. Whenever an instruction in FLOS 184 indicates that an operand fetched to an FLB 185 is to be a source operand, the FLB when it receives the operand requests a time slot on the FLBB 199. FLBB 199 has controls similar to CDB 196 but simpler in that the only priority is between the FLB's 185 according to their number. When an FLB's request for Bus 199 is accepted, its address is sent to all receiving units and, as described above with respect to the CDB 196, on the next cycle the unit which is to receive the operand will gate it in from FLBB 199.

G. Fixed-Point Unit

The Fixed Point Unit FXPU 143, FIG. 3, is a part of the E Box 133 and executes all operations using fixed point hexadecimal numbers and all variable length operands, alphabetic and/or numeric. The FXPU 143 comprises five functional units as indicated in FIG. 6. These units are an Operation Stack 201, for both fixed Point and Variable Field Length operations, a group of 16 General Purpose Registers (GPR) 202, each 32 bits wide and, as previously mentioned in the description of the I Box 134, each connected by "hot" lines to the I Box GPR Bus A 173 and GPR Bus B 174, and six Fixed Point Buffer (FXB) registers FA to FF individually references as FA 204, FB 205, FC 206, FD 208, FE 209, and FF 210. Also included in FXPO 143 are a VFL Execution Unit 212 having an Immediate Data Input Register 213, and a Fixed Point Execution Unit comprising a 36 bit Carry Save Adder (CSA) 214, a 38 bit Carry Propagate Adder (CPA) 216 with a 68 bit Accumulator 217, and a Shifter 218 on the output of CPA 216. Shifter 218 is capable of shifting the output signals to the right or to the left up to 32 bit positions and includes an Overflow Detector 220 to detect any significant digit loss on a left shift. A Store Bus 221 can hold any data to be transferred from the FXPU 143 to the Storage Data Buffers in the I Box 134 until the SDB is available to receive the data.

The Fixed Point Operating Stack (FXOS) 201 contains six 24 bit Buffer Registers. The function of FXOS 201 is to receive micro-coded OP's on an input bus 222 from the I Box 134 as previously mentioned, and to issue the OP's on a First In-First Out basis to the OP decoder 224 for control of the Fixed Point/VFL operations.

The 16 GPR's 202 are used as the sink and source of the operands for most instructions. There are two full word output busses, Bus A, 225, and Bus B, 226, and only a full word can be gated from a GPR 202 to a Bus 225 or 226. The GPR Address Register 228 is a 9 bit register set from I Box 134 on Bus 229 to control the address of the GPR which is the sink of an operation and controls the ingating of operands into the GPR's 202. A single byte (8 bits) a full word (32 bits) or a double word (64 bits) can be ingated on any cycle. An ingated byte will always be stored in bit positions 24 to 31, i.e. the right end of a GPR and a double word will be stored in an even-odd pair of GPR's, i.e. #'s 2 and 3, 4 and 5, etc.

The six Fixed Point Buffers 204–210 are used during Fixed Point/VFL operations as sink and source data registers and all operands from storage will enter the FXPU 143 through these Buffers. Four of the six buffers FA–FD are used for all multi-operation instructions, both Fixed Point and VFL, while the other two FE and FF are used only for Fixed Point operations. A buffer can have either the right or the left 16 bit half outgated to the left half of the left inputs of CPA 216, or the right half can be gated into the right half of the left input of CPA 216, either along or in conjunction with the gating of its left half into the remainder of the left CPA input from the left half of the Buffer 204–210. It should be noted that this left input of CPA 216 has a T/C side 231 which may be set to cause entry of the True operand or its complement for addition or subtraction of the operand.

For VFL operations, the FA and FB buffers 204 and 205 may be used as one 64 bit sink register and any byte may be outgated to the sink bus 232 of the VFL Execution Unit 212. The other two buffers FC and FD 206 and 208 may be used as the 64 bit source register and any byte may be outgated to the Source Bus 233 of the VFLEU 212. Although not further described at this time, there is a Byte Address Register associated with each Buffer FA, FB, FC, and FD, those with FA and FC being three bits wide to address any byte of the combined 64 bits of FA–FB and FC–FD and those for FB and FD being two bits wide to address any of the four bytes in a register when it is used alone for 32 bits. Each can be incremented or decremented and control the bytes to the outgated to Busses 232 and 233.

The Carry Save Adder 214 is used only for Multiplying operations and has a Multiply Gate 235 connected to two of its inputs to supply to one input either nothing or a one multiple or a two multiple and to the other input either nothing or a four multiple or an eight multiple. All multiples are of the multiplicand operand without a 0, 1, 2, or 3 bit position left shift, and any multiple can be supplied either plus or minus as required.

The Carry Propagate Adder 216 is 38 bits wide on each input. It is used as a 32 bit wide Adder for Add and Subtract operations, as a 36 bit wide Adder for multiplication and division operations and it is used over its full width in Convert to Decimal operations. Only on the left input is a complement function available.

The Accumulator 217 is 70 bits wide with a right 32 bits, a left 32 bits and a six bit left extension, and is used particularly in Multiplication to buffer partial results. The outgating circuits go to the Shifter 218 or back to the inputs of CPA 216 with the CPA input circuits settable for a left shift of either one or three orders, or for a right shift of four orders of only the left part and extension. The outgating for the right part of Accumulator 217 enables the value stored in the right half of the Accumulator 217 to be sent to either input of CPA 216, to be partially decoded along with the left part for a string of leading zeros in Leading Strings Decoder 379, or to a Multiplier Decoder 377 which controls the Multiply Gates 235.

The Shifter 218 spans a full 64 bits and is ingated from Accumulator 217 and for the Multiply operation can also receive the right four bits of the six bit left extension. The input can be shifted to the right or to the left and can be shifted any extent up to 32 orders. Zeros will be filled in on the right or left end, ones will be filled on the left end when a complemented negative number is shifted and any significant digit shifted to the left out of the effective output bus will be detected as a spill.

The Immediate Data Register 213 is linked to the VFL Data flow and is also linked to the Operation Stack 201. Its primary function is to hold Immediate Data which will be included in the instruction word. This register 213 can outgate to either the Sink Bus 232 or the Source Bus 233 for the VFL Logic Unit 212.

The VFL Logic Unit 212 has the Sink Bus 232 and the Source Bus 233 as its two 8 bit inputs and has the ability to AND, to OR, or to XOR (Execlusive OR) the two sets of inputs or to gate either input unchanged to the Result Bus 234.

The I Box can supply data directly to the GPR's 202 by sending a 32 bit word, generally an address base, on a Bus 236 and specifying the GPR 202 to receive the data by the signals on Bus 229 to the GPR Address Register. The I Box 134 can receive signals by the 512 "hot" lines connected to the GPR's and an 8 bit OR 237 drives a bus which can transmit any 8 bit byte from the FXB's 204, 205, 206, or 208, to I Box 134.

The Storage Bus Out (SBO) 155 is a 32 bit wide bus and will carry a word frof storage as the response to a fetch request. Data on this Bus 155 will be preceded by the I Box assigned address of the FXB into which the operand is to be stored. As described earlier, the detection of its address by an FXB 204–210 will open its ingates on the next cycle to allow the store value to enter the FXB.

The Floating Point Bus is Bus 199 of FIG. 5 and comprises a 64 bit data part and a three bit address part to select an FXB as above. Data will be put on the Bus 199 as a result of a request from FXPU 143.

The Store Bus OR's 221 can be loaded with up to 64 bits of data to be sent to a Storage Data Buffer (SDB) 244 in MSCE 136. The OR's 221 will also be supplied the address of the SDB 244 to which the data is to be sent. The Store Bus OR's 221 can collect data from the FXB's 204–210, from the GPR's 202 and from the Accumulator 217. Either 1, 2, 4, or 8, bytes of eight bits can be gated through the Store Bus OR's 221.

H. Fixed Point Unit Operation

The primary purpose of the decoder 224 is to control the issuing of instructions from the Operating Stack 201. These instructions in FXOS 201 are microcoded in 21 bits with the left eight bits containing the OP code. Three tag bits are also provided for each FXOS buffer register. These three are the Conditional Operation, Set Condition Code, and Full bits which have been previously described.

As OP's are processed, certain signals must be sent to the I Box 134 to maintain up-to-date the I Box counters indicating the status of the GPR's and FXOS. The RUA and RUM Counters 337 and 335 are incremented as OP's are sent to the FXOS and during execution of these OP's the same counters are to be decremented and will indicate that a specific GPR has just completed its function as a sink or a source field. The specific RUM or RUA counter to be decremented will be indicated by the register address field of the OP or from the GPR Sink Address Register 228.

The I Box 134 also maintains the FXOS Counter 203 to indicate the number of unexecuted instructions in FXOS 201. Each OP issued by I Box 134 to FXPU 143 causes the Counter 203 to be incremented, and each OP execution sends a Stack Counter Decrement Signal to the I Box.

Fetches of all operands will have been called for by the I Box when an instruction is decoded, and a specific FXB 204–210 or Floating Point Buffer (FLB) 185 FIG. 4 will have been assigned. In general, all 32 bit operands will be brought into the FXB's while 64 bit operands will be sent to an FLB 185 and will be transferred to the FXB's when requested. The address of the assigned FLB or FXB will be included in the OP sent to FXOS 201. The I Box 134 keeps track of the full or empty status of the FXB's and FLB's by setting a busy trigger when an FXB or FLB is assigned and then having the trigger reset by OP Decoder 224 when the data in the FXB or FLB is used. Also, address generation of operands, branches etc., in I Box 134 will be taking place concurrently with the execution of OP's in FXPU 143. To prevent delay in the I Box processing when Fixed Point operations are in process, the I Box is given priority in making a store into GPR's 202, even to the point of blocking Fixed Point/VFL processing if necessary. This priority is controlled by an ingate priority circuit which monitors all I Box requests for GPR ingating, and as soon as the I Box request for ingating is accepted, it will block an ingate request from the FXPU execution units until the I Box has completed its storing into the GPR's.

In the FXPU 143, the normal processing of OP's in the FXOS 201 is in a serial manner. As an OP is issued to one of the execution units, Fixed Point or VFL, any data required from a FLB 185 is called for and assigned to an FXB 204–210. The FXB's are monitored to detect when all data fields are available to execute the issued OP.

While the execution of one OP instruction is in process in the execution units, the next OP in FXOS 201 is being decoded in Decoder 224 and this will apply for the successive OP's of a multiple OP instruction, as well as for an OP which can be executed in a single cycle. The succeeding OP will be issued as soon as the data facilities for its execution are available to the extent that two or more OP's can be in execution simultaneously if they do not have overlapping hardware requirements.

Most OP's for the FXPU 143 are single OP instructions having, for the control bits 8 through 20, the addresses of the registers containing the needed operands. In these 21 bits, bits 0–7 are for the OP code, bits 8–11 identify a GPR 202 for the first operand, bits 12–15 identify a second GPR 202 for a second operand, bits 16–18 specify which FXB or FIB contain the operand to be sent to storage, and bits 19–20 are the SDB 244 which is to receive the data to be stored in Main Storage 104.

For another type of operation, single operand instructions, bits 12–18 may contain data having a different significance. If the operation is a SHIFT then bit 12 specifies a direction and bits 13–18 are the shift extent, while for a LOAD MULTIPLE or STORE MULTIPLE, there will be a plurality of OP's, i.e., one micro-OP for each word and bits 12–15 are control bits for LEFT, RIGHT, START and END, and bits 16–18 specify the FLB having the storage operand to be processed.

The Fixed Point Unit (FXPU) 143 operations may be grouped into single cycle instructions and multiple cycle instructions. The single cycle instructions include the LOAD instructions in which all operands go through the Adder 216. The source register, either a FXB or a GPR is gated to the left input to Adder 126 and then back to the GPR sink register. If the LOAD instruction includes a test of the operand condition, the test is made at the Adder 126 according to the instruction with the Condition Code being set in accordance with the result of the test. For a LOAD POSITIVE or LOAD NEGATIVE, the T/C gates 231 of Adder 216 are conditioned to enter the operand, complemented as required for the instruction, while LOAD COMPLEMENT always complements the operand. The numeric operations, ADD, SUBTRACT, COMPARE, and the CONNECTIVES, all require two operands and have a GPR 202 as a sink operand storage. The source operand may be from either a GPR 202 source or from an FLB 204–210. For SUBTRACTS and COMPARES, the operand which is to be subtracted is directed to the left input of Adder 216 where it can be complemented as required. The CONNECTIVES, i.e., AND, OR, and EXCLUSIVE OR, are performed within the Adder 216 in a separate data path and ORed into the Adder output. STORE operations route a data operand from the selected GPR 202 to Store Bus OR's 221 for transmittal to an SDB 244.

The multicycle OP's are either a fixed number of cycles, e.g. single word shifts or are data dependent as MULT, DIV, CONVERT TO BINARY, SHIFT DOUBLE WORD, etc. The RUM and RUA Decrement signals and the FXB Not Busy signals are sent to the I Box during the execution of these operations at times dependent upon the operation and the FXOS 201 Buffer Register is released to the I Box as soon as all data has been extracted from it, generally on the second execution cycle.

J. Variable Field Length Operations

The VFL Execution Unit generally operates with alphanumeric operands having no fixed length. Since such operands cannot normally be encompassed in a double word length, the operation is generally with one operand from storage and a second operand from either storage or a GPR 202. The VFL Logic Unit 212 operates for each cycle on a maximum of eight bits from each operand and these 8 bit bytes are supplied over the Source and Sink Busses 232 and 233 from the FA–FB and FC–FD Buffers. Since the length of storage in a buffer is 8 bytes, it will be necessary for the I Box 134 to keep these buffers filled until the whole of the VFL operands is utilized. The I Box 134 will issue an OP for each word to be used as either a source or a sink, will refill each buffer as the data word therein is utilized, and will indicate when the VFL operation is to terminate.

K. Main Storage Control Element

The Main Storage Control Element (MSCE) 136, FIG. 7, is the communication control unit between the E and I Boxes 133 and 134 on one hand, and on the other hand to the Main Data Storage units 104, and, through the PSCE 137, to Extended Storage Units 105 and the I/O units indicated in FIG. 1.

The MSCE 136 is logically divided into the following functional areas as shown in FIG. 7:

(1) Storage Address Bus (SAB) 240, Store Address Registers (SAR) 241 and Sink Bus 243,
(2) Storage Bus In (SBI) 242, Storage Bus Out (SBO) 155 and three Storage Data Buffers (SDB) 244,
(3) The Request Stack (RS) 245, and
(4) The Accept Stack (AC) 246.

The Storage Protect Feature 138, shown in FIG. 7, is as previously noted, described in detail in applicants' pending application No. 334,714, and will not be further described herein. It functions to store a protection code for each block of storage addresses in MS 104, for every reference to an address in MS 104 it compares the code for the block including that address with the code under which the program is operating to detect and signal any unauthorized storage operations.

The Storage Address Bus 240 receives from the I Box 134, the Maintenance Console 102 and PSCE 137, the address at which a storage operation is to be performed, as well as the instructions for performing that operation. The Storage Address Bus 240 is ingated to the Storage Address Registers 241, the Request Stack 245, the Accept Stack 246, and to the PSCE 137, for those storage addresses which are not contained within the MS 104. The Sink Bus is fed from the Accept Stack, the Maintenance Console 102 and PSCE 137, and carries, one cycle in advance of the presentment of data, the sink address of the unit to receive data requested from storage. The Sink Bus 243 is sensed by each unit which can expect to receive data from storage, i.e. the I Box 134, the FXPU 143, the FLPU 142, the Maintenance Console 102 and PSCE 137.

The SBI 242 is the bus carrying all data for insertion in MS 104 or EMS 105, and its only supply source from CPU 100 is through the SDB's 244 although it can also be ingated from the Maintenance Console 102 or the PSCE 137. Similarly the SBC 155 can receive data from the MS 104, PSCE 137, SPF 138 or Maintenance Console 102, and is outgated to the units which sense the Sink Bus 243, i.e. the I Box 134, the FXPU 143, FLPU 142, PSCE 137 and Console 102. The SDB's 244, as previously noted, are filled over a Bus 197 with data under control of store instructions issued by I Box 134 to itself or the E Box 133.

The Request Stack 245 is a group of four buffer registers to hold storage instructions which cannot be immediately put into operation as they are received, due generally to a "busy" condition of the module of Main Store 104 containing the desired operand. It will normally issue a stored request when the requested storage module becomes available and the stored requests will issue in a random order since there is little likelihood that the storage modules of MS 104 will become available in the same sequence as instructions are stored in Request Stack 245. If, however, there are two requests in Request Stack 245 which can be issued, or if there are two requests addressed to the same module, these will be issued in a First in-First Out status to insure issuance of every request and to preserve logical correctness. The Request Stack 245 has priority over the CPU in issuing instructions to MS 104 and when one of its buffered instructions can be issued, that instruction will be transferred into the Accept Stack 246 in preference to one from CPU 100 which will be blocked from access to the Accept Stack side of SAB 240.

The Accept Stack 246 is the main data control area of the MSCE 136. It is essentially a large pushdown stack of buffer registers in which stored data is moved downwardly one step for each machine cycle, so that it becomes available at various output control stations on a strict First In-First Out basis. The Accept Stack 246 has first a group of five Address buffers 248, each sufficiently large to store the address of any double word in MS 104. There are also a group of eight sink address buffers 249 to retain the return address of a word being fetched from storage, and also a column of 11 module designating buffers 250 to hold the designation of the module of MS 104 in which the fetch or store instruction was being performed.

It should be noted that buffers 248, 249, and 250 are simultaneously loaded with the data on SAB 240 and as all data progresses downwardly one step per machine cycle, the word address in buffers 248 will remain available for five cycles, the sink address in buffers 249 will be retained for 8 cycles and the module address in buffers 250 will be held for eleven cycles. The reasons for retaining such addresses for the given times is related to the ratio between the machine cycle under which the CPU 100 operates and the much slower cycling speed of the MS 104 modules. After an address has been issued to MS 104 and a module thereof has started to cycle, it requires nine machine cycles before the data for a fetch can be gated on to the SBO. However, only three cycles are required before the data for a store can be gated from the proper SDB 244 into the data register of a module. The sink address in buffers 249 is therefore retained in buffers 249 until the eighth cycle when it is gated from the lowest buffer 249 to the Sink Bus 243 to alert all sink units that data for the specified sink unit will be put on SBO 155 on the next cycle. For a store cycle, the stored data contained in the SDR 244 for the SAR 241 which started the store cycle, is outgated to SBI 242 three cycles after the store request is set on the SAB 240, as will be later described in more detail. The sink buffers 249 also store and shift the control data which accompanied the instruction. Such control data can include error signals, Maintenance Console 102 instructions, etc.

The eleven module designating buffers are used to control on the ninth cycle, the Data Out Gating controls to put the fetched data from the proper module onto the SBO 155. The additional buffer locations are required due to the construction of the modules of MS 104. As is conventional, each module is started cycling by supplying to it one of its addresses. After a fixed interval, herein taken as about eight machine (CPU) cycles, the data from the address location is present in a Storage Data Register in the module and can be gated out as is described above on the ninth cycle. For a store operation, some or all of the data at the addressed location is prevented from entering the Storage Data Register and its place is taken by data ingated from SBI 242. During the remainder of the module cycle, the information in the Storage Data Register is copied into the addressed location and after about the 13th machine cycle, the module can be readdressed for another operation. The eleven buffers of module designation stack 250 are continuously monitored to indicate the busy modules. Every address put on SAB 240 is decoded to determine the designation of the module having the storage address and that designation is compared with all of the module designations in stack 250 to determine if the requested module is busy. The storage address is transmitted to all storage modules and the entire information is gated into Accept Stack 246 and Request Stack 245. If, however, the required module is busy servicing a previous storage request, the request is rejected and tagged invalid in Accept Stack 246 where it will be ignored and will be tagged Valid and held in the Request Stack 245. It should be noted that every request is ingated to one of the Request Stack 245 buffers but is only tagged valid if the requested module cannot accept the request. Unless the valid tag is on, a buffer of the Request Stack 245 is considered empty.

One exception to the rejection of requests for data in a busy module is made when a fetch is to be made from a storage location which is already being fetched from or stored into. If the fetch address is contained within the five buffers of Address Stack 248, it is immediately accepted into Accept Stack 246 despite the busy state of the module. As above noted, the Storage Data Register of the module retains the fetched or stored data so that a second outgating of the data can be performed without the necessity of going through another storage cycle with consequent delay in supplying the data to the requesting unit. The Address Stack 248 is limited to five positions as it is believed that the time saved when the later fetch is more than five instructions after the earlier request does not justify the additional hardware and complexity required to eliminate the storage cycle.

Such detection of a request to a storage location presently being accessed is controlled by a Compare Unit 252 which compares on each machine cycle every address within the five buffers of Address Stack 248 and all addresses in the Request Stack 245 with the I Box 134 requested address on SAB 240 to detect any such request which can be accepted even though the addressed module is busy.

As noted above, Request Stack 245 has four buffer registers. In order to save time, each request applied to SAB 240, is stored in a selected one of these four buffer registers. However, the buffer register is tagged valid only when it is determined that the required storage module is busy. If the required module is not busy, the request in the buffer is not tagged valid and is ignored. When an indication is received that a storage module for which there is an outstanding request in Request Stack 245 is about to go not busy, Stack 245 has priority over any new requests from the I Box 134.

The Request Stack 235 will therefore put its address on SAB 240 and inhibit the application of an address to this bus by the I Box 134.

Since execution of a fetch request may be started as soon as it is entered into the Accept Stack 246, whereas a store request must wait until all of the required data is available, a situation could arise where a fetch request is received for data from a particular address while an unexecuted store request for storing in that address is in one of the SAR's 241. In order to prevent the fetching of improper data, the fetch request must be inhibited until the store operation has been completed. This objective is achieved by compare unit 254 at the SAR's which compares every address received on bus 240 with each address in the SAR's. A successful comparison in compare unit 254 means that the request cannot be executed and that it must therefore be stored in Request Stack 245. The entry in Request Stack 245 is chained to the corresponding entry in SAR 241, so no attempt to execute the fetch request will be made until the store has been completed.

Various other multiple access conditions to a single memory address may also exist in the system. When multiple fetch requests are made to the same memory address, the fact that there is an unexecuted request to that address in Request Stack 245 is noted by compare circuit 253, and the two requests are chained together. These requests are executed on a first in-first out basis with the second request, in almost all cases, being applied to SAB 240 on the cycle immediately after the cycle that the first request is supplied to this bus. This is the only exception to the rule that a Request Stack entry is not applied to SAB 240 when the required module is busy. More than two requests to the same storage address would be handled in the same manner. If the request is to an address which is already in one of the five address positions of Accept Stack 246, this fact is noted by Compare Unit 252, and the request is validly entered into the Accept Stack even though the indicated module is busy. In this manner multiple access may be had to the same storage address with only a single storage select operation. Again, more than two requests to the same address would be handled in the same manner. Finally, the presence of two successive store requests to the same address is detected by compare circuit 254 and the requests are chained together in SAR 241. Successive store requests to the same address are likewise handled on a first in-first out basis in order to preserve logical continuity.

It is to be noted that each module of MS 104 can retain the readout or stored data in its Storage Data Register until the module is recycled. As above noted, this feature permits a fetch from an address to be performed following a fetch from or a store into that address of the module. Also, the Accept Stack 246 contains no transient information and will store data indefinitely unless during a machine cycle a clock pulse is gated thereto to step data down through the Accept Stack 246 and out the bottom. Consequently, no data will be lost if the HSCE is temporarily halted. This feature is quite advantageous for diagnostic error testing where the serviceman can cause the Main Storage 104 and MSCE 136 to progress by single machine cycles to enable each stage of the storage operation to be checked for error.

L. MSCE controls

The controls in MSCE 136 have two main functions. First, a decision must be made as to which addressing source is to be gated on to the SAB 240, and secondly, assuming that some address is put on the SAB 240, another decision must be made as to which of the instruction buffer units is to be selected.

The first decision may be considered as a priority allocation for it enables a selection between simultaneously calling sources. In every machine cycle, the priority conditions are examined to determine which source is to gate on to SAB 240 in the next cycle, and at the same time, the present contents of a previously selected source are being transmitted over the SAB 240. There is thus an overlapping of service and effectively the SAB 240 can service one storage access call during each machine cycle.

The general order of priority is:
(1) EMS 105 data returns to CPU 100 or MC 102.
(2) PSCE 137 request for data from MS 104.
(3) Maintenance Console 102 returns data to the I Box 134 or E Box 133 or applies requests to MSCE 136 for MS 104 or EMS 105.
(4) Request Stack 245 issue to MS 104 for a multiaccess request.
(5) SAR 241 request for MS 104 or EMS 105 service.
(6) Request Stack 245 to MS 104 or EMS 105 for service.
(7) CPU 100 request to MS 104 or EMS 105 for a fetch.

Priority 1 is generated as a result of a previously issued request from CPU 100, or MC 102, for a fetch from EMS 105. When PSCE is about to select an EMS 105 storage module, a signal is sent to MSCE 136 to create a time slot on the SBO 155.

Such a time slot on SBO 155 is created by not gating anything to SAB 240 during a cycle so that the Accept Stack has a vacant position. Nine cycles later there will be no data gated out of MS 104 when this vacant position reaches the Data Out Gating position in Accept Stack 246 and PSCE is free to put its data on SBO 155, and also, of couse, to put the sink unit address on the Sink Bus 243 during the preceding machine cycle. Since the PSCE 137 created the time slot, it knows when the Sink Bus 243 and SBO 155 will be available and it gates its data out accordingly.

137 to MSCE 136 of the need of some data device connected.

Priority 2 arises as a result of the notification by PSCE to the PSCE 137 for a storage reference to MS 104. The MSCE 136 continuously decodes the module designations in the upper eight positions of section 250 of Accept Stack 246 and signals to PSCE 137 the designations of the modules which are identified in those positions. Since it requires four machine cycles for the decoded designation to be transmitted from the MSCE 136 to PSCE 137, and for the PSCE 137 to respond by making a request, MSCE 136 notifies PSCE 137 of the availability of a module by signalling a not busy condition of a module four machine cycles prior to the end of the storage cycle. The PSCE 137 has priority over the other users of SAB 240, and it can then issue its request, which it knows will be addressed to a module, which will be available when the PSCE request is received by MSCE 136, and that the request will be received by the Accept Stack 246. It is the responsibility of the PSCE 137 to be ready to accept the data return at the time it is set onto SBO 155.

Priority 3 puts an address from MC 102 on SAB 240 as soon as the requested module is not busy, i.e. its designation does not appear in any buffer of the section 250 of Accept Stack 246 and its busy signal is therefore not energized.

Priority 4 gives next priority to a second instruction of a multiaccess pair of instructions. When the first of such instructions is stored in Accept Stack 246, the MS signal on SAB 240, along with an identification of a buffer in Request Stack 245, causes the contents of the designated buffer to be the next instruction gated out on SAB 240 into Accept Stack 246, so that the instructions are executed in logical order, but without unnecessary intervening storage cycles.

Priority 5 enables a store to MS 104 to be executed when ready. As soon as one of the three SDB's 244 is set with data, the corresponding SAR 241 requests priority within the group of SAR's 241, where priority is on a first in-first out sequence among the ready SAR's. Thus, if the SAR has priority within the SAR's 241, and no higher priority has claimed SAB 240, the instruction on SAR 241 will be put on the SAB 240 for storage in Accept Stack 246, or Request Stack 245, in accordance with the Busy-Not Busy condition of the requested Storage Module.

Priority position 6 is given to the Request Stack 245. Each buffer within Stack 245 with a valid instruction compares the designation of the storage module needed for execution of its instruction with the Busy-Not Busy condition of the module as decoded from the designations of the modules in Section 250 of Accept Stack 246. If more than one Request Stack Buffer compares its module designation with that of a non-busy module, a sub priority of First In-First Out controls which buffer shall be gated on to SAB 240. When a buffer of the Request Stack 245 designates for a fetch request, a storage address which is also contained within an SAR 241, the buffered fetch request is for the fetching of data which has not yet been stored and the request cannot be allowed to compete for priority. It will, however, be designated as a multiaccess buffer and given fourth priority when the instruction in SAR 241 is issued after the required data has been stored in SDB 244.

The last priority position is given to CPU 100 requests for storage service which may comprise a direct request for a fetch, the instruction being stored in either Request Stack 245 or Accept Stack 246, depending upon the Busy-Not Busy condition of the required storage module, or which may comprise storage of the instruction in an SAR 241 for a store cycle. As a safety feature, the CPU 100 cannot issue storage instructions when the Request Stack 245 is full. This prevents possible loss of the instruction for lack of a buffer to store it in.

To optimize the overlap operation of storage units, for optimum priority and optimum utilization of the SAB 240, knowledge of the future condition of availability of a storage unit is as valuable as knowledge of its present availability. The module designations in Section 250 of Address Stack 246 are therefore decoded to generate three module busy signals for each module. A first busy signal is the busy to PSCE signal which goes not-busy four machine cycles before the actual end of a storage cycle of a module. The use of this signal enables the PSCE, as above noted, to be preset to claim a module for operation as soon as its cycle times out. A second busy signal is Busy to Priority which drops two machine cycles prior to the end of the modules cycle. This signal when down allows the Maintenance Console 102 or Request Stack 245 to be preset to use the SAB 240 during select time.

The third busy signal for a module is Busy to Select which drops only one machine cycle before the end of the storage module cycle. When this line drops, a select signal can be generated to start the module on its next operating cycle when the SAR 241 or CPU 100 requests the module provided that the use of the SAB 240 is not claimed for a higher priority function. If the SAB 240 into the Accepted Stack is so claimed, then the SAR 241 or CPU 100 request is inhibited. Obviously, all three of the busy signals for a module are down when the module is not cycling, and all signals will go busy together when the module starts to operate.

The second control condition is the decision of whether or not a storage module is to be selected for an address on the SAB 240. After it is decided in the priority controls which source, if any, shall gate an instruction on to SAB 240, the MSCE 136 must decide what to do with the information to appear on SAB 240. When data is set on SAB 240, it is stored in the topmost position of Accept Stack 246, an SAB Valid Signal is set for one machine cycle, and the storage address on SAB 240 is sent to all storage modules. The Accept Stack 246 decodes this address to determine the designation of the module containing the address and checks the busy-not busy status of the Busy to Select signal for that module. If the Busy to Select signal is down, the selected module recognizes its address on SAB 240 and retains the requested address and starts cycling. At the same time, the topmost position of Accept Stack 246 is tagged valid.

As the capacity of MS 104 is limited, it may happen that the address set on SAB 240 represents a storage location in EMS 105, and if so, when this address is present on SAB 240, it is routed into a buffer register in PSCE 137 for decoding and selection of a location in EMS 105, as will be later described. In the event that the buffer of PSCE 137 is not available, the storage request will be handled as a request for a busy MS 104 module.

In the event that the needed PSCE 137 or MS 104 module are busy, the instruction information which has already been gated into Request Stack 245 is tagged walid to prevent further stores into that buffer of Stack 245, and as above noted, will be issued to SAB 240 when the required storage module is about to go not busy. The multiple access considerations set out previously for double instruction references to a single address may prevent a selection of a non-busy storage module whose address comes up on SAB 240, or may cause a second instruction to be set into Accept Stack 246 without another selection signal to a busy module. When the multiaccess situation is detected between the SAB 240 address as set in from CPU 100, and a storage address in a store instruction in an SAR 241, it is too late to prevent the issuance of a select pulse to the storage module required, and such a pulse will issue if the instruction would otherwise be executed. However, in this case, the Sink Address Section 249 of Accept Stack 246 is prevented from being set and although the storage module goes through its storage cycle, there is no sink signal sent out on Sink Bus 243, so no unit is alerted to gate in the information on SBO 155, and it is lost for that cycle.

M. Peripheral Storage Control Element

The Peripheral Storage Control Element (PSCE) 137 controls the flow of data between the MSCE 136, the Extended Main Storage 105, and the Input/Output (I/O) Channels 106 and 122, see FIG. 1. As indicated in FIG. 8, the PSCE 137 is comprised of three major sections, the Bus Control 260, the Common Channel Control (CCC) 261, and the Storage Channel (SC) 262. The Bus Control (BC) 260 is the central unit of the PSCE 137 and communicates directly with MSCE 137, with EMS 105, with CCC 261, and with CS 262. All accesses to EMS 105 by CPU 100 through MSCE 136, as well as all accesses to MS 104 by either the CS or an I/O unit pass through Bus Control 260. In order to maximize utilization of EMS 105, the Bus Control 260 maintains a request stack that may contain up to eight requests. As any module of EMS 105 becomes available, the Bus Control 260 scans this stack and initiates a storage cycle if there is a request for the not-busy module. Since the BC 260 will start cycling of any needed module as soon as it is not busy, storage requests may be handled out of sequence. Requests to MSCE are similarly handled for as above noted, any module of MS 104 drops its Busy to PSCE signal four machine cycles before the end of its storage cycle, thereby giving the Bus Control 260 of PSCE 137 time to call for use of the module as soon as it is not cycling. Since the PSCE has first priority on calls to MSCE 136, BC 260 can be sure that when it does issue a storage instruction to MSCE 136, the request will be accepted and BC 260 can proceed to another item.

The Common Channel Control (CCC) 261 provides for the attachment of up to five Selector Channels 122 and one Multiplier Channel 106. The channels all attach directly to CCC 261 which in turn communicates with the BC 260. All channel storage requests are monitored by the CCC 261 to maintain priority among them, and the CCC 261 also controls the sequencing of the issued I/O instructions, machine interruptions and unusual conditions. When high speed I/C devices fetch from MS 104, the CCC 261 takes on the responsibility of prefetching data into the buffers of Bus Control 260 to insure that data is available when needed.

The Storage Channel (SC) 262 controls data transfers from one storage to the other. The SC 262 appears to BC 260 as a control unit and its I/O device with both attached to a selector channel as 122. It responds to instructions of the selector channel type and uses the command and interrupt formats of such a channel. All communications between SC 262 and the storage modules are handled by the BC 260 and can be overlapped with other system activity.

N. Bus Control

The basic internal structure of Bus Control 260 is shown in FIG. 9, and consists of five major elements. These are the Input Busses, the Queue, the Control Stack, the Output Busses and the Priority Control. There are five Input Busses, of which two, EMS In Bus 264 and EMS In Bus 265, handle fetch returns from EMS 105 with Bus 264 being controllable to feed the PSCE Output bus SBO 155 when the EMS fetch is for CPU 100. The SAR 240 brings in requests passing through MSCE 136 and SBO 155 supplies data returns from MSCE 136. The Input Request Bus 266 enters all storage requests from the CCC 261, from SC 262, and from Maintenance Console 102.

Queue 268 is a stack of eight 115 bit buffer registers having a 72 bit data field (64 data bits, 8 parity bits), a 24 bit address field, a nine bit mark field, a six bit key field and a four bit error field. Each request accepted by BC 260 will be assigned to one of the eight buffer registers until the request has been supplied. The function of the fields are:

Data.—Hold data to be stored until the selected storage module has accepted store data during a store cycle, or to receive fetch data when available from a storage module during a fetch cycle.

Address.—The storage address of the request is retained here until it can be received by storage.

Mark.—An eight bit byte with a parity bit to specify which bytes of the addressed double word (8 bytes) are to be changed during a store cycle. When a bit signal is present the corresponding byte is to receive a data byte from the Data field.

Key.—This field is for the Storage Protect Key which must compare with that of the protection key for the addressed storage location.

Error.—These four bits are separately settable to indicate which type of error has been detected in execution of the request. The indicated errors are Data Check (bad parity) Address Check (bad parity), Storage Protection Violation (wrong key used) and Invalid Address (not contained in the storage modules).

On a Store request, the assigned queue register holds its data until the memory select signal is generated and the data has been gated into the data storage register of the storage module. On Fetch requests, the buffer register of Queue 268 holds the data therein and remains busy until the storage fetch is complete and the data has been gated out to the requesting unit.

Queue Control Stack 269 is a set of eight 30 bit registers having the following data fields:

Primary Decode.—12 bits to indicate the storage being requested.

Source Address.—Eight bits (seven bits plus a parity bit) to identify the unit requesting the storage operation.

Full/Empty.—A bit which is set when a word has been returned due to a fetch request.

Hold.—A bit to prevent a request from being erased after it has been executed. This bit is used for maintenance to prevent cancellation of a request and may also be used to eliminate a defective register for if this bit is set the associated control register cannot be stored into.

Active.—A bit set to indicate that this Control Stack Register is presently occupied by a pending request.

Operation.—Three bits individually settable to indicate one of three CPU 100 operations, Set Tag, Insert Tag, and Test and Set.

Queue Link.—Three bits plus a parity bit settable in combination to identify the Queue Register which has been assigned to this request.

The Control Stack 269 contains all information necessary to establish priority and initiate storage cycles for requests in the Queue 268. In order to determine a First In-First Out relationship, the Queue Sequencing is accomplished by entering new requests into the bottom of the stack and moving all previous requests toward the top.

There are four output busses which are used to transmit data and control information to storages and channels. The EMS Request Bus 270 provides the data and control path from the registers of Queue 268 to EMS 105. The SBO 155 is used to send requested EMS data to MSCE 136 or the CPU 100 and SAB 240 makes storage requests for MS 104 data for EMS 105. The fourth bus is the CCC Bus 272 which returns data from EMS 105 to the Storage Channel 262 or the I/O Channels by way of CCC 261.

The Control Stack 269 is monitored by Priority Control 273 in order to provide for sequencing and routing of requests in the BC 260. The Control Stack 269 is scanned by Priority Control 273 for the following list of functions:

(1) To assign a queue register of Queue 268 to a store or fetch request from CPU 100, SC 262 or CCC 261. The assignment is based on the next available register in Queue 268, and is conditioned by channel activity and priority among requesting elements.

(2) To generate storage requests. This decision is based on the busy status of storage modules and on unit priority when the same storage is being requested by different units.

(3) To return storage fetch data to the Queue 268. To perform this function, the Queue link data is sent to the storage module at the start of a fetch cycle and is returned shortly before the fetch data. The Input Priority section 274 of the Priority Control controls the gates for moving data coming in on EMS Bus 264 into or around the Queue 268.

(4) To return fetch data from Queue 268 to the requesting element. The decision depends upon the identity of the requesting unit. For a CPU 100 request fetch data is transmitted to SBO 155 as soon as possible after the fetch data is put in the Queue 268, but this is not necessarily in the same order as the requests were received. For the Storage Channel 262 data remains in the Queue 268 and may be readdressed if the transfer were on a double word boundary. Control words and single data words are returned to the channel when requested. For I/O requests through CCC 261, the data is transmitted when requested by the I/O device.

Every action of Bus Control 260 requires access to either the Input Busses or the Output Busses or both. However, most actions are independent of each other and may be taken concurrently. Some of the independent actions of Bus Control 260 are:

For Input Busses—
(1) Fetch returns on SBO 155 from MSCE 104 to Queue 268.
(2) Fetch returns from EMS 105 to Queue 268.
(3) Fetch requests from CPU 100 on SAB 240.
(4) Either an I/O Store/Fetch request or a Storage Channel 262 Store/Fetch Request.

For Output Busses—
(1) EMS 105 fetch return to CPU 100 on SBO 155.
(2) A request to EMS 105 on EMS Request Bus 270.
(3) A request to MSCE 136 on SAB 240
(4) Either a fetch return to CCC 261 or a fetch return to SC 262 on Bus 272.

P. Common Channel Control

The Common Channel Control 261 performs the pre-priority function among the Channels 106 and 122 for storage requests and interrupt actions. Effectively, the CCC will pass to the Queue 268 any request received from a channel 106 or 122. It is only when two channels make simultaneous requests that one will be granted a built-in priority and be the first to have its request transmitted to Queue 268. In view of the difference in the operating speeds of a device connected to a channel and the internal operation of the PSCE, the momentary delay in transmitting a request is of no importance to the channel operation.

Q. Storage Channel

The Storage Channel 262 provides a fast data transfer from one storage to another and as above noted, this transfer can overlap other system activity. The transfer can be between all addressable highspeed core storages connectable to MSCE 136 and to PSCE 137, but cannot include paths to I/O devices connected to channels through CCC 261. A minor limitation is that the data items transferred cannot be bounded in storage addresses by any less than full word boundaries, i.e. no address of a word to be transferred, nor the address to which it is to be transferred can have other than two rightmost zeros.

The SC 262 communicates with the MS 104 and EMS 105 through the Bus Control 260, and consequently takes advantage of the Bus Control Queue 268. Since the function of SC is to transfer words between storage locations, each action of SC 262 requires a Fetch/Store combination of requests. The SC 262 will send fetch requests to the Bus Control 260 as long as space is available in Queue 268. At the same time, the SC 262 will send the corresponding store address to the data portion of the Queue register so that it will in effect accompany the fetch request. When Queue 268 makes the fetch request from the storage location specified in the address portion of the register, the store address is transferred from the data portion into the address portion of the register. Such a change converts the initial fetch request to a store request waiting for data and consequently when the fetch data returns into the data portion of the register, a store request is initiated to put the data into the other storage location.

VI. FLOATING POINT UNIT

The detailed embodiment of this invention is provided in the floating-point execution unit of a computer system, since that is the best mode presently contemplated by the inventors. The other parts of the computer are briefly explained herein, so that the reader can understand the overall utilization of the embodiment in the environment of a computer system within which it fits as an integrated building block.

Figure 17B:
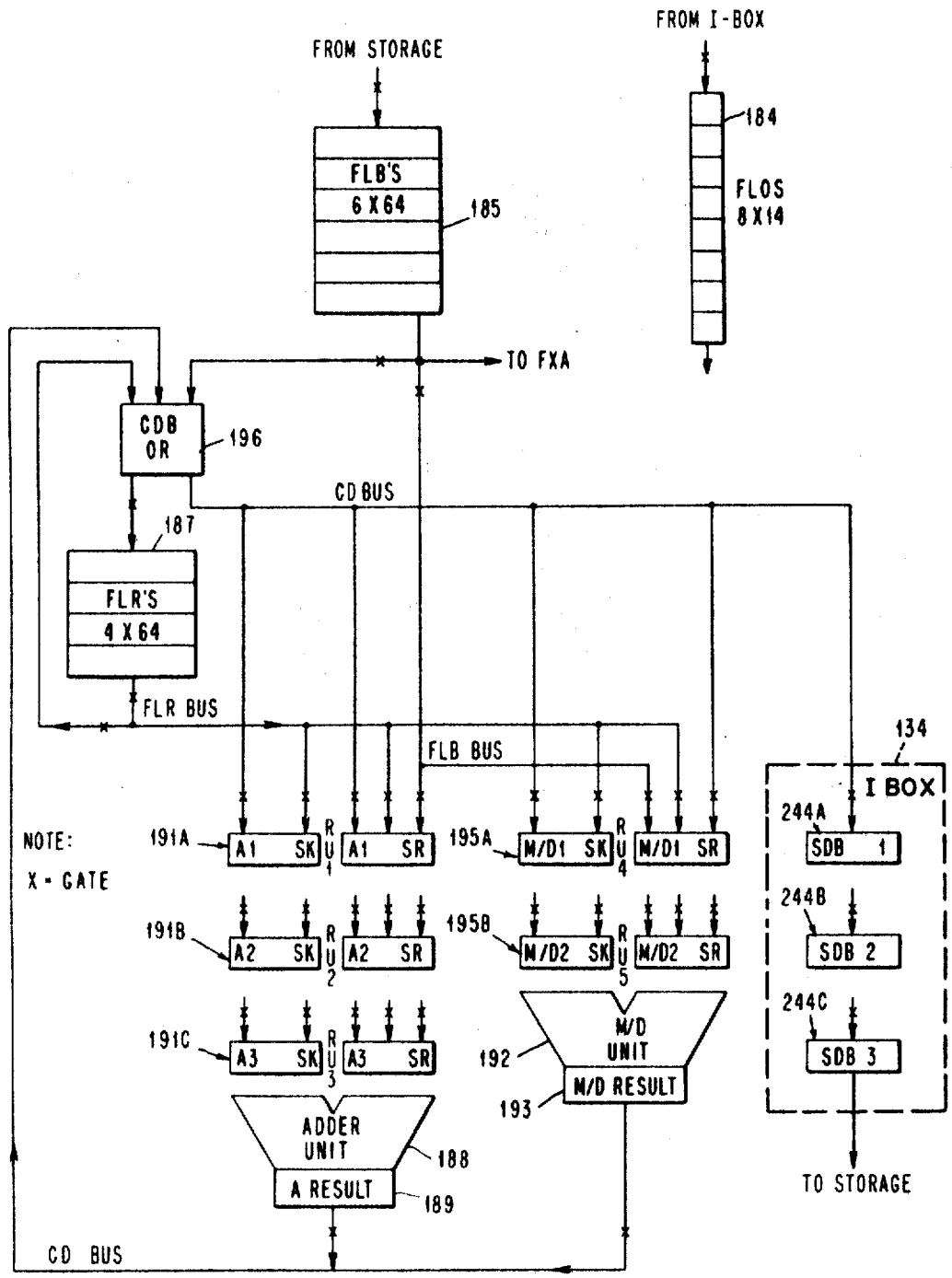

The basic arrangement of FLPU 142 is shown in FIGURE 17B, which is represented in a more detailed level in FIGURES 18A and B. It consists of five basic operand handling units: (1) FLB's 185, (2) FLR's 187, (3) adder 188 and its RU's 191, (4) M/D unit 192 and its RU's 195, and (5) three SDB's 244.

The detailed embodiment of the invention shown in FIGURES 18A and B and other drawings will be described in this section. It is within the more general form of the invention previously described in this specification. Thus the detailed form which follows executes Floating-Point Instructions, because this type of instruction set has had the greatest need for speed improvement. The invention, however, is usable with any type of instruction set. A general understanding of the Floating-Point Instruction set is necessary to understand the detailed embodiment.

A list of the Floating-Point Instructions and their mnemonics, format type, and operation codes (hexadecimal) follow:

| Name | Mnemonic | Type | Hex-Dec Code |
|---|---|---|---|
| Load (Long) | LDR | RR | 28 |
| Load (Long) | LD | RX | 68 |
| Load (Short) | LER | RR | 38 |
| Load (Short) | LE | RX | 78 |
| Load and Test (Long) | LTDR | RR | 22 |
| Load and Test (Short) | LTER | RR | 32 |
| Load Complement (Long) | LCDR | RR | 23 |
| Load Complement (Short) | LCER | RR | 33 |
| Load Positive (Long) | LPDR | RR | 20 |
| Load Positive (Short) | LPER | RR | 30 |
| Load Negative (Long) | LNDR | RR | 21 |
| Load Negative (Short) | LNER | RR | 31 |
| Add Normalized (Long) | ADR | RR | 2A |
| Add Normalized (Long) | AD | RX | 6A |
| Add Normalized (Short) | AER | RR | 3A |
| Add Normalized (Short) | AE | RX | 7A |
| Add Unnormalized (Long) | AWR | RR | 2E |
| Add Unnormalized (Long) | AW | RX | 6E |
| Add Unnormalized (Short) | AUR | RR | 3E |
| Add Unnormalized (Short) | AU | RX | 7E |
| Subtract Normalized (Long) | SDR | RR | 2B |
| Subtract Normalized (Long) | SD | RX | 6B |
| Subtract Normalized (Short) | SER | RR | 3B |
| Subtract Normalized (Short) | SE | RX | 7B |
| Subtract Unnormalized (Long) | SWR | RR | 2F |
| Subtract Unnormalized (Long) | SW | RX | 6F |
| Subtract Unnormalized (Short) | SUR | RR | 3F |
| Subtract Unnormalized (Short) | SU | RX | 7F |
| Compare (Long) | CDR | RR | 29 |
| Compare (Long) | CD | RX | 69 |
| Compare (Short) | CER | RR | 39 |
| Compare (Short) | CE | RX | 79 |
| Halve (Long) | HDR | RR | 24 |
| Halve (Short) | HER | RR | 34 |
| Multiply (Long) | MDR | RR | 2C |
| Multiply (Long) | MD | RX | 6C |
| Multiply (Short) | MER | RR | 3C |
| Multiply (Short) | ME | RX | 7C |
| Divide (Long) | DDR | RR | 2D |
| Divide (Long) | DD | RX | 6D |
| Divide (Short) | DER | RR | 3D |
| Divide (Short) | DE | RX | 9D |
| Store (Long) | STD | RX | 60 |
| Store (Short) | STE | RX | 70 |

A. Instruction groups

The Floating-Point Instructions can be separated into three basic instruction groups: move, add/subtract, and multiply/divide.

(1) *Move group.*—The move group of instructions consist of all load and store type of instructions. These two types of instructions have two main features in common. They both move data from one location to another and only use one operand. In the case of the Load and Test instruction, the operand is also tested for a zero, positive, or negative fraction.

The load type of instructions are used for moving an operand from one data register to another within the FLPU.

Besides moving data, the Load Complement instruction complements the fraction sign bit, and Load Positive and Load Negative instructions force the fraction sign bit positive or negative, respectively.

The store type of instructions is used for moving an operand from the FLA to the main storage (via the main storage control element).

(2) *Add/subtract group.*—The add/subtract group of instructions consists of all Add, Subtract, Compare, and Halve type of instructions. Except for the Halve instruction, all of the instructions use two operands. The floating-point add unit is used to execute the instructions.

(3) *Multiply/divide group.*—The multiply/divide group of instructions consists of all multiply and divide type of instructions. Both instruction types use two operands and instruction execution takes place in the floating point multiply/divide unit.

B. Instruction execution timing

The three main timing sections A, B, and C are shown in FIGURE 55. Certain operations occur during each section; however, all instructions do not use all three sections. The normal Load (LDR, LD, LER, and LE) and Store (STD and STE) instructions only require section A; all other instructions require sections A, B, and C. (It will be seen later that overlaps may exist between the timings defined herein.)

(1) *Section A timing.*—All Floating-Point Instructions require section A timing. Normally, section A consists of two machine cycles. During the first cycle, designated as the decode cycle, the OP code and certain address tags are distributed to FLPU control circuits. The second cycle, designated as the select cycle, permits selection of an execution unit (FIGURE 55). In some cases, an operand, if available in one of the floating-point registers, is transferred to the selected execution unit during the select cycle. This operand transfer cycle is designated as the data 1 cycle.

Section A cycles of consecutive instructions are overlapped so that the decode cycle of one instruction occurs during the select cycle of the previous instruction (see OP 1 and OP 2, FIGURE 55).

If both operands are available in the floating-point registers, a third cycle (data 2) cycle occurs (OP 3, FIGURE 55). When a data 2 cycle is required, the decode cycle of the next instruction is overlapped with the data 2 cycle rather than the select cycle (see OP 3 and OP 4, FIGURE 55).

(2) *Section B timing.*—This section is the time required to execute the instruction. All instructions, except for the previously mentioned normal load and store instructions, require section B timing. The section consists of a variable amount of machine cycles, called execute cycles, depending upon the type of instruction. An example of instructions and their respective number of execute cycles are shown in the following list.

Instruction:                                Required cycles
    Load and test _____ 2
    Load complement _____ 2
    Load negative _____ 2

| Instruction: | Required Cycles |
|---|---|
| Load positive | 2 |
| Add | 2 |
| Subtract | 2 |
| Compare | 2 |
| Halve | 2 |
| Multiply | 3 |
| Divide (short precision) | 9 |
| Divide (long precision) | 12 |

(3) *Section C timing.*—During section C timing, the result of the instruction execution is transferred from the execution unit to other FLPU circuits or to Storage Data Buffers in the main storage control element.

C. FLPU detailed circuits and operations

The relative timing for detailed components within the detailed FLPU shown in FIGURES 18A and B is shown in FIGURES 56, 57, 58 and 59.

The FLPU 142 buffers a sequence of up to eight Floating-Point Instructions in FLOS 184. The FLPU also can store up to six operands from Main Storage in FLB's 185 and can store up to four operands in four working registers called FLR's 187. Also the FLPU has as its execution units an Add Unit 188, and an M/D Unit 192, and each has its own plural RU's. Each Execution Unit RU stores can store two operands. Thus FLPU 142 is essentially a small specialized computer under the overall control of the I Box 134. As was set out in the description of the I Box, any instructions for the floating point unit are sufficiently decoded to identify that the instruction is for FLPU 142 and the operation part of the instruction is sent thereto. If the instruction also specifies the FLR's 187 as the source and sink of the required operands, these two addresses will be also transmitted to FLPU 142. If, however, an operand from storage is needed, the I Box will determine which of the FLB's is available for use, will insert the address of the FLB in the instruction sent to FLPU and will call for the storage fetch to be returned to that buffer. These instructions are sent to and stored in FLOS 184 in sequential order.

Each instruction issued by the FLOS is decoded sufficiently to allow making decisions about selecting a unit to execute the operation, directing the required operands to the execution unit, and providing the sink for the result of the operation. FIGURE 20 illustrates the bit fields in each of the eight registers comprising FLOS.

Normally, each operation is handled by the FLPU for two internal machine cycles. The first cycle is the decode cycle, the second cycle is the select cycle. Cycles of sequential operations are overlapped such that the select cycle of the first operation occurs simultaneously with the decode cycle of the second operation.

Instructions are issued from the stack in strict sequence at the maximum rate of one per machine cycle. This is represented by FIGURE 11. However, they may be completed out of sequence. This poses a problem when two instructions have the same sink register, since the second instruction may not begin until the first is completed. One way to ensure this is not to issue the second instruction until the first is done, i.e., has placed its result in the sink register. When no precision conflict exists, the only condition issuing a Floating-Point Instruction is the availability of an RU to execute it. A precision conflict exists when there is a difference between the Floating-Point Instruction and any busy FLR called for by the operation. If the conflicting FLR is busy, the System will handle the operation by the first method mentioned above.

When an operation is issued from the stack, the FLOS decoder 595 monitors the OP code field to determine the type of operation to be executed. Listed here are the types of information required by FLOS decoder 595 to make decisions about RU selection for execution and the routing of operands to the RU.

(1) OP's to be executed by the adder.
(2) OP's to be executed by the M/D Unit.
(3) RX OP's (main storage-to-register operations).
(4) RR OP's (register-to-register operations).
(5) Single-operand OP's.
(6) Sink FLR busy or available.
(7) Source FLR busy or available.
(8) OP's to be executed by the FLPU.

Information types 1, 2, and 8 are required for selection of the proper RU for execution of the OP, while types 3, 4, 5, 6, and 7 are utilized in routing of operands.

All floating-point operations, when issued from FLOS, are decoded into groups or classes for ease in handling. For example, all of the operations which require the adder unit for execution are decoded to generate a signal called "Adder Unit required." A similar decoding exists for all operations requiring the M/D Unit for execution. Groups which are decoded in this manner are listed here along with a short description of each.

(1) *Adder unit required.*—This group includes all arithmetic operations to be executed by the adder unit. These OP's are:

OP—
   Add
   Subtract
   Compare
   Halve
   Load Positive
   Load Negative
   Load Complement (2) *M/D Unit Required.*—This group includes all operations to be executed by the M/D Unit. These OP's are:

OP—
   Multiply
   Divide (3) *OP's handled in the FLPU.*—These OP's include:

OP—
   Load
   Load and Test
   Store (4) *Single-operand operations.*—This group includes load positive, load negative, load complement, load and test, load, and halve.

(5) *Store.*—This is also a one-operand operation, but it is grouped by itself as it requires special handling.

Groups 1 and 2 together are referred to as arithmetic OP's; that is, all those operations which require the adder or the M/D Unit are arithmetic OP's. The instruction format is changed in the I-Box 134 to a format particularly suited for the FLPU before each instruction is sent to the FLOS 184 in the FLPU in FIGURE 5. (The system of FIGURE 5 conforms to FIGURE 17A or 17B.) The instruction format received by FLOS is shown in FIGURE 20. The controls for moving instructions into and out of FLOS 184 is shown in FIGURE 19. The operation of the FLOS decoder controls is represented by the flow diagram in FIGURE 46. Thus, it is not necessary to decode RR versus RX or the precision of the operation, since this information is provided in the SO bit and the S/L bit for each position of FLOS. If the SO bit is a one, the second operand is defined as a storage operand, hence the name SO. Lack of this bit implies the OP to be RR. If the S/L bit is one, the precision is short, and lack of a bit implies long precision for the operation.

The SO bit is included in the source tag to make it a 5-bit tag. However, the source tag originates from the source FLR, while the SO bit originates from the FLOS decoder 595.

When an instruction in FLOS 184 receives a GO signal, it is decoded in the FLOS decoder 595 at the output of FLOS 184, which determines what units are required for execution of the instruction. Its CP Code and the FLR sink tag are transmitted to the sinks of all unbusy Reservation Units (RU's) during the decode cycle for each instruction in FLOS 184. Every unbusy Reservation Unit will sample the transmitted information, and it will continue to sample the information sent during the decode cycle of every instruction until it is selected. The sampling comprises actually entering the sink tag into a set of latches in each unbusy RU and retaining it until the next set of data is put on the FLOS output. A source tag is sent simultaneously only for arithmetic instructions. When an execution unit is selected for the execution of the instruction, the operation code already in its latches will be frozen into the units control circuit by setting a Unit Busy Trigger, and the tags which accompanied will remain in the RU 560 or 561 or the RU for an SDB. The RU is selected during a machine cycle, called a Select Cycle, following the decode cycle. That RU is thereafter tagged busy and will not again sample the control signals until it has completed its operation and placed its result signals on the CDB 196. It has actually been determined that the time saved by the provision of three separate Add units (one per Add RU) and two separate M/D units (one per M/D RU) instead of one Add Unit 188 with three sets of RU's 191 and one M/D unit 192 with two sets of RU's 195 is negligible or non-existent for most programs.

Before any RU can be selected it is necessary to bring up the FLOS GO signal during the instruction decode cycle. FIGURES 44A and B, FIGURE 45 and FIGURE 46 provide a flow diagram of the operation of the decoder hardware for generating a GO signal and for then generating a "step-the-stack" signal that outgates (OG) the next instruction from FLOS into decoder 595. FIGURE 47 is a flow diagram connecting to the diagram in FIGURE 44B to represent the operation of RU and SDB selection. The conditions required for generation of GO are dependent upon the operation to be performed, but may include such tests as:

(1) A precision (S/L) match between an instruction and the data in a sink register.
(2) A precision (S/L) match between an instruction and the data in a source register.
(3) Is a required type of RU available.
(4) Is operation tagged conditional.
(5) Is the operation cancelled.
(6) Is the FLOS empty.

The second cycle of operation handling in the FLPU is called the select cycle for the operation. The general set of activity which takes place at the cycle boundary between the decode cycle and the select cycle of an operation is called update in the FLPU. Update for any operation takes place at the first cycle boundary after GO is generated.

Update consists of some combination of the following:

(1) Turn on the selected RU's Select Trigger for one cycle.
(2) Set Unit Busy Trigger for the selected unit.
(3) Set the FLB part of the address of the instruction into the FLB address part of the Buffer 191 or 195 and turn on a GO when Full (GWF) tag for the addressed FLB.
(4) Set the FLR part of the address of the instruction into the FLR address part of the Buffer 191 or 195 and turn on a busy trigger for the FLR.
(5) Set a Sink FLR outgate trigger.
(6) Set a Source FLR outgate trigger.
(7) Step the Operating Stack to the next instruction.

It is to be noted that during the decode cycle, the RU will receive the tag (address) of the unit which is to send it the required operand or operands, and such tags (addresses) will be latched in when the RU is selected. During a select cycle of an arithmetic operation, an available sink operand from the appropriate FLR 187 will be put on the bus for receipt by the selected RU. If, however, the sink FLR has not yet received the required operand from a unit, i.e. an FLB 185, the Add Unit 188 or M/D unit 192, it will have a busy bit TB set to "1," which is discussed in more detail at a later point; and instead the FLR will have in its control circuits the name tag of the unit which is to supply the operand to the CDB 196 for transmission to FLR 187. If the sink FLR 187 has a set TB busy during the select cycle when its stored operand is to be transmitted, the FLR 187 will instead transmit the tag of the unit that will supply the operand. This tag will replace (update) the FLR tag sent to RU 191 or 195, so that the execution unit which is to supply the operand can determine when to put its identification (name tag) on CDB 196, whereby its identification will be recognized by the receiving unit (or units), which will thereupon in-gate the operand into it on the next cycle. This system of transmitting a tag (representing an operand supplying unit when the operand is not available in the supplying unit) may be called an "Advance Execution System" because it sets up the best operand-transfer paths for the future time instant when the operand becomes available. The "Advance Execution System" will enable substantial execution time to be saved, since it is not necessary to stop decoding instructions to await the fetch of operands for each instruction being decoded, and the final path is much more direct than if all intermediate paths were required to be followed by the operand. An additional advantage is that each FLR 187 is always free to receive a new operand at the end of every decode cycle.

In FIGURE 18A, the eight positions of FLOS 184 are shown with an output connected through a gating network 445 to an instruction decoder 200 which normally processes each instruction in one machine cycle so that it can normally process all eight instructions in FLOS 184 in eight machine cycles. However, FLOS 184 is continually receiving new instructions from the Instruction Unit through gate 446 under control of the In-Index Control 555 operated by the Valid Operation line 443 from the I-Box. After the decoding cycle (normally one machine cycle), the instruction is removed from FLOS by a Step-the-Stack signal on lead 444. After the decode cycle, the FLPU has no further need for the instruction being in unit 200, since other circuits within FIGURES 18A and B are set up to handle the execution remaining for that instruction. The selection of which FLR is the sink and which is the source and the order of outgating is done in response to the R1 and R2 fields in decoder 200. The R1 Bus 200F and R2 Bus 200G each include four select lines for FLR control. The R2 Bus 200G also includes six lines for FLB selection.

An OP decode circuit 595 examines the OP code and SO bit of the instruction. The OP code indicates the type of instruction, and the SO bit indicates it is an RR or RX type instruction. If the instruction requires an RU, a line 595B activates a gate 531 which receives another input from an RU priority circuit 528 which is active if any RU of the type required by the instruction is available. The types of RU's involved are (1) Adder RU's, (2) Multiply/Divide RU's, and a ZET RU. A Unit Busy Trigger 563 with the decode circuits represents each RU Busy or Availability status for RU selection. All of the RU Busy Triggers 563 provide inputs to RU priority circuit 528, in which there is one RU priority circuit per RU type. The RU REQUIRED signal output of OP decode circuit 595 activates AND Gates 529 (of which one is representatively shown) which send out the address of the selected RU circuit to both the FLR tag field selected by a gate 194 under control of the R1 and/or R2 fields of the instruction in decoder 200, or to the sink address field 185B selected by a gate 558 in FIGURE 18B under control of the R2 field of instruction in unit 200.

Thus, AND Gate 531 is activated during the early part of a decode cycle if a required type of RU is available. Its output is provided to an AND Gate 532 which receives its other inputs from an FLR Status Generate Circuit 182 controlled by the Busy Bit (TB) with each FLR selected by the instruction in decoder 200. Gate 532 is activated by leads 182C and 182D only if the decoding of the FLOS instruction is to continue. The qualifications for continuing the decoding are that (1) there is an S/L precision match with respect to each FLR required, or (2) if the precision does not match that all required FLR operands are available. Lead 182C indicates availability or precision match for the source FLR operand if one is required, and lead 182D does likewise for the sink FLR operand. Each lead 182C or 182D also is activated if its respective source or sink operand is not called for by the instruction. When gate 532 is activated, it provides an output signal called an instruction GO signal, which enables the remaining execution of the instruction in decoder 200.

As shown in more detail in FIGURE 24, the precision match inputs for gate 532 are generated within circuit 182 by determining if the S/L bit in the required FLRs for the instruction have the same setting for both the new instruction precision and the prior setting of the S/L bit for the respective FLR.

In FIGURE 18A, the GO signal enables the AND Gate 530 for the selected RU (only one of a group of AND Gates 530 is enabled by a line from AND Gate 529 representing the RU selected by priority circuit 528). One of a plurality of RU select triggers 577 (representing the selected RU) is set by the next clock pulse to begin the select cycle, and to set busy the respective RU Busy Trigger 563. The output of the selected trigger 577 is sent on a lead 939 to the Unit Busy (UB) trigger in a respective RU to select that RU to control subsequent execution of the instruction (see FIGURE 31).

FIGURES 49, 50, and 51A and B are flow diagrams representing the operation of the FLR's and FLRB.

Also the GO signal from gate 532 is used to generate a Step-the-Stack signal on lead 444 from an OR Circuit 526, which steps FLOS 184 to the next sequential instruction, unless AND Gate 533 receives a One-Cycle Inhibit signal which would delay stepping the stack for one machine cycle. This delay is required in the special case where both operands of an RR arithmetic instruction are available in FLR's, or where the source operand is available for an RR Load Instruction, or where the sink operand is available for a Store Instruction. These inhibit conditions are respectively determined by AND Gates 538, 539, and 540 which are connected for one-machine cycle through an OR Circuit 548 to an input of AND Gate 533. And Gate 538 is conditioned by an RR arithmetic OP decode from circuit 595, and leads from FLR status generate circuit 182 indicating that both the Source and the Sink FLR's are available as specified by the instruction. The availability of each FLR operand is indicated by testing its Busy Bit (TB).

During the machine cycle following the decode cycle, the source operand, if available is sent to the Reservation Unit on the FLRB. FIGURE 50 shows a flow diagram representing the FLR available conditions. A Two-Cycle Trigger 523 controls the transfer of available operands for RR Arithmetic instructions, and a Move Data Trigger 524 controls the transfer of available operands for RR Load and Store Instructions. If only one operand is available, whether it be sink or source, it is transferred on the FLRB during the machine cycle following the decode cycle. If both operands are available, the source operand is transferred on the FLRB during the machine cycle following the decode cycle, and the sink operand is transferred on the FLRB during the next machine cycle. This delay is controlled by the One-Cycle Inhibit signal from OR Circuit 548.

Figure 18B:
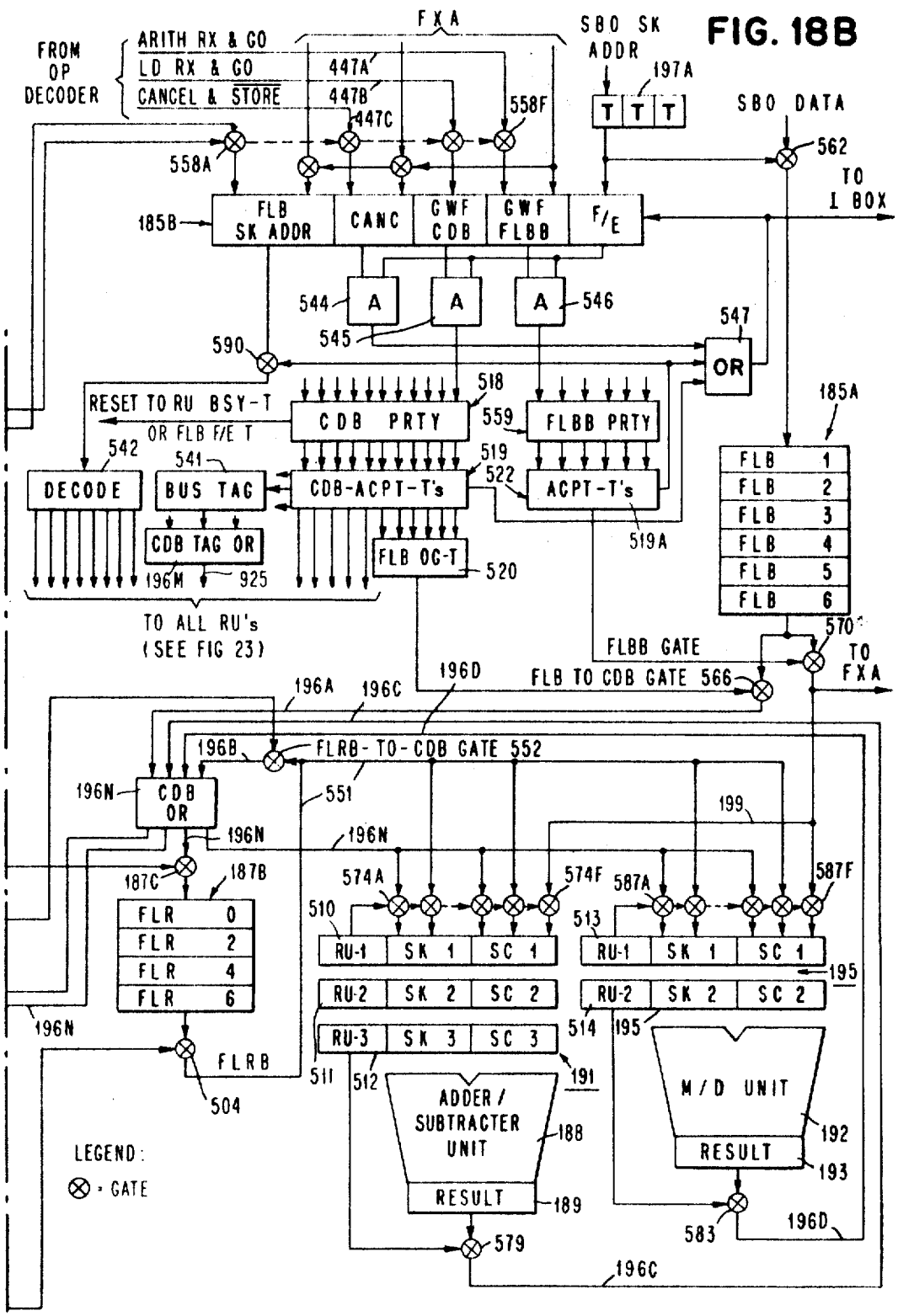

Thus, in FIGURE 18B, when either one or both operands of the current instruction are available in the FLR registers 187B, the FLRB control 535 in FIGURE 18A is operated to cause the transfer of each available FLR operand on the FLRB during a machine cycle (or cycles) immediately following the decode cycle for that instruction. Circuit 535 is shown in more detail in FIGURES 25A and B in conjunction with each FLR register and its control. The inputs to circuit 535 shown in FIGURE 18A are: the opposite outputs from the Move Data Trigger 524, the opposite outputs from Two Cycle Trigger 523, arithmetic instruction decode line 595A from OP decode circuit 595, an input line from an OR Circuit 536 (provides a signal when either a source or sink FLR operand is available), a Sink Available lead 182E from generate circuit 182, a sink select bus 200F and a source select bus 200G from the instruction decode circuit 200, a Source Available lead 182F from AND circuit 537, and a Both Sink And Source available signal from gate circuit 538 for RR arithmetic instructions.

Whenever one or both RU tags is all-zeros, the RU expects an ingating from the FLRB during the machine cycle immediately following the decode cycle. The all-zero tag settings are done during the decode cycle for that instruction and the operand transfer on the FLRB must immediately follow on the next one or two cycles. Thus in FIGURE 31 when an all-zero RU tag is received on one or both leads 182A or B that all-zero tag immediately causes the setting of an ingate 574B to connect the FLRB to the respective registers 510A or B, so that on the immediately following cycle, the data is ingated from the FLRB to the required RU register. ON the other hand if both RU sink and source tags in tag registers 929 and 930 are all-zero, then both sink and source RU ingates 574B and 574E are enabled, so that the first FLR operand (source operand) ingates into both. Then the setting of a source full trigger 960 immediately thereafter blocks the source ingate 574B so that on the next cycle only the sink ingate 574E can receive the sink operand.

The SO bit is off for all instructions using FLR source tags, zero or otherwise. Therefore, gate 945 interlocks the all-zero tag signal from unit 935 with the SO bit being off.

When UB Trigger 940 is set, it disables all control input gates 934–N and enables gates 954–958 to condition the ingates 574–E to the RU operand registers 510A and 510B, for example. Thus gate 955 is enabled by the set UB trigger 940, and it enables gate 574B to ingate an available source operand from the FLRB. Hence, this is how the RU's receive available data from FLR's on the FLRB.

FIGURES 60, 61, 62, and 63 are flow diagrams representing the operation of the RU's.

The Move Data Trigger 524 is used during a Load or Store Operation when data is available in the specified FLR which is to send an operand. Thus trigger 524 is set by the output of an OR Circuit 527 which receives outputs from AND Gates 539 and 540, that respectively indicate the availability of the operand to be transferred for a Load or Store Instruction. Also the output of the Move Data Trigger 524 causes a Step-the-Stack signal to override any inhibit signal that AND gate 533 might have received.

If an RR Load instruction is decoded and the source FLR is available, a transfer from one FLR to itself or to any other FLR must be done by outgating the source FLR onto the CDB from the selected gate 504 through FLRB-to-CDB Gate 552, and then ingating from the CDB into the sink FLR through the selected sink gate 187C. This requires a CDB cycle, which is obtained by forcing the highest priority on the CDB priority circuit 518 in FIGURE 18B in response to the setting of the Move Data Trigger 524.

In FIGURE 25B, a gate 535A is energized by the ON output 524A of trigger 524 and output 539A from gate 539. This activates a selected (R2) source gate 535F to set a selected Outgate Trigger 187D for outgating during the next cycle, during which FLRB-to-CDB Outgate 552 is enabled by Trigger 552A. The FLRB-to-CDB Trigger 552A is set by a gate 535G maintained on for two machine cycles; the first cycle being actuated by gate 535A, and the second cycle being actuated by the CDB Accept Trigger output 519A shown in FIGURE 18B. Thus the source FLR is outgated on the CDB during the second cycle, during which a selected FLR ingate 187C is enabled by the TB bit being off for that FLR. The CDB Accept Trigger Output lead 519A also activates a selected gate 535P, which sets a respective CDB Compare-Equal Trigger 535S through an OR Circuit 535T, which sets the selected FLR Ingate Trigger 187E. The source operand is then ingated into the sink FLR.

If a Store Instruction is decoded and the register to be stored is available, the outgating to the CDB is the same as for an RR Load. The Move Data Trigger 524 likewise forces a CDB cycle. However there is no ingrating to any FLR as in the RR Load. Instead, the Store Instruction outgating to the CDB is handled in the normal CDB manner, in which the receiving RU (in this case a selected SDB) uses a tag compare to ingate the operand from the CDB.

The Two-Cycle Trigger 523 is set in response to an Arithmetic RR instruction in which both operands are available. Although the Two-Cycle Trigger is up for only a single machine cycle, it controls both selected FLR outgate triggers 187D for two cycles. In FIGURE 25B, gate 535C is energized during the decode cycle when the sink FLR operand is available. If both operands are available, the Two-Cycle Trigger 523 is set at the end of the decode cycle. The output of gate 535C energizes a selected R1 gate 535K to set the selected FLR Outgate Trigger 187D at the end of the decode cycle upon the occurrence of the next Clock Pulse (CP). The sink operand is therefore outgated onto the FLR during the next machine cycle. At the end of the next cycle another clock pulse resets the FLR Outgate Trigger 187D to end this outgate cycle. The same clock pulse resets the Two-Cycle Trigger. (The set input of any Trigger overrides a simultaneous reset pulse.)

The Two-Cycle Trigger is set at the end of the decode cycle by the clock pulse actuation of gate 538A in FIGURE 18A. Thus Two-Cycle Trigger 523 is set during the cycle that the source operand is on the FLRB. In FIGURE 25B, gate 535D is energized at the end of that cycle by the clock pulse than occurring; this sets the sink (R2) selected Outgate Trigger 187D, which may be for the same or a different FLR, and overrides the simultaneous CP reset pulse to that selected Outgate Trigger 187D. Accordingly the sink available FLR is outgated to the FLRB on the next cycle.

If only one operand was available during the RR arithmetic decode, the Two-Cycle Trigger would not have been set. Hence there would not have been a second data cycle on the FLRB. If the sink operand is available instead of the source operand, gate 535B is energized to set the selected Outgate Trigger 187D. Thus the sink FLR only is outgated to the FLRB during the machine cycle following the decode cycle. As a result, the FLR outgates to the FLRB are up for two cycles when a condition exists of availability for both source and sink FLR operands for the RR arithmetic instruction being decoded. The FLR Busy Bit Trigger is reset by the ON output of the FLR ingate trigger to indicate that the contents of the ingated FLR will be valid.

In FIGURE 25B a FLRB-to-CDB gate trigger 552A is also shown which is activated by the Move Data Trigger 524 in response to an RR instruction in the same manner that Outgate Trigger 187D was set during its second cycle. Thus a Load RR Instruction transfer with an available FLR source operand occurs on the second cycle after the decode cycle.

On an RX Load Instruction, the R2 field of instruction in decoder 200 indicates the FLB to which the storage operand is to be sent from main storage. The FLB-R2 field was determined in the I-Box. The output of the R2 field in decoder 200 brings up the FLB select line 200G which enables the FLB Gate 558A so that a sink address from the RU address gate 529 can be set with the selected FLB. It is understood that one control circuit 185B is provided for each FLB operand store register 185A and that it is selected by one of six leads from the bus represented by 200G. Also for an RX Load a signal is provided from OP Decoder 595 on lead 447B to set a GWF–CDB bit for indicating that the CDB is to be used when the FLB becomes full. If the instruction was an RX arithmetic type, a signal would have been provided from the decoder on lead 447A to set the GWF–FLBB bit which indicates that the operand is to be provided to the FLBB when it is available in that FLB. The Full/Empty (F/E) bit with each FLB indicates the availability of the operand in the FLB. This bit is set to one when the operand is gated into the selected FLB from main storage. Whenever the F/E bit is set to one (indicating that the operand is available in the FLB), this bit provides an output to enable gates 544, 545, and 546. The use of the cancel bit (enabling gate 544 to provide a signal to the I-Box) was treated in the I-Box portion of this specification and will not be discussed any further in the FLPU section.

FIGURES 48A and B are a flow diagram illustrating the operation of the FLB's and FLBB.

If gate 545 is enabled by the GWF–CDB bit, a signal is provided to a CDB Priority Circuit 518 (also shown in FIGURE 28) which receives an input from each unit which can provide an output to the CDB. All the other units that can transmit to the CDB are shown in FIGURE 28, including the result registers operating with the respective RU's at the execution unit. If any conflict exists due to simultaneous requests from these units, only one unit is selected according to the priority arrangement shown in FIGURE 26. The timing of the operation for a CDB cycle is shown in FIGURE 27.

FIGURES 52A and B provide a flow diagram representing the operation of the CDB Priority Circuit 518. The request to priority circuit 518 is the initial cycle, and the responsive output of the priority circuit sets a CDB Accept Trigger 519 that provides an Accept Cycle which causes a Bus Tag to be transmitted through the CDB tag OR Circuit 196M to all of the receiving units on the CDB. The FLR or RU expecting to receive the CDB data will have an identical tag stored therein, representing the address of the FLB (or Result Register) sending the data.

FIGURE 22 shows a detail of the FLR connection to the CDB, and FIGURES 30 and 31 show detail on RU connections to the CDB. If any FLR or RU finds a compare-equal situation between its stored tag and the received bus tag, then it sets its ingates to the respective register associated with the stored tag. On the next cycle, the data appears on the CDB since the Accept Trigger 519 has set the FLB Outgate Trigger 520 which enables FLB-to-CDB gate 566 to transfer of the data from the selected FLB to the waiting RU or FLR with enabled ingates.

Whenever CDB Priority Circuit 518 grants a CDB time slot to an RU or FLB, it sends out a reset signal to the RU Busy Trigger or F/E trigger so that thereafter that RU or FLB indicates a non-busy or empty signal and can receive sink or source tags from the FLR status generate circuit 182.

If the GWF–FLBB bit had been set in a particular FLB, then when the F/E is set to indicate availability of the operand, the AND Gate 546 provides an input from the particular FLB to an FLB priority circuit 559. In case of concurrency of requests for the FLBB by plural FLB's, a priority is used according to the numbering order of the FLB's.

The priority circuit 559 gives the requesting FLB a time slot on the FLBB by setting an FLBB Accept Trigger 522 for that particular FLB to enable an FLB-to-FLBB gate 570 to connect the source FLB operand register of the arithmetic RU source register. The FLBB Accept Trigger also provides an output that enables a gate 590 which causes the sink address of the accepted FLB to actuate a decode circuit 542 that signals the addressed RU on a line 542A (see FIGURE 31) that actuates the required gates 944, 954, and 574A so that the respective source operand can be gated into register 510A on the next cycle. The delay to the next cycle is obtained by the trigger at the output of each gate 944–948.

The following summary will assist in understanding the overall operand transfers that occur in FIGURE 17A or B, or within FIGURES 18A and B:

D. Summary of FLPU operations and major formats (1) *Arithmetic operation data flow.*—The arithmetic operation consists of all add, subtract, halve, multiply, and divide type instructions. FIGURES 37, 38, and 40 show the data flow for this operation. The data flow for all arithmetic operation instructions is basically the same. The main exceptions to the flow are which execution unit is used (add unit or M/D unit), instruction format (RR or RX), and whether data is immediately available in the FLB's or FLR's.

If operands are available in the FLR's and the instruction is in the RR format, both the sink and source operands are transferred from the FLR's to the execution units via the FLRB. After the arithmetic operation is completed, the results are transferred via the CDB to the sink FLR. Two exceptions to this data flow are the halve and compare instructions. The halve instruction is only a one operand instruction; therefore, only the source operand is transferred from the FLR's to the add unit. The result of the halve operation is then returned to the sink FLR. The compare instruction is basically a subtract operation and uses the same data flow as the subtract instruction (i.e., from the FLR's to the add unit via the FLRB). However, the operation result is never transferred from the add unit to the FLR's; instead, a condition code signal is sent to the I-Box.

If the operands are available and the instruction is in the RX format, the sink and source operands are supplied by the FLR's and FLB's, respectively. The sink operand follows the same data flow as the RR format sink operand. The source operand flow is from the FLB's via the FLBB to the selected execution unit. The results of the operation are then transferred from the execution unit to the sink FLR via the CDB. The RX format compare instruction results are handled in the same manner as the RR format compare instruction results.

When data is not available in the FLR's or the FLB's, the tagging system is used to set up the transfer of operands to the proper execution unit. The tag transfer process is represented by FIGURE 35. FIGURES 36A, B, C, D, and E represent the tag transfers under the various cases that can occur in the detailed embodiment of this invention. This process prevents unnecessary delays in the FLPU operation due to the sink and source operands not being immediately available. For example, if an RX format Add instruction is selected for execution and the sink and source operands are not available, tags are sent to the selected RU to indicate where the data is coming from. Then, when the data is available, a tag is put on the bus one cycle before the data, and is compared with the tag in the RU. A match between the two tags enables ingating of the data. In this example, assume that the sink FLR has a tag=M/D indicating it is waiting on the results of a previous arithmetic operation from the M/D Unit 192, and the M/D–RU has a tag=FLB2 indicating its source is waiting for data to arrive from storage into FLB2. In decoding the Add instruction, the sink FLR=M/D is sent to a selected Add RU 191 as the FLR tag. When the M/D Unit 192 completes its operation, the M/D Unit 192 puts its identification as the bus tag on the CDB which is compared with the tags in all RU's. A match condition results at the waiting Add RU, and the M/D Unit 192 results are ingated into the waiting Add RU 191. Thus, no time is lost in decoding subsequent sequential instructions while waiting for an operand to pass through an intermediate register (the FLR), which is bypassed. A tag identifying the source FLB is also sent to the waiting RU. When the storage data arrives, the FLB tag is placed on the bus and is compared with the source tag in all RU's. A match condition in the waiting RU enables ingating of the FLB operand into the waiting RU. Then the Add RU has both operands and can signal the Add unit to execute them.

FIGURE 34 represents a worst-case timing relationship between a decode cycle for one instruction and an asynchronous CDB operation for some prior decoded instruction.

(2) *Handling of arithmetic instructions.*—In somewhat more detail, when the conditions for GO are met for an arithmetic RX instruction execution, it is handled for at least two cycles. The GO conditions are precision match, or, if no precision match, available for the sink operand and a unit available to execute the operation. The select cycle follows the decode cycle and overlaps with the decode cycle of the next operation. If the sink FLR operand is available, a sink FLR–OG trigger 504 is set on during the select cycle, and the sink FLR operand is gated to a selected Reservation Unit over the FLRB. If the sink FLR is busy, the tag would have been sent to the RU's during the decode cycle.

The second operand is always an FLB for every RX arithmetic instruction. The address of the FLB to receive the operand from storage is in the R2 field of the instruction. The FLB is given the "go-when-full on the FLBB" signal and tagged with the address of the selected reservation station. Arrival of the operand from memory is asynchronous with decoding the operation; therefore, the go-when-full trigger is set for the buffer, and the FLPU proceeds with the decoding of the next operation. FIGURE 54 shows major waveforms during the execution of a particular Arithmetic instruction using FLR–0 as its sink and FLB–2 as its source.

Arithmetic RR instructions require, in addition to the conditions for RX OP's, a precision match, or available condition, for the source operand. If the sink FLR is busy, and the source FLR is available, the source FLR–OG trigger is set on during the select cycle, and the source operand is gated over the FLRB to the Reservation Units. The sink FLR tag would have been sent to all unbusy RU's during the decode cycle.

If the converse conditions exist, e.g., the sink FLR is available and the source FLR is busy, the sink FLR–OG trigger is set, and the source FLR tag would have been sent in the decode cycle. FLR tags are gated to the RU's only if the selected FLR is busy and required as an operand by the instruction being decoded. An ungated tag appears as an all-zero tag at the RU's for either an available sink or source FLR.

The Arithmetic RR instructions are handled for two cycles for the cases mentioned earlier. The decode of the next instruction overlaps the select of the first in the normal manner. However, the exception to the select cycle described here occurs when both operands of a two-operand operation reside in available FLR's. Two cycles are required for transferring the operands to the execution unit.

The source operand is sent to the Reservation Units via the FLRB in the normal way (during the select cycle). The sink operand is sent on the following cycle. This is accomplished by suppressing the Step-the-Stack signal, and turning on the sink FLR–OG trigger during the decode cycle. The two-cycle trigger is set on at the start of the first data cycle (select cycle) and turned off at the start of the second data cycle. The two-cycle trigger is then used to set the sink FLR–OG trigger and to Step-the-Stack at the start of the second data cycle.

Single-operand RR operations do not require three cycles of handling in the FLPU, as the sink operand is not sent to the execution unit.

Two general data path types are provided (1) transfer operation, and (2) arithmetic operation. Initially, Floating Point Instructions are loaded into the FLOS from the I-Box and floating point operands are loaded into the FLB's from main storage. Once the FLOS and FLB's are loaded, the FLPU data flow is dependent upon the type of instruction being executed.

(3) Transfer operation data flow.—Transfer type of operations consist of all Load, Sign Control and Store instructions. The data flow for the transfer operation is shown on FIGURES 41, 42, and 39 respectively.

The Load (RX format) instruction (FIGURE 41) consists of transferring either a long or short operand from an FLB to an FLR via the FLBB and CDB. The load (RR format), and load and test instructions have the same data flow except that the operand is tested by the ZET Unit 553 for equal to, greater than, and less than zero during the load and test instruction. The main flow for the Load (RR) and Load and Test instructions is from an FLR to another or the same FLR via the FLRB and CDB.

The sign control instructions (Load Positive, Load Negative, and Load Complement—FIGURE 42) are all in the RR format. The data flow consists of transferring an operand from an FLR over the FLRB and CDB to the add unit where the operand sign bit is forced positive, forced negative, or complemented, respectively. The modified operand is then sent over the CDB to another or the same FLR.

The Store instruction (FIGURE 39) consists of transferring data from the FLBB, FLR or Result Registers to the Storage Data Buffers in the Main Storage Control Element. The data flow from an FLR to a Storage Data Buffer is via the FLRB and CDB. The data flow from an FLB or Result Register is only on the CDB to a SDB.

A more detailed summary of Load and Store Operations follows:

(4) Handling of RX Load instructions.—These instructions are strictly data transfer from storage to one of the FLR's with no data manipulation. FIGURE 33 represents the timing for the execution of a RX Load instruction. FIGURE 54 shows major waveforms during the execution of a particular RX Load instruction from FLB-1 to FLR-0. The operand is fetched from storage by the I-Box and routed to one of the FLB's 185A by the MSCE. When the operand arrives over the Storage Bus Out, it is gated into the proper FLB, according to the SBO sink tag. The FULL trigger for that FLB is set. The FLPU handles the RX Load for the normal two cycles-decode and select with update taking place on the cycle boundary just before the select cycle.

The R1 field of the instruction contains the address of the sink FLR, while the address of the FLB to receive the operand is in the R2 field.

The condition for generating GO during the decode cycle is precision match or available for the sink FLR. It is not necessary to test for an unbusy FLB to receive the operand, since the I-Box has done this prior to issuing the instruction to FLOS 184. The I-Box will direct floating-point operands to available (unbusy) FLB's only. Update for the RX Load consists of setting the FLB address into the sink FLR tag register, setting the Busy Trigger on for that FLR, and turning on the go-when-full-to-CDR trigger for the FLB, as defined in the R2 field. The FLOS does not wait for the operand to arrive in the buffer. After FLOS sets the go-when-full-CDB trigger for the selected FLB, it proceeds with decoding the next operation. No actual select signal is sent to the buffer for the RX Load execution, so the select cycle is reduced to a name of the cycle following the decode cycle. Further activity in this cycle is dependent upon the status of the FLB at the time.

(5) Handling of RR Load or Load and Test Instructions.—These instruction are executed by the FLPU as strictly data transfer operations. The source FLR operand (R2 field) is to be transferred to the sink FLR (R1 field). FIGURE 32 represents the timing for the execution of a RR Load instruction. In the case of Load and Test Instruction the operand is also tested by ZET 553 for a fraction of zero, positive or negative. No manipulation of data operands is required for these instructions. The operation of ZET 553 with Condition Code (CC) bits is represented by the flow diagram in FIGURE 53.

When the fraction test portion of the Load and Test Instruction is treated as a separate function, the data transfer portion of the execution is handled the same as for the RR Load Instruction.

Stated simply, the data transfer function moves the source FLR operand to the sink FLR, as defined in the R2 and R1 fields, respectively, of the operation. Conditions for generating GO for the instruction decode are precision match or that the sink FLR is available, and likewise for the source FLR operand. The update activity depends upon the conditions that allowed GO to be generated.

If the source FLR operand is available at update time, that is the operand to be moved. For this case, it is necessary to gate the source FLR to the FLRB, gate the FLRB to the CDB, and gate the CDB to the sink FLR.

The FLR's outgate to the FLRB only, and they ingate from the CDB only.

If the source operand is available for an RR Load, three cycles of handling are provided in the FLPU. The cycles are the decode cycle, the first data cycle, and the second data cycle. Update takes place between the decode cycle and the first data cycle. The update activity required is:

(1) Inhibit Step-the-Stack signal.
(2) Inhibit turn-on-sink FLR Outgate Trigger signal.
(3) Inhibit CDB Priority logic.
(4) Turn on Move Data Trigger.

Inhibit of the CDB Priority logic will reserve a slot on the CDB for the second data cycle of this operation (this is the earliest guaranteed CDB slot which can be reserved).

The Move Data Trigger is used to turn on the source FLR OG trigger and the FLRB-to-CDB Gate Trigger for the second data cycle. It is also used to generate Step-the-Stack signal, to turn on the sink FLR Ingate Trigger, and to turn off the sink FLR Busy Trigger, if it is on. The Move Data Trigger is a One-Cycle Trigger. It is on for the duration of the first data cycle. The first and third cycles of this case are overlapped with the preceding and the following instruction decode cycles in the FLPU.

The precision for these operations is handled by the precision convention chosen for the CDB. Precision is handled on the CDB as follows: All units which gate onto the CDB will do so in long precision, at the same time, all units which gate from the CDB have split ingates, and each will gate the operand from the CDB in the precision indicated by its precision trigger. These precision indicators will have been set by a previous operation for each particular unit.

For the case when the source operand is not available in the source FLR at update time, the move data operation is simpler. For this case, it is necessary only to move the tag from the source FLR to the sink FLR and set the sink FLR Busy Trigger on. Busy FLR's monitor the CDB tag for notification that its operand will be on the CDB next cycle.

The move data portion of Load and Test, as well as the RR Load are covered in the two cases just described. The test portion of the Load and Test Instruction done using ZET 553 is described here.

The Load and Test operation will set the CC register in the I-Box to a code indicating the fraction of the operand to be zero, or positive, or negative, as the case may be. This operation, when issued to the FLOS, is accompanied by the CC bit. If the CC bit for this operation has not been erased by a more currently issued operation, the operand for this operation, when on the CDB, tested by ZET 553 and the signals sent to the I-Box to set the CC register to the specified code. The signals required to energize the zero tester (ZET Unit 553) for the Load and Test operation has additional activity at update time.

For the first case, when the operand to be tested resides in the source FLR, the Move Data Trigger is used to turn on the ZET RU Unit Busy Trigger only if the CC bit is still active for this operation. If the CC bit has been erased, the ZET RU Unit Busy Trigger is not turned on, and the operand is moved without being tested.

For the second case—a busy source FLR—when the source FLR tag is being moved to the sink FLR, it is also set into the ZET RU tag register (4 bits) along with the proper precision, and the ZET RU Busy Trigger is turned on. With the ZET RU Busy Trigger on, the unit monitors the CDB tag for a match. This is the indication to the ZET unit when to test the operand for the second case.

(6) Handling of Store instructions.—The store operation in the floating-point section of the machine is a data move operation where the contents of the sink FLR is transferred to the Store Data Buffer (SDB), defined in the R2 field of the operation. FIGURE 32 represents the timing for the execution of a typical Store instruction. FIGURE 54 shows major waveforms during the execution of particular Store instruction from FLR–0 to SDB–1. The operation is handled by the FLPU for 2 or 3 overlapped cycles dependent upon the conditions which generate the GO signal. The conditions necessary to generate GO for this operation are precision match or available for the sink FLR, and the SDB defined in the R2 field of the instruction must be empty.

Three signals are sent to the FLPU from the SDB's indicating their empty status. These signals are monitored by the FLPU to determine when GO can be generated for the operation.

The CDB is used for routing floating operands to the SDB's. When GO is generated for a store operation and the operand is avalable in the sink FLR, the operation is handled for three cycles in the FLPU. These cycles are the decode cycle, the first data cycle, and the select cycle. The select cycle is also the second data cycle (CDB slot).

The activity at the cycle boundary between the decode and the first data cycle is:

(1) Turn on sink FLR–OG trigger.
(2) Inhibit CDB Priority logic.
(3) Inhibit Step-the-Stack signal.
(4) Turn on Move Data Trigger.

The inhibit CDB priority signal will reserve a slot on the CDB for the second data cycle. The Move Data Trigger is used to generate a select to the SDB, to turn on the gate FLRB to CDB trigger, and to Step-the-Stack for the next operation. The first and third cycles of this operation are overlapped in the FLPU operation.

For the case when the sink FLR is busy, the store operation is handled for two overlapped cycles in the FLPU. The cycles are decode and select cycles. The activity when the sink FLR is busy, is to move the sink FLR tag to the RU of the SDB during the decode cycle, and to send the select signal the following cycle. The SDB will then monitor the CDB tag for a tag match.

A summary description follows of the major components found within FIGURES 18A and B:

(7) Floating-Point Buffer (FLB).—The six floating-point storage operand buffers (FLB's) may be referred to as FLB1, FLB2 . . . FLB6. Each FLB is capable of holding a 64-bit, long-precision, floating-point operand, including appropriate parity bits. Status indicators associated with each FLB are defined below and in FIGURE 21:

*F/E bit.*—This bit defines the validity of the contents of the FLB. It is set F (full) when data is gated to the FLB from the SBO (Storage Bus Out). It is set E (empty) when data is gated from the FLB to either the CDB or the FLB, or is canceled.

*Cancel indicator.*—The cancel indicator is turned on, instead of the GO triggers, for any floating-point RX Load or RX Arithmetic instruction being cancelled by the FLOS. When the cancel indicator is on, and the buffer contains valid data, the buffer status is reset and the FLB release signal is sent to the I-Box.

*GWF–CDB indicator.*—The go-when-full Common Data Bus Trigger determines that the FLB is to be outgated to the CDB when it contains valid data. It is set on at the completion of the decode cycle for a RX Load instruction. When the FLB is gated to the CDB, its status is reset and the FLB release signal sent to the I-Box.

The data path for loading the FLR's from storage is: main storage-to-SBO-to-FLB-to-CDB-to-FLR.

*GWF–FLBB indicator.*—The Go When Full floating buffer bus trigger determines that the FLB Bus is to be outgated to the FLB when it contains valid data. It is set on at the completion of the decode cycle of and RX Arithmetic instruction.

The data path for the second operand (source) for the RX Arithmetic instruction is: main storage-to-SBO-to-FLB-to-FLBB-to-source register of the Reservation Unit selected to execute the instruction.

*Sink address.*—The sink address consists of four bits and is used to direct fetch operands to the proper sink via the FLBB Floating-Point sink addresses are set at the completion of the decode cycle of the floating-point RX Arithmetic instruction. The sink address which is set will correspond to the Reservation Unit selected to execute the instruction. The FLB's are shared with the fixed-point section of the machine for certain fixed-point operands. The addresses for fixed-area sinks and the GWF–FLB trigger are set in the FLB status triggers when a signal, Request for FLB, is received from the fixed-point operation decode logic. A fixed-point request signal is required for each FLB. Sink address assignments are shown in FIGURE 21.

The data path for fixed-point operands is: main storage-to-SBO-to-FLB-to-FLBB-to-FLR.

*FP, AE and MALS.*—These bits are control bits associated with the operand using any particular FLB. They are fetch protect, address exception, and multiaccess link suppress, respectively. They are handled as data bits in the FLB's when the operand is transmitted to the fixed-point area. Only the FP bit is monitored in the FLPU on operand transmission over the FLBB or the CDB. If the bit is present when the operand is routed to a floating-point unit, the set FP interrupt signal is sent to the I-Box for one cycle.

The FP and MALS bits are sent to the FLPU along with the SBO sink address signals from the MSCE and are entered into the status of the FLB on the following cycle.

The AE bit is sent to the FLPU from the I-Box at the time the operand is fetched from storage. Associated with the AE signal are six additional signals from the I-Box, which indicate to the FLPU the FLB to receive the AE tag. The AE state for each FLB is held until the operand arrives from storage. The bit is then entered into the status field of the FLB. This operand and all three tags will be sent via the FLBB to the fixed-point sinks when called for by that unit. The FP bit is not monitored on the FLBB by the FLPU when the operand is routed over that bus to the FXPU.

(8) Floating-Point Buffer Bus (FLBB).—The FLBB is used to transmit long or short floating-point operands (source) to the floating-point Reservation Units. Sixty-four bit fixed-point operands are also transmitted via the FLBB when the FLB's are being used for fixed-point operations. Units which use (gate onto) the FLBB are: FLB1, FLB2 . . . FLB6. When an FLB has its GWF–FLBB indicator on, and its F/E indicator is full, or about to be set full, a Request FLBB signal is sent to the FLBB priority logic.

FLBB Priority Circuit 559 provides simple priority with FLB1 given highest priority, and the FLB6 given lowest priority. When the request signal is received and no unit with higher priority is requesting the bus, the Accept Trigger for the FLB will be turned on at the next cycle boundary.

The Accept Trigger is essentially the outgate to the FLBB for the FLB given priority. During the accept cycle, the unit whose identification is set with the FLB is notified to sample the FLBB at the next cycle boundary.

Units which sample (gate from) the FLBB are:

A1—source register (reservation station)
A2—source register (reservation station)
A3—source register (reservation station)
M/D1—source register (reservation station)
M/D2—source register (reservation station)
Fixed-Point Buffers (FXB)

9. Floating-Point Register (FLR).—The four floating-point registers are named F0, F2, F4, and F6. Each of the FLR's is capable of holding a 64-bit floating-point operand and appropriate check bits.

Each FLR has associated with it the status bits given below as shown in FIGURE 22:

*S/L bit.*—This bit controls the precision of the next data to be ingated to the FLR.

*Tag busy bit.*—The tag busy bit indicates the validity of the tag field and, also, the validity of the FLR operand, shown in FIGURE 23.

*Tag field.*—The tag field is a 4-bit register which contains the address of the last unit that changed the reigster (busy bit=OFF), or the address of the next unit that will change the register (busy bit=ON).

*Comparator (4 bits).*—Each FLR has associated with it a comparator for comparing the address contained in its tag field with the CDB tag. When a match is detected and the tag busy bit is on (the tag is valid), conditions are met for sampling the CDB to the FLR on the next cycle.

*ME tag busy, ME tag M1/M2.*—These are utilized only when the FLR is the sink register of a single-precision multiply operation (ME). The logic is included to allow the sink register of a single-precision MPY OP to be tagged short-precision, and at the same time, to provide a means ingating the long-precision result from the multiply unit. With the sink register tagged short-precision, it will function smoothly with the common data bus tag scheme when the ME OP is included in a sequence of short-precision operations.

Update for the ME multiply instruction consists of:

(1) Set E/L to short.
(2) Set tag field to address of selected unit.
(3) Set tag busy bit on.
(4) Set ME busy bit on.
(5) Set low-order bit of selected unit address to ME tag M1/M2.

The tags are constantly being compared to the CDB tag, but are valid only when the busy bits are on. If the FLR described above is used as the sink FLR of a subsequent short-precision instruction before the ME OP is completed, the tag field will be updated to a more current status; however, the ME controls are not updated unless, of course, the new OP is ME. This FLR cannot be used for a long-precision OP until the ME is completed. Thus, the right half of the FLR is properly maintained with long-precision results from the ME OP's.

The CDB tag's three highest order bits are decoded for any M/D address, while the ME tag M1/M2 will be compared to the low-order CDB tag bit to detect which MD unit is to use the CDB next slot.

The ME busy bit and the ME tags are reset whenever the right half of the CDB is sampled into the FLR.

Thus, the FLR status is updated each time it is the sink register of the instruction being issued (i.e., at the completion of the decode which generates Step-the Stack). The exceptions are the Store instruction and the Compare instruction, in which cases the FLR status is not changed.

Special ME tags are included in the FLR status to account for the long-precision result of a short-precision multiply operation. The special ME tag and busy bit are set on only when the operation is a single-precision OP (ME).

(10) Floating-Point Register Bus (FLRB).—The FLRB is used to transmit long-precision operands from the FLR's to the sink and source registers of the reservation registers. When operands are to be moved from the FLR's to the SDB's, they are gated to the FLRB which is gated to the CDB. The CDB is the only data input to the FLR's, and is the only floating-point input to the SDB's. The FLR's are the only units which use the FLRB (gate onto it). Units which sample the FLRB (gate from it), are:

A1 unit sink and source registers.
A2 unit sink and source registers.
A3 unit sink and source registers.
M/D1 unit sink and source registers.
M/D2 unit sink and source registers.

The FLRB is gated to the CDB for certain move operations.

(11) Common Data Bus (CDB).—The Common Data Bus is capable of transmitting long floating-point operands and results between FLB's, FLR's, SDB's, and the floating-point execution units. FIGURE 26 shows the units which use, and the units which sample, the CDB. Each unit which uses the CDB is assigned a four bit binary identification number called the address of the unit. When a unit requires the use of the CDB to transfer an operand it must request use of the bus through the CDB priority circuit in FIGURE 28. The bus priority is a combination of simple and FIFO (first-in-first-out) priority. The overall CDB priority is FLB1, FLB2 . . . FLB6 (FIFO–A1, A2, A3), and (FIFO–MD1, MD2). The Adder unit and the MD unit CDB requests must be handled in FIFO manner to allow staging of operation through these units. The FLB1 has highest priority and the MD unit requests have the lowest priority.

When a request is received at Priority Circuit 518 (FIGURE 18B) and no unit with higher priority is requesting the CDB, an accept signal is returned to the requesting unit. The address (number) of the requesting unit also broadcast by Priority Circuit 518 on the CDB tag bus 196M to all units capable of receiving from the CDB (see FIGURES 27 and 28). The CDB tag with the accept signal are maintained for one complete machine cycle. After the requesting unit receives the accept signal, it will outgate data to the CDB on the cycle following the accept cycle. The timing of the request signal, the accept signal, the CDB tag, and gating of data onto the CDB are related as shown in FIGURE 27.

Each unit which can receive from the CDB has a tag register (4 bits) and a comparator (4 bits). See FIGURE 22, 30, and 31. When a busy unit's tag and the bus tag compare-equal, the unit's CDB ingate logic is set to sample the bus on the following cycle. The receiving unit's tag register was previously set to a CDB user's address during the decode cycle of a previous instruction.

Tags are introduced into the CDB System using the R2 field of the RX Load instruction (FLB address) or from the unit select logic (Reservation Unit addresses) when the arithmetic type of instruction is decoded.

All unit addresses introduced in this manner are addresses of units which may gate data onto the CDB. The address is set into the tag register of the (sink) FLR for either the RX Load or the arithmetic type instruction.

Store operations do not introduce tags. The FLR tags for each OP issued from the stack are distributed from the FLR tag registers to all samplers of the CDB during the OP decode cycle. Two tag assignment busses are utilized for transmission of tags during the decode cycle (as shown in FIGURE 35) in order to retain the identity of the tags at the execution units. The tags of the FLR, whose address is contained in the R1 (sink) field of the instruction, is the sink operand (first operand) tag, while the tag of the FLR (if any), whose address is contained in the R2 (source) field, is the source operand (second operand) tag.

A sink operand tag can be assigned only to the following units:

A1 Unit Sink Register
A2 Unit Sink Register
A3 Unit Sink Register
M/D1 Unit Sink Register
M/D2 Unit Sink Register
SDB1 Store Data Buffer
SDB2 Store Data Buffer
SDB3 Store Data Buffer A source second operand tag can be assigned only to the following units:

A1 Unit Source Register
A2 Unit Source Register
A3 Unit Source Register
M/D1 Unit Source Register
M/D2 Unit Source Register
F0
F2
F4
F6
ZET

(12) Example of tag assignment sequence.—The sequencing of dependent instructions is accomplished by utilizing the tag on each FLR in conjunction with the CDB for transmitting a result to any FLR and to all units waiting for that result. The FLR tag always contains the identification of the last unit to use the register as a sink.

The following sample program execution illustrates how tags are used; the tag assignments can more easily be followed using FIGURE 43 which indicates all tag assignments existing at the end of each instruction decode cycle.

(1) LD F0, FLB1

At decode start for FLR=F0, TB=0, and Tag=Any.
This is how an RX Load instruction appears to the stack. Upon reaching the bottom of the stack, the instruction is decoded, and a check is made on the status of the sink register. If a precision conflict exists, the stack will wait until the sink FLR is not Busy (i.e. available) to proceed.
At decode end for FLR=F0, TB=1, and Tag=FLB1.
When no precision conflict exists for F0, a GWF-CDB signal is sent to FLB1 and the sink FLR status is updated. If the FLB is already full or is being loaded, it will request the CDB as soon as it receives the GO signal. If the buffer is not loaded, it will request the CDB as soon as it becomes full.

(2) MD F0, FLB2

At decode start for FLR=F0, TB=1, and Tag=FLB1.
At decode end for FLR=F0, TB=1, and Tag=M/D1.
Now the decode also checks for the availability of a multiply unit. If F0 were not busy, it would be transmitted to the selected multiplier, say MD1, along with the select. Since F0 is busy, the tag, FLB1, is sent instead, and M/D1 is instructed to get its sink operand off the CDB when FLB1 is using the Bus. The sink FLR tag, of course, is updated to M/D1. FLB2 is tagged with the M/D1 address and instructed to Go-When-Full via the FLBB. When the operand arrives from storage, the buffer will transmit it to M/D1's source register. If there is a precision conflict, the stack will wait until the register has a Tag Busy=0 to proceed.

(3) LD F2, FLB3

At decode start for FLR=F2, TB=0, and Tag=Any.
At decode end for FLR=F2, TB=1, and Tag=FLB3.
The F0 instruction sequence is broken by this Load instruction. The tag assignments occur in the same manner as described for instruction (1).

(4) MD F2, FLB4

At decode start for FLR=F2, TB=1, and Tag=FLBB.
At decode end for FLR=F2, TB=1, and Tag=M/D2.
Now comes an RR instruction, where both registers are busy. The sink is handled as before, assuming adder A1 is available. The tag of the source FLR is also shipped to A1, but it is not updated. Only sink FLRs have their tags updated.

(5) AD F0, F2

At decode end for FLR=F0, TB=1, and Tag.
At decode end FLR=F2, TB=1, and Tag=M/D2.
The tag assignments occur in the same manner as described for Instruction (4).

(6) STD F0, SDB1

At decode end for FLR=F0, TB=1, and Tag=A1.
At decode end for FLR=F2, TB=1, and Tag=M/D2.
When the Store instruction is decoded, a check is made via the store controls on the availability of SDB1. If it is available, a select signal is sent to it by the store controls. Of course, the sink register tag A1 was sent to the assigned SDB during the decode cycle of the Store instruction. The select signal informs the SDB to keep the A1 tag, compare it to the CDB tag, and sample the CDB when a match is detected. The sink FLR tag is not updated for Store instructions.

(7) LD F0, FLB5

At decode start for FLR=F0, TB=1, and Tag=A1.
At decode end for FLR=F0, TB=1, and Tag=FLB5.
It should be noted that a RX Load instruction may be executed even though its sink register is busy. The only inhibiting condition is a precision conflict. If none exists, the FLB is given the GWF-CDB signal, and the sink register status is updated.

At the end of this sequence of instructions, the following tag pattern exists.

| Unit: | Tag |
|---|---|
| F0 | FLB5 |
| F2 | M/D2 |
| M/D1, source | — |
| M/D1, sink | FLB1 |
| M/D2, source | — |
| M/D2, sink | FLB3 |
| A1, source | M/D2 |
| A1, sink | M/D1 |
| SDB1 | A1 |

This final tag pattern represents the internal FLPU connections existing among the units after the decode of the seventh instruction. For example, FLB1 operand is received from storage, it is connected to the M/D1 sink RU register. When M/D2 generates its next result, it will simultaneously be connected to both FLR-F2 and the A1 source RU register, etc.

No Execution Unit may begin execution until it has received both operands. Therefore, each of the M/D units will start on the cycle after both its respective RU sink register has received its operand from the CDB and the RU source register has received its operand from the FLBB. The Adder cannot start until both M/D1 and M/D2 have sent their results on the CDB. The SDB is connected to the CDB when Adder A1 connects its result to the CDB. It does not matter which of the independent M/D1 or M/D2 executions finishes first. Also, the RX Load instructions are not dependent upon completion of the previous instructions, except on precision conflicts which are rare. The busy bit on a FLR is reset once its tag is used to connect it to the CDB.

Instructions are issued in strict sequence from FLOS dependent only on the availability of an Execution Unit if not precision conflicts exists, which is very rare. When a precision conflict exists, execution continues when the register operand(s) are available. (When a conditionally issued OP reaches the bottom of the FLOS, it is not issued, and the stack stops until the conditional hold is removed.)

Executing Units perform their functions as soon after they have been selected at both operands become available. These Units acquire storage operands from the FLBs on the FLBB either one cycle after they receive the select signal or one cycle after the buffer is loaded from storage, whichever is later. FLR operands are either sent with the select signal via the FLR bus or are taken off the CDB when the address of the Unit whose results is on the CDB matches the tag sent to the waiting unit by the OP stack.

The use of the CDB and tags allows strict sequencing of dependent instructions, out of sequence execution of independent instructions, and simultaneous entry of operands into an FLR and all units waiting for that operand.

Two cycles before an arithmetic Unit completes execution, it requests the CDB for a time slot in which to send its forthcoming result. If no priority conflict exists, it will be given the CDB time slot at the conclusion of its execution. CDB request conflicts may be resolved arbitrarily, since the tags ensure correct sequencing. Reference may be made to the flow chart in FIGURES 52A and B for CDB priority control operations. When a Unit is granted the CDB its identification is sent to all other Units including the SDBs and FLRs. SDBs only take from the CDB according to its tag; while FLBs, on the other hand, never take data from the CDB, but only send storage operands when full after a GO signal has been received from the FLOS.

(13) *RU operation.*—The operation of the RU's follows. (Reference can be made to the flow charts in FIGURES 60–63.) The select lines 939A–H shown in FIGURE 18A respectively turn on the Unit Busy Trigger 940 in FIGURE 31. If the RU is not busy, the tag fields and the S/L bit from the FLPU are ingated into their respective triggers. It should be noted, at this point, that the tag field, S/L, and the Read-In (RI) triggers connected to gates 944–948 are set each cycle, if conditioned, and reset if they were on and the set condition is not present. If Unit Busy Trigger 940 is on, each tag field, SO, CC, and S/L triggers are locked by disabling gates 934 at the next cycle boundary, whereas the RI triggers, after being turned on, will be reset and held off.

The FLPU sends the sink and source tag bits for each operation at the same time during the decode cycle on busses 182A and 182B as shown in FIGURES 35 and 18A. The select line 939 is a private line to each unit, and as mentioned previously, sets the Unit Busy Trigger 940 which inhibits the read-in of any following tags. The Read-In Triggers for each data bus (sink and source) are set upon condition each cycle. If the RU is selected, these triggers will be reset at the next cycle boundary and held reset. The operands for any instruction are transferred under the following conditions on the following data busses:

| Source | Sink | Sink Tag | Source Tag |
| --- | --- | --- | --- |
| CDB | CDB | ≠0 | ≠0 |
| CDB | FLRB | =0 | ≠0 |
| FLRB | CDB | ≠0 | =0; SO=0 |
| FLRB | FLRB | =0 | =0; SO=0 |
| FLBB | FLRB | =0 | =0; SO=1 |
| FLBB | CDB | ≠0 | =0; SO=1 |

The two operands to any RU can be read in from the CDB on the same machine cycle. For example, this happens in the case of doubling one operand, wherein the source tag and the sink tag are then identical, and both sink and source full triggers 960 and 961, and the CDB Read-In Triggers 574C and D are turned on. When both operands come from FLR's it is not possible to determine which operand comes from any particular register, since the tags are both zero. Instead, this problem is resolved by the FLPU sending the source operand over the FLRB before the sink operand. For this case, the RU does not turn on Sink-Full Trigger 961 and does not generate a sink register ingate signal until the Source-Full Trigger is set. The Source-Full and Sink-Full Triggers are reset by the Execution Unit when it has accepted the operands in the RU.

If either of the operands are coming from the CDB, the time at which the data will appear with respect to the unit select time is undefined. If either of the operands are coming from the FLRB, the earliest time at which the data is received is the next cycle boundary after the select is received. If the source operand is from the FLBB, the earliest time at which the data is received is the second cycle boundary after the select cycle.

The source tag bits are examined for an all-zero condition. If the all-zero condition does not exist and the source tag is identical to the bus tag (determined by Exclusive-Or circuitry on a bit-by-bit basis), the following will occur:

(a) If the Unit Busy Trigger is on, indicating that this RU has been selected, and the Source-Full Trigger has not been set, the Source-Full Trigger and the CDB RI will be turned on.

(b) If the Unit Busy Trigger is not on, the Source-Full Trigger and the CDB RI Trigger will be set, yet no operand will be ingated.

If the Unit Busy Trigger is on, the CDB read-in signal for this RU will be generated. If this is a double-precision operation, the entire RU source register is read into; for a single-precision operation, only the high-order half of the RU source register is read in. The Source-Full Trigger will be reset when the unit receives a CDB Accept signal. If the Unit Busy Trigger is not on, the Source-Full Trigger will be reset at the next cycle if no information is to be read into it.

The case, where both the source tag field and the SO bit are zero, must also be considered. If the Unit is busy, and its Source-Full Trigger is not set, or if the Unit is not busy, both its source Read-In FLR Trigger and its Source-Full Trigger will be turned on. If the Unit goes busy, data will be read in from the FLRB into the source reservation stations.

If the source tag field is zero and the SO bit is one, and FLB Ready line 542A is activated the Source-Full Trigger and the Source Read-In FLBB Trigger will be set. If the Unit is busy, the FLBB will be read into the source RU operand register.

The sink tag field is also examined for an all-zero condition. If the all-zero condition does not exist, and the sink tag is identical with the Bus Tag, the Sink-Full Trigger and the Read-In CDB Trigger 993 will be turned on provided that:

(a) the Unit is not busy, or
(b) the Unit is busy and the Sink-Full Trigger is off.

If the Unit is busy, the Read-In Sink RU line is activated, and the Sink-Full Trigger will be reset when the Unit receives an Accept signal. If the Unit is still not busy, the Sink-Full Trigger will be reset in the next cycle, if no data are read into it.

If the sink tag field is zero, the Sink Read-In FLR Trigger 995 is turned on, if the Unit is not busy, or if the Unit is busy and the Sink-Full Trigger is not on. The Sink-Full Trigger is set under these conditions and the additional condition that the Source Read-In FLR Trigger is not on. If the unit is busy, and the Source Read-In Trigger is not on, the read-in for the FLRB into the sink RU register is caused.

The select line 939 for a particular RU will also reset the unit's operand registers and will outgate a unit-full signal to a start control in the Execution Unit if:

(a) the Source-Full Trigger is on, and it is a one-operand operation, or
(b) it is a two-operand operation, and both source and Sink-Full Triggers are on.

The Sink-Full Trigger will be reset when the Unit receives an Accept signal. However, if the Unit Busy Trigger is not on, the Sink-Full Trigger will be reset at the next cycle, if no information is to be read into it. See U.S. patent applications 579,082 or 576,157, previously cited, for a detailed description of the Execution Unit start controls.

(14) *RU Reset Control Logic.*—If the Execution Unit receives a CDB Accept or a Compare Accept for any RU, it will generate a signal to reset the following triggers for the particular RU involved:

(1) Unit-Busy-Trigger
(2) Source-Full-Trigger
(3) Sink-Full-Trigger

(15) *Storage Data Buffer (SDB).*—The SDB's are three seventy-two bit buffers (SDB's 1, 2, 3) each associated with a particular Storage Address Register (SAR). These buffers can receive data for store operations from the FLPU via the CDB and from the Fixed Point Area via the FX STORE BUS. Also SDB–1 is used for I-Box stores of the Program Status Word (PSW). From the SDB's the data is then sent by the MSCE to storage via the Storage Bus IN (SBI) 1971 when the Store request is made.

Associated with each SDB is a SC TAG register 930, a BUSY trigger 244B and a FULL trigger 244C. One BUS TAG register 980 is used by all SDB's.

The BUSY trigger 244B indicates that the SDB 244A has been selected for a store and that it is waiting for data. When the data is gated into an SDB, its BUSY trigger is turned OFF.

The FULL trigger 244C tells the MSCE that it can make the store request. It is turned ON when data is gated into the SDB. It is turned OFF when the store request initiated by the MSCE is accepted.

The SC TAG register 930 and BUS TAG register 980 are used to control the ingating of the SDB's from CDB.

When the SDB's 244A are not BUSY or FULL, the SC TAG is gated into register 930 each cycle. The BUS TAG is gated into the BUS TAG register 980 each cycle, regardless of conditions. If the SC TAG register 930 is all zeros, or if the SC TAG register equals the BUS TAG register, data is gated in from the CDB. In both of these cases the FULL trigger 244C is turned ON when the data is ingated. If the data isn't available at the time of the select, SC TAG register 930 is continually compared with the BUS TAG. When there is an equal compare the FULL trigger 244C is turned ON, and one cycle later the data is gated into the SDB from the CDB.

In the case of a store operation for which the data originates in the Fixed Area, the in-gating procedure is relatively simple. A FX SELECT is sent to a particular SDB in parallel with the data to be stored. The recognition of the SELECT will cause the data to be in-gated and the FULL trigger to be turned on. When the I-Box stores a PSW, the PSW is gated into SDB–1 and FULL trigger-1 is turned ON.

While the invention has been particularly shown and described with reference to preferred embodiments thereof, it will be understood by those skilled in the art that the foregoing and other changes in form and details may be made therein without departing from the spirit and scope of the invention.

We claim as our invention:

1. An operand conveying system for an instruction-execution unit comprising,
   a common data bus,
   a plurality of input units, each having data storage means connectable to said common data bus,
   a plurality of output units, each having data storage means connectable to said common data bus, with an address register associated with each output unit,
   means for setting into an address register an address representing the input unit from which an operand is forthcoming for the associated operand register,
   address generating means connectable to said common data bus to provide the address on said bus of any input unit providing a request signal to said address generating means for the transmission of an operand on said common data bus,
   a request circuit for each input unit for providing the request signal from any input unit to said address generating means when said input unit has an available operand,
   said address generating means broadcasting an address signal representing any requesting input unit on said common data bus in response to a request signal,
   comparator means associated with each output unit for providing a signal representing similarity between an address stored in any address register and any address broadcast on said common data bus,
   and ingating means set by said signal from said comparator means to ingate data broadcast from the requesting input unit on said common data bus immediately following any similar address transmitted on said common data bus by said address generating means.

2. A common data bus system as defined in claim 1 in which some of said input units are also output units.

3. A common data bus system as defined in claim 1 including means for gating said address and said data in consecutive machine cycles on said common data bus.

4. A common data bus system as defined in claim 1 further including,
   a first plurality of lines in said common data bus for broadcasting the address of any requesting input unit,
   and a second plurality of lines in said common data bus for broadcasting the data of the requesting input unit,
   wherein an address broadcast from any input unit can be simultaneous with the data broadcast of any other input unit.

5. A common data bus system as defined in claim 1 including
   a busy indicator circuit associated with each output unit,
   and means for connecting each output unit address register to said common data bus for each output unit selected to have its busy indicator circuit provide a busy signal.

6. A common data bus system as defined in claim 1 in which
   said first plurality of lines are connected together by a tag OR circuit,
   and said second plurality of lines are connected together by a data OR circuit.

7. A common data bus system as defined in claim 1 in which
   said input circuits comprise a plurality of source operand registers with a corresponding plurality of associated source control registers.

8. A common data bus system as defined in claim 1 in which
   said output units comprise a plurality of sink operand registers, with a corresponding plurality of associated sink control registers.

9. A common data bus system as defined in claim 1 in which a plurality of operand registers comprise both said input and output units, and a plurality of tag control registers respectively associated with said operand registers.

10. A tag-assignment system for the execution of an instruction, comprising, a working unit for receiving an operand, and an associated working sink control unit, an execution unit, at least one reservation unit capable of being connected to said execution unit, said reservation unit including an operand register with a respective control register, means for transmtiting the existing setting of the working sink control register to the reservation unit control register, and means for resetting the working sink control register to represent the address of the selected reservation unit.

11. Tag transfer means in an instruction-execution decoder for a storage-to-register type of arithmetic instruction including the means defined in claim 10 comprising, a storage operand buffer, and means for setting the address of said storage operand buffer into said reservation unit control register during the execution of said instruction, whereby the execution of a next instruction can overlap the execution of the storage-to-register instruction.

12. Tag transfer means in an instruction-execution decoder for a register-to-register type of arithmetic instruction including means defined in claim 10 comprising, a second working operand register, and an associated second working control register for storing the address of a unit which is to transfer an operand into said second working operand register, and means for transferring the address in the second working control register to a reservation unit source control register during the execution of said instruction.

13. Tag transfer means in an instruction-execution decoder as defined in claim 11 comprising, a common operand bus, said working sink operand register and said working sink control register being connectable as input units to said bus, a priority circuit operating with said common operand bus to control the connection of any requesting input unit to said bus, an output of said arithmetic execution unit being connectable as an input to said bus, said reservation unit sink operand register and said reservation unit sink control register being each connectable as outputs of said bus, means with each input unit transmitting its address on said bus after it receives an operand, said reservation unit including a comparator for comparing each address transmitted on said bus with the address stored in its sink control register, and providing a compare-equal signal when address identity is sensed, and means for ingating into said reservation unit sink operand register any data on said bus immediately following the address transmitted on said bus for which the compare-equal signal is generated.

14. Tag transfer means in an instruction-execution decoder defined in claim 10, further comprising, a plurality of reservation units associated with said execution unit, selection means for selecting an available one of said reservation units for use in the execution of said instruction.

15. Tag transfer means in an instruction-execution decoder defined in claim 12, further comprising, a plurality of reservation units associated with said execution unit, selection means for selecting an available one of said reservation units for use in the execution of said instruction.

16. Tag transfer means in an instruction-execution decoder defined in claim 12, further comprising, busy-status indicating means associated with each of said reservation units, means for setting said busy-status means in response to selection of a respective reservation unit by said selection means, and means for releasing the busy status of said busy-status indicating means after both operands have been received by said reservation unit.

17. Tag transfer means in an instruction-execution decoder defined in claim 12, further comprising, busy-status indicating means associated with each of said reservation units, means for setting said busy-status means in response to selection of a respective reservation unit by said selection means, means for releasing the busy-status of said busy-status indicating means after both operands have been received by said reservation unit, and means for ingating into the reservation unit control register every transmitted setting of any working sink control register when said busy-status is not set.

18. An execution unit for instructions having sink and source operand designations wherein the sink designation is expected to contain the result of its instruction execution, comprising, a plurality of sink operand registers, each having a sink tag register, a plurality of loading buffers, means for assigning a particular one of said loading buffers to a particular source operand requiring a memory fetch, a plurality of reservation units, each having a sink operand and a tag store, and a source operand and a tag store, a plurality of arithmetic units, each having an input from at least one of said reservation units, each arithmetic unit generating a result output after both operands are available in its selected input reservation unit, a data bus connecting said sink operand registers, reservation units, and arithmetic unit result outputs, means for transferring data on said data bus from any connected unit to any other connected units having a corresponding tag stored therein, whereby the overlapped execution of sequential instructions is obtained.

19. A common operand bus system comprising, a plurality of sending units, each having an address, a plurality of receiving units, each having an associated tag register, means for setting tags in said tag registers to represent sending units, a priority circuit for receiving requests from said sending units, a common bus connecting said sending units to said receiving units, said priority circuit sending the address of any requesting sending unit on said common bus, comparator means in each receiving unit for comparing each received tag to each setting of its tag register, and including means for indicating any equality of said comparison, said priority circuit signalling the selected sending unit to transmit its data on said common bus immediately following the transmission of its tag identification, and means for in-gating said data transmitted from said sending unit into said receiving unit having an equality signal.

20. A system as defined in claim 19 in which said sending units comprising storage operand buffers, and execution unit outputs, and said receiving units comprising reservation units which provide inputs to said execution units, and storage buffers, and working storage registers being connected to said common operand bus system as both receiving units and sending units.

21. A common data bus system as defined in claim 20, further comprising, an instruction decoder operating with a decode cycle, tag assignment means included in said operation decoder, said operation decoder including, means for setting the tag register associated with a selected one of said working storage registers with the address of the respective units from an operand will be sent, means for assigning a reservation unit to receive an operand required for executing the instruction, and means for updating the setting of the tag register associated with a selected sink working storage register to the address of the assigned reservation unit.

22. A data bus system including a common data bus as defined in claim 21 and, further comprising, a special bus for available operands connected between said working storage registers and said reservation units, means for detecting the availability of an operand in any of said working storage registers selected while decoding an instruction, tag assigning means for assigning a special tag setting to the associated tag register in a selected one of said reservation units, means for recognizing the special tag setting, means responsive to said recognition means for rejecting any signals on said common data bus until after said reservation unit is released, and means for releasing said reservation unit after its operands are transferred to an associated execution unit.

23. A common data bus as defined in claim 20 having an available operand bus connected between the working registers and reservation units, and having a storage operand bus connected between a storage fetch buffer and said reservation units.

24. A data bus system including a common data bus as defined in claim 21 and, further comprising, a special bus for storage operands connected between an available fetch buffer and said reservation units, tag assigning means for assigning a particular tag setting to set associated tag registers in an assigned receiving unit, and said assigning means assigning other tag settings to said associated tag register to represent any sending means from which an operand will be received.

25. Tag transfer means in an instruction-execution decoder for initiating the execution of arithmetic instruction, comprising, a working sink operand register for storing an operand, and an associated working sink control register for storing an address of a unit which is to transfer an operand into said working sink register, an arithmetic execution unit selected to execute said instruction, at least one reservation unit associated with said execution unit, said reservation unit including, a reservation unit sink operand register, and a reservation unit sink control register, and a source operand register with a respective source control register, means for transferring the address in the working sink control register to the reservation unit sink control register during the decoding of said instruction, and means for thereafter setting the address of the selected execution unit into the working sink control register during the execution decoding of said instruction, whereby execution of a subsequent instruction can begin before completion of execution of said arithmetic instruction.

26. In an execution unit for instructions having sink and source operand designations, wherein the sink designation is expected to contain the result of its instruction execution, comprising, a decoding means for each instruction for assigning a tag address representing a source of expected data to a sink register expected to receive said data, means with said decoding means for transferring said tag address to a reservation unit assigned by a subsequent instruction to use said sink register, and other means with said decoding means for replacing the tag address of said sink register with a tag address representing said assigned reservation unit for said subsequent instruction.

27. In an execution unit having the tag assignment system defined in claim 26, further including, common bussing means for connecting said sink register with said reservation unit.

28. In an execution unit having the tag assignment system defined in claim 26, further including, common bussing means for connecting said sink register to said reservation unit, and a result register being connectable to said common bussing means for transmitting the result to said sink register and said reservation unit.

29. A tag-assignment system in an instruction-execution decoder that permits the parallel execution of instructions, including means for partially executing a load instruction comprising, an operand bus, a storage operand buffer, and a sink operand register, each connectable to said operand bus, a control register associated with said sink operand register, means for setting the address of said storage operand buffer into said control register during the execution of said load instruction, and means for beginning the execution of the next instruction even though an operand is not yet available in said sink operand register for completing the execution of said load instruction, whereby the execution of the next instruction can overlap the execution of the load instruction.

30. A common data bus system as defined in claim 29 in which said setting means is actuated during a decode cycle of the instruction-execution decoder which has received said instruction.

31. A tag-assignment system as defined in claim 29, further comprising, a source control register associated with said storage operand buffer, at least one control bit position in said source control register being set by the reception of an operand from storage into the storage operand register, and means for transmitting an operand from said storage operand buffer to said sink operand register in response to the setting of said control bit position indicating the availability of the operand in said buffer.

32. A tag-assignment system as defined in claim 31, further comprising, means for transmitting the buffer address followed by an operand from said storage operand buffer to said operand bus, and means for in-gating said buffer operand from said operand bus into said sink operand register in response to a comparison between the address tranmitted on said operand bus and the address setting in the sink control register.

33. A tag-assignment system in an instruction-execution decoder as defined in claim 31 in which, said address transmitting means includes, means for setting a special-bit position in said sink control register to indicate the availability status of an operand in said sink operand register, and means for sensing the setting of said special-bit position for enabling the gating of the contents of said sink operand register onto said common data bus.

34. A tag-assignment system in an instruction-execution decoder as defined in claim 31, further including,
an address generating means connected to said control-bit position to broadcast the address of said storage operand buffer on said operand bus when said position is set.

35. A tag-assignment system as defined in claim 34, further including,
means for automatically broadcasting the contents of said storage operand buffer to said operand bus in timed sequence after initiating the transmission of said address on said operand bus,
means for indicating an equality between the transmitted address on said operand bus and the address setting in said control register,
and means responsive to said equality means for in-gating the operand being transmitted on said common data bus into said sink operand register.

36. A tag-assignment system in an instruction-execution decoder as defined in claim 29, further comprising,
means for setting a special-coded-bit configuration into said control register to indicate the non-availability of the control register for use with the operand bus,
and means for inhibiting the connection of said sink operand register to said operand bus in response to said special-coded-bit configuration.

37. A tag-assignment system in an instruction-execution decoder as defined in claim 36, further comprising,
a special bus for connecting the source operand buffer to a second sink operand register.
a second sink control register associated with said second sink operand register,
said second sink operand register connectable to both said special bus and said operand bus,
and means for sensing said special-coded-bit configuration to control the connection of said second sink operand register to a selector one of said sink operand registers.

38. A tag-assignment system in an instruction-execution decoder as defined in claim 36, further comprising,
a special bus for connecting the sink operand register to a second sink operand register,
a second sink control register associated with said second sink operand register,
said second sink operand registers connectable to both said special bus and said common data bus,
and means for sensing said special-coded-bit configuration to control the connection of said sink operand register to said second sink operand register.

39. A tag-assignment system for the execution of a register-to-register load instruction, comprising,
a common data bus,
a source operand register, and a sink operand register connectable to said common data bus,
a first control register with said sink operand register,
and means for setting the address of said source operand register into bit positions of said sink control register in response to initiating the execution of said instruction to enable the execution to be delayed while awaiting a source operand without holding up the execution of subsequent instructions.

40. A tag-assignment system as defined in claim 39, further comprising,
at least one bit position in said source control register being set by the reception of an operand into the source operand register,
and means for transmitting on the common data bus the source address in response to the setting of said control bit followed by transmission on the common data bus of the source operand,
and means for in-gating said source operand from said common data bus into said sink operand register in response to a tag setting in said tag control register.

41. A common data bus system as defined in claim 40, further comprising,
address generating means associated with said source control register,
said address generating means being said source address transmitting means,
and means associated with said sink control register for recognizing an identity between the tag stored in its control register and an address transmitted on said common data bus by said address generating means.

42. A common data bus system as defined in claim 41, further comprising,
a plurality of sink operand registers with a corresponding plurality of associated sink control registers,
and said common data bus capable of receiving inputs from all units which can provide an operand to said sink operand register.

43. A common data bus system as defined in claim 42, further comprising,
a plurality of source operand registers with a corresponding plurality of associated source control registers.

44. A common data bus system as defined in claim 39, in which said sink control registers are set at the end of a decode cycle for an instruction decoder which has received said instruction.

45. A tag-assignment system for the execution of a register-to-storage store instruction, comprising,
a common data bus,
a storage operand buffer, and an operand working register connectable to said common data bus,
a storage control register with said storage operand buffer,
and means for setting the address of said operand working register into bit positions of said storage control register in response to initiating the execution of said instruction for arranging a data transfer on said common data bus during a following machine cycle.

46. A tag-assignment system as defined in claim 45, further comprising,
a control working register associated with said operand working register,
at least one control bit position in said source control working register being set by the reception of an operand into the operand working register during a machine cycle after a tag-setting machine cycle,
and means for transmitting on the common data bus, a source operand when said control bit indicates operand availability,
a means for in-gating said operand from said common data bus into said storage operand register in response to the tag setting in the control working register during a machine cycle after a cycle setting the tag in said sink control register.

47. A common data bus system as defined in claim 46, further comprising,
address generating means associated with said control working register,
said address generating means being connected to said common data bus to provide the address of said operand working register in response to the setting of said control working register to indicate availability of said source operand,
means associated with said storage control register for recognizing an identity between the tag stored in its control register and an address received from said common data bus, and means for in-gating into said storage operand register the operand immediately following the identification on said common data bus.

48. A common data bus system as defined in claim 47, further comprising, a plurality of operand working registers with a corresponding plurality of associated control working registers.

49. A common data bus system as defined in claim 48, further comprising, a plurality of storage operand registers with a corresponding plurality of associated storage control registers.

50. A common data bus system as defined in claim 45 in which said control working register is timed to be set at the end of a decode cycle for an instruction decoder which has received said instruction.

References Cited

UNITED STATES PATENTS

| | | | |
|---|---|---|---|
| 3,331,056 | 7/1967 | Lethin et al. | 340—172.5 |
| 3,327,294 | 6/1967 | Furman et al. | 340—172.5 |
| 3,317,899 | 5/1967 | Chien et al. | 340—172.5 |
| 3,311,887 | 3/1967 | Muroga | 340—172.5 |
| 3,309,677 | 3/1967 | Montgomery et al. | 340—172.5 |
| 3,303,477 | 2/1967 | Voigt | 340—172.5 |
| 3,292,151 | 12/1966 | Barnes et al. | 340—172.5 |
| 3,277,447 | 10/1966 | Newman et al. | 340—172.5 |
| 3,270,324 | 8/1966 | Meade et al. | 340—172.5 |
| 3,249,921 | 5/1966 | Seeber | 340—172.5 |
| 3,248,702 | 4/1966 | Kilburn et al. | 340—172.5 |

GARETH D. SHAW, Primary Examiner

UNITED STATES PATENT OFFICE
CERTIFICATE OF CORRECTION

Patent No. 3,462,744                                         August 19, 1969

Robert M. Tomasulo et al.

It is certified that error appears in the above identified patent and that said Letters Patent are hereby corrected as shown below:

Column 7, line 2, "decored" should read -- decoded --. Column 13, line 67, "and" should read -- any --. Column 30, line 9, "FLBB" should read -- FLB --. Column 32, line 2, "frof" should read -- from --. Column 34, line 52, "SBC" should read -- SBO --. Column 38, line 1 should be line 2. Column 39, line 55, "walid" should read -- valid --. Column 43, in the chart, the line reading "Subtract Unnormalized  SU  RX  7F" should read -- Subtract Unnormalized (Short)  SU  RX  7F --. Column 50, line 40 the number "934-N" should read -- 934A-N --; line 41, "574-E" should read -- 574A-E --. Column 59, line 34, "reigster" should read -- register --; line 54, "E/L" should read -- S/L --. Column 63, line 20, "results" should read -- result --.

Signed and sealed this 12th day of May 1970.

(SEAL)
Attest:

EDWARD M. FLETCHER, JR.                        WILLIAM E. SCHUYLER, JR.
Attesting Officer                                    Commissioner of Patents